US007143091B2

(12) United States Patent
Charnock et al.

(10) Patent No.: US 7,143,091 B2
(45) Date of Patent: Nov. 28, 2006

(54) METHOD AND APPARATUS FOR SOCIOLOGICAL DATA MINING

(75) Inventors: Elizabeth Charnock, Foster City, CA (US); Steven L. Roberts, Foster City, CA (US); David J. Holsinger, Pescadero, CA (US)

(73) Assignee: Cataphorn, Inc., Redwood City, CA (US)

( * ) Notice: Subject to any disclaimer, the term of this patent is extended or adjusted under 35 U.S.C. 154(b) by 280 days.

(21) Appl. No.: 10/358,759

(22) Filed: Feb. 4, 2003

(65) Prior Publication Data

US 2003/0182310 A1     Sep. 25, 2003

Related U.S. Application Data

(60) Provisional application No. 60/354,403, filed on Feb. 4, 2002, now abandoned.

(51) Int. Cl.
*G06F 17/30* (2006.01)
(52) U.S. Cl. .............................. 707/5; 707/100; 715/500
(58) Field of Classification Search ................ 707/2–5, 707/100; 715/500, 501.1, 513–516
See application file for complete search history.

(56) References Cited

U.S. PATENT DOCUMENTS

| | | | |
|---|---|---|---|
| 5,689,550 A | 11/1997 | Garson et al. | 379/88.18 |
| 5,754,939 A | 5/1998 | Herz et al. | 455/3.04 |
| 6,209,100 B1 | 3/2001 | Robertson et al. | 713/200 |
| 6,275,811 B1 | 8/2001 | Ginn | 705/10 |
| 6,311,194 B1* | 10/2001 | Sheth et al. | 715/505 |
| 6,381,579 B1 | 4/2002 | Gervais et al. | 705/8 |
| 6,598,046 B1* | 7/2003 | Goldberg et al. | 707/5 |
| 6,631,375 B1* | 10/2003 | Jecha et al. | 707/9 |
| 6,654,726 B1* | 11/2003 | Hanzek | 705/26 |
| 6,728,752 B1* | 4/2004 | Chen et al. | 709/203 |

OTHER PUBLICATIONS

Barry Wellman, 'For A Social Network Analysis Of Computer Networks: A Sociological Perspective on Collaborative Work and Virtual Community', 1996, ACM, pp. 1-11.*
International Search Report from PCT (corresponding case No. PCT/US03/03309) dated May 1, 2003.

* cited by examiner

*Primary Examiner*—Greta Robinson
*Assistant Examiner*—Cheryl Lewis
(74) *Attorney, Agent, or Firm*—Blakely, Sokoloff, Taylor & Zafman LLP; Judith A. Szepesi

(57) ABSTRACT

A processing system for retrieving interrelated documents is described. The system comprises a document repository for storing a plurality of documents, a metadata repository for storing a plurality of metadata elements to represent relations between the documents, and a sociological analysis engine to identify relationships between the documents using the metadata elements from the metadata repository.

30 Claims, 64 Drawing Sheets

Figure 1: Example of a computer network
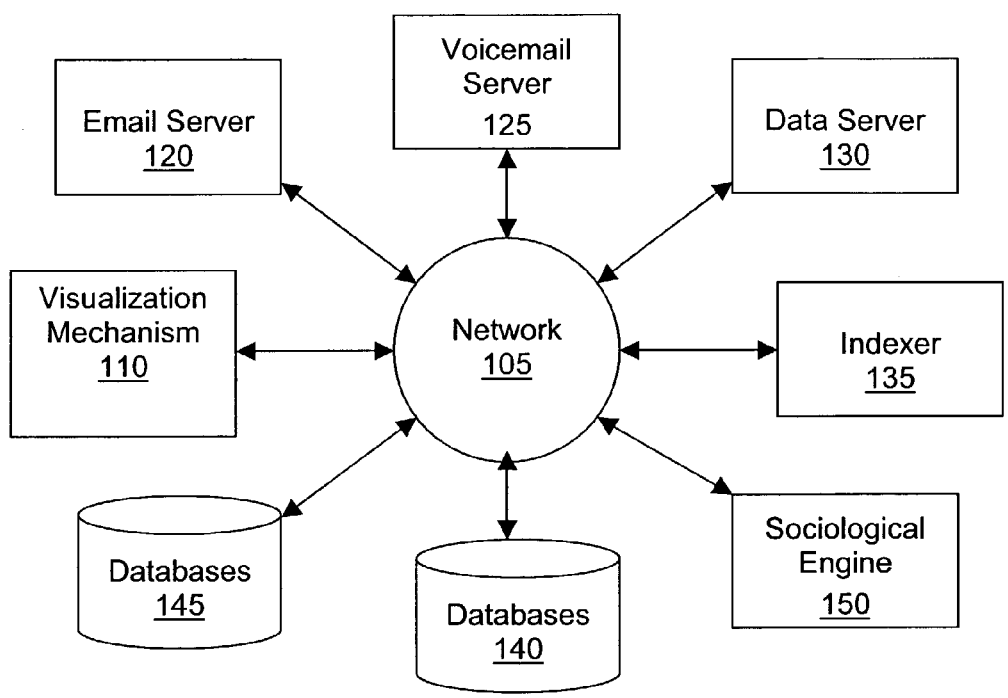

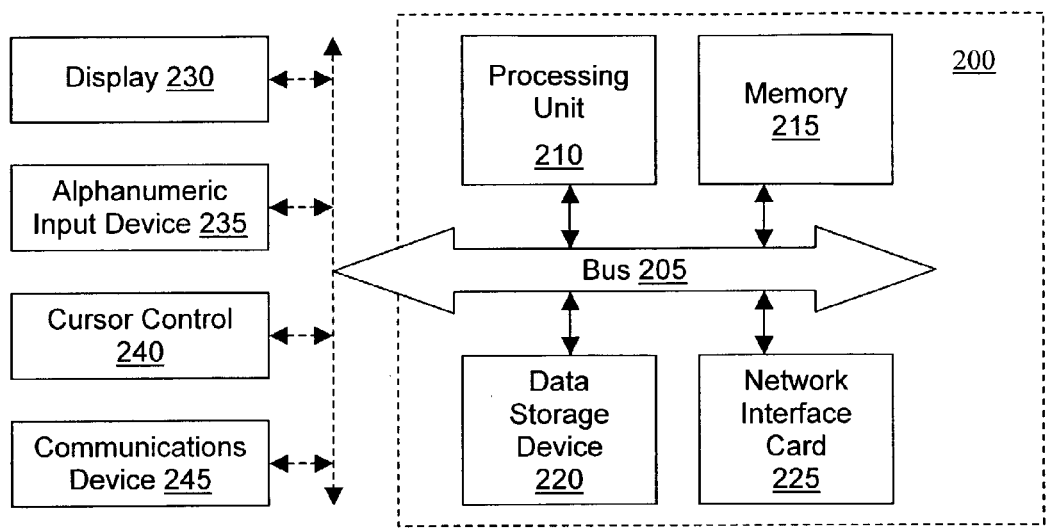
Figure 2: Example of a digital computer

Figure 3: Navigation Flow
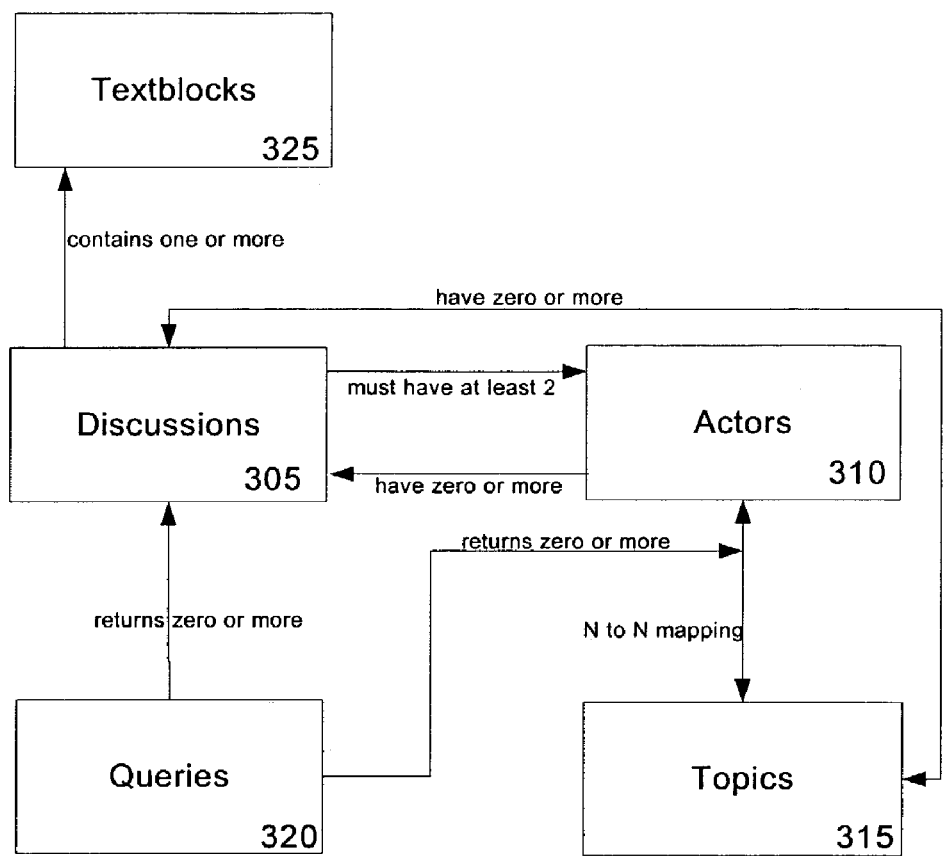

Figure 4a: Initial Preprocessing
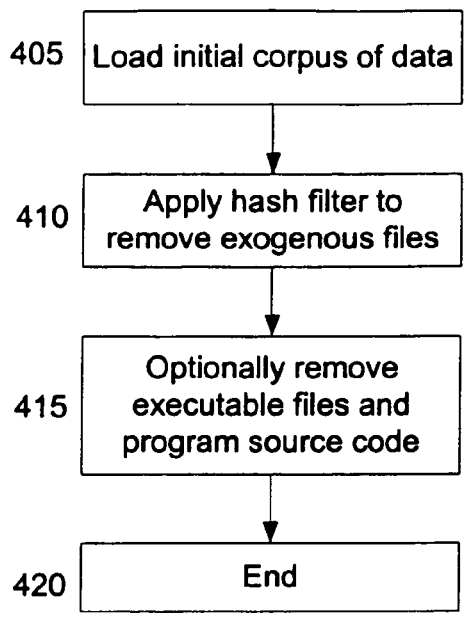
Figure 4b: OCR Processing of Graphics Files
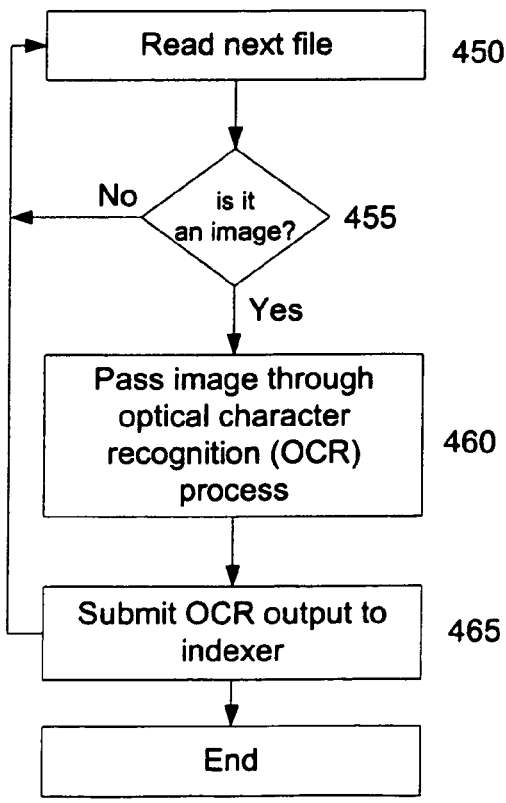

Figure 4c: Discussions and Singletons
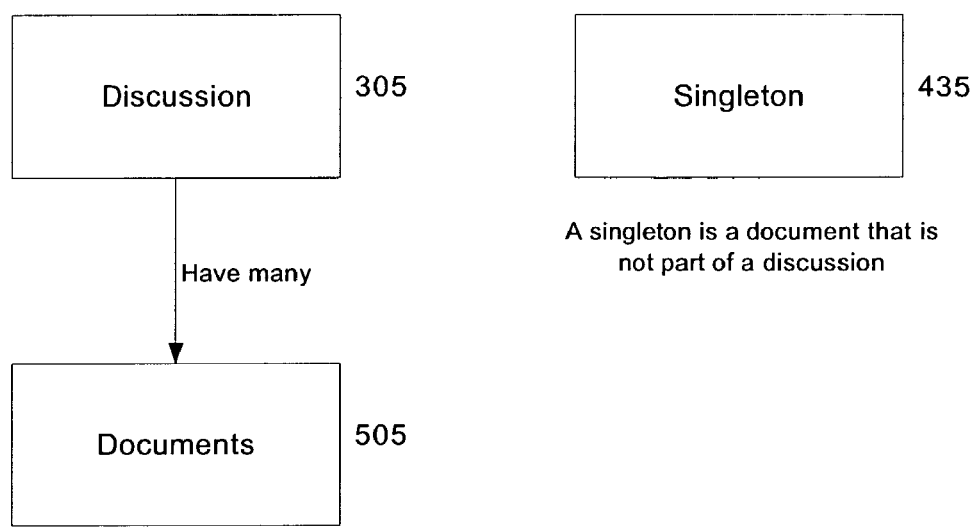

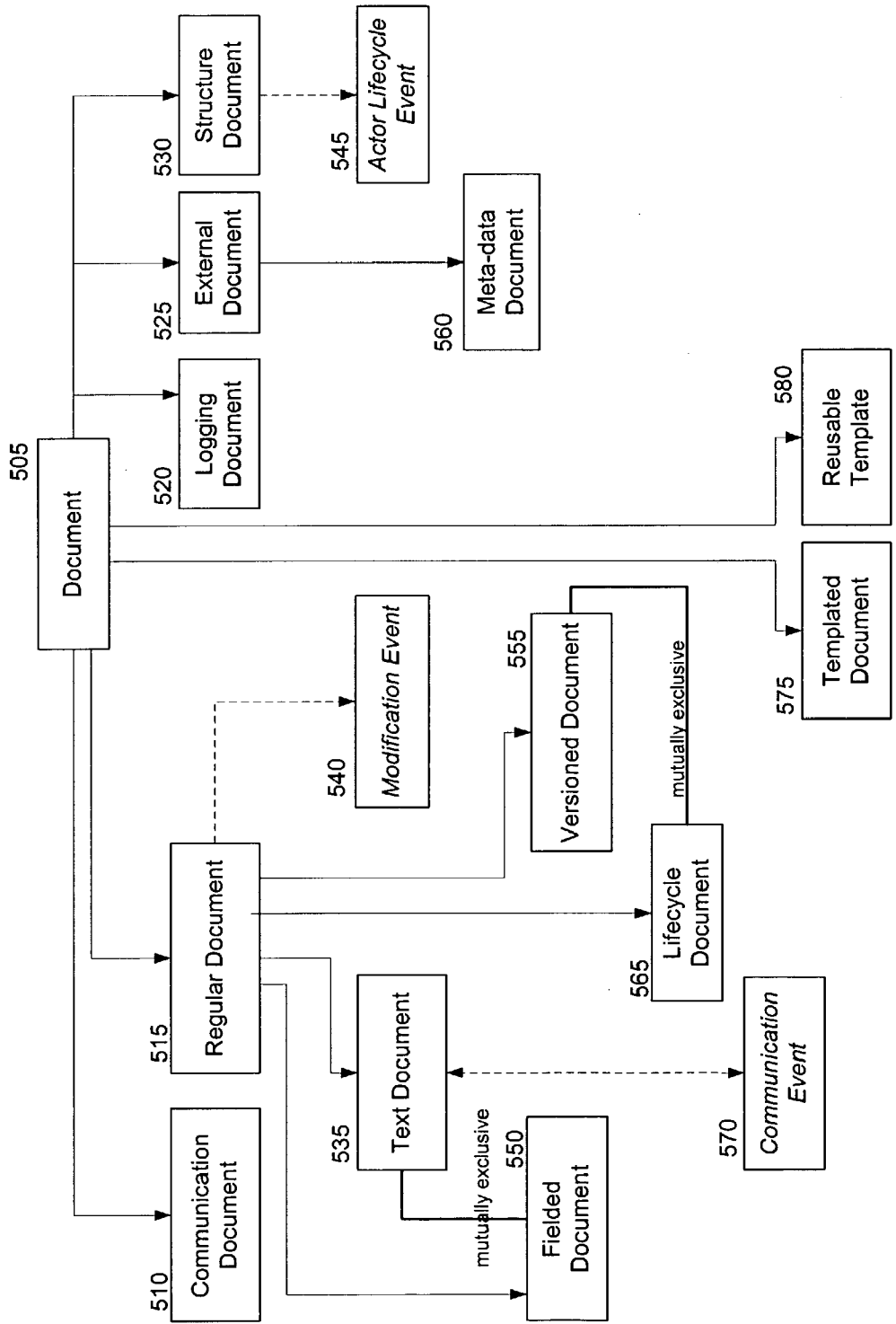
Figure 5: Document Subclasses and Relations to Event Types

Figure 6a: Email Identity Extraction Process
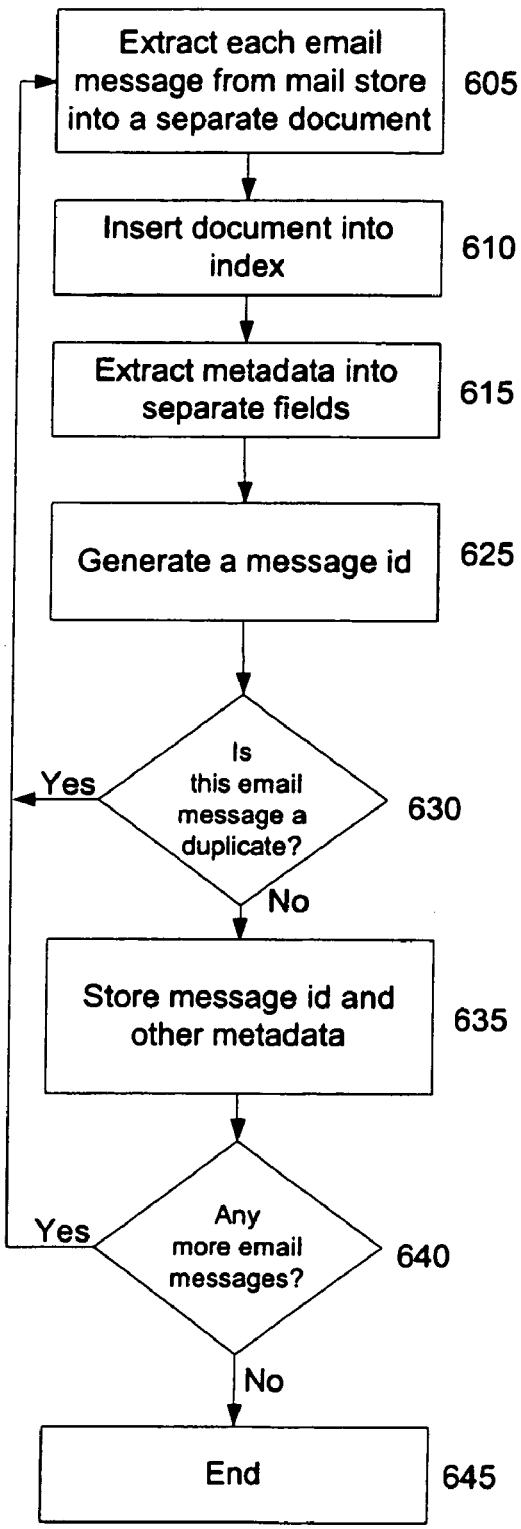

Figure 6b: Email Identity Disambiguation
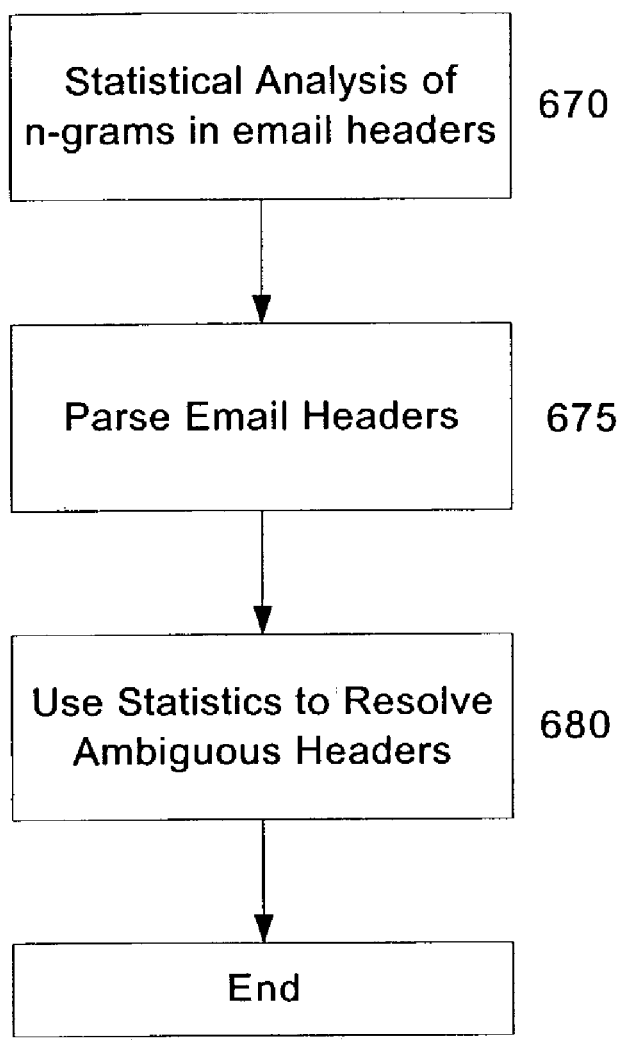

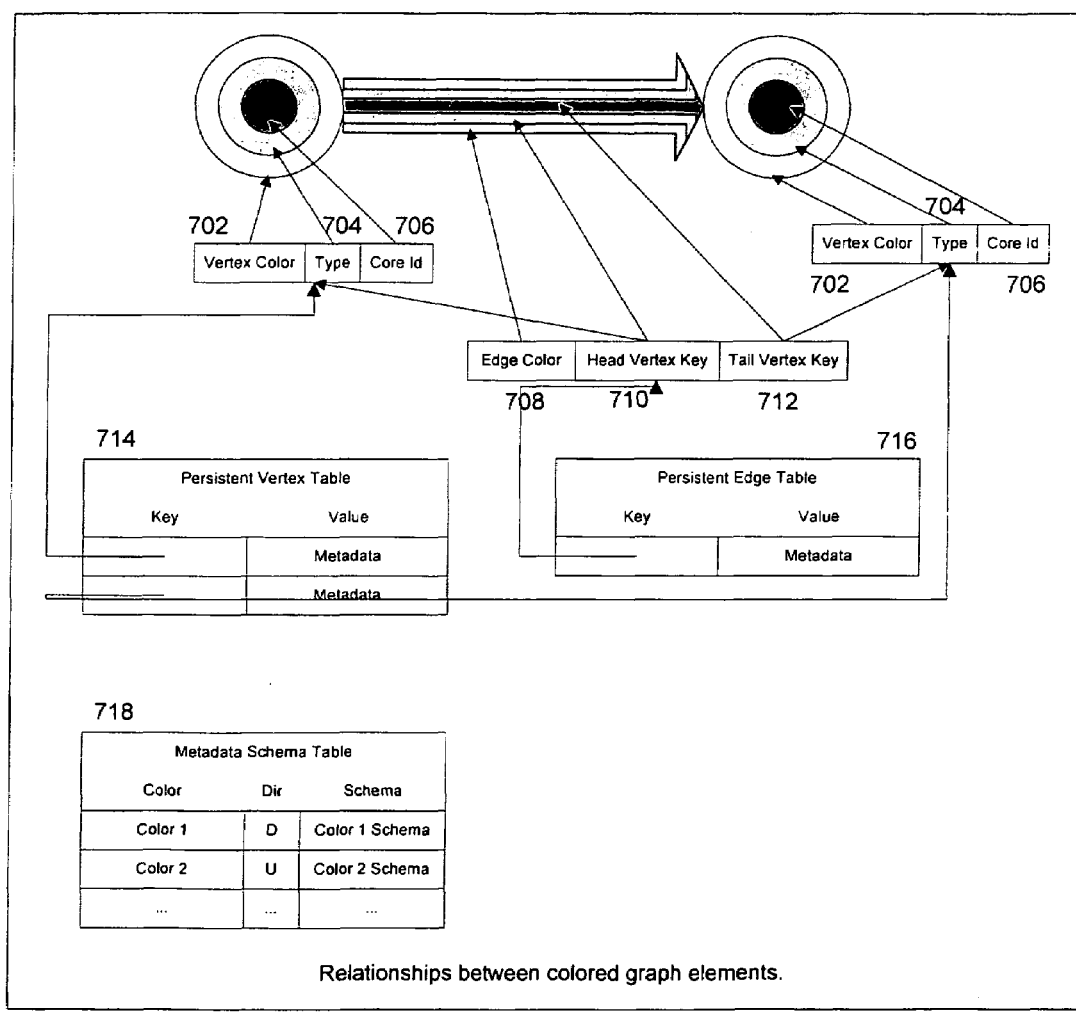
Figure 7a: Colored Graph
Relationships between colored graph elements.

Figure 7b: Colored Graph Sample
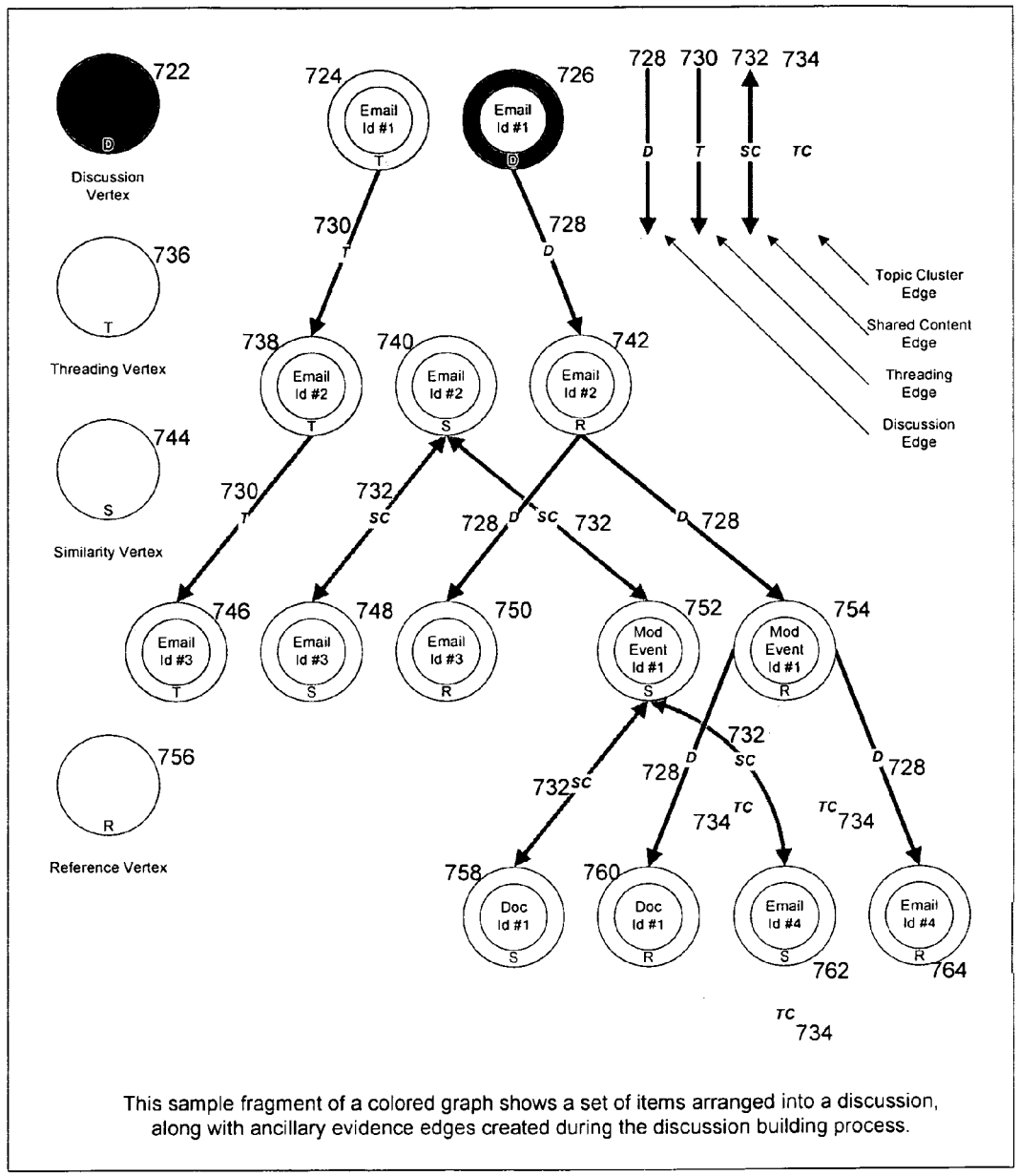
This sample fragment of a colored graph shows a set of items arranged into a discussion, along with ancillary evidence edges created during the discussion building process.

Figure 8: Actor Graph Construction - 1
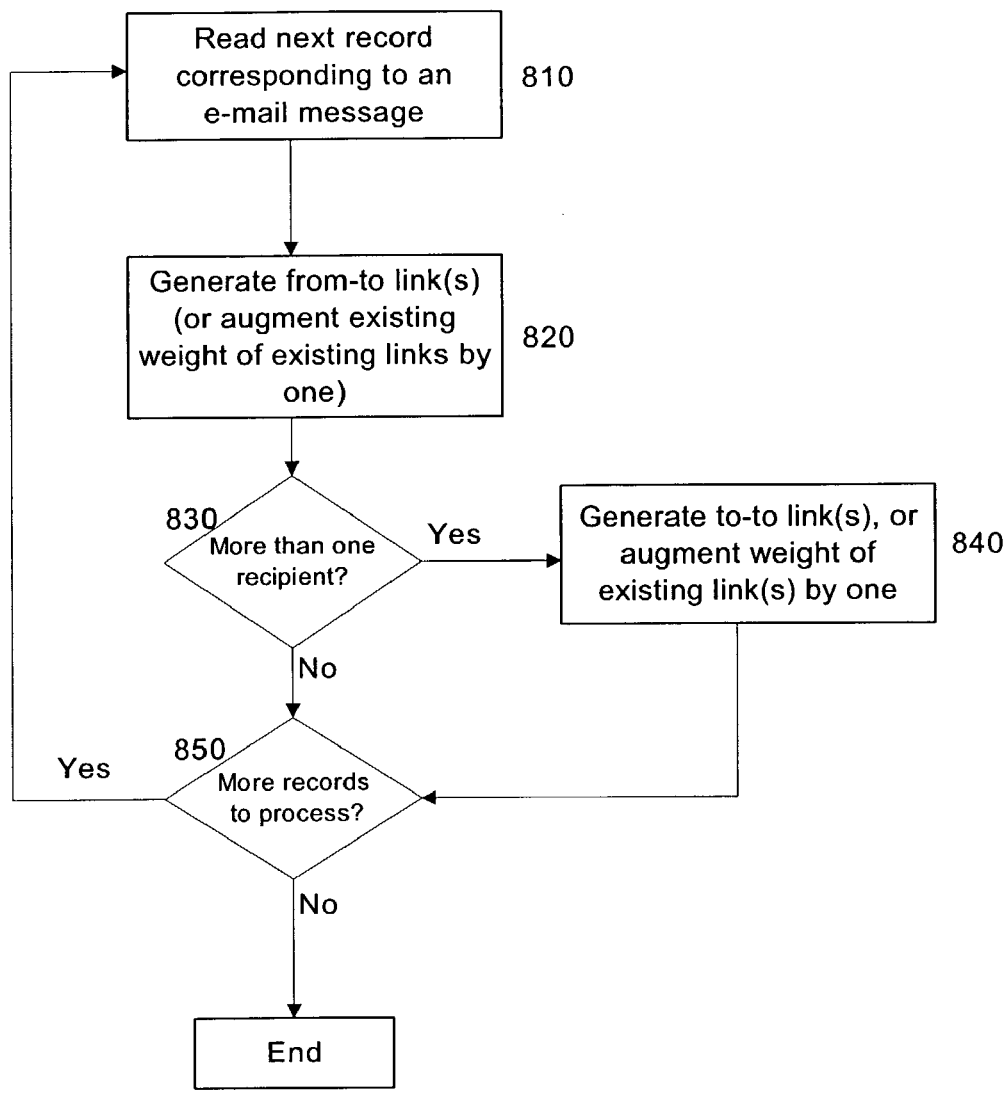

Figure 9a: Actor Graph Construction - Process Overview
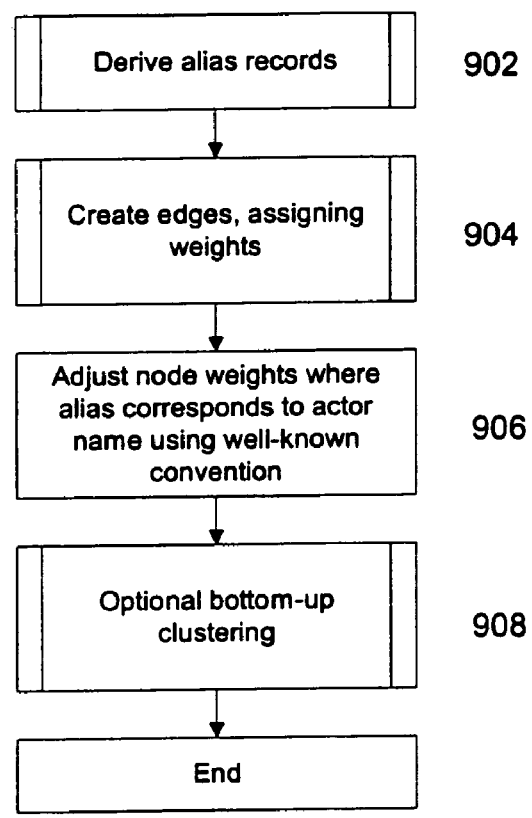

Figure 9b: Actor Graph Construction - Edge Creation and Weight Assignment
(optionally consult abstract or specific constraints at all stages of processing)
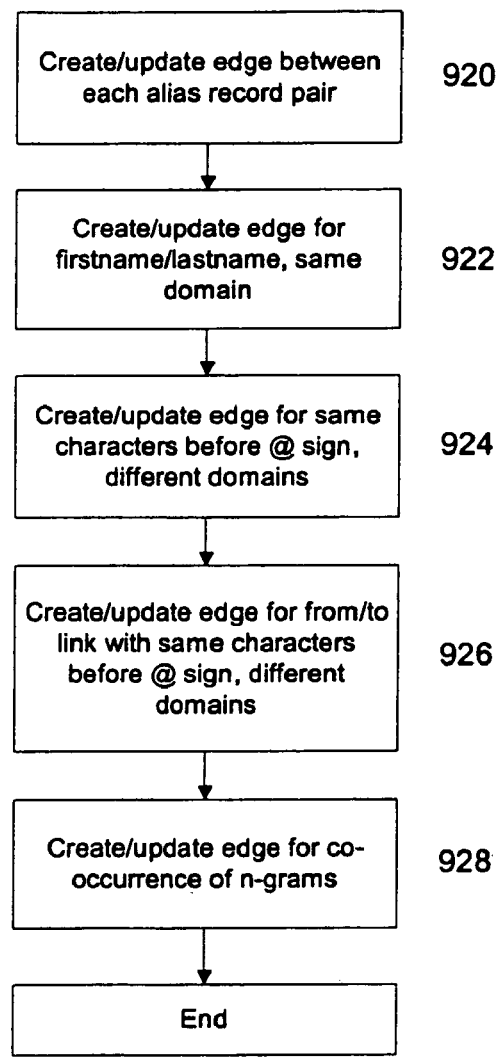

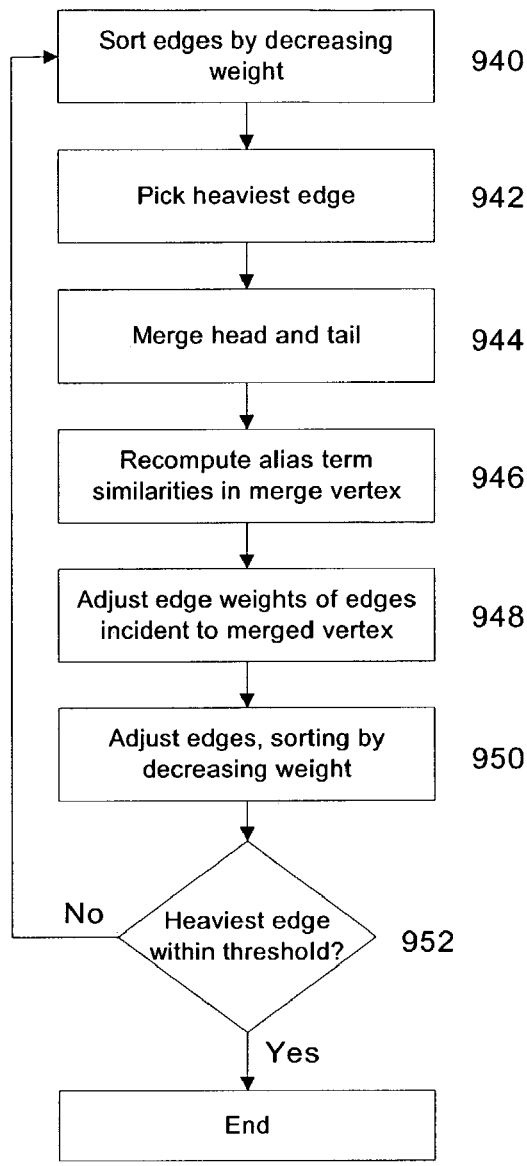
Figure 9c: Actor Graph Construction - Bottom-up clustering

Figure 9d: Actor Graph Construction - Deriving Aliases
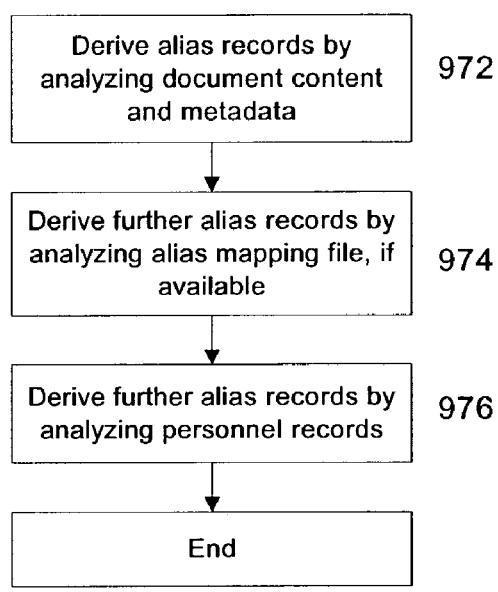

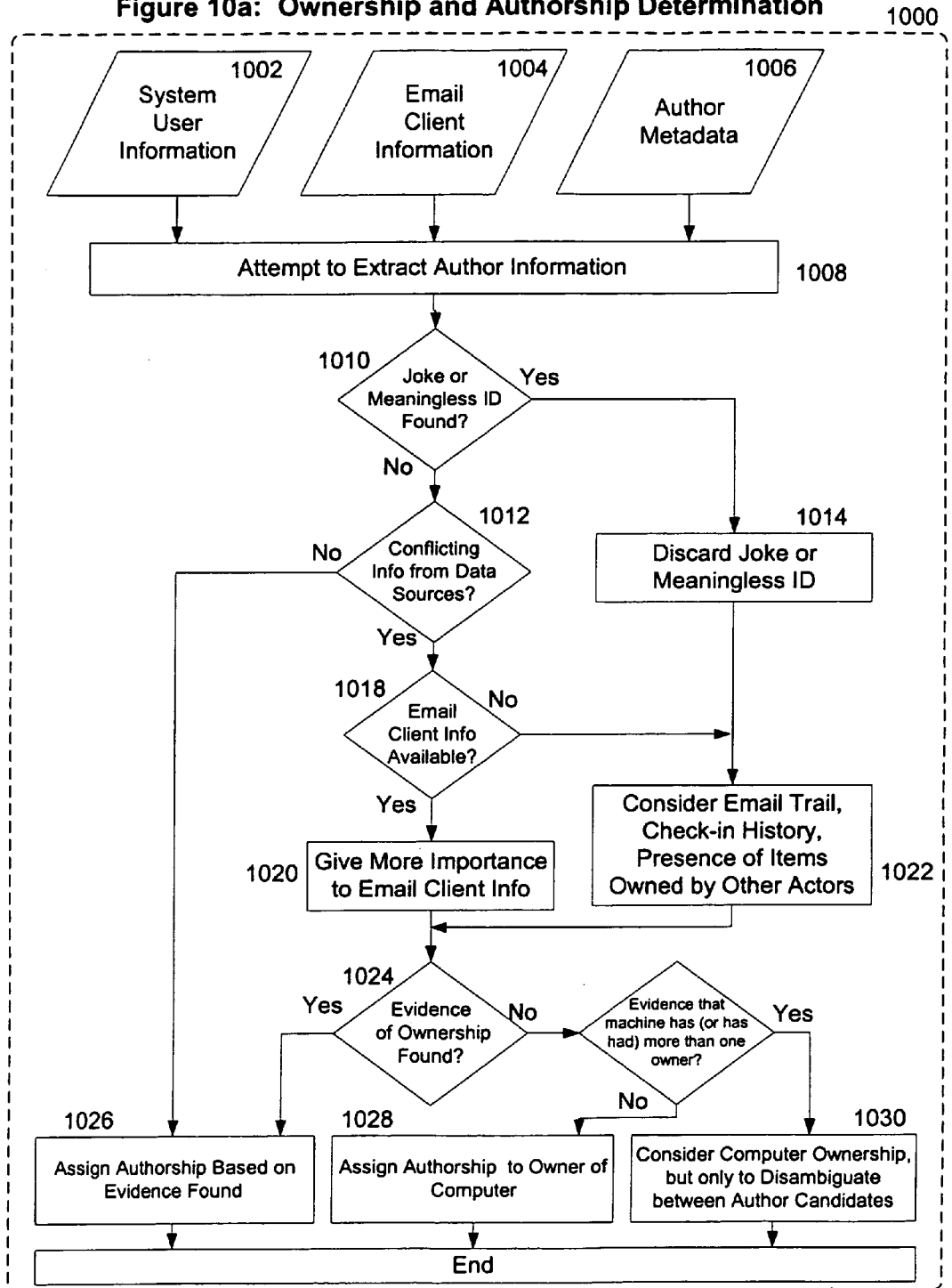

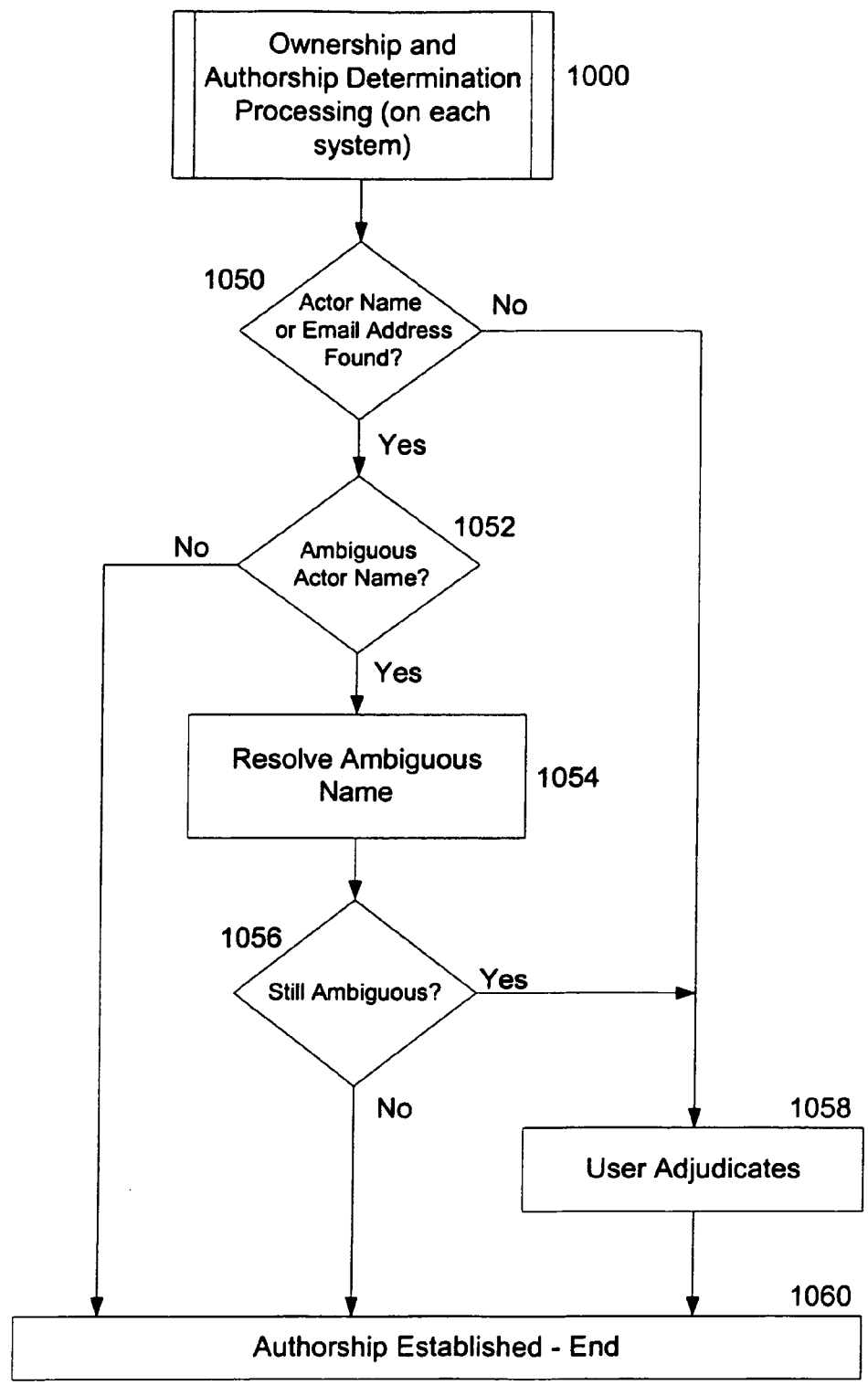
Figure 10b: Ownership and Authorship Determination where User Logs on to Multiple Systems

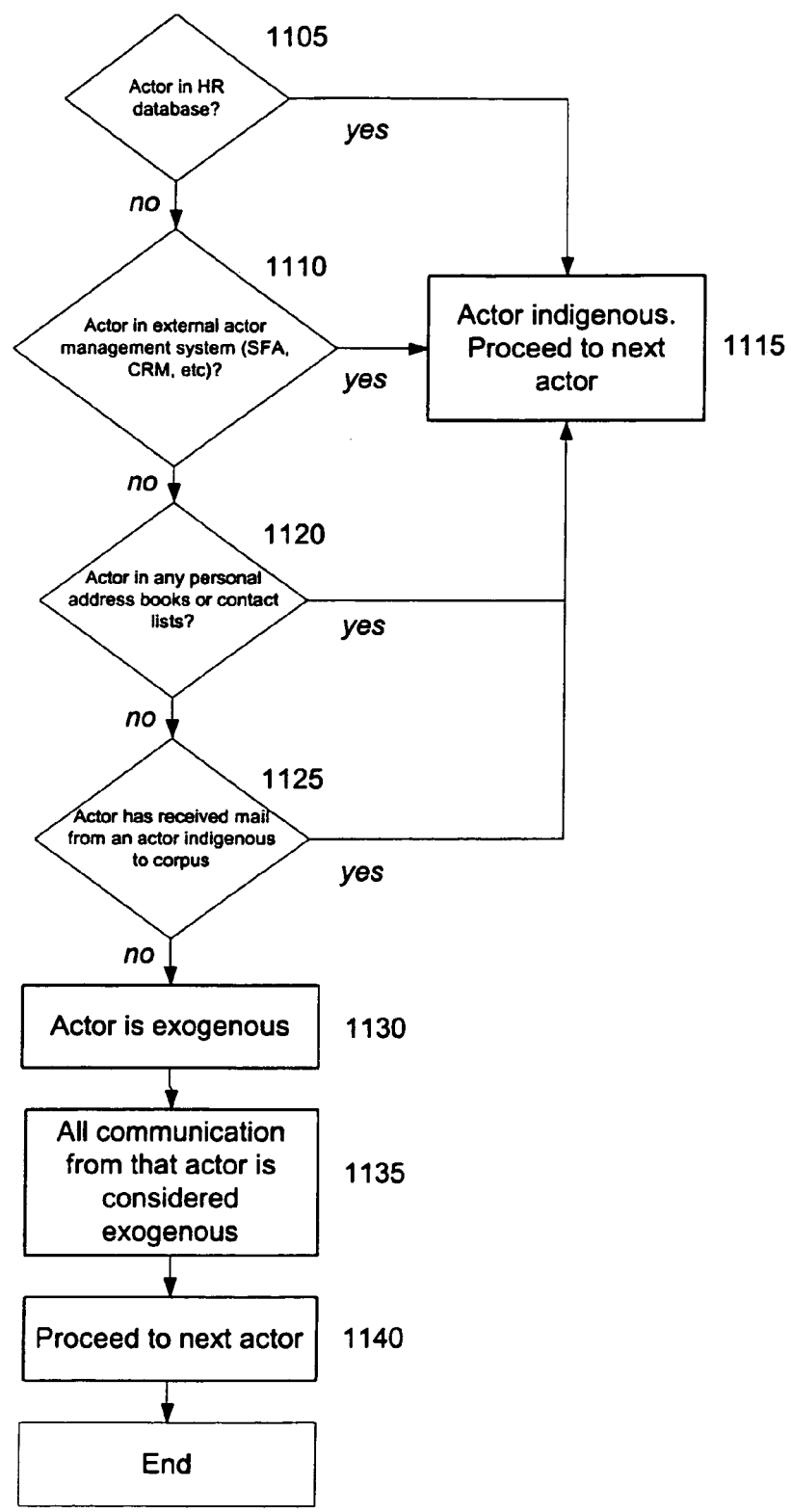
Figure 11: Determining "Spam" And Other Exogenous Content

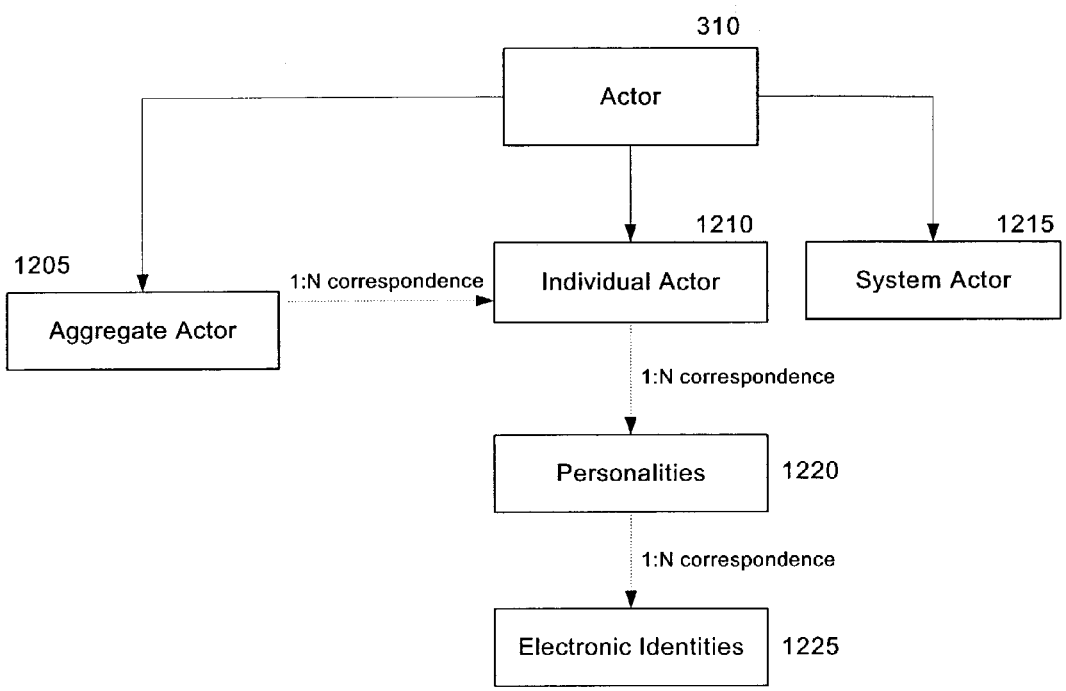
Figure 12: Actor Class And Containment Hierarchy

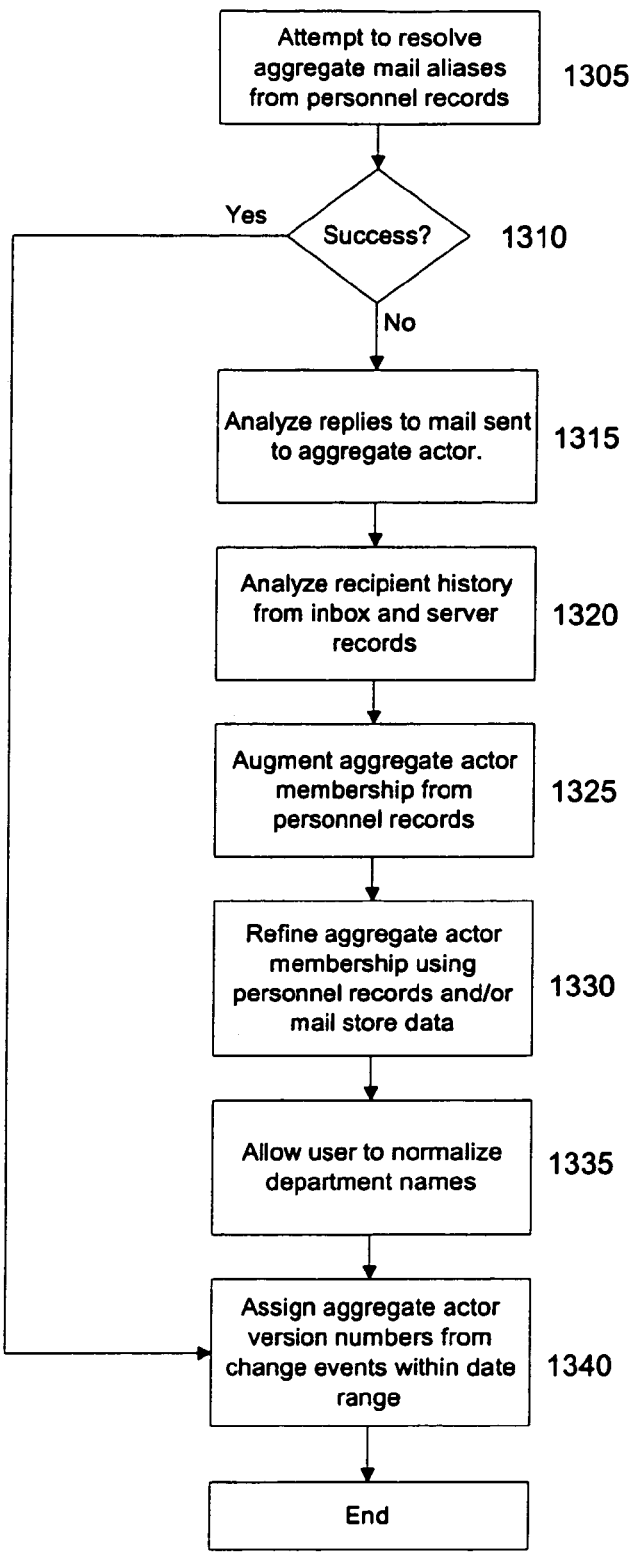
Figure 13a: Alias Versioning

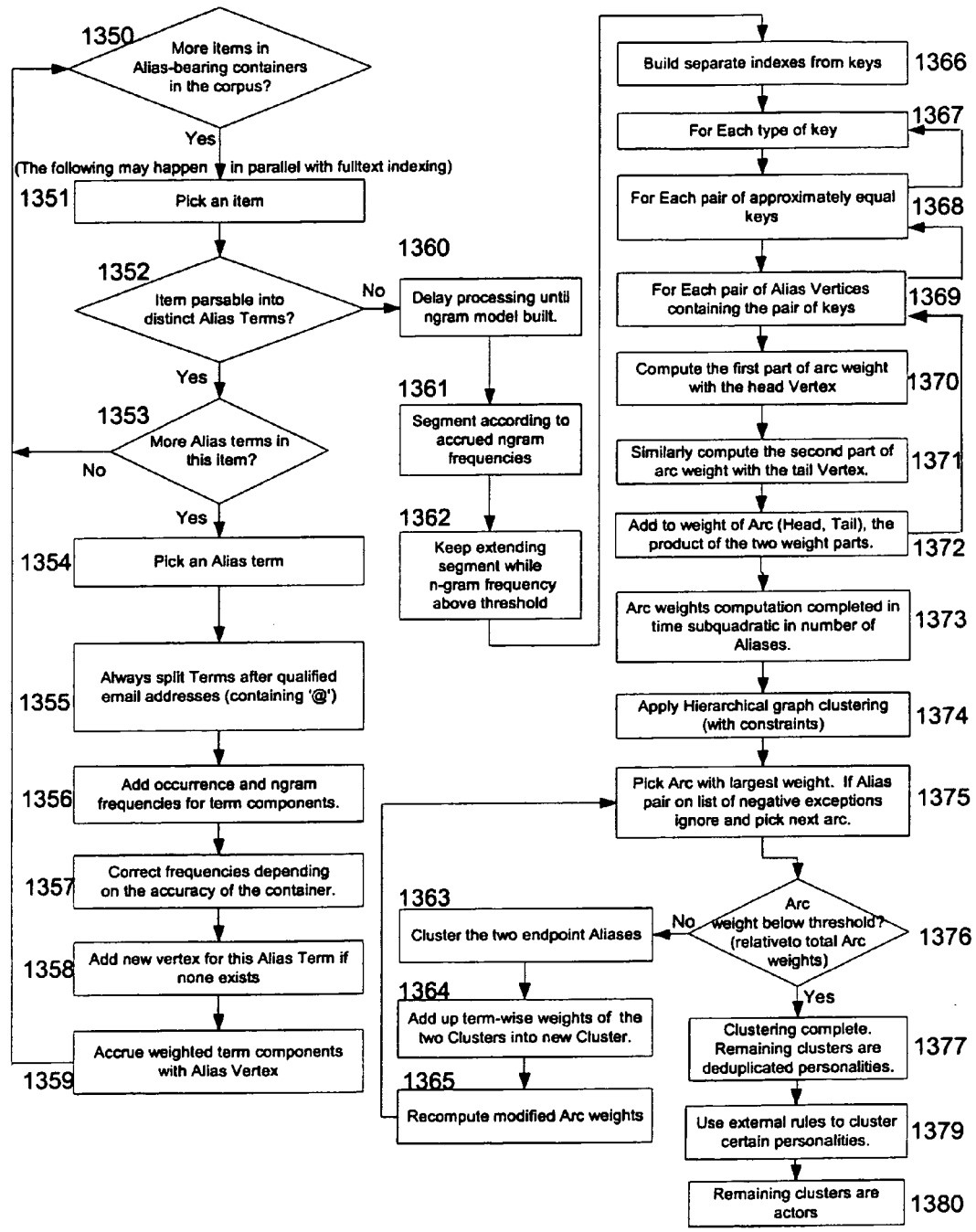
Figure 13b: Actor Parsing and Deduplication Process

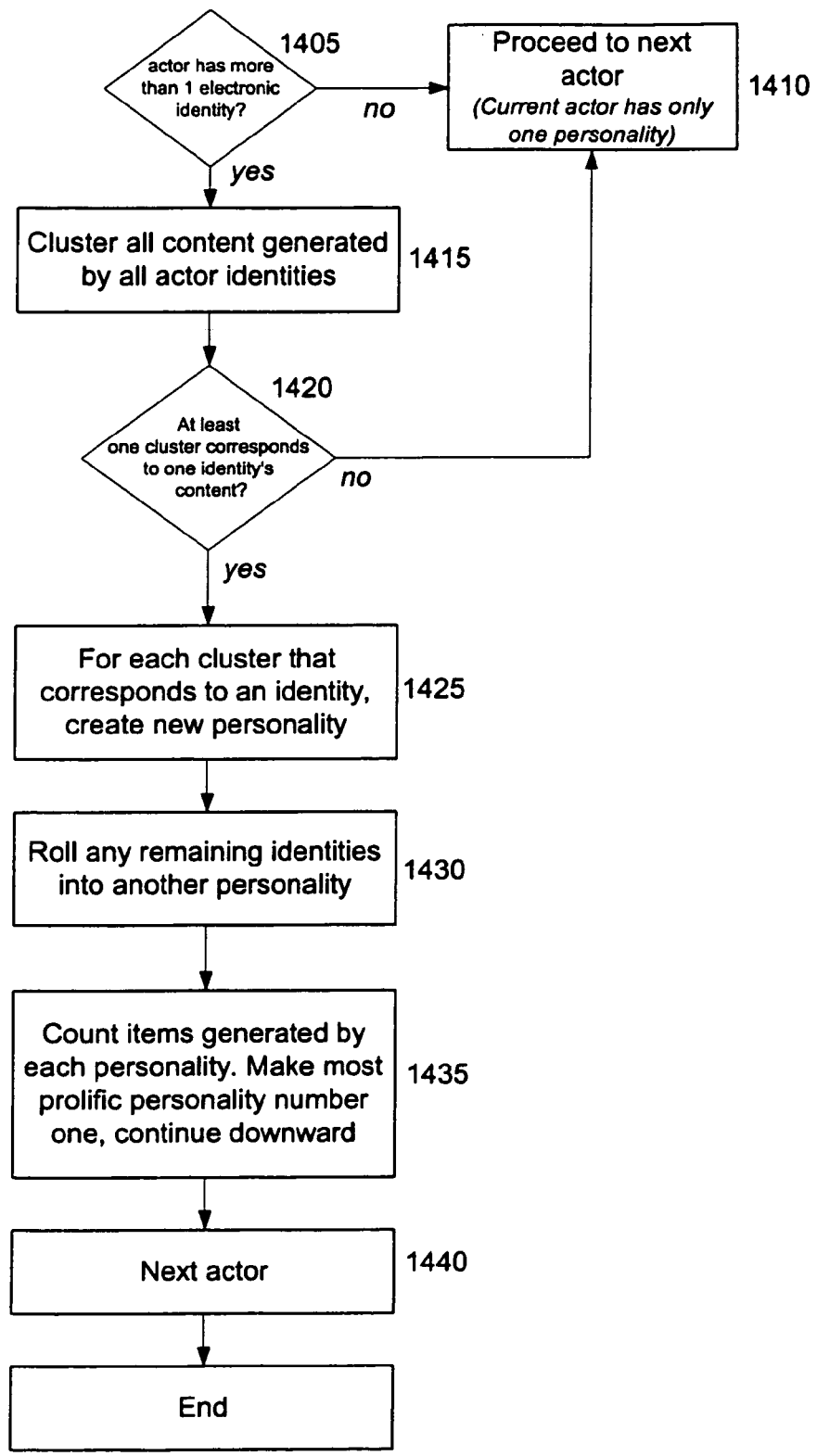
Figure 14: Actor Personality Identification

Figure 15: Circle of Trust or Clique Class Hierarchy and Associations
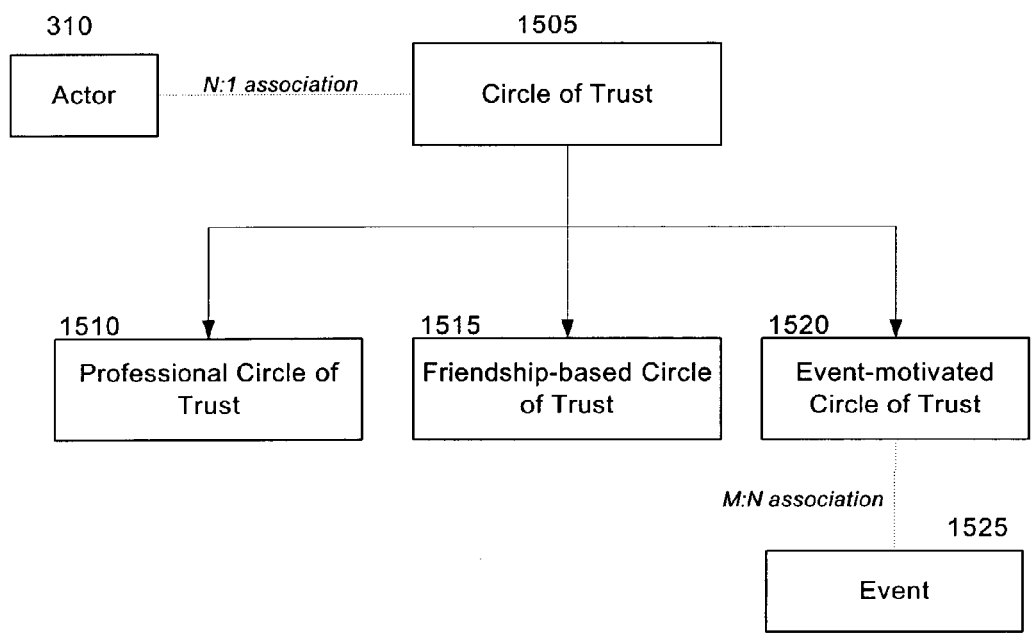

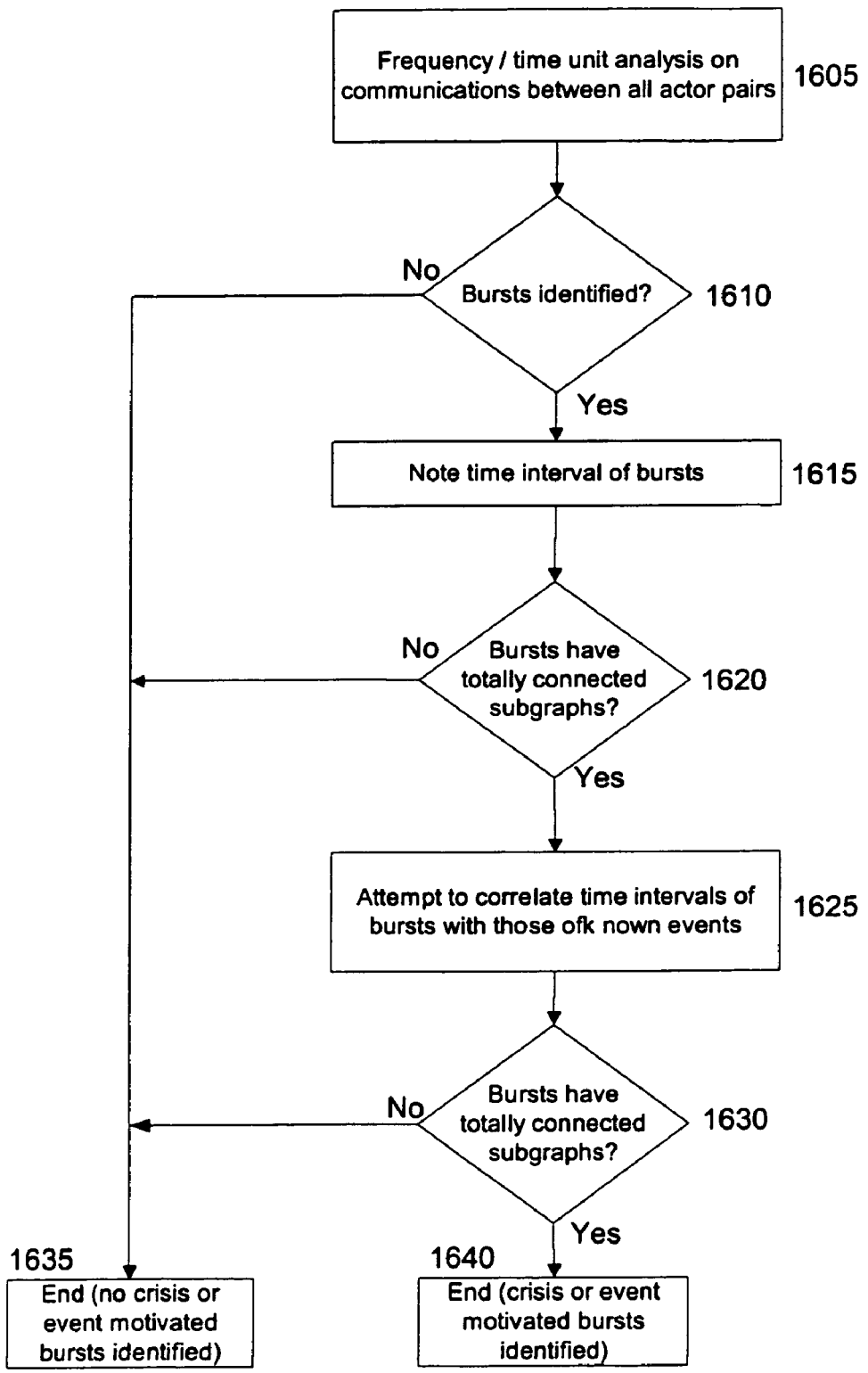
Figure 16: Crisis/Event Circles of Trust

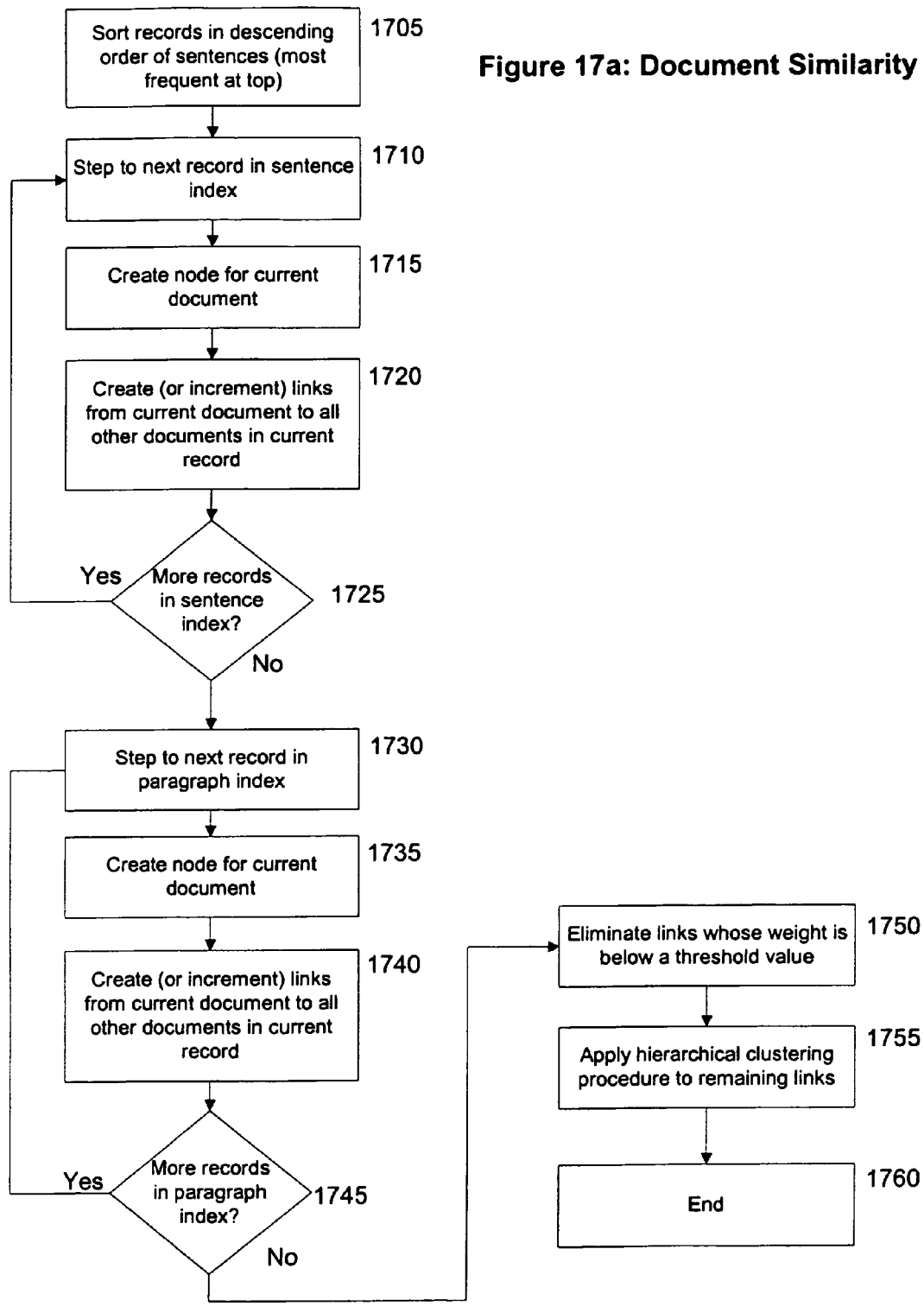
Figure 17a: Document Similarity

Figure 17b: Free-form Document Indexing Granularity and Deduplication
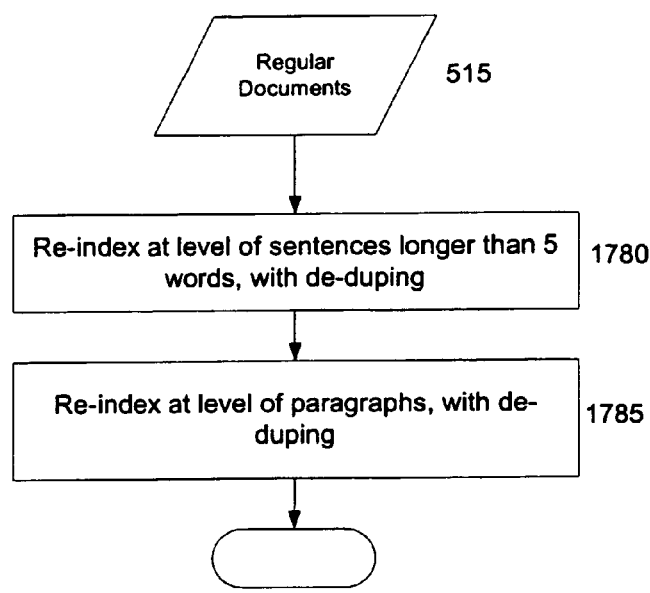

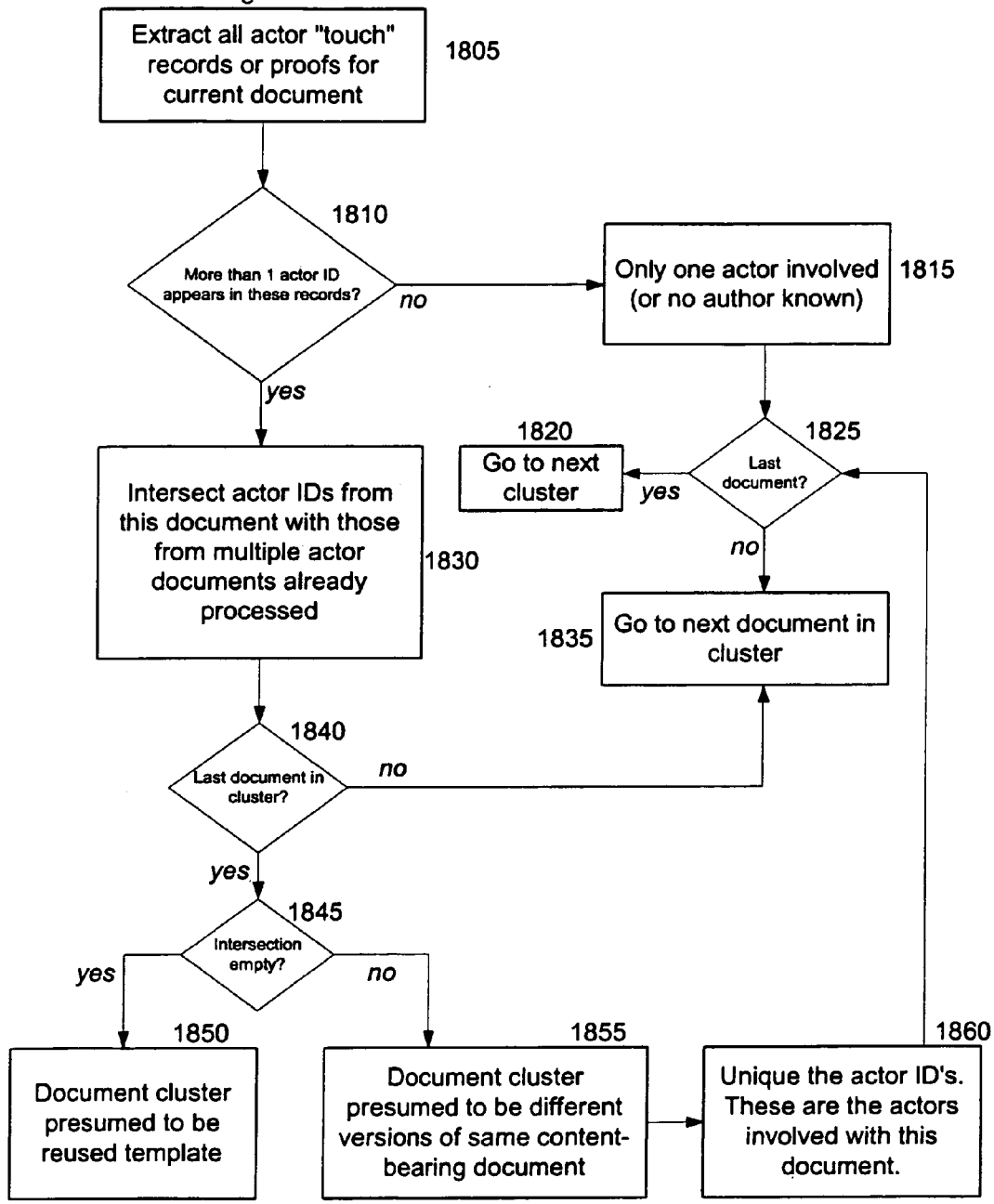

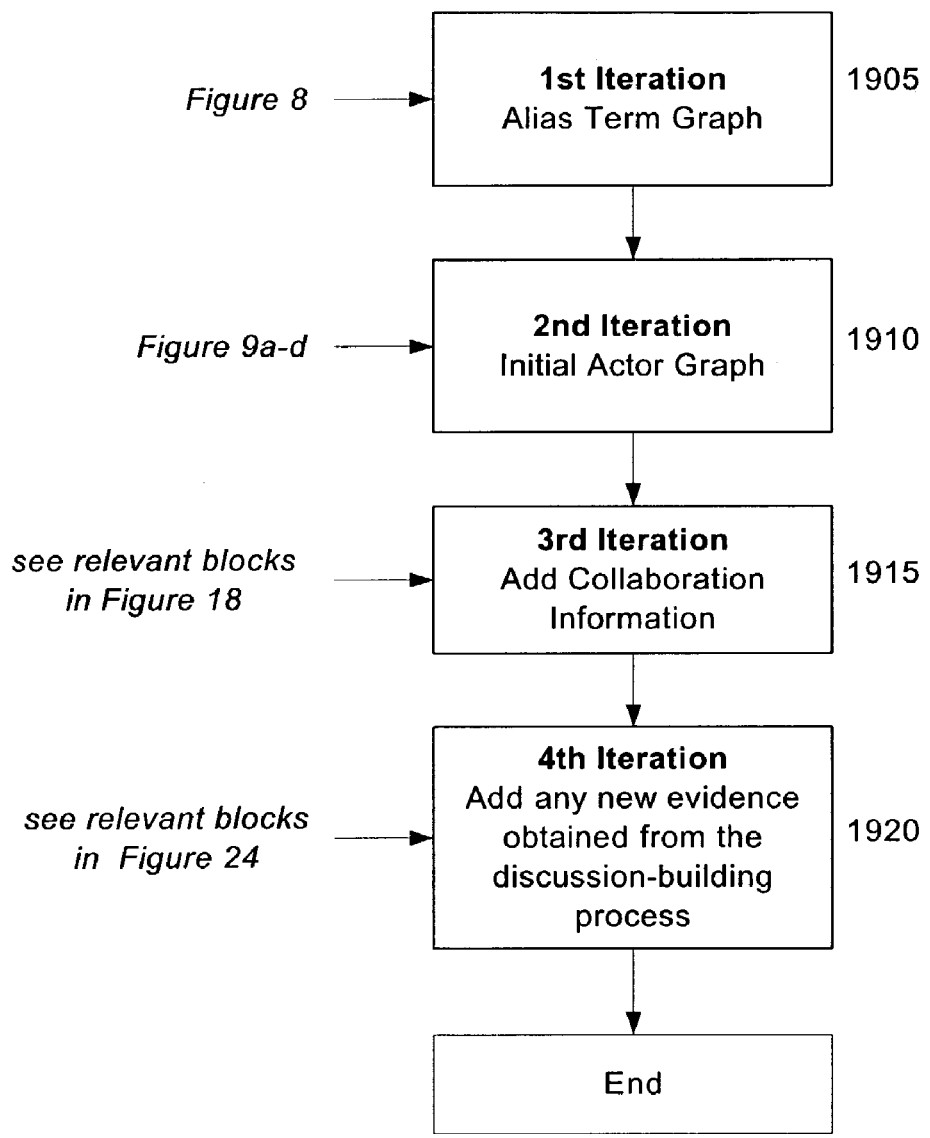
Figure 19: Iterations in Building the Actor Graph

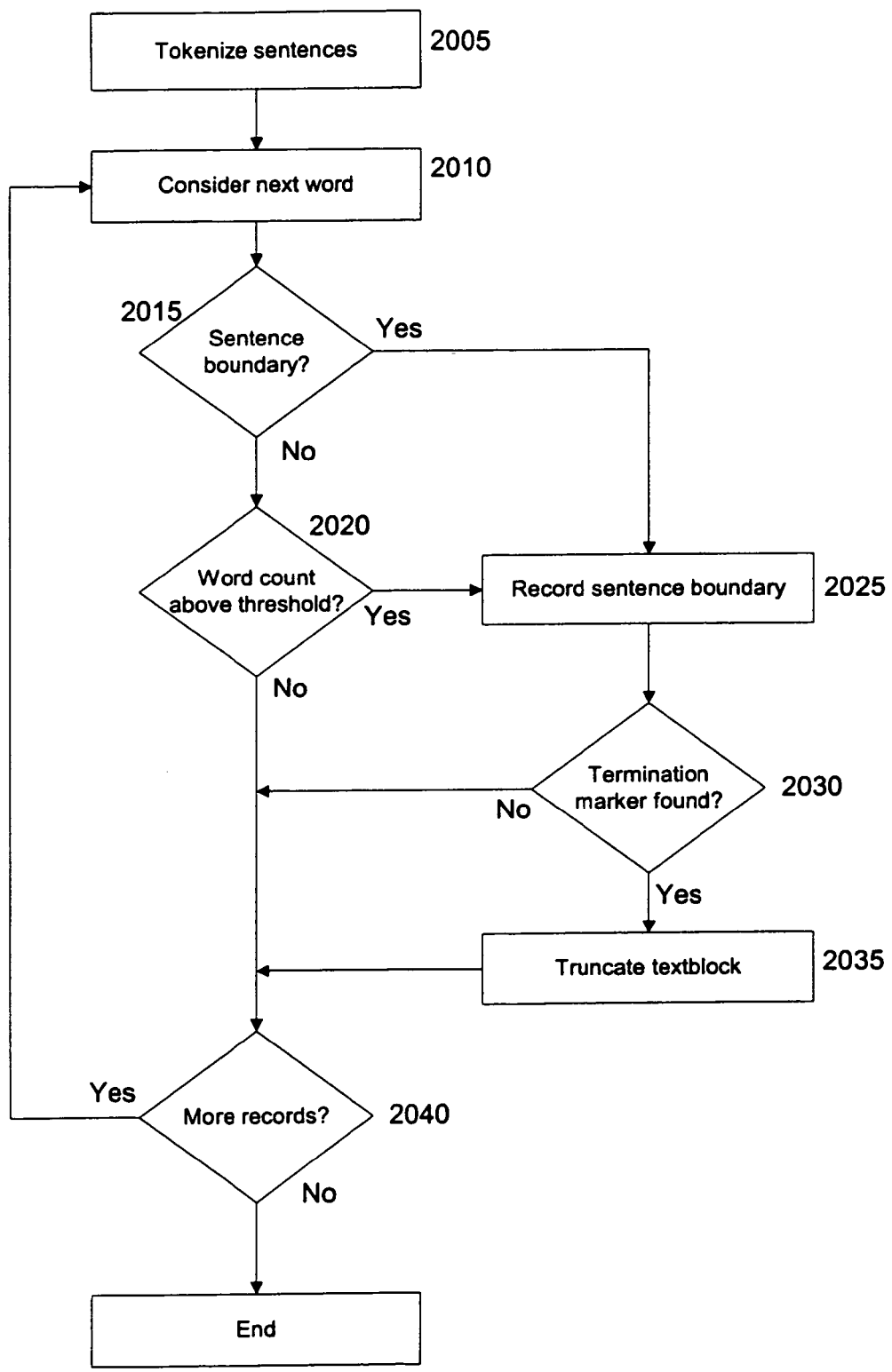
Figure 20a: Textblock Identification

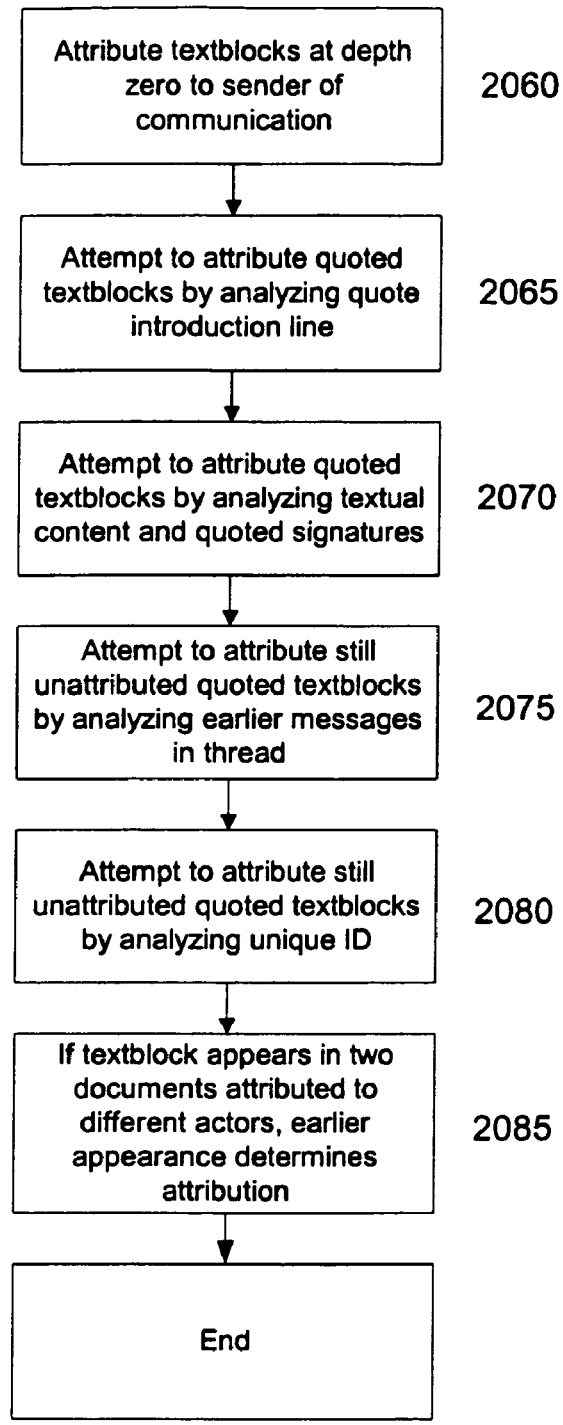
Figure 20b: Textblock Attribution

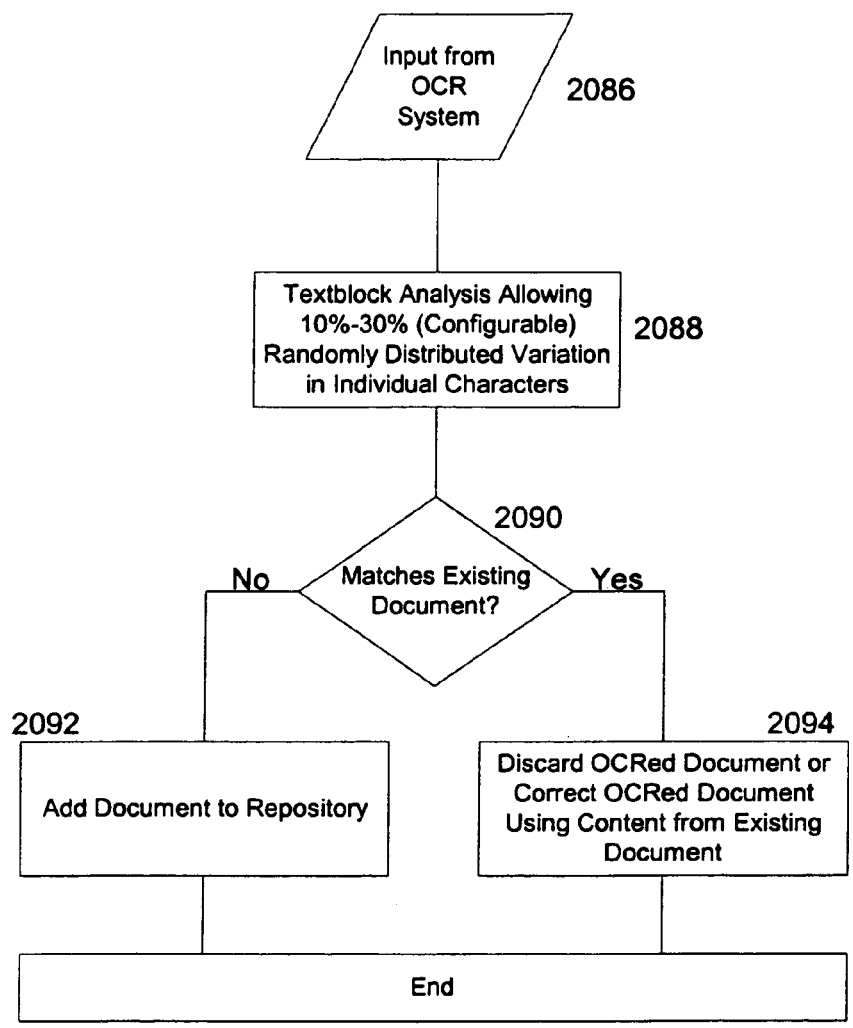
Figure 20c: Textblock Identification with OCRed Documents

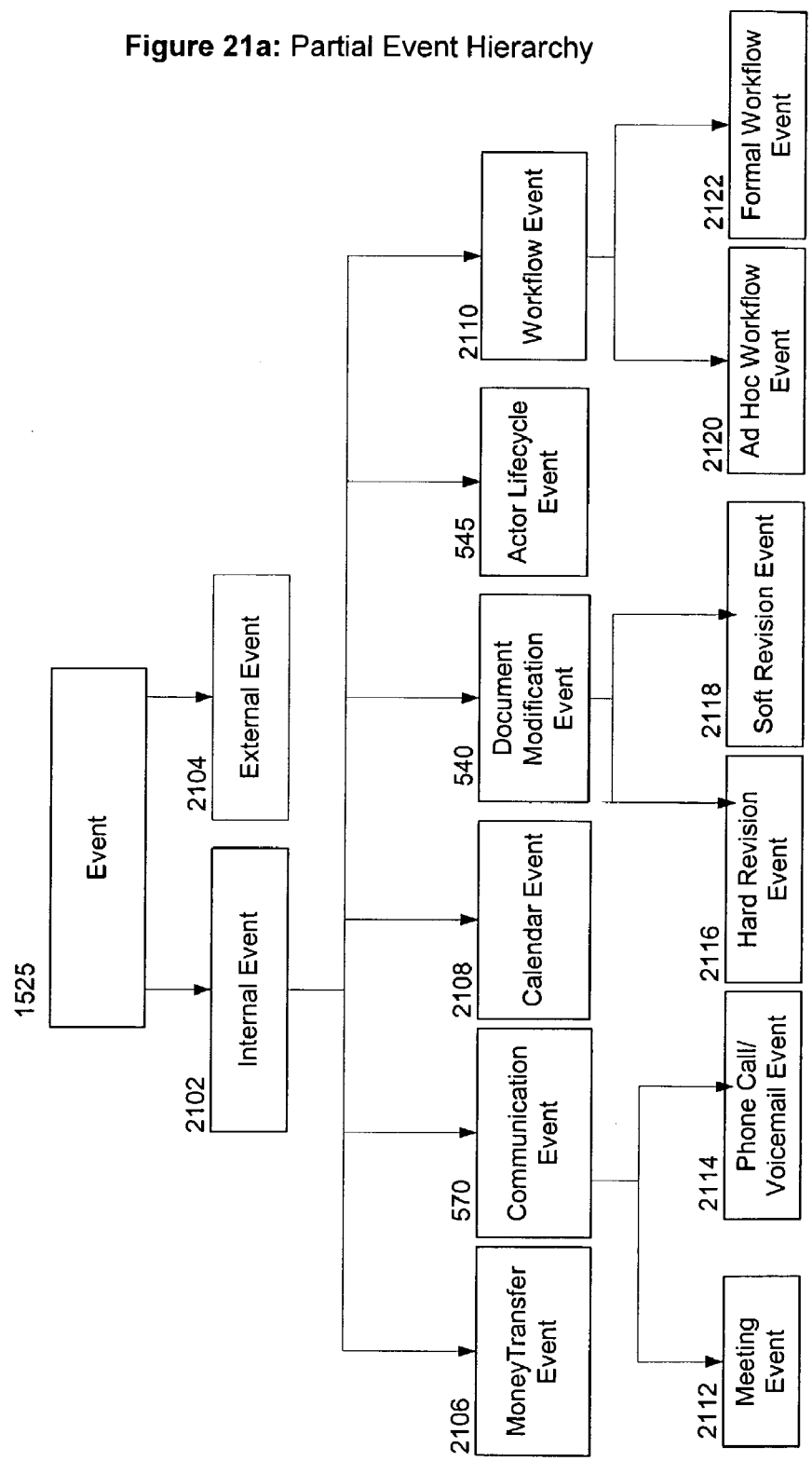
Figure 21a: Partial Event Hierarchy

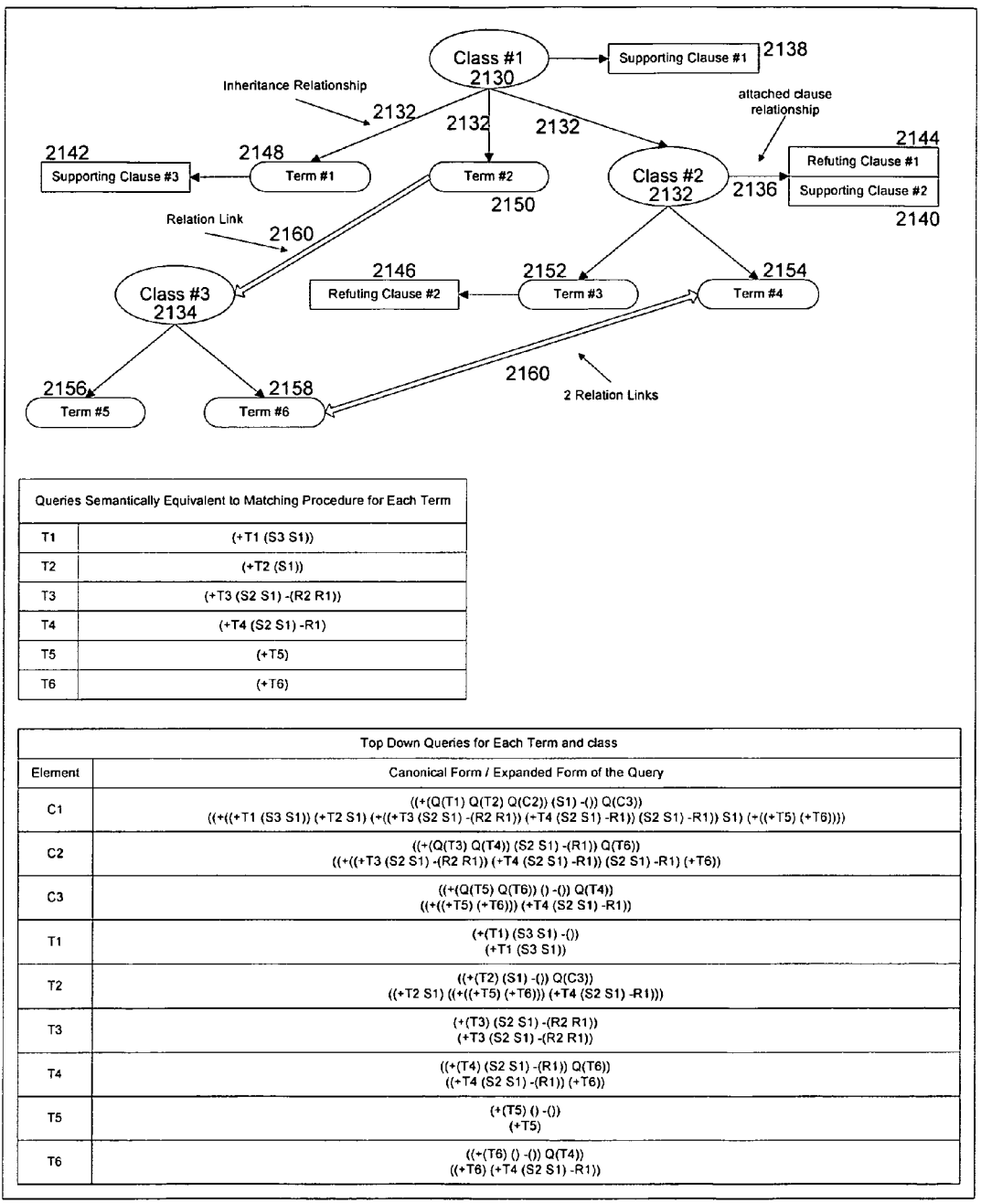
Figure 21b: Element Relationships in a Sample Ontology

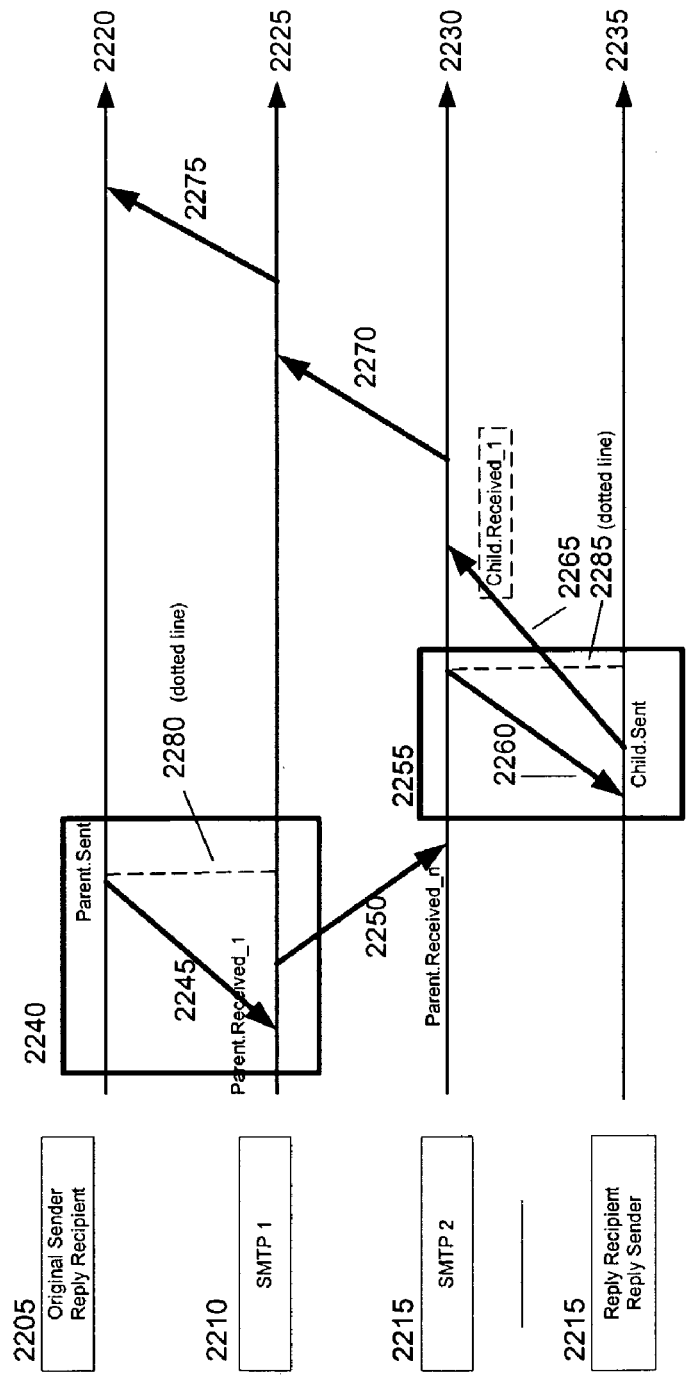
Figure 22a: Clock Drift Detection

Figure 22b: Warped Time
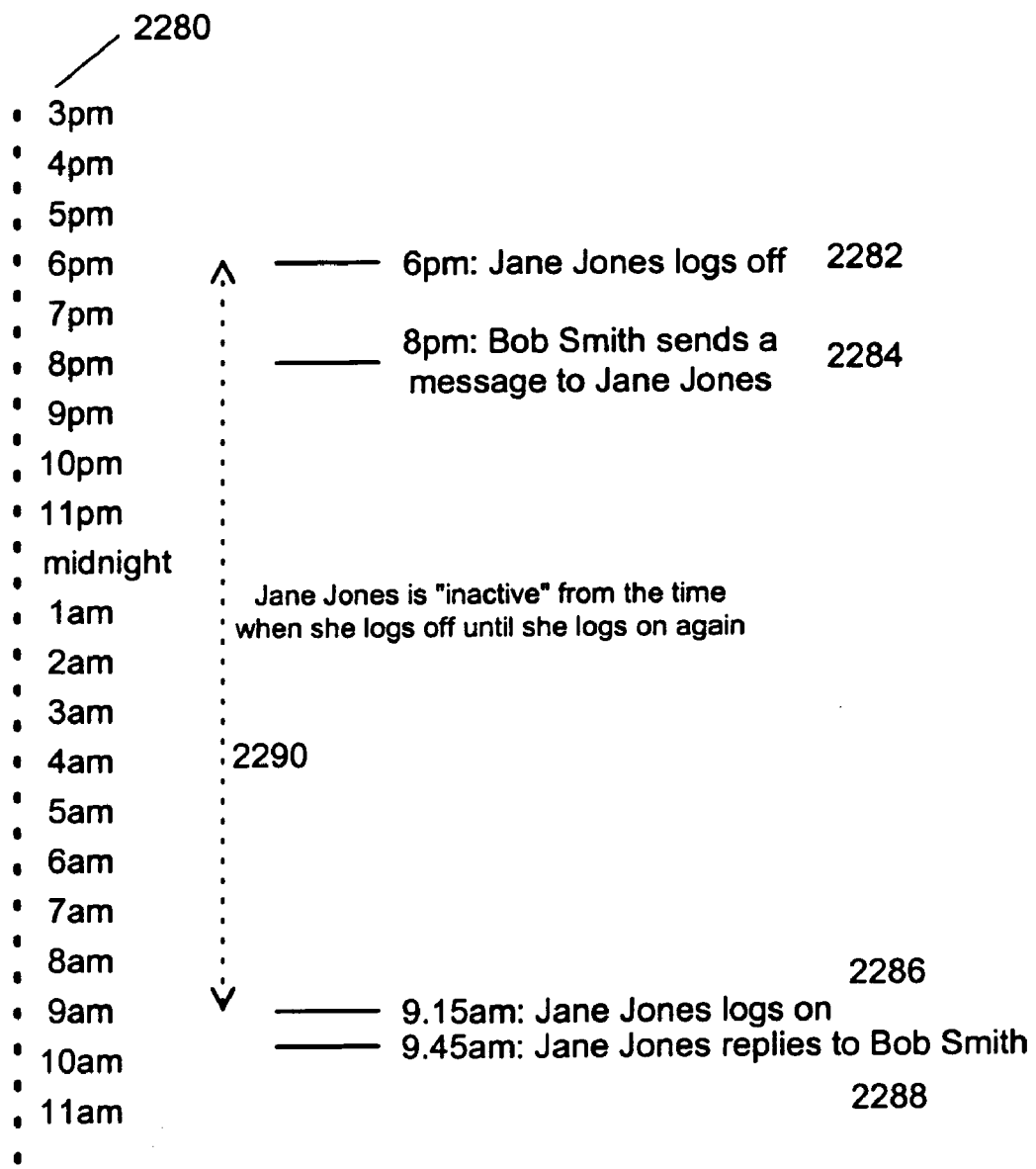

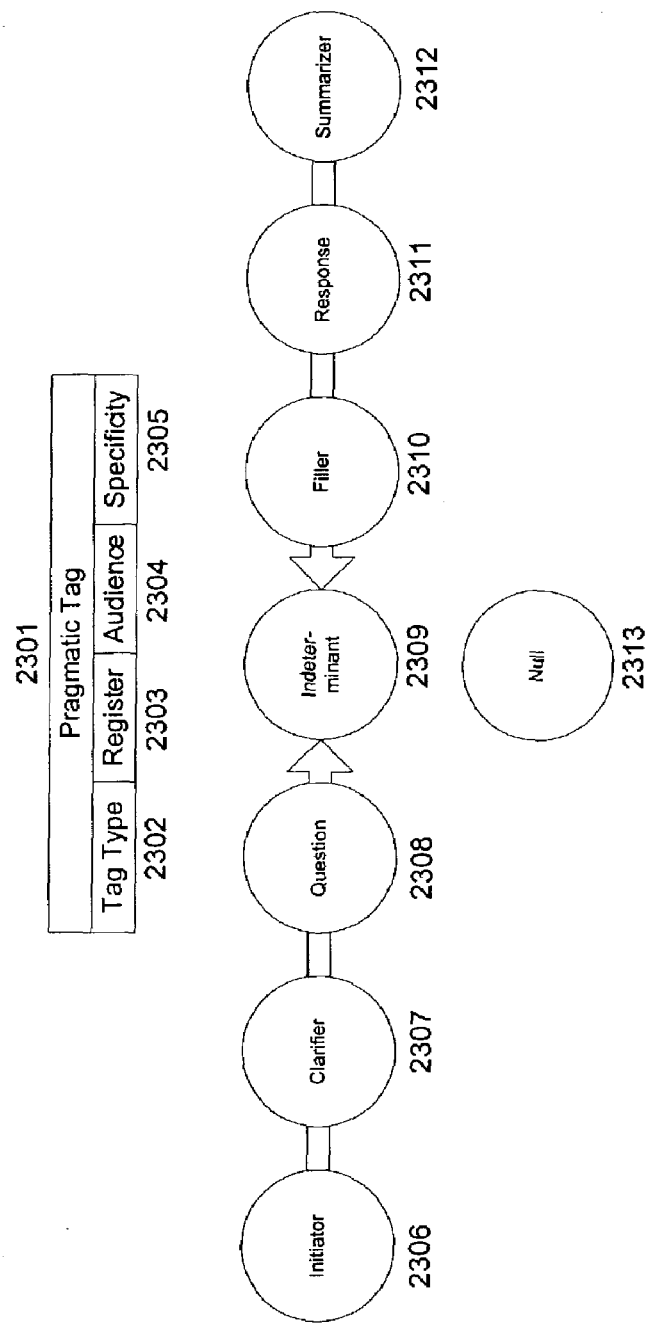
Figure 23a: Pragmatic Tag Spectrum

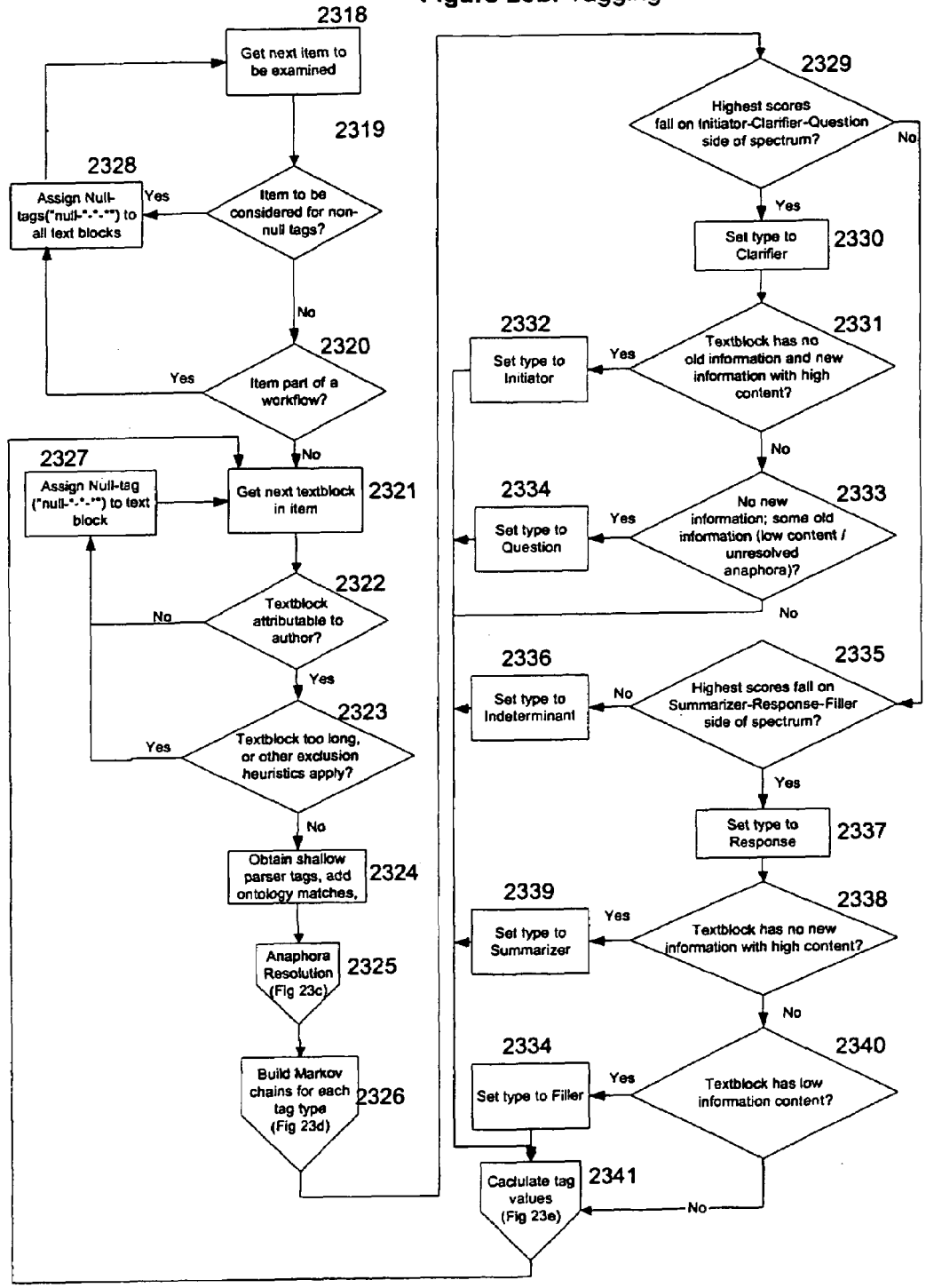
Figure 23b: Tagging

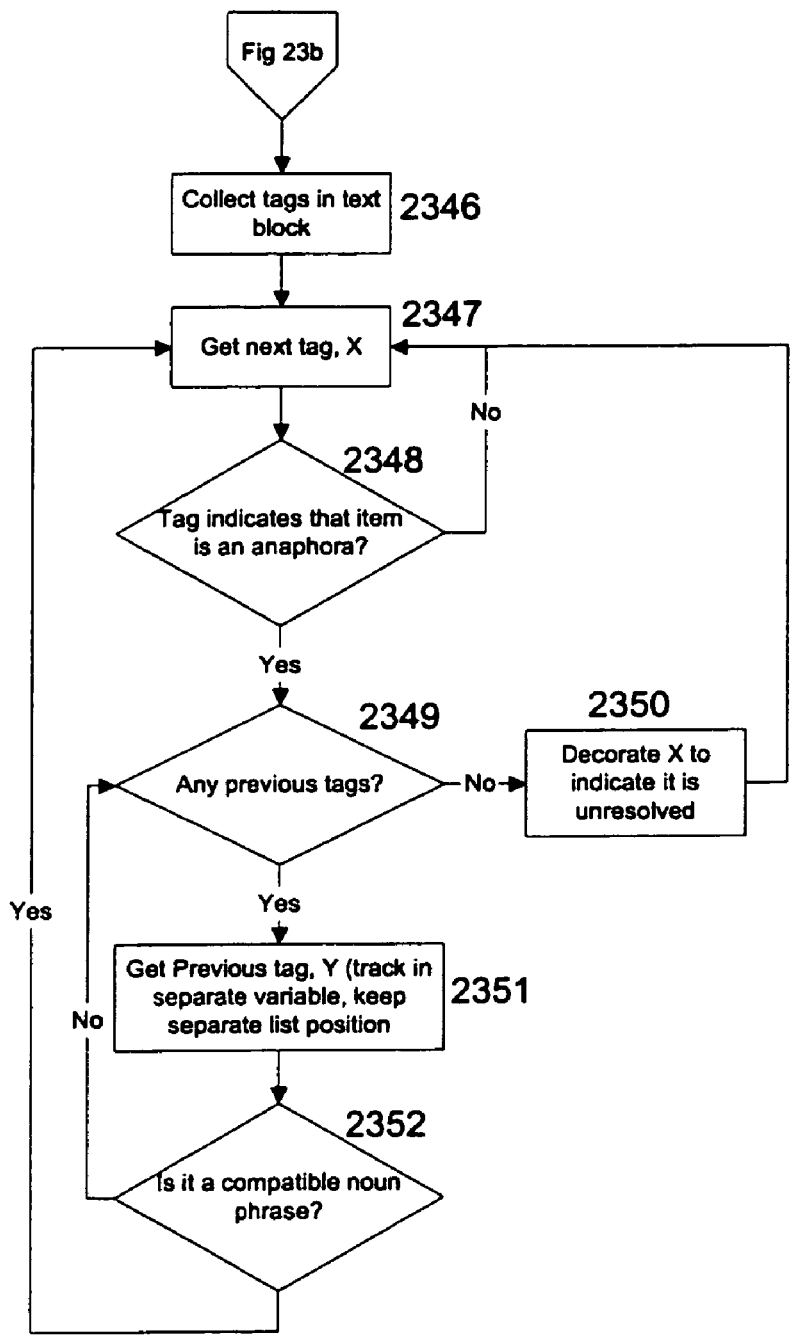
Figure 23c: Anaphora Resolution

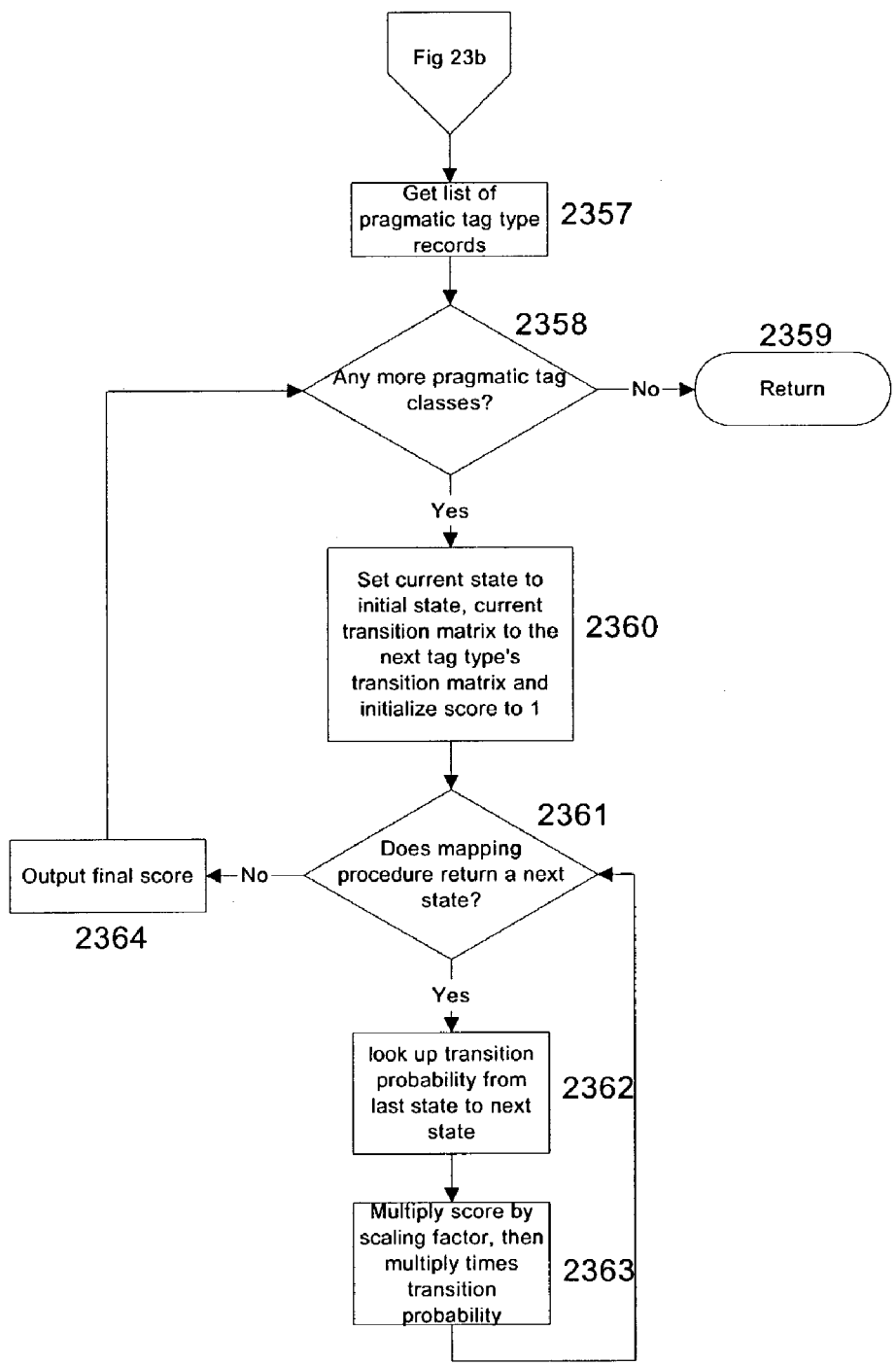
Figure 23d: Constructing Markov Chains

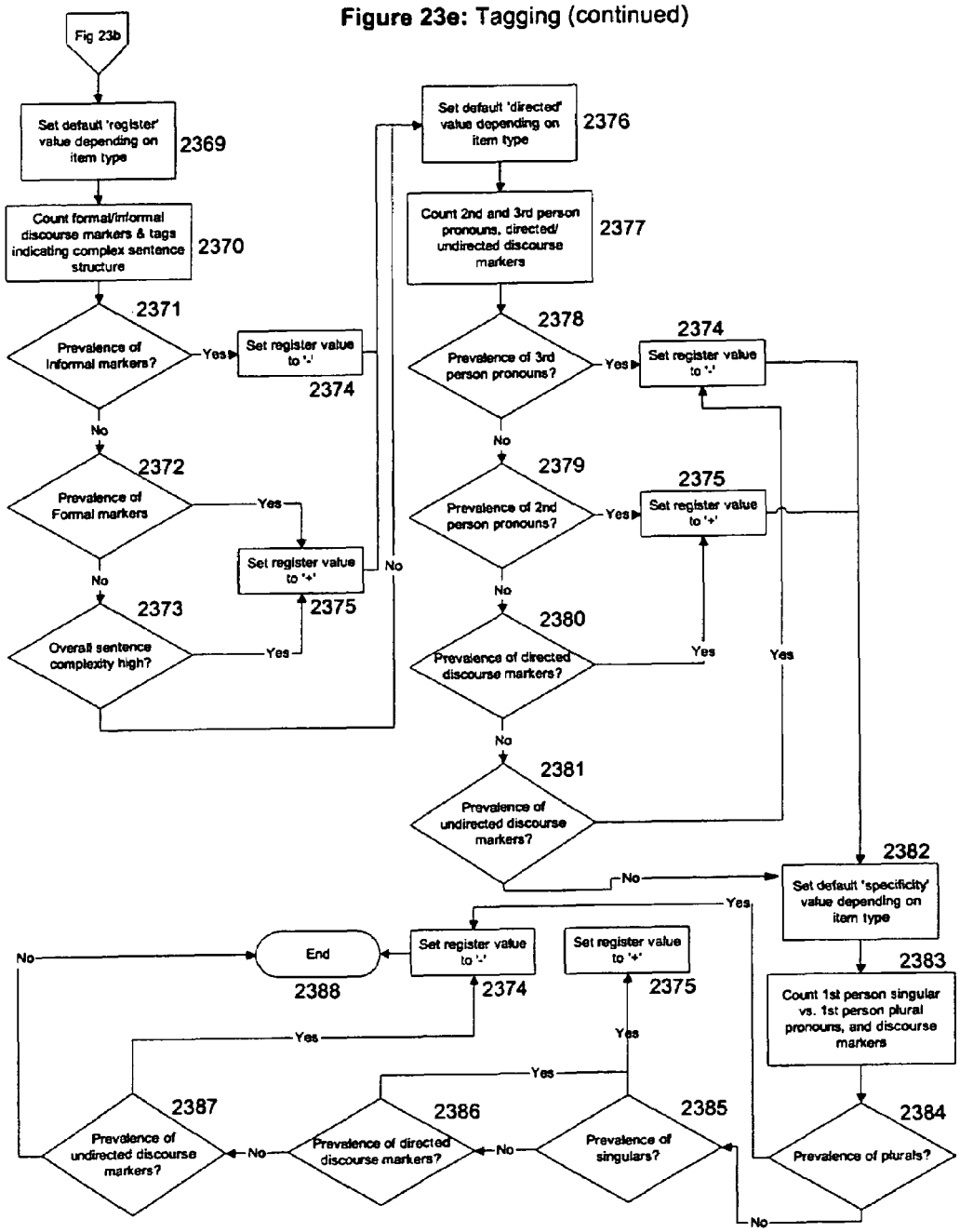
Figure 23e: Tagging (continued)

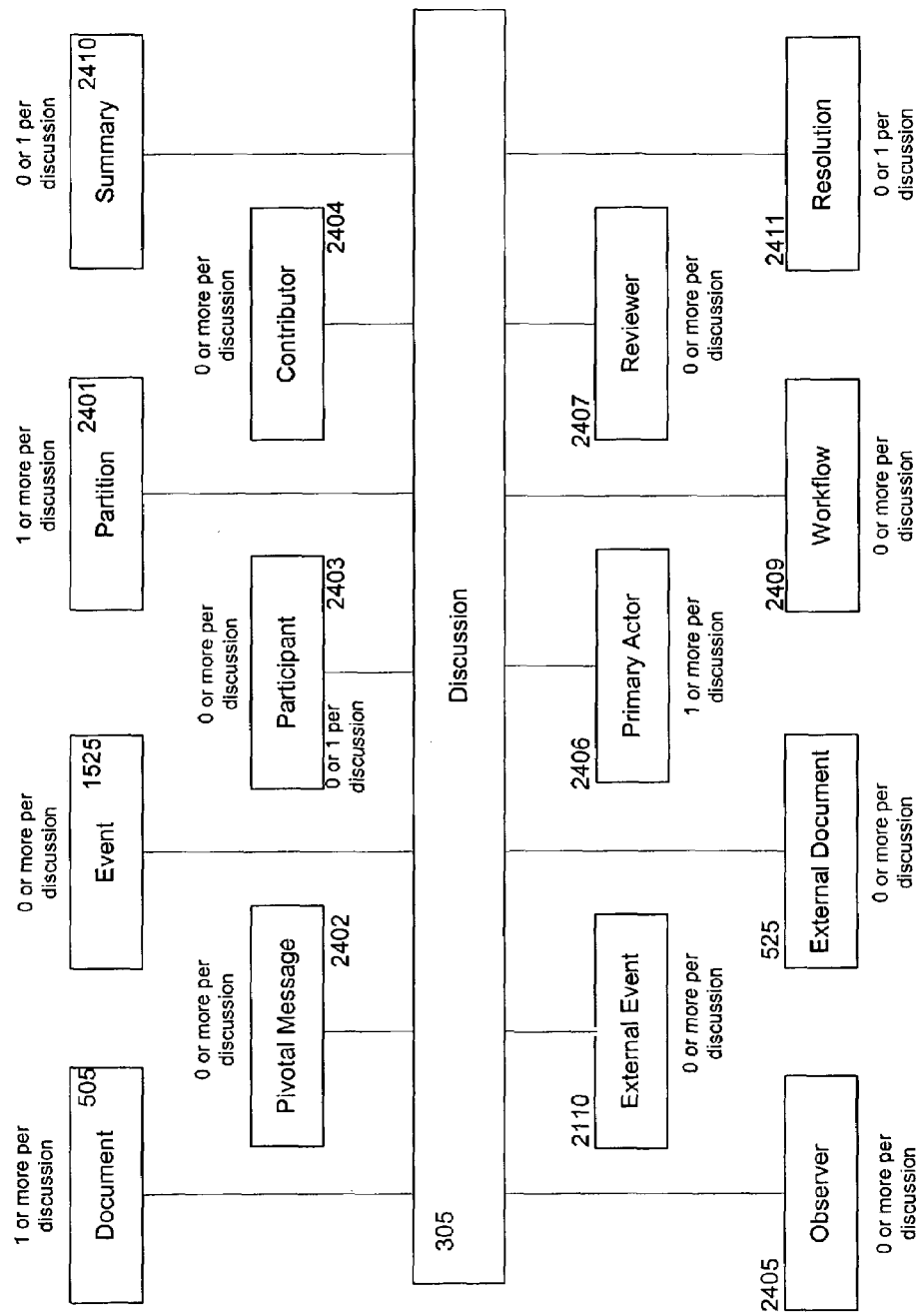
Figure 24a: Relationship of Discussion to Other Objects

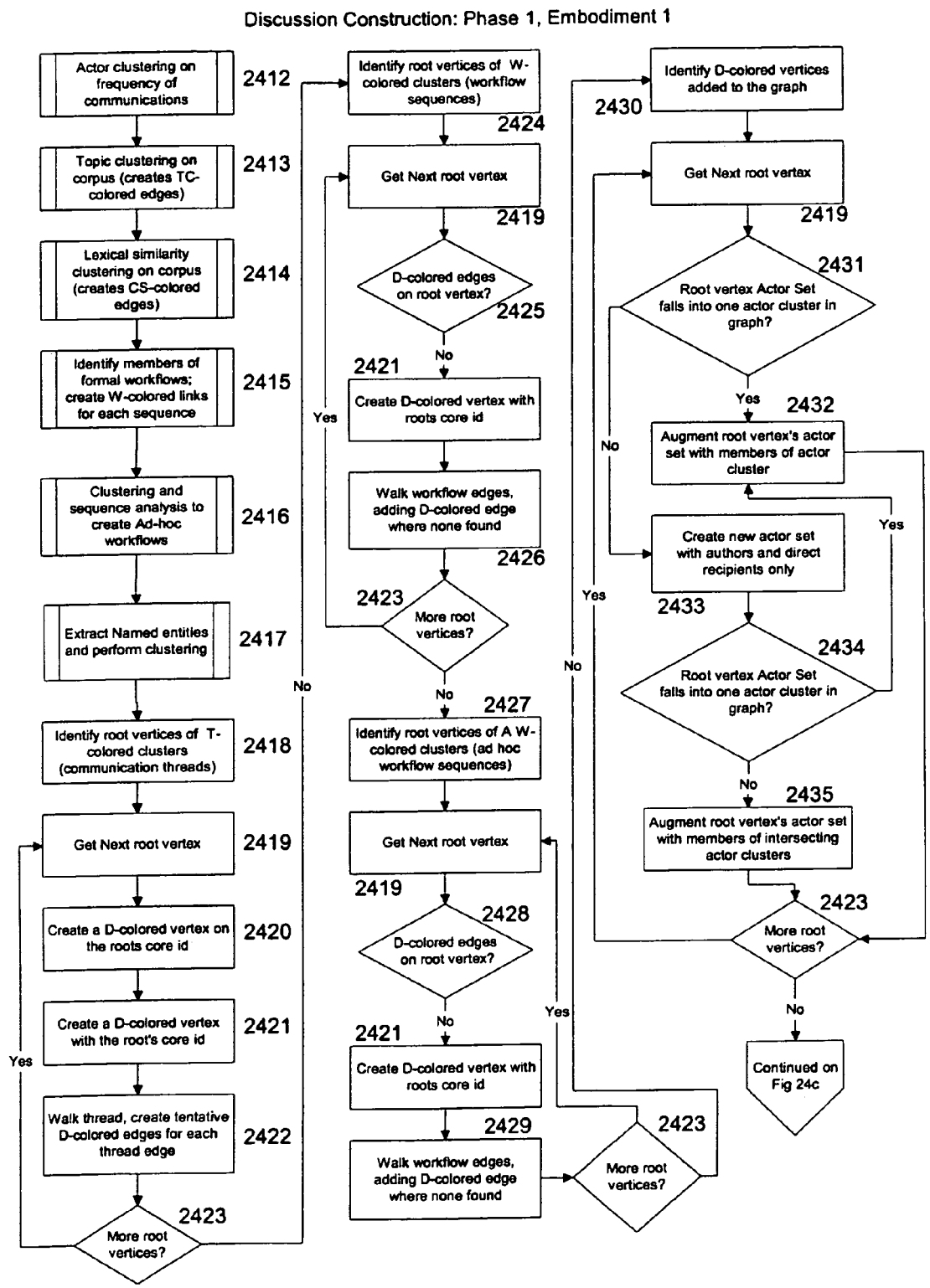
Figure 24b: One Embodiment of Discussion Building

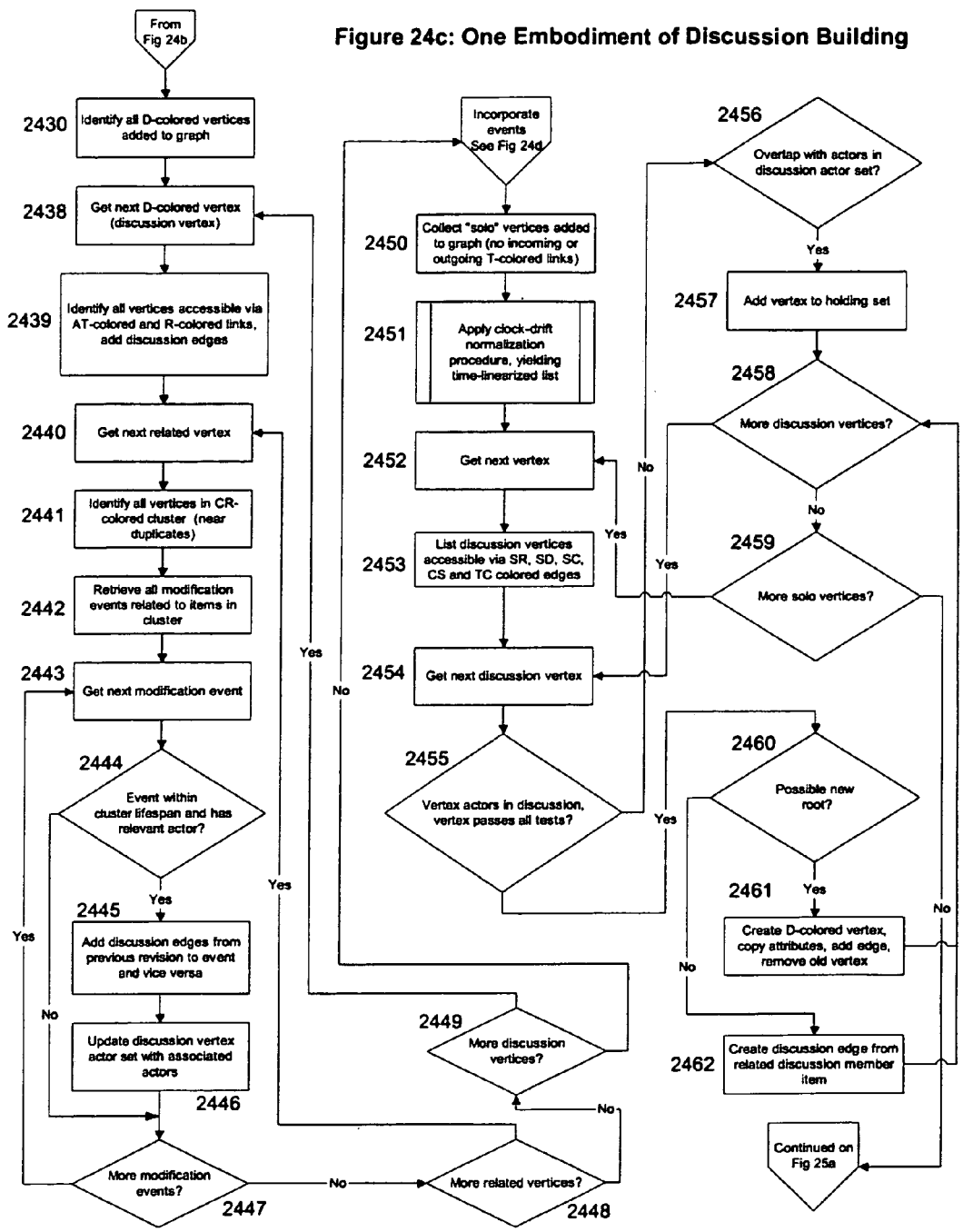
Figure 24c: One Embodiment of Discussion Building

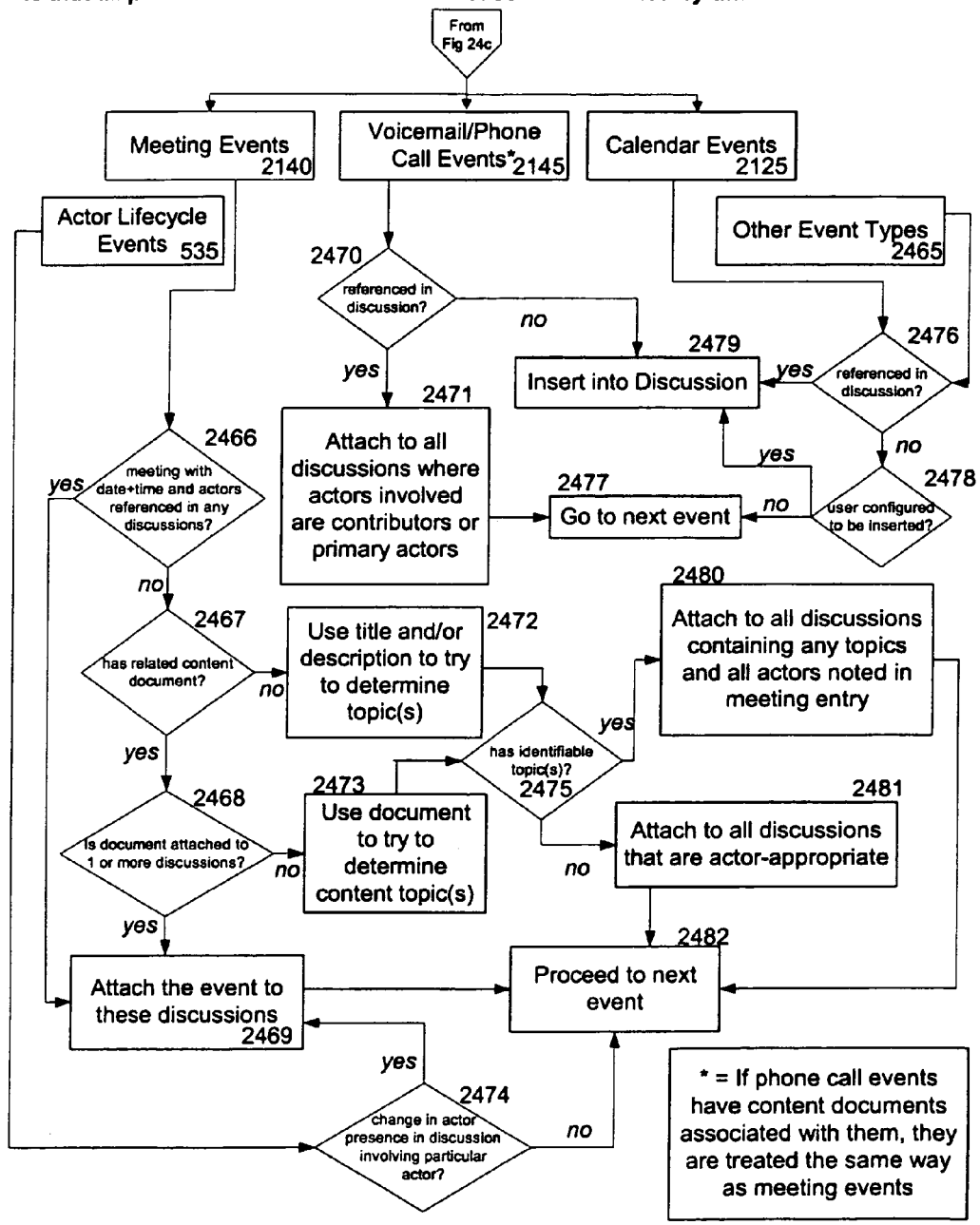
Figure 24d: Event Incorporation in Discussions
Note that all potential event inclusion in discussions is limited by time as described

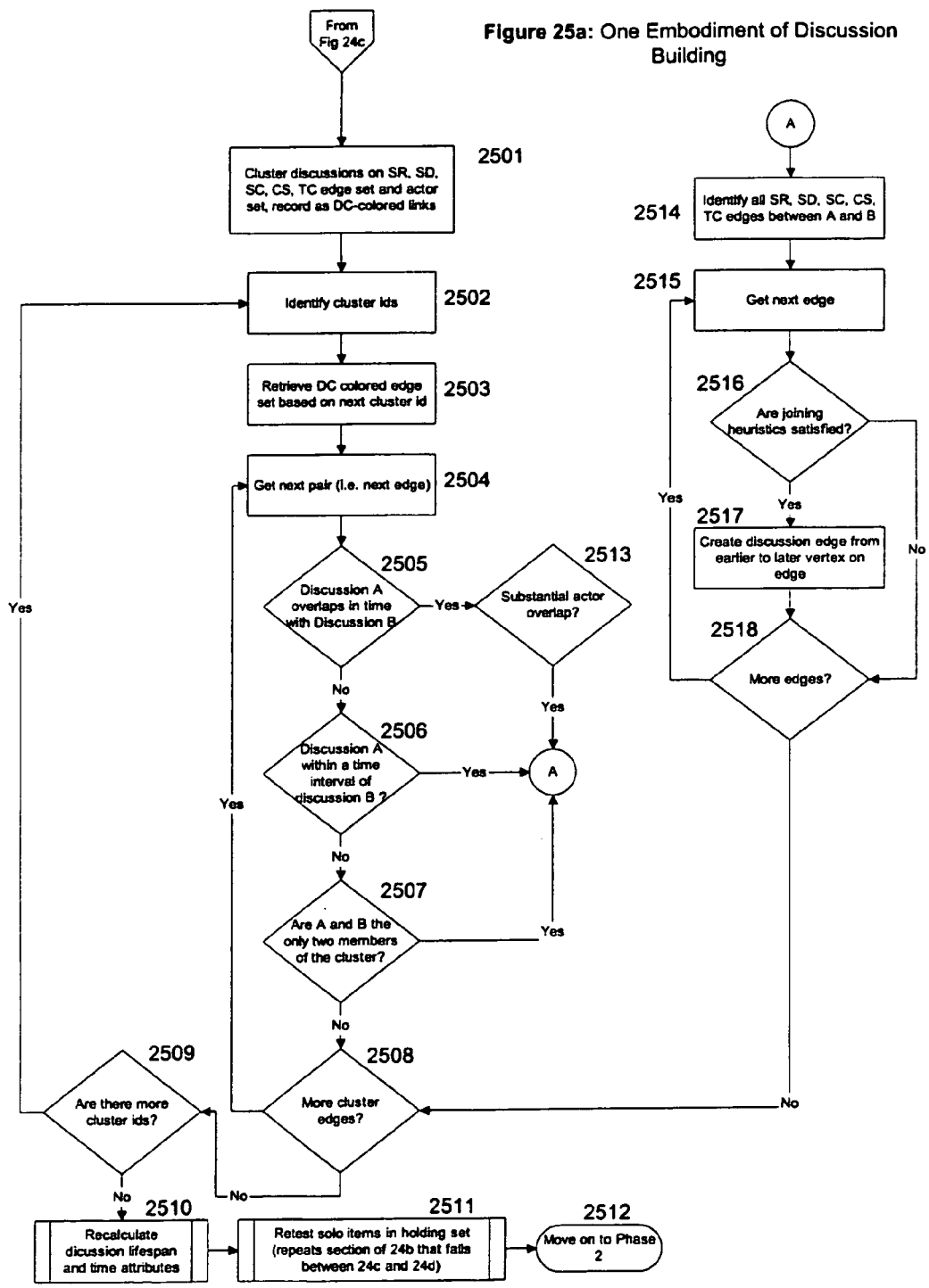
Figure 25a: One Embodiment of Discussion Building

Figure 25b: One Embodiment of Discussion Building
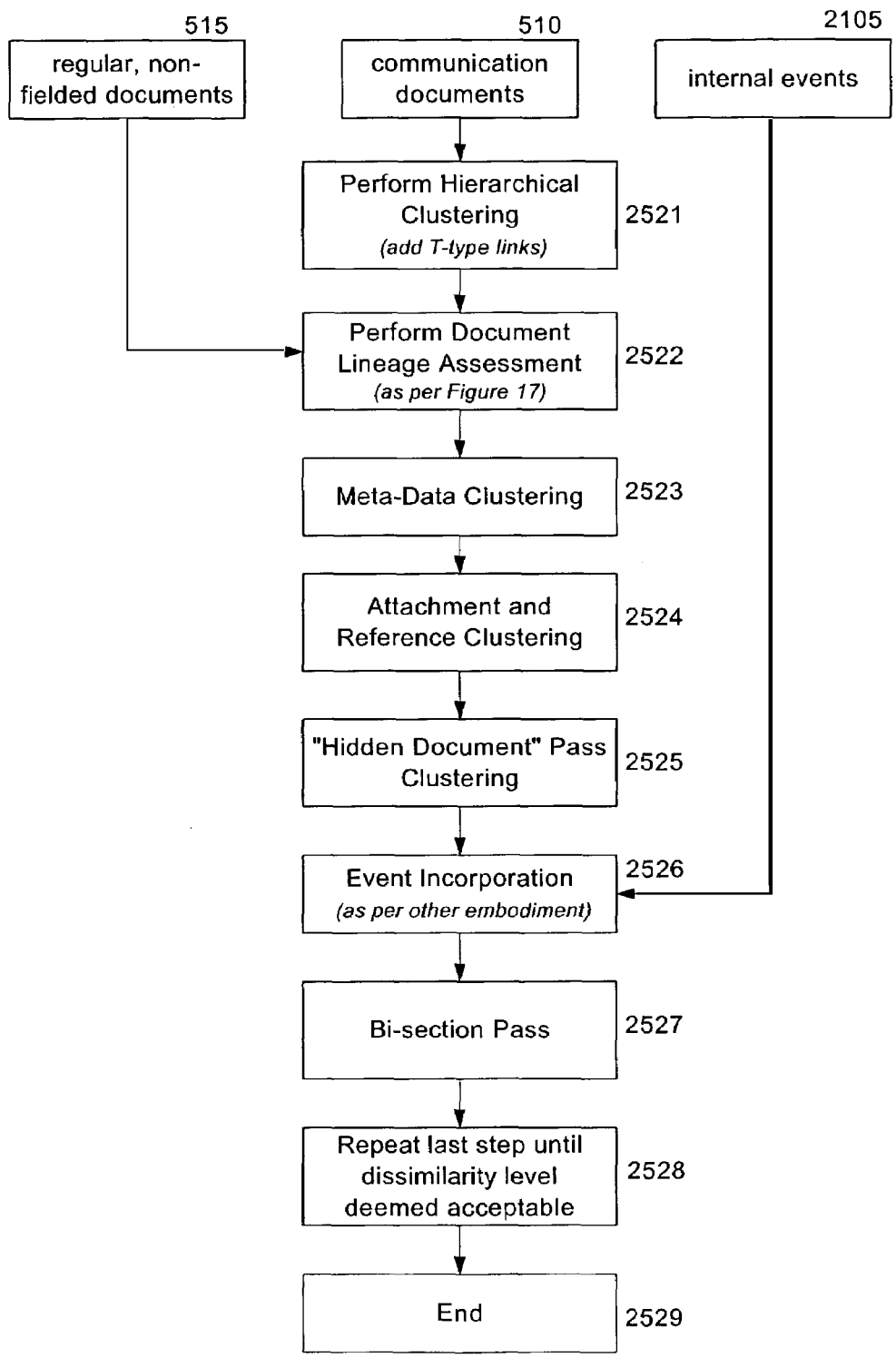

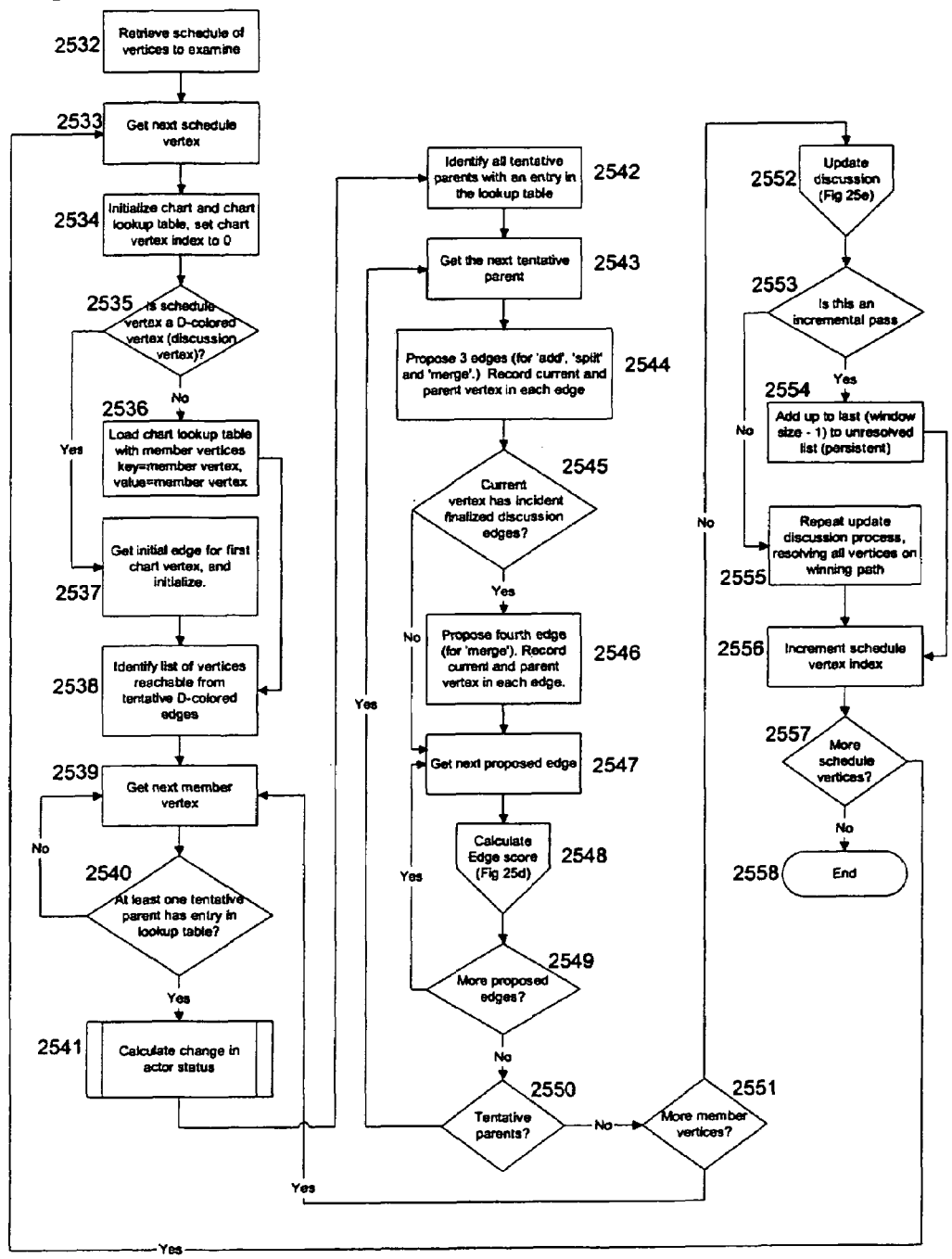
Figure 25c: Discussion building: phase 2 - Finalizing discussion edges

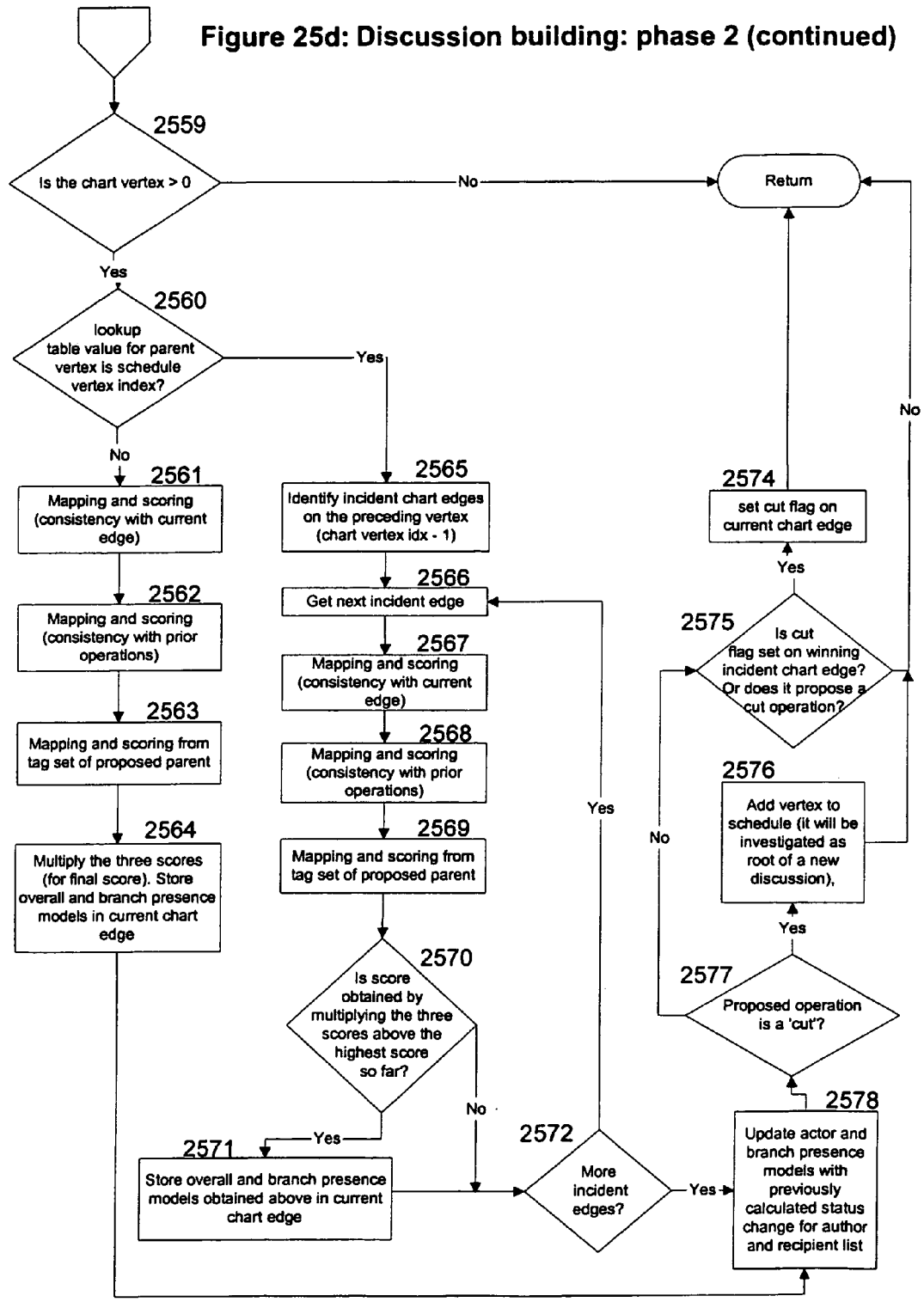
Figure 25d: Discussion building: phase 2 (continued)

Figure25f: Data Structures used in second pass discussion building

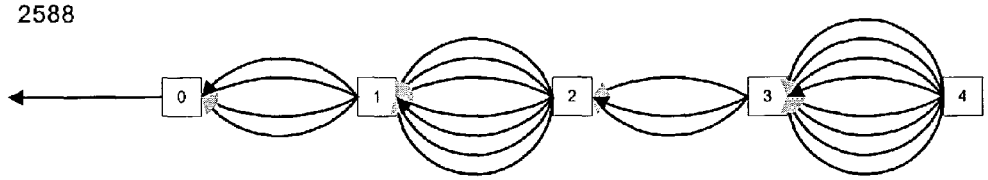

2588

2589
Chart Lookup Table

| Key | Value |
|---|---|
| D.Email Id #1 | 0 |
| R.Email Id #2 | 1 |
| R.Mod Event Id #1 | 2 |
| R.Email Id #3 | 3 |
| R.Doc Id #1 | 4 |

| Chart Edge 2590 / 2592 ||||||
|---|---|---|---|---|---|
| 2591 | overall presence model | branch presence model | proposed structural op | | 2593 |
| | score | child vertex key | parent vertex key | cut flag | parent edge |
| | 2594 | 2595 | 2596 | 2597 | 2598 |

Notes: black colored arcs represent best scores along one chain, each of the final set of arcs establishes its own chain of such parent arcs

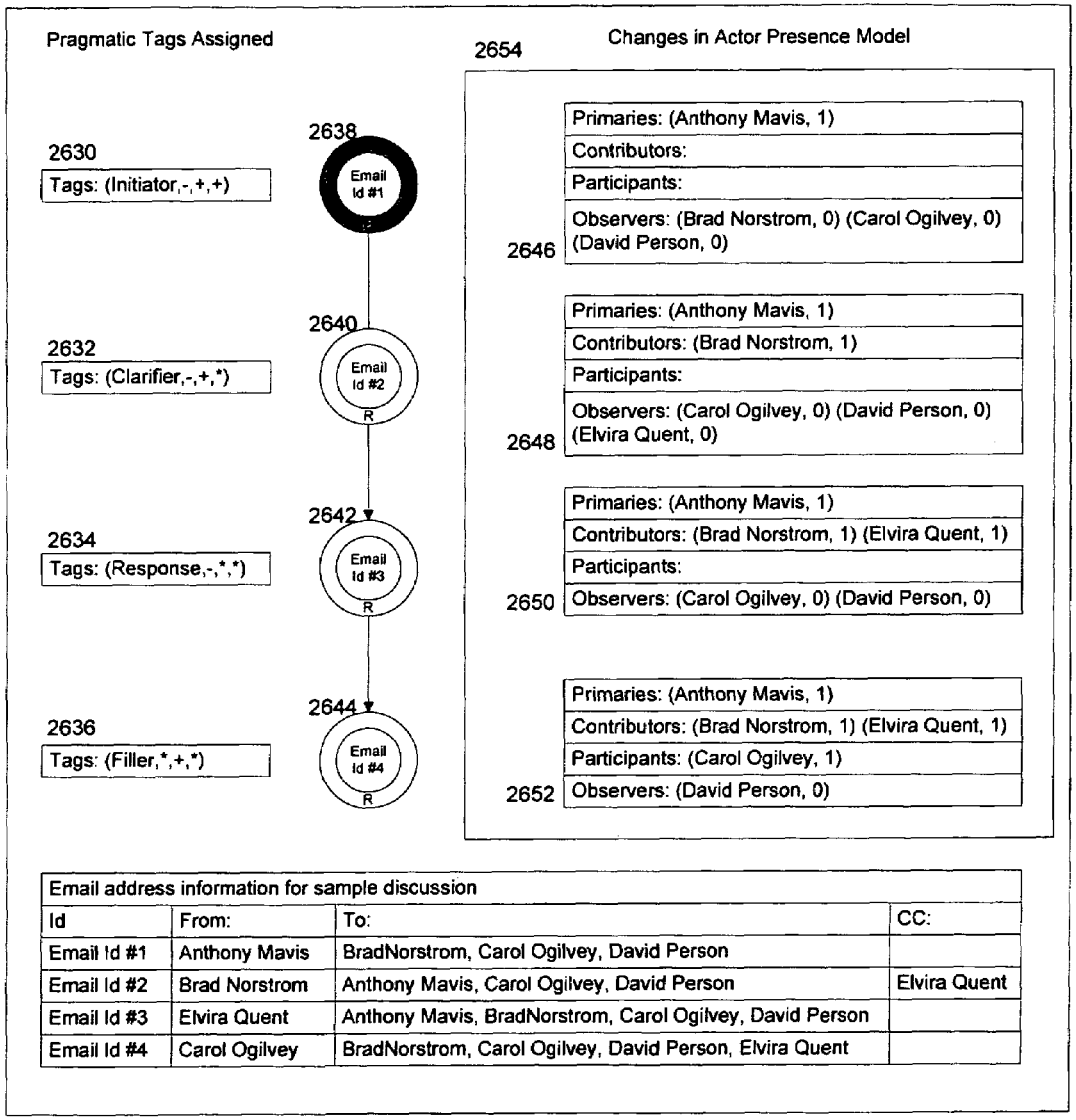
Figure 26a: Example of Actor Presence Model Evolution

Figure 26b: Ad Hoc Workflow Identification
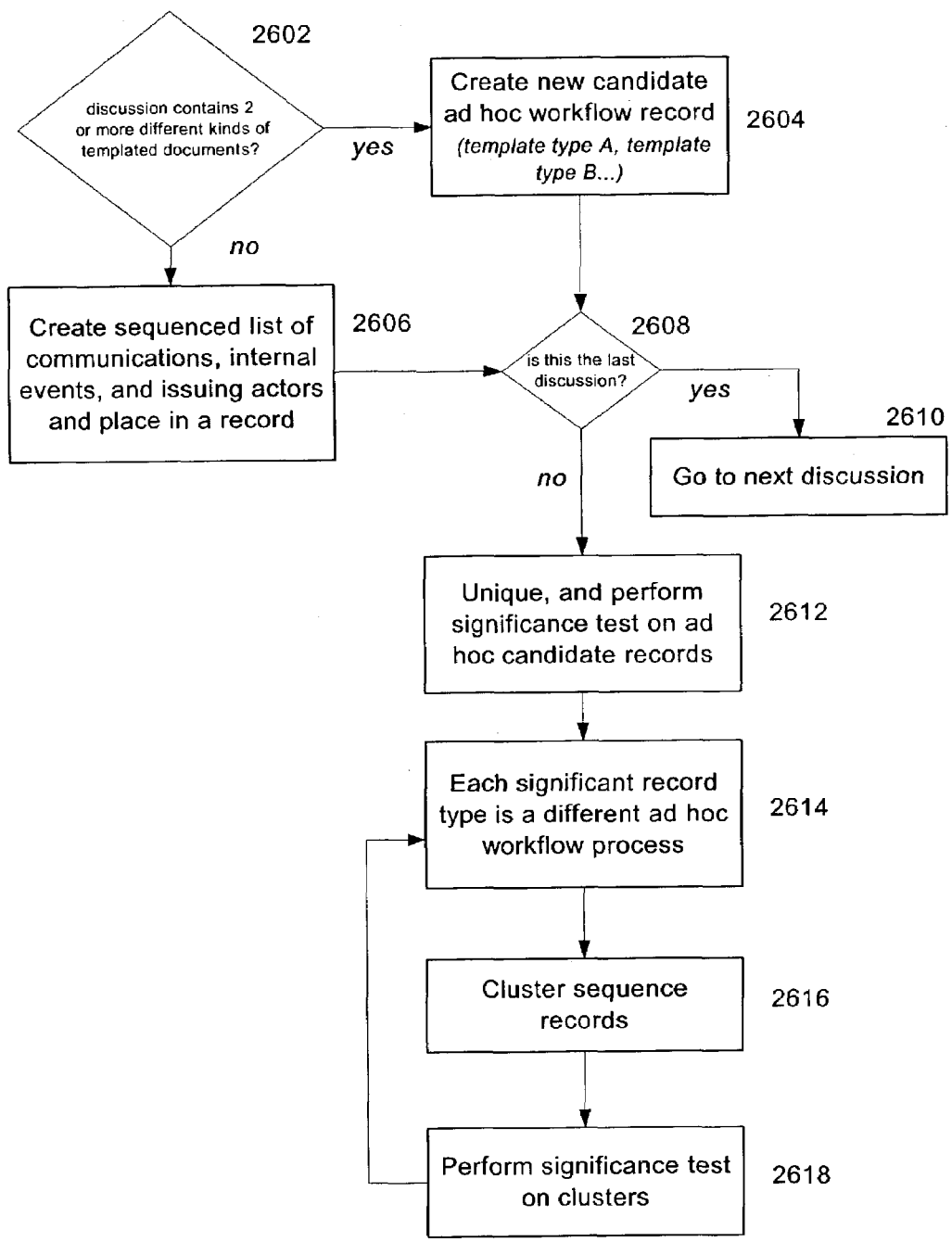

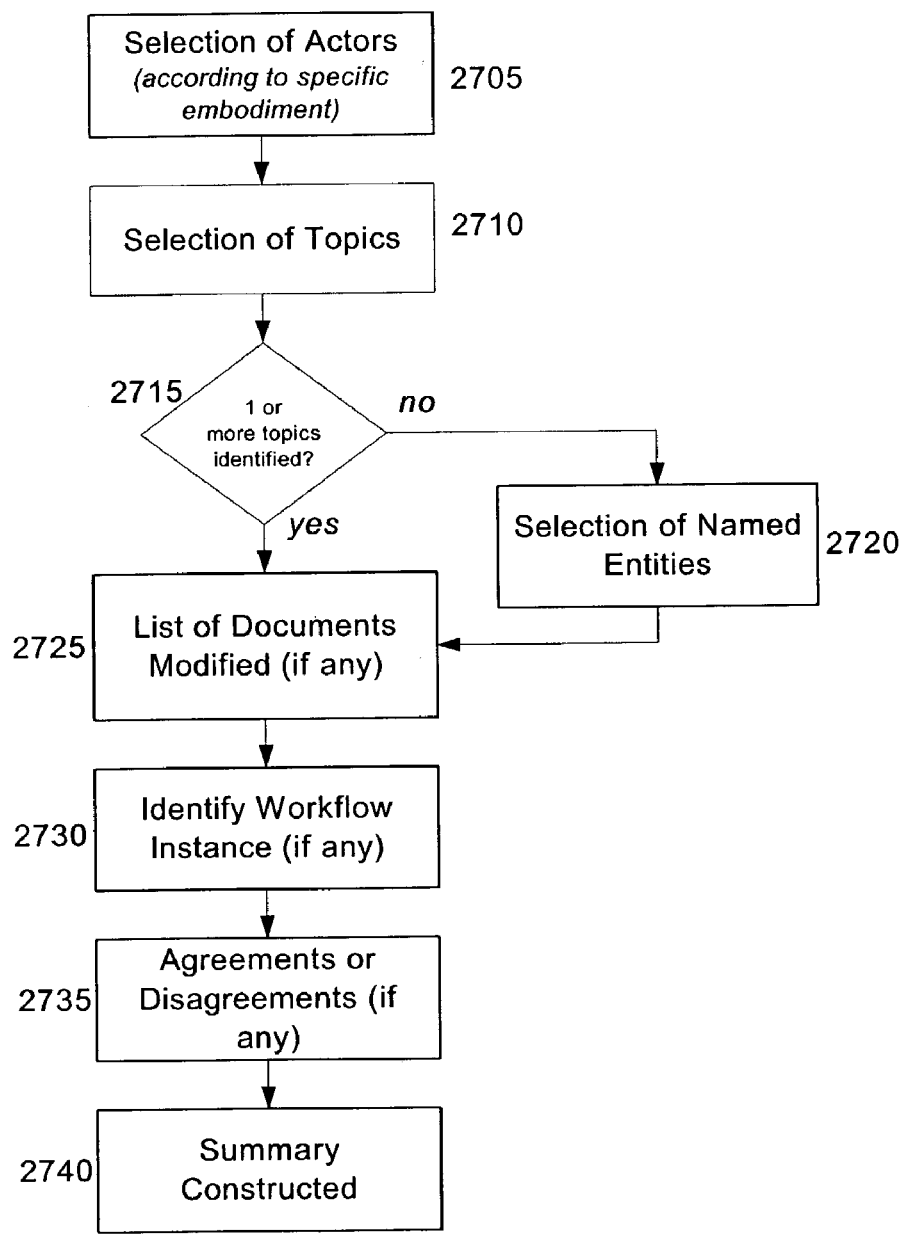
Figure 27: Discussion Summary Construction

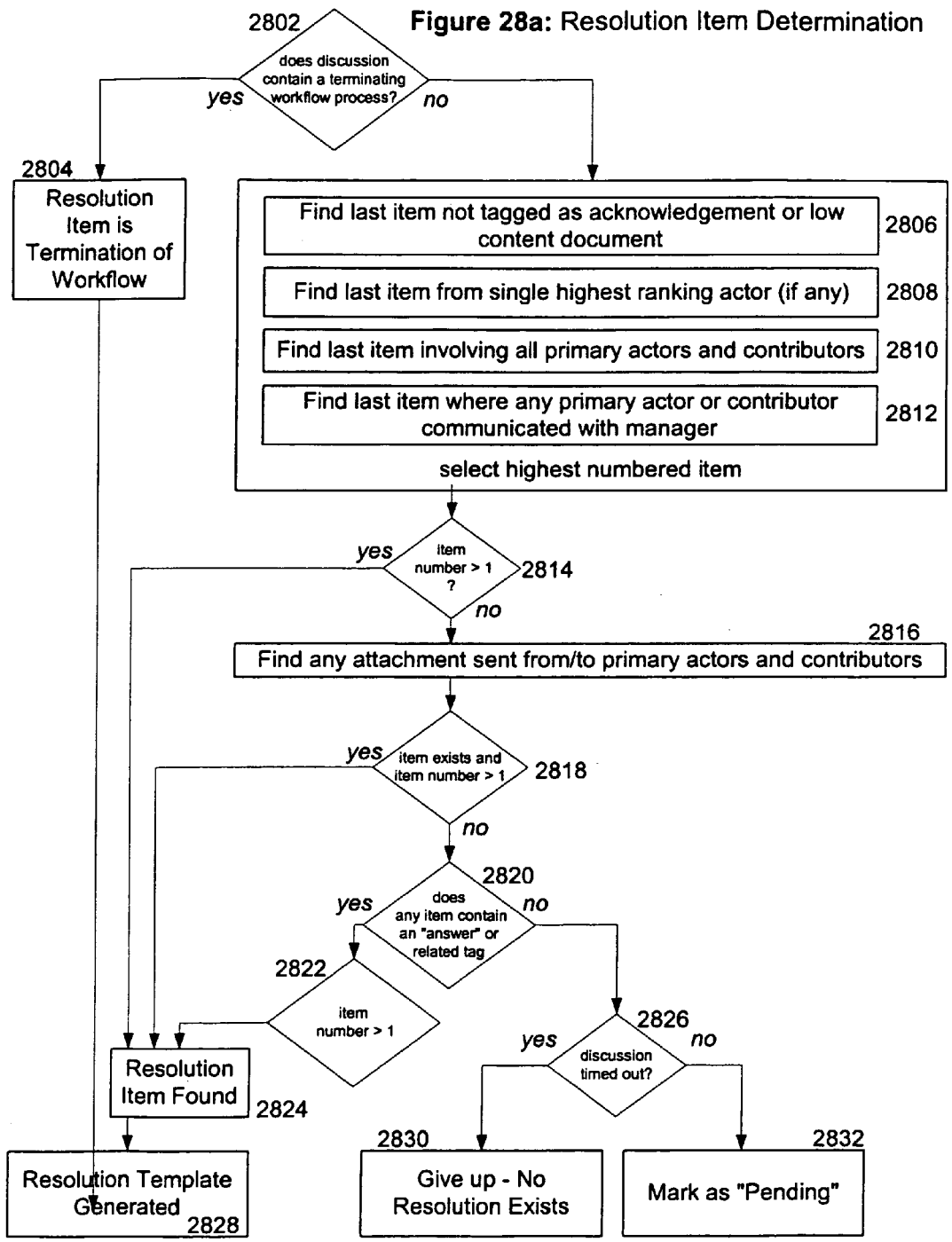
Figure 28a: Resolution Item Determination

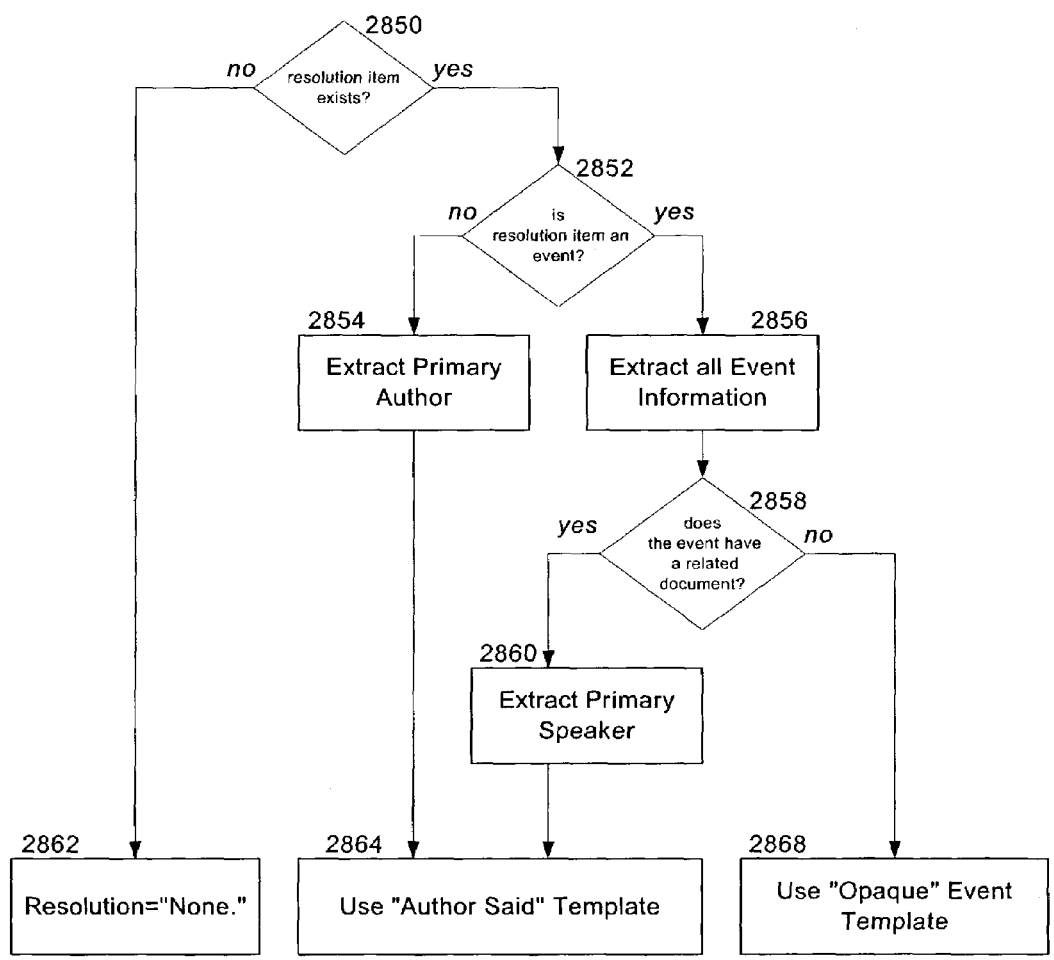
Figure 28b: Resolution Template Selection Process

Figure 29: Discussion Partitioning
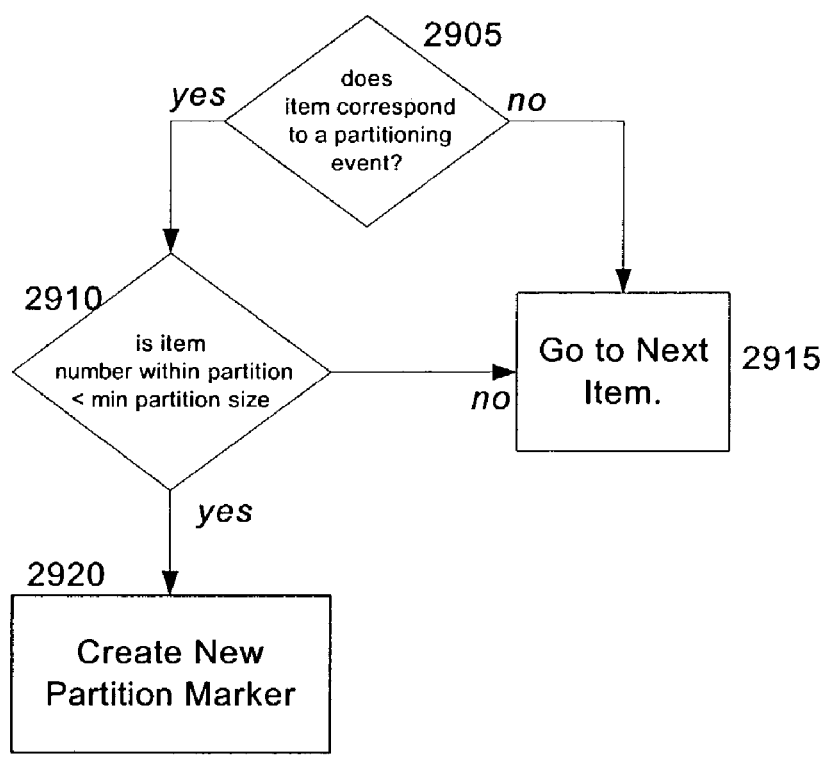

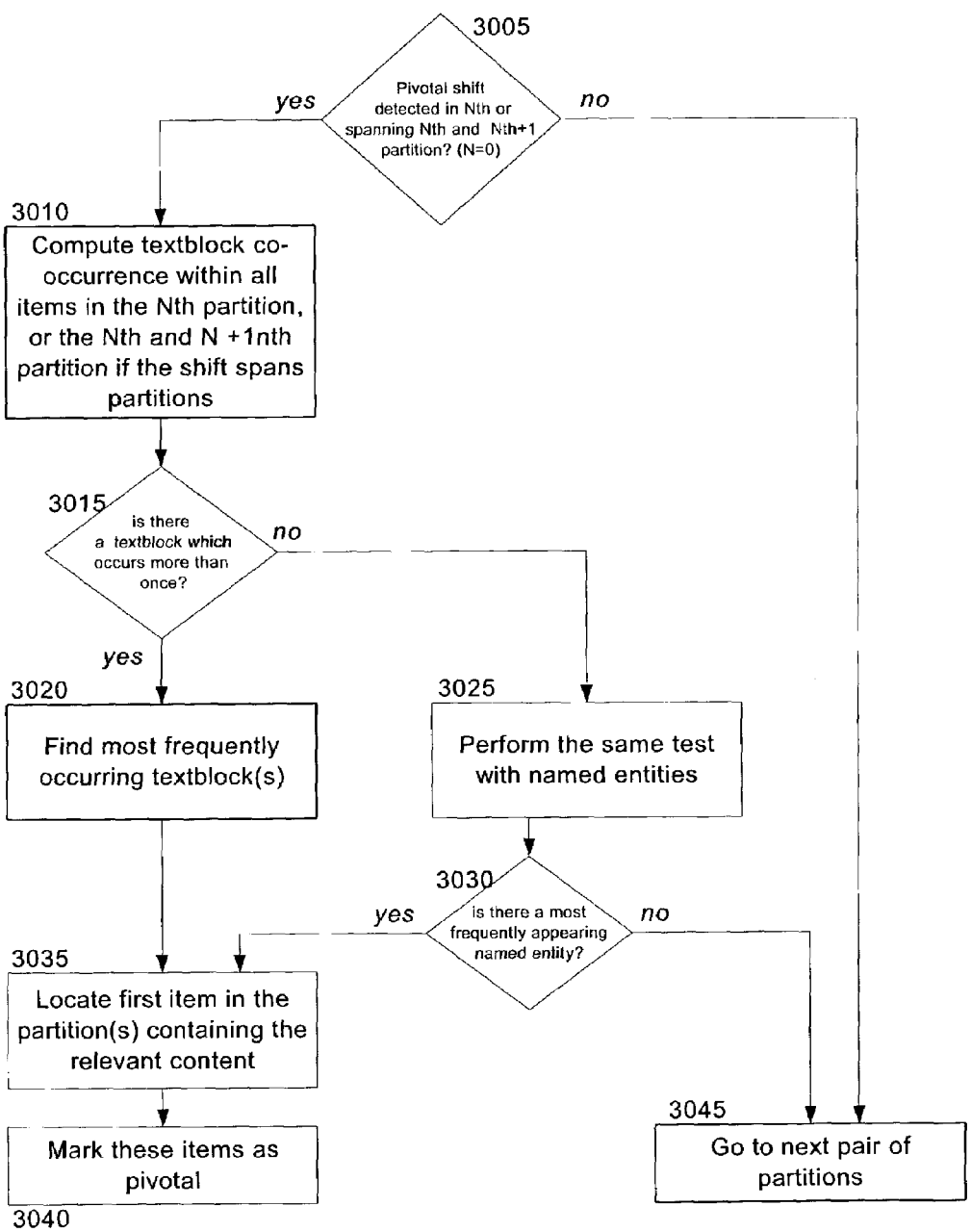
Figure 30: Pivotal Message Identification

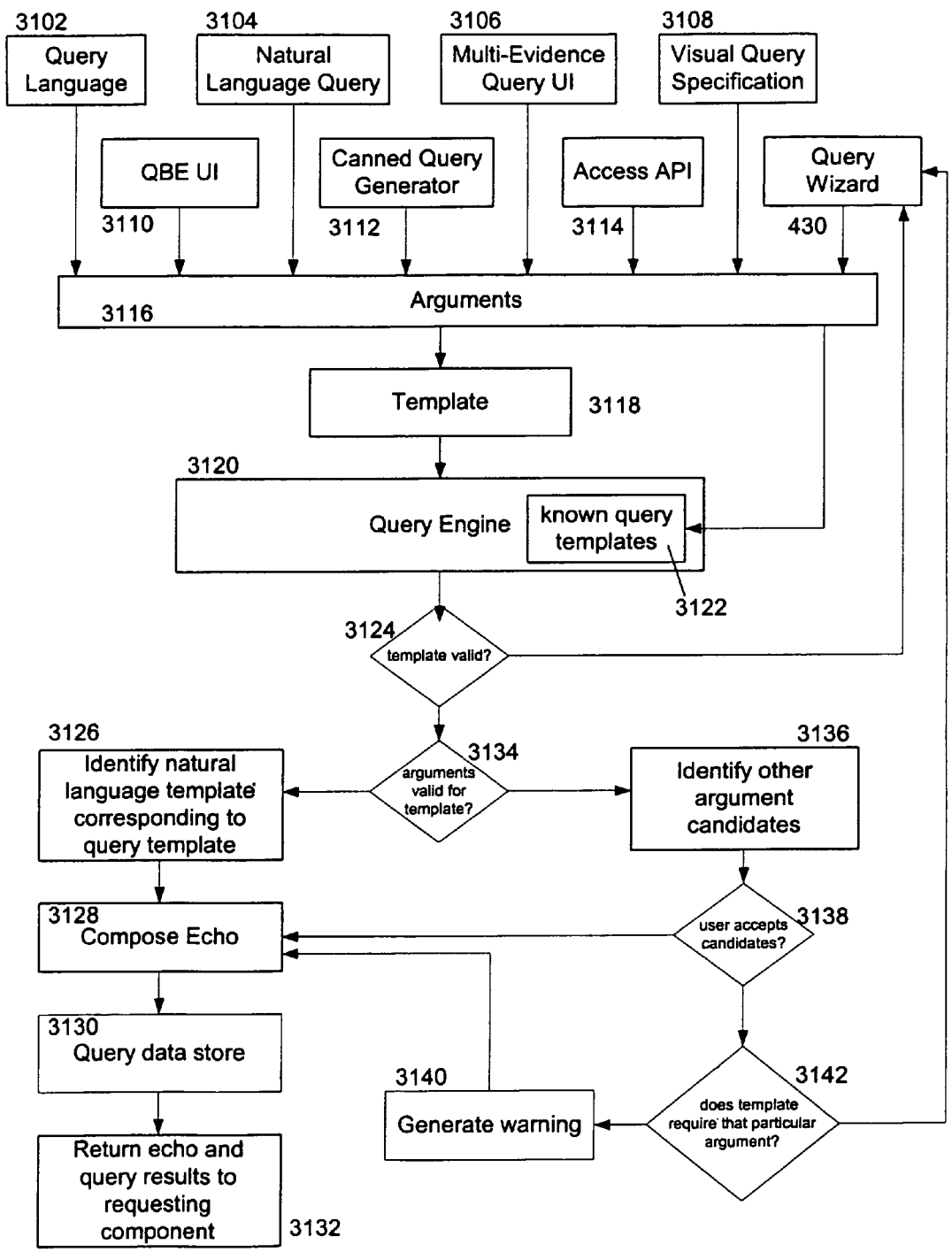

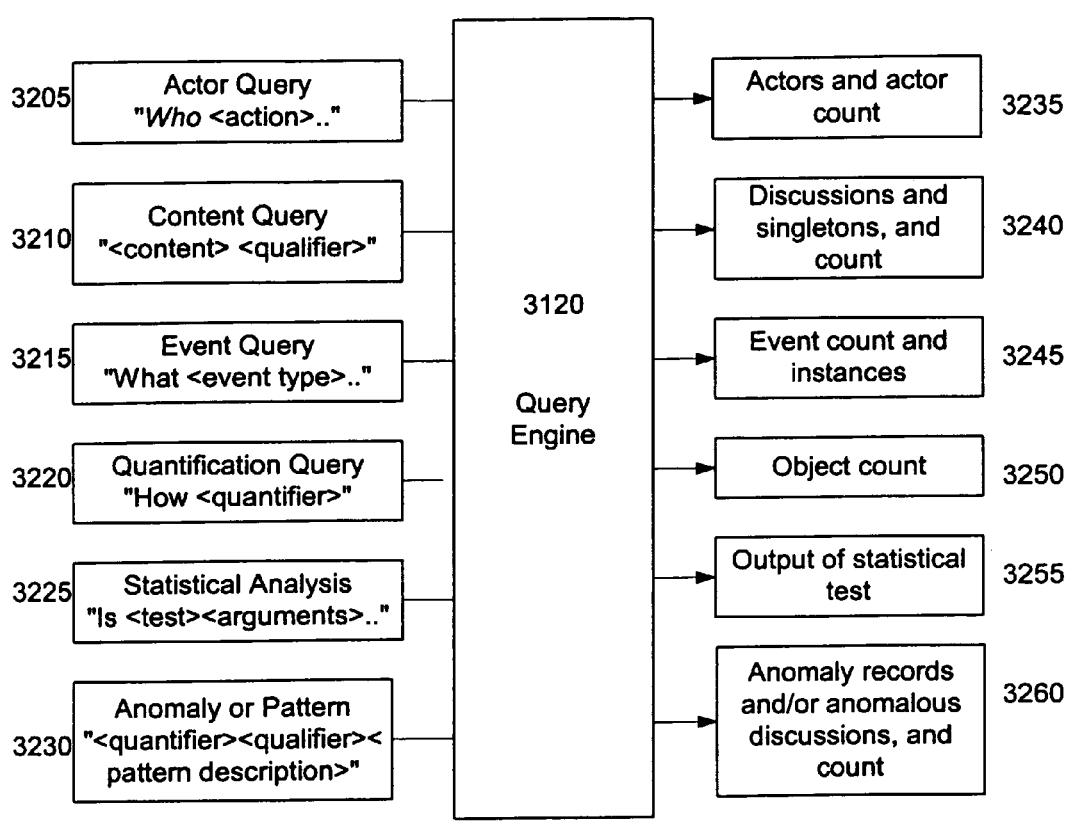
Figure 32: Primary Template and Return Types

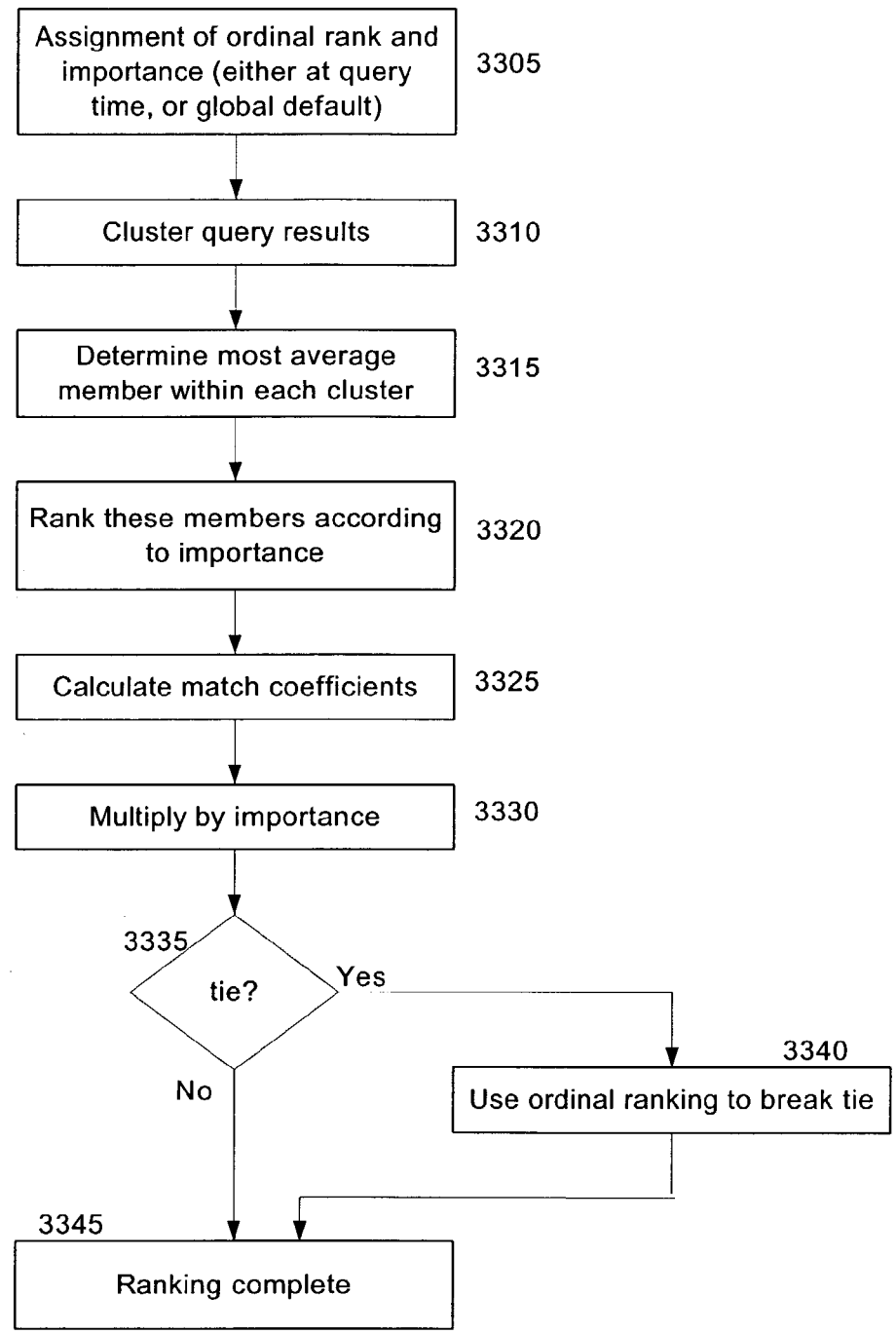
Figure 33: Relevance Ranking Process

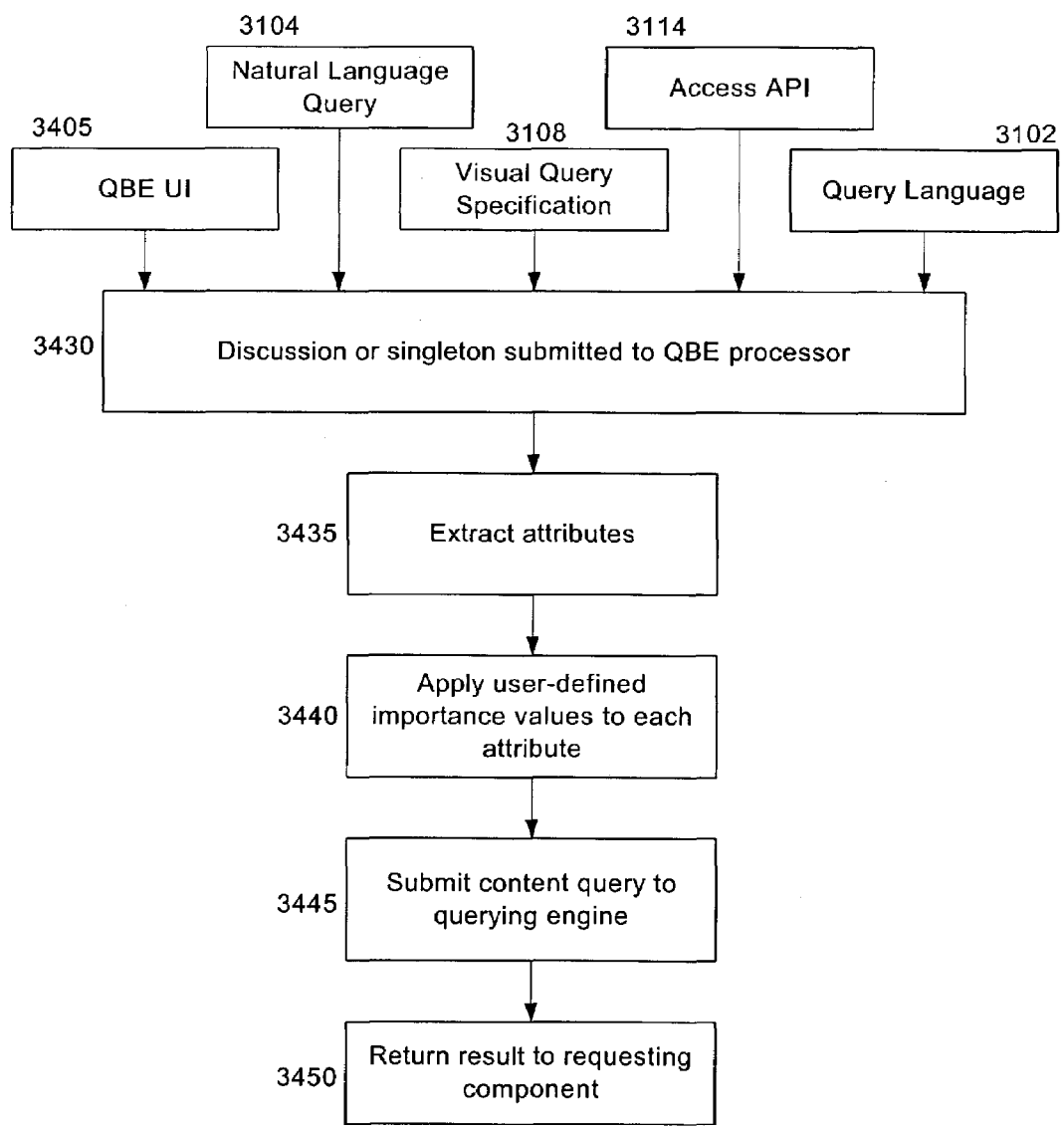
Figure 34: Query By Example

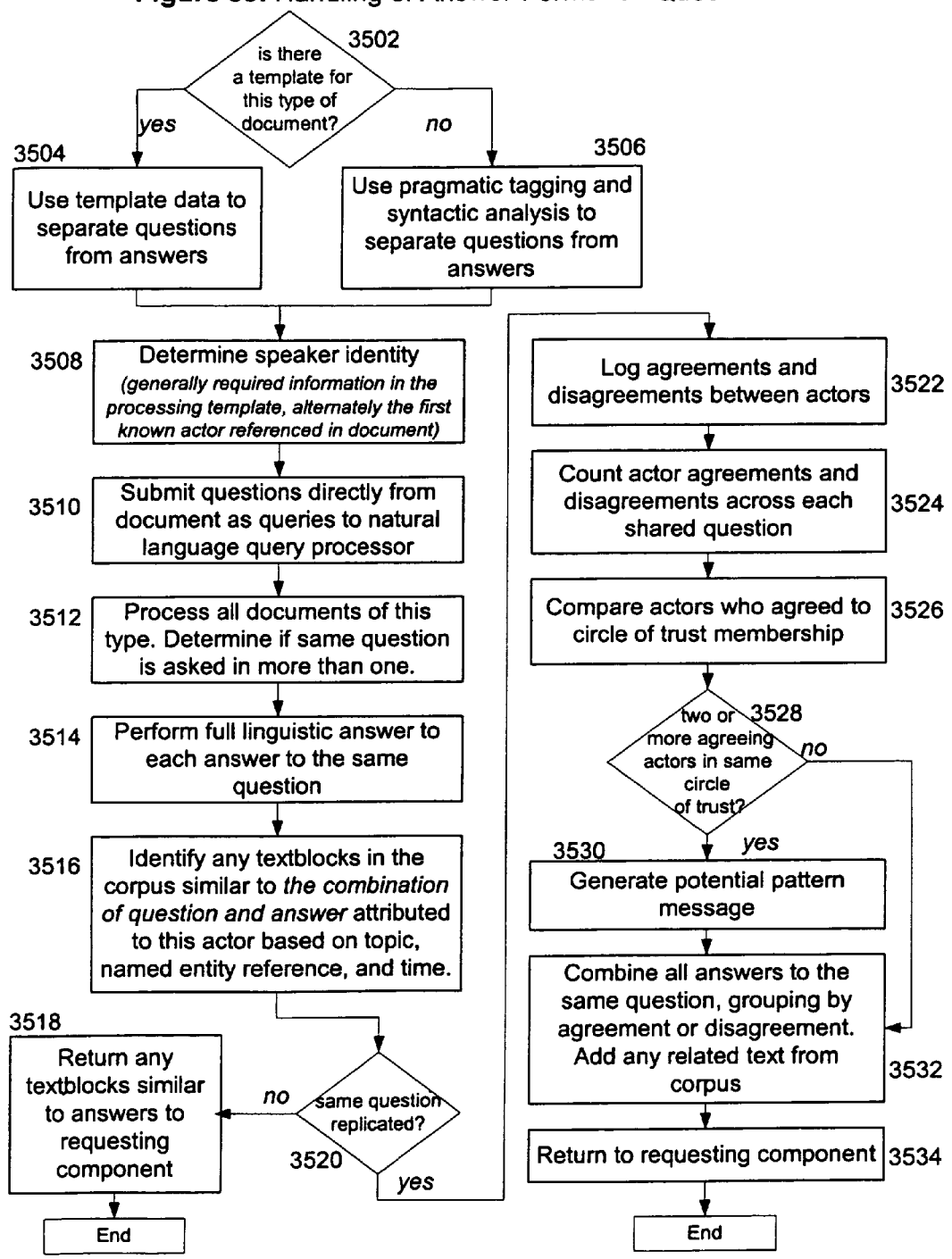
Figure 35: Handling of Answer-Formatted Question

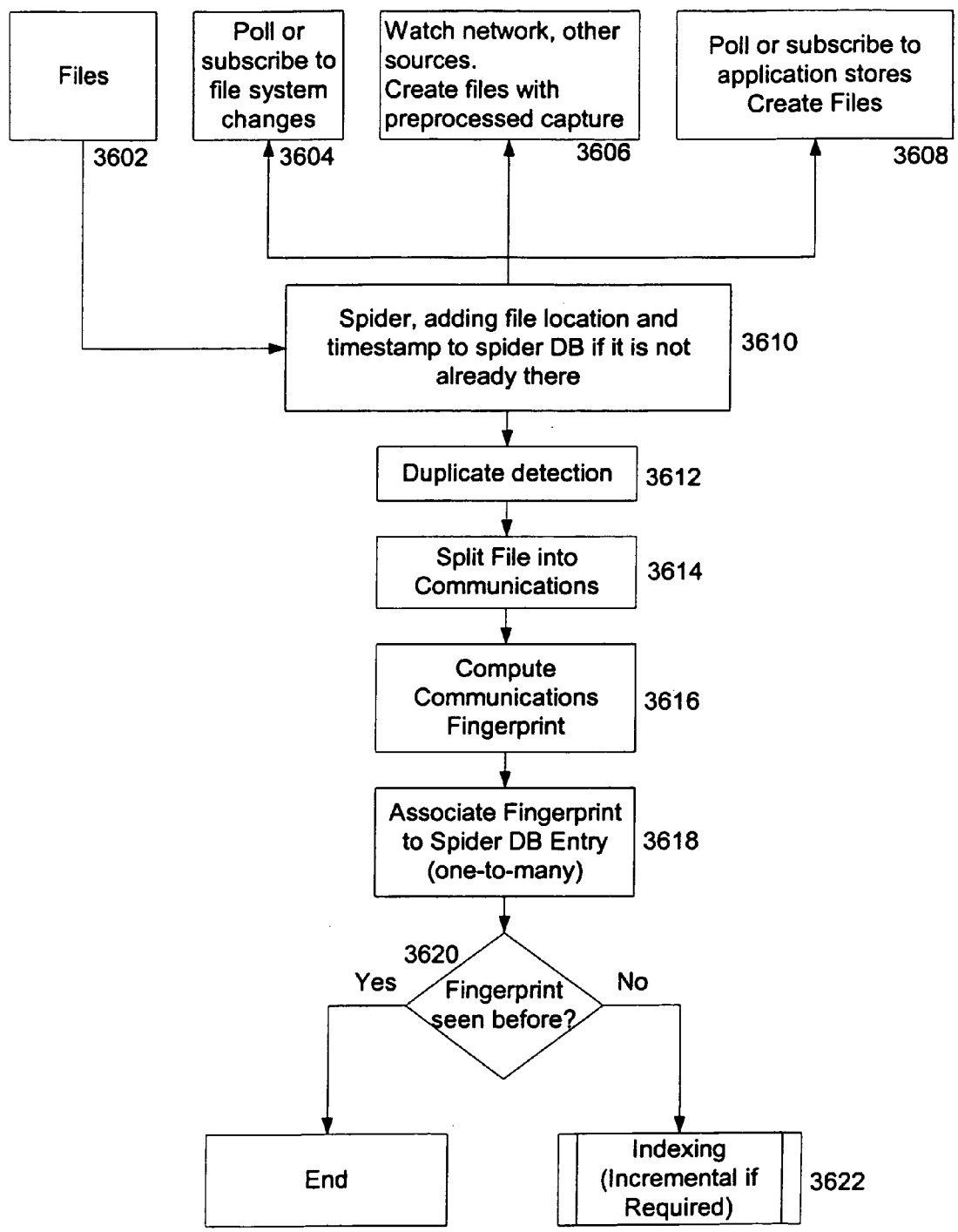
Figure 36a: Dynamic Update Detection

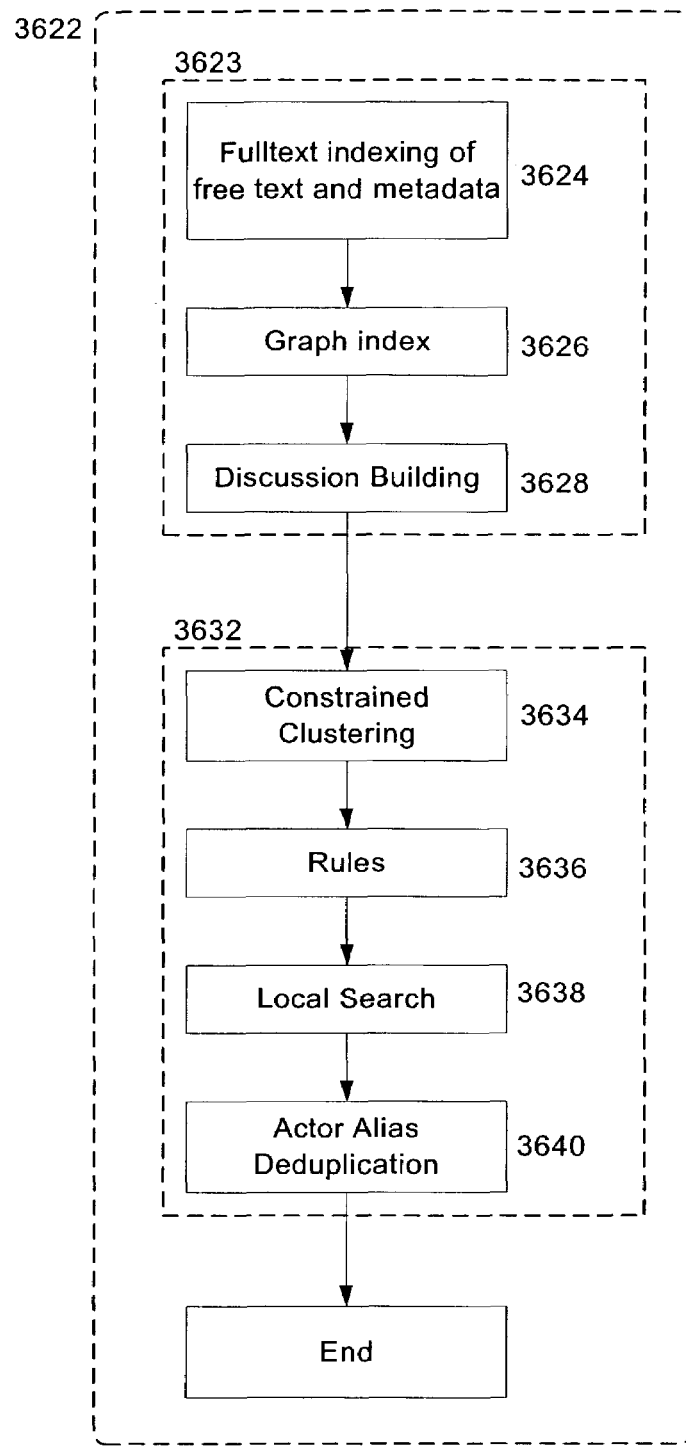
Figure 36b: Indexing (Including Dynamic Indexing)

METHOD AND APPARATUS FOR SOCIOLOGICAL DATA MINING

This application claims benefit of Ser. No. 60/354,403 filed on Feb. 4, 2002 now ABN.

FIELD OF THE INVENTION

The present invention relates to electronic documents, and more particularly to a method for retrieving a document or (more typically) a group of documents that satisfies a user-defined criterion or set of criteria. Additionally, the invention relates to the detection of patterns among these documents, and the various actors operating upon them.

BACKGROUND

The volume of electronic information in both personal and corporate data stores is increasing rapidly. Examples of such stores include electronic mail (e-mail) messages, word-processed and text documents, contact management tools, and calendars. But the precision and usability of knowledge management and search technology has not kept pace. The vast majority of searches performed today are still keyword searches or fielded searches. A keyword search involves entering a list of words, which are likely to be contained within the body of the document for which the user is searching. A fielded search involves locating documents using lexical strings that have been deliberately placed within the document (usually at the top) with the purpose of facilitating document retrieval. These data retrieval techniques suffer from two fundamental flaws. Firstly, they often result in either vast numbers of documents being returned, or, if too many keywords or attribute-value pairs are specified and the user specifies that they must all appear in the document, no documents at all. Secondly, these techniques are able only to retrieve documents that individually meet the search criteria. If two or more related (but distinct) documents meet the search criteria only when considered as a combined unit, these documents will not be retrieved. Examples of this would include the case where the earlier draft of a document contains one keyword and the later draft contains another keyword that is absent from the first document; or an e-mail message and an entry in an electronic calendar, where the calendar entry might clarify the context of a reference in the e-mail message.

SUMMARY OF THE INVENTION

A processing system for retrieving interrelated documents is described. The system comprises a document repository for storing a plurality of documents, a metadata repository for storing a plurality of metadata elements to represent relations between the documents, and a sociological analysis engine to identify relationships between the documents using the metadata elements from the metadata repository.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of one embodiment of a network, which may be used with the present invention.

FIG. 2 is a block diagram of one embodiment of a computer system.

FIG. 3 is a block diagram of navigation flow in one embodiment of the present invention.

FIG. 4a is a flowchart of one embodiment of the initial preprocessing step.

FIG. 4b is a flowchart of one embodiment of OCR processing of graphics files.

FIG. 4c is a block diagram of one embodiment of the relationship between discussions, documents, and singletons.

FIG. 5 is a block diagram of one embodiment of document subclasses and relations to event types.

FIG. 6a is a flowchart of one embodiment of the e-mail identity extraction process.

FIG. 6b is a flowchart of one embodiment of the e-mail identity disambiguation process.

FIG. 7a is an illustration of one embodiment of the relationship between colored graph elements.

FIG. 7b is a fragment of one embodiment of a colored graph sample.

FIG. 8 is a flowchart of one embodiment of the initial actor graph construction process.

FIG. 9a is a flowchart of one embodiment of an overview of the second stage of actor 310 graph construction.

FIG. 9b is a flowchart of one embodiment of edge creation and weight assignment during actor graph construction.

FIG. 9c is a flowchart of one embodiment of bottom-up clustering during actor graph construction.

FIG. 9d is a flowchart of one embodiment of the process of deriving aliases during actor graph construction.

FIG. 10a is a flowchart of one embodiment of the ownership/authorship model.

FIG. 10b is a flowchart of one embodiment of the ownership/authorship model where the user logs on to multiple systems.

FIG. 11 is a flowchart of one embodiment of the process for detecting spam and other exogenous content.

FIG. 12 is a block diagram of one embodiment of the actor class and containment hierarchy.

FIG. 13a is a flowchart of one embodiment of the alias versioning process.

FIG. 13b is a flowchart of one embodiment of the actor parsing and deduplication process.

FIG. 14 is a flowchart of one embodiment of the actor personality identification process.

FIG. 15 is a block diagram of one embodiment of the circle of trust or clique class hierarchy and associations.

FIG. 16 is a flowchart of one embodiment of the process of detecting crisis/event-based circled of trust.

FIG. 17a is a flowchart of one embodiment of the process of computing document similarity.

FIG. 17b is a flowchart of one embodiment of document indexing granularity and deduplication.

FIG. 18 is a flowchart of one embodiment of the process of computing actor involvement.

FIG. 19 is a flowchart of one embodiment of the iterative process of building the actor graph.

FIG. 20a is a flowchart of one embodiment of the process of textblock identification.

FIG. 20b is a flowchart of one embodiment of the process of textblock attribution.

FIG. 20c is a flowchart of one embodiment of the process of textblock attribution with OCRed documents.

FIG. 21a is a block diagram of one embodiment of a partial event hierarchy.

FIG. 21b is a block diagram of one embodiment of a the element relationship in a sample ontology.

FIG. 22*a* is an illustration of one embodiment of the clockdrift detection process.

FIG. 22*b* illustrates the concept of "warped time".

FIG. 23*a* is a block diagram of one embodiment of the pragmatic tag spectrum.

FIGS. 23*b*–23*e* are a flowchart of one embodiment of the pragmatic tagging process.

FIG. 24*a* is a block diagram of one embodiment of the relationship of discussions to other objects.

FIGS. 24*b*, 24*c*, 24*d* and 25*a* are a flowchart of one embodiment of phase one of discussion building.

FIG. 25*b* is a flowchart of another embodiment of discussion building.

FIG. 25*c*, 25*d* and 25*e* are a flowchart of one embodiment of phase two of discussion building.

FIG. 25*f* is a diagram of one embodiment of data structures used in the second phase of discussion building.

FIG. 26*a* is an illustration of one embodiment of the evolution of an actor presence model for a small example discussion.

FIG. 26*b* is a flowchart of one embodiment of ad hoc workflow identification.

FIG. 27 is a flowchart of one embodiment of the discussion summary construction process.

FIG. 28*a* is a flowchart of one embodiment of the resolution item determination process.

FIG. 28*b* is a flowchart of one embodiment of the resolution template selection process.

FIG. 29 is a flowchart of one embodiment of the discussion partitioning process.

FIG. 30 is a flowchart of one embodiment of the pivotal messages identification process.

FIG. 31 is a block diagram of one embodiment of the query engine.

FIG. 32 is a block diagram of one embodiment of the primary template and return types.

FIG. 33 is a flowchart of one embodiment of the relevance ranking process.

FIG. 34 is a block diagram of one embodiment of the query by example process.

FIG. 35 is a flowchart of one embodiment of the process for handling answer-formatted questions.

FIG. 36*a* is a flowchart of one embodiment of the dynamic update detection process.

FIG. 36*b* is a flowchart of one embodiment of the indexing process, including dynamic indexing.

DETAILED DESCRIPTION OF THE INVENTION

Figure 25E:
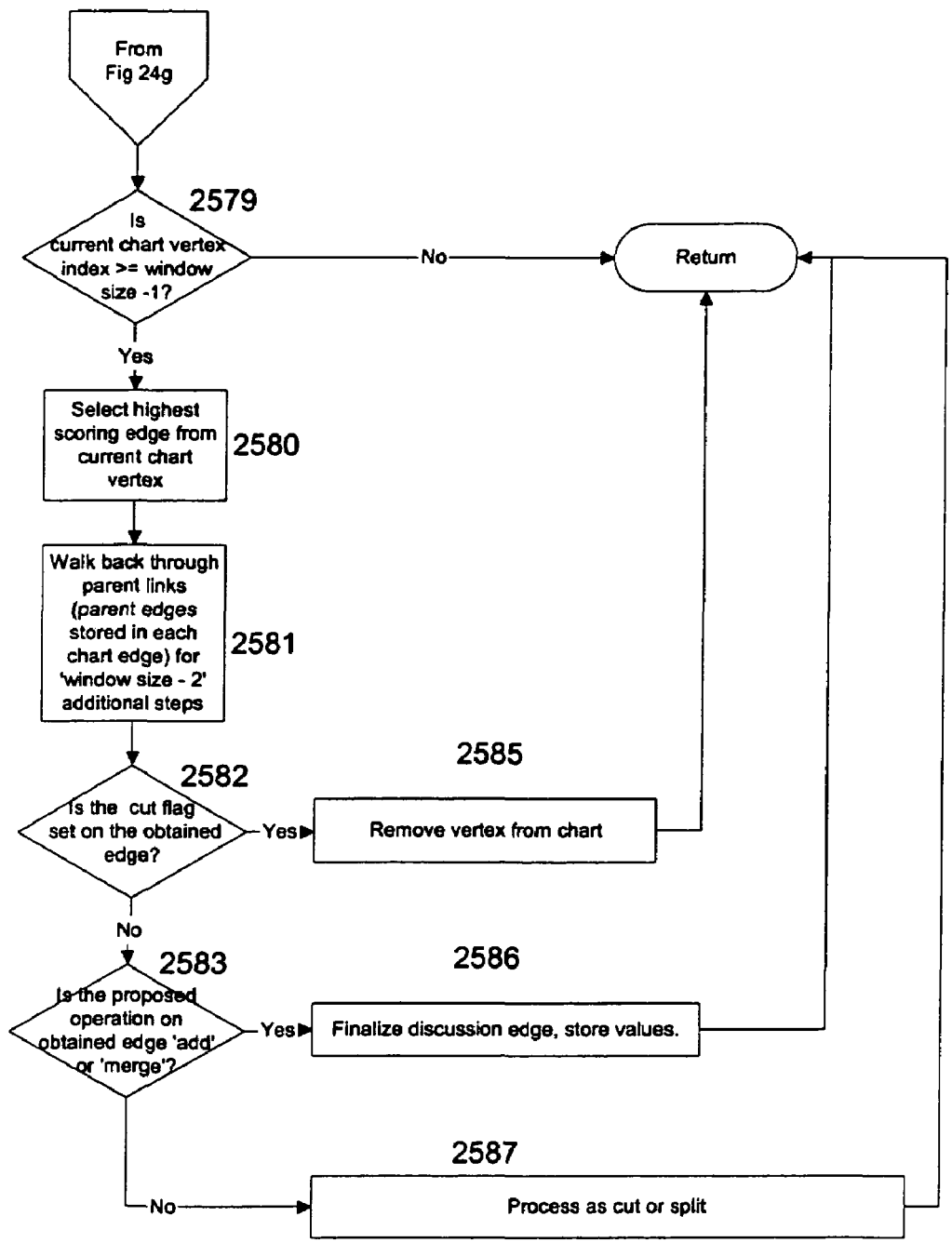

The present invention comprises a system for organizing documents and in some cases, portions of their content, into causally related sets of information. These sets of documents will be referred to as "discussions." The humans or computer system processes that contribute content to a discussion will be referred to as "actors." The system for organizing such documents permits the use of advanced search techniques.

There is a clear need for a search technique that returns sets of related documents that are not merely grouped by textual similarity, but also gripped and sequenced according to the social context in which they were created, modified, or quoted. By grouping documents in this way, the present invention is able to solve previously intractable problems. This makes it possible to retrieve a very precise set of documents from a large corpus of data. Hitherto, with conventional search tools, this has only been possible by the use of complex search queries, and the results have been restricted to documents that individually meet the search criteria. The present invention allows a precise set of documents to be retrieved from a large corpus of texts using simpler search queries, and with the added benefit of presenting the returned documents in the context of causally related documents (for example, meeting minutes sent out after a board meeting), even when those other documents do not, individually, satisfy the search criteria. This relieves the user of the need for detailed prior knowledge (before running the search) of keywords likely to occur in any sought-after documents, or of such details as the exact date on which a message was sent, or who sent it.

Consequently, less skilled query-writers can retrieve a set of related documents (or an individual document) more effectively and accurately with the present invention than with conventional search engines. Furthermore, the availability of class-based ontologies composed of sets of synonyms, antonyms, and other linguistic data will allow users to search from a pre-selected set of likely relevant topics; in this case, the system will generate queries over sets of terms automatically, sparing the end user from manual input of large sets of terms.

In addition, it is of great importance in many contexts to determine patterns of behavior in corpuses of data. Such patterns include sets of actors who regularly communicate with one another, the paths down which certain types of information often travel, as well as anomalies in such communications. Segmenting a corpus of documents into causally related chains facilitates the definition and capture of such complex patterns of behavior, as well as divergence from them.

An apparatus is disclosed for selectively grouping and retrieving sets of interrelated electronic documents and records. The apparatus uses a combination of different types of sociological and linguistic evidence from the documents in the corpus in order to establish highly probably causal relationships between specific documents or document parts. This results in the creation of a kind of "electronic paper trail" spanning many different software applications, as well as potentially many different media, networks or machines. We call the sets of documents of document parts that are joined together in this manner "discussions." Discussions are container objects with a number of their own attributes, such as a name, lifespan, and set of actors associated in some way with their various content items. Organizing a corpus of electronic information into discussions not only allows data to be retrieved more accurately and completely, with a significant reduction in the amount of unwanted data retrieved, but also allows the detection of potentially interesting communication anomalies in the data that would otherwise be difficult or impossible to detect. For example, the gradual elimination over time of a particular person from discussions of certain kinds, or involving certain topics.

FIG. 1 depicts a typical networked environment in which the present invention operates. The network 105 allows access to e-mail data stores on an e-mail server 120, log files stored on a voicemail server 125, documents 505 stored on a data server 130, and data stored in databases 140 and 145. Data is processed by an indexing system 135 and sociological engine 150, and is presented to the user by a visualization mechanism system 140.

FIG. 2 depicts a typical digital computer 200 on which the present system will run. A data bus 205 allows communication between a central processing unit 210, random access volatile memory 215, a data storage device 220, and a network interface card 225. Input from the user is permitted through an alphanumeric input device 235 and cursor control system 240, and data is made visible to the user via a display 230. Communication between the computer and other networked devices is made possible via a communications device 245.

It will be appreciated by those of ordinary skill in the art that any configuration of the system may be used for various purposes according to the particular implementation. The control logic or software implementing the present invention can be stored in the main memory 250, mass storage device 225, or other storage medium locally or remotely accessible to processor 210.

It will be apparent to those of ordinary skill in the art that the system, method, and process described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The present invention may also be embodied in a handheld or portable device containing a subset of the computer hardware components described above. For example, the handheld device may be configured to contain only the bus 215, the processor 210, and memory 250 and/or 225. The present invention may also be embodied in a special purpose appliance including a subset of the computer hardware components described above. For example, the appliance may include a processor 210, a data storage device 225, a bus 215, and memory 250, and only rudimentary communications mechanisms, such as a small touch-screen that permits the user to communication in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 210. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital sounds, etc.).

FIG. 3 shows the flow of navigation in the present invention. The user can submit queries 320, which return discussions 305. Each discussion 305 contains at least two actors 310. Each of the actors 310 about whom the user can submit queries 320 must appear in zero (0) or more discussions 305 (an actor 310 can appear in 0 discussions 305 by being connected in some way with a singleton document 435 which, by definition, is not part of a discussion 305). An actor 310 can be associated with multiple topics 315, and vice versa. Each discussion 305 can be associated with multiple topics 315, and vice versa.

Overview

FIG. 4*a* is a flowchart of one embodiment of the initial preprocessing. The system requires a corpus of electronic data as input (block 405). In one embodiment, it will start off by doing a conventional spidering of the corpus. Alternative means of acquiring the data may be used. The data can be in any form, but in order to be processable by the system, must have at least some component that is textual in nature, and which further corresponds to a natural language such as English, German, Japanese, etc. Prior to the data being processed by system described herein, the corpus is passed through an MD5 or similar hash filter (block 410) in order to remove common exogenous files such as those associated with the operating system. In many circumstances it is also desirable to remove additional files (block 415) that are binaries or ASCII files containing programmatic code, executables, source code, etc.

Subsequent to the indexing process, in one embodiment any document that is an image (for example, a TIFF), will be passed through an optical character recognition (OCR) process to ascertain whether it is a "real image." FIG. 4*b* is a flowchart of one embodiment of the distinguishing process. The next file is selected (block 450) for processing. If the process determines that the file is an image file (block 455) or a graphic, it returns to block 450, to select a next file. If the process determines that the file is an imaged document file, the system will perform OCR on the document (block 460), and resubmit the now recognizable document to the indexer (block 465). This process is iterated until all image files have been processed, at which point it ends.

FIG. 4*c* is a block diagram of the relationship between discussions 305, documents 505, and singletons 435. A discussion 305 contains two or more related documents. A singleton 435 is a document 505 that is not part of a discussion 305.

Because the system heavily utilizes sociological evidence, it uses document types from an analysis standpoint. FIG. 5 illustrates one embodiment of the document type and subtypes that the present system uses. Note that some documents 505 or records may be of more than one type. With the exception of meta-documents 505, which are often not created contemporaneously with the rest of the corpus, the other kinds of documents 505 fall into 2 categories: those which are used by the system primarily to establish context, and those which are placed in the context that they provide.

Communication Documents 510: Any type of text-containing document 505 that also contains information about both in creator(s) and its recipients, coupled with a timestamp for each time it was sent. E-mail and IMs (Instant messages) are examples of communication documents 510.

Communication Events 570: Any type of communication that contains information about at least one creator and at least one recipient, and has both a start time and an end-time associated with it. It does not itself necessarily contain any other text, or have any other information associated with it. However, a communication event 570 may be associated with a document 505; for example a conference call might have meeting minutes recorded for it; a voicemail might have a speech to text indexer attached to it. Phone records and calendared meetings are examples of communication events 570. Communication events 570 are generally records in larger files, which require extraction, rather than being individual documents 505.

Regular Documents 515: Any type of documents in the colloquial sense of the term; a file which contains at least some textual content. Examples include word processing documents. HTML pages, and financial spreadsheets. Regular documents 515 can be fielded documents 550, for example databases, or spreadsheets. They may be largely graphical in content, such as slide shows. Or they may be text documents 535, which just contain regular text or mark-up language. A regular document 515 requires at least one author, a creation date, and a modification history; its content may have numerous other properties which are disclosed below.

In addition, regular documents 515 have a special event 1525 type that is associated with them:

Versioned Documents 555: Any document 505 whose changes are recorded in some formal and regular manner. Examples include any document 505 that is systematically under some type of version control, or that has consistently had change tracking enabled.

Lifecycle Documents 565: A lifecycle document 565 is one that is not under strict, or any version control. Rather, its history of modification is reassembled to the extent possible by the system by a digital archaeology process described below.

In addition, regular documents 515 have a special event type that is associated with them:

Modification Event 540: An edit to a regular document 515. This may be one of the following:

An edit that is part of a check-in message to a document repository system. Such an edit may have a comment or check-in message associated with it, and a list of actors who received notification of the change.

An edit that is tracked by a change tracking system, this information being appended to the regular document 515 itself as meta-data.

An edit for which no time stamp exists, but which is known to have occurred due to the fact that there are different versions of the regular document 515.

Structure Documents 530: A document 505 or series of records that provide information on organizational or process structure. Examples include, but are not limited to, Human Resource management and workflow management systems. Structure documents 530 are analyzed solely for purposes of analyzing the content-bearing documents 505. Structure documents 530, can include actor lifecycle events 545, such as name change, hiring, termination, promotion, transfer, vacation, leave of absence, etc. For example, an HR database might indicate that "Ann Jones" had previously been known as "Ann Ross" and hence that the two names in fact corresponds to the same actor 310. Structure documents 530 are generally analyzed on a per-record basis. Task lists in personal organizers can also be considered structure documents 530.

Logging Documents 520: A document 505 that contains records involving any type of event, for example access logs or transactions logs. Logging documents 520 are generally evaluated on a per-record basis.

Meta-Data Documents 560: A document 505 containing information about other documents 505 or their contents, or to which these documents 505 at their contents may be pertinent. Examples include depositions of witness involving particular sets of documents 505. In general, meta-data documents 560 are external documents 525, since they do not belong in the corpus.

External Documents 525: A document 505 that has been created external to the corpus of data, and integrated into the corpus either by a human operator or automatically by the system as useful external context. Examples include a graph of the value of a particular stock, or various articles about it might be very pertinent to a securities violation matter.

Communications documents 510 and communications events 570 are identified by the system according to their file type at the time the corpus is assembled. This is done both on the basis of file extensions, and by examining a small portion of the file (in one embodiment, the first 12 bytes) in order to confirm that the file format and extension are consistent with one another. In the event that they are not, or that the file extension is unknown to the system, the format will take precedence, and the system will parse the file looking for "hints" as to exact type. For example, the presence of e-mail headers would indicate that the file is, or at least contains, an e-mail. Documents 505 lacking such hints are just considered to be regular documents 515. Structure documents 530 are determined similarly; in addition to recognizing the file and data storage formats of common application such as PeopleSoft, the system contains templates to recognize employee data. Logging documents 520 are recognized similarly; while the extension is less likely to be recognized, the series of records with timestamps provides a sufficient type identification mechanism.

E-mail is treated specially by the system during the spidering and type identification process. FIG. 6 is a flowchart of one embodiment of the email identity extraction process. Many common e-mail applications, such as Microsoft's Outlook, store arbitrarily large numbers of individual e-mails in a single file. During this process these individual mails are extracted (Block 605) into individual documents, and placed in the index (Block 610). At this time, the meta-data associated with each e-mail is extracted (Block 615) and placed in separate fields. This includes the "from:, to:," "cc.", "bcc.", time stamp, and subject, but also additional information when available, such as "reply to:" information. Note that when the system is unable to parse a text-format mail box (for example, due to file corruption), it exhibits graceful failure by treating the mail box as a text file.

When the document in question is an e-mail message, the message should already have been assigned a unique message id by the e-mail software that generated it. However, in practice, many e-mail clients do not add a message ID, relying on the SMTP relay to do so instead. This often leads to e-mail stores containing messages that have no message ID. For example, a user's outbox folder (containing items sent by that user) contains messages that have not arrived via SMTP. If such a message is detected (Block 620), the system generates a unique identifier (Block 625). This can be done using any scheme that is guaranteed to generate unique IDs. Even if the message already has an externally-generated id, this will be useful as a UID.

In many cases, the same file will be found within several e-mail stores (if e-mail stores files from several computers are used as input to the system). However, only one instance of each e-mail will be stored in the repository. Additional copies that are found (Block 630) will result in a new location reference being added to the record for that e-mail, and the "instances" counter for that mail will be incremented accordingly. In one embodiment, the system determines that the e-mail is a duplicate by doing a hash on the combination of header information and content. In one embodiment, the hash is included in the communication UID. If the message is a duplicate, it is not stored, and the process continues to bock 605, to process the next message.

The standard Message-ID field is stored in the repository, as are other e-mail headers. For example, a combination of the Message-ID header (if present), the References header and the In-Reply-To header are stored in the repository (Block 635) and will later be used to construct edges between the vertices of the communications graph. The process determines whether there are any more email messages to process (Block 640), and if there are, the process returns to block 605. If no more messages remain, the process ends (Block 645).

Another email-specific issue involves email agent garbling of actor names. FIG. 6*b* is a flowchart of on embodiment of email identity disambiguation. For each new e-mail message, the system computes statistics (Block 670) about actor-related word n-grams in the e-mail headers (for example, From, Reply-To, To, Cc, Bcc). This technique is especially powerful when parsing ambiguous headers (Block 675), as in the following example of a message sent to two actors in a corpus containing the two actors Fed Smith and Ann Jones:

To: Fred, "Smith;", "Smith;", Ann, "Jones;", "Jones;"

Statistical analysis (Block 680) of n-grams in this and other messages will reveal that the sequences (ignoring punctuation) "fred smith" and "ann jones" occur far more often than "smith ann" or "jones jones". This allows the system to interpret the following header (in a format commonly used, for example, in some versions of the Microsoft Outlook™ e-mail client) as referring to a single recipient, even though internet RFC 822 states that the comma indicates two recipients rather than one, for example: To: Fred, Smith.

Returning to FIG. 5, in some instances the differentiation of whether a document 505 is a versioned document 555 or lifecycle document 565 cannot be determined initially, and as described in a subsequent section, this must be determined at discussion building time.

Meta-data documents 560 can in general only be identified or provided by the system's user. The exception to this is the case of a date-limited corpus to which more recent meta-data documents 560 are added. In this event, the meta-data documents 560 can be identified by having a date stamp that is outside the valid set of dates for the corpus. Meta-data documents 560 to not need to have authors or titles. In fact their only required attribute is non-null textual content, although in order to be useful, a meta-data document 560 should contain information about the information in the corpus or its actors. As noted above, a deposition involving data in a corpus is an example of a meta-data document 560. If meta-data document 560 are added to the corpus after the initial indexing, a separate process will be kicked off to index them.

Document 505 de-duplication is done during the indexing according to currently practiced methods. However, the data store containing the index also contains a complete set of pointers to the original locations of all of the duplicates. This information will be used later. This leaves us at this stage with a uniqued set of documents 505 which have been typed by the system according to the types described above (with the exception of those types of documents 505 that may be added to the corpus after the fact.) Note that any document 505 that the system cannot classify will be placed in an "unknown" category.

These documents 505 can be reviewed by the user, who has the choice of categorizing them individually or by type (for example, adding a new file extension to those recognized by the system). In addition, the user may add a regular expression specifying valid combinations of the first N characters of the file. Generally, however, documents 505 that do not fail into any of the above categories can be considered exogenous. That is, they were neither created nor meaningfully modified by any of the actors related to the corpus of documents 505 being analyzed, nor added to the corpus because of their relevant content. Examples of such exogenous documents 505 include, but are not limited to, operating system and software application files In order to proceed with the next step in analyzing the documents 505, the system generates a set of actor profile information. Since much of the interesting information about actors involves their relationships to other actors, this information is represented in a graph. In one embodiment, the graph representation employed by the system is a variant of a colored graph as currently practiced in computer science (see discussion building section below for a more detailed description). Actors are implemented as A-type vertices. Different types and strengths of relationships among the actors are implemented as appropriately colored edges. The actor relationships form a sub-graph in the colored graph. To give a precise definition, an actor is a person or computer system that is referred to communications from the corpus or that produces, sends or receives communications in the corpus.

Because the system is primarily concerned with determining probable causality between objects in the corpus, the object class of greatest interest is the actor. The presence of the same actors—or actors closely related to them—can be used to assess causality when there is otherwise insufficient data. Many people may use similar language to discuss similar things, but there is no cause-effect relationship involved in these communications apart from those instances where the actors are shared. Similarly, the identity of the actors who authored or modified a document is a key clue in determining whether two documents have an ancestral relation to one another, or whether they are just two similar looking documents created independently at different times. Thus the actors' identity should be accurately assessed before any further analysis on the documents is performed.

Therefore, the system starts with correctly identifying the various electronic identities that correspond to a human user, as well as other electronic records that identify him or her, such as those in a human resources management system. It is not at all uncommon for there to be a very large number of different references to the same individual in a corpus obtained from a corporation or other organization. For example:

Official work email account

Aliases to this account

Personal (non-work-related) email accounts

IM monikers

Logins to or accounts for different systems, such as document repositories or HR systems Name, or sequentially used names, as recorded in an HR system Name as recorded in a license for an application such as Microsoft Word; this is the name that will be used in the "author" meta-data field by the application.

Name as recorded in numerous forms filled out over time for different reasons, for example purchase orders or expense reports.

Names as recorded in form-fillers, electronic wallets, or similar items

While commercial systems exist to normalize slightly differing variations of people names—and one embodiment of the present invention uses these existing systems—this normalization is only a small part of the much larger problem of uniting as many of these different electronic identities as appropriate into the same actor ID. Many of these identities may have no lexical similarity whatsoever to one another. For example, the actor "Jim Smith" may have an email account bluebear@yahoo.com. Such existing systems will not ferret out this information unless it appears in the same record as the actor name. Often this will be the case, especially as many people—perhaps even most—have at least two unrelated email accounts.

FIG. 8 is a flowchart of one embodiment of the actor graph construction. In order for the invention to perform this unification of different electronic identities and reference into actor IDs, it starts with an analysis of all available email stores. Recall that email instances were identified as a distinct type during the initial indexing phase, and, where appropriate, individual emails were extracted from any archival formats, and their meta-data placed into separate fields for subsequent analysis. This analysis is now performed. The system reads the record corresponding to each email in the data store (Block 810). Using the meta-data information in the actor-related fields (to:, cc:, bbc, and from) the system constructs a sub-graph of electronic identity relationships.

In one embodiment, each electronic identity is a first pass filter pass alias record (vertex type AP1.AR, for color AP1, type AR), and each directed edge represents co-involvement in the same email communication. Two different edge colors are defined for this subgraph, FT (from-to) on directed edges and TT (to-to) on undirected edges. For example, if John Smith sends an email to Jane Jones and Jack Barnes, there would be an FT-colored edge from John Smith to Jane Jones and another from John Smith to Jack Barnes, and a TT-colored edge between Jane Jones and Jack Barnes.

For each relationship, if a link doesn't yet exist, it is generated, and if an edge linking the two electronic identities already exists, its weight is augmented by one (Blocks 820). If there is more than one recipient (Block 830), appropriate to-to links are generated between recipient pairs, or the weight of the existing links is augmented by one (Block 840). This process continues until there are no further records to process (Block 850).

At this point, these are still electronic identities, not actors. Therefore, in one embodiment, the process of building this graph will be repeated again at a later stage with actor IDs, rather than their various electronic identities. The next step is to unify these electronic identities associated with email accounts into actor IDs. As noted previously, a 1:1 correspondence between actors and electronic identities is almost never expected. In reality, most actors will have many electronic identities. WThese different identities are also referred to as "alias terms." Further, some electronic identities may be used by more than one person. (This latter problem will be dealt with at a later stage in the processing, and is presumed to be far less commonly occurring and important than the issue of single actors having many electronic identities.)

Next, a second sub-graph is constructed using the technique described in the following paragraphs. This sub-graph uses AP2.AR vertices and undirected CA-colored edges. FIG. 9a is a flowchart of one embodiment of this phase of the actor graph construction.

In order to optimize the speed of edge creation in the graph, the system creates auxiliary inverted indexes on any kind of document that appears to contain both human names and email addresses in close proximity to one another, e.g. "alias records" (Block 902).

FIG. 9d is a flowchart of one embodiment of deriving alias records. To split the name side of an email into candidate names and addresses, the system looks for common separators such as dot, dash, underscore. Other methods include permutations of first name/last name/middle name/company name; middle initial insertion/removal (Block 972).

In the event that there is an explicit alias mapping file (Block 974) anywhere within the corpus, (any document containing data of the form: Human name, email account 1, email account 2 . . . email account N",) this information will be automatically considered as evidence that each of these email accounts maps to the actor specified at the beginning of the record. An exception to this is the case in which an email account appears to be associated with more than one actor. In this event, it is treated by the system as an aggregate actor. This is one of the type of "structure documents" that the system looks to identify during the initial data acquisition. For one embodiment, the system creates CA-colored edges (Block 904) for each such pairing.

If one of the types of structure document available in an HR database, the system looks for a "maiden name", previously used named, "née" or similar fields (Block 976). In those records where these fields are non-null, a new first name last name combination is created, and is added as a second name to the existing AP2.AR vertex.

As noted in FIG. 9a, the system creates edges and assigns weights to those edges (Block 904). FIG. 9b is a flowchart of one embodiment of edge creation. In order to ensure that there is a CA-colored edge between all alias record pairs, e.g pairs of AP2.Ar vertices, i.e. the email address and the actor name, the system creates an edge between each alias record pair (Block 920) and initializes its weight to 0 if there is currently no edge between them. If the edge already exists, its weight is updated. For each pair of vertices add the product of the two Alias term similarities to the current edge weight.

The system creates a CA-colored edge (or updates the weight of an existing edge) between AP2.AR vertices if a pair of corresponding alias records can be constructed from an AP1.AR vertex. (Note that some embodiments of the invention may weight these different types of evidence differently):

Permutations of first name last name with same internet domain connected by a to/cc or to/bcc link (from the previously constructed email identity graph) (Block 922).

The same characteristics prior to the "@", but a different internet domain (Block 924).

Co-occurrence of either the above, and a from/to link from an account with the same characteristics prior to the "@" but with different internet domains (Block 926).

Co-occurrence of n-grams in nodes linked directly together in the previous email identity graph (Block 928).

In one embodiment, the presence of FT or TT colored edges between two communication documents, is considered negative evidence for linking their associated alias records, or a negatively weighted link. This is because a person rarely sends replies to themselves.

In one embodiment, this analysis is repeated at a later stage in the process when additional evidence is available. In another embodiment of the invention, this analysis is conducted without benefit of the previously constructed graph, for reasons of computational efficiency. In these embodiments, only the lexical part of the test is performed.

Note that in order to protect against or correct mistakes, a set of either abstract or specific constraints may optionally be consulted in the edge construction process before merging two records.

AP2.AR vertices are decorated with a weight. In one embodiment of the invention, the weight is the number of occurrences of the vertices Alias Term in the corpus. Weights may be increased if the alias term corresponds to a human actor name using a well-known convention (Block 906). For example, "John Smith" mapping to john.smith@acme.com.

In one embodiment of the invention the following bottom-up clustering procedure (Block 908) is then applied. One embodiment of this process is described in more detail by FIG. 9c.

The CA-colored edges are sorted by decreasing weight (Block 940). The heaviest edge is selected (Block 942), and its head and tail are merged (Block 944). This operation represents unification of the two aliases. The alias term similarities are recomputed in the merged vertex as the sum of the two corresponding similarities (or zero if only present in one vertex) in the head and tail vertices (Block 946). Using the same procedure as for edge creation, the process adjusts the weights of the edges in order to account for any vertices that were merged in the previous step (Block 948). The edges are then adjusted, sorting by decreasing weight (Block 950). This process is repeated until the heaviest falls under a predefined similarity threshold (Block 952). The remaining alias vertices form the set of all de-duplicated alias terms. For each such alias term create an actor vertex (node type A), another graph of relations between these vertices will be built after discussions are created.

Other embodiments of the invention may be implemented with different clustering algorithms. In one embodiment, the "pick the heaviest edge" can be vetoed using an algorithm specified by the user. In the case of veto, the edge is simply skipped. If all edges are vetoed, the clustering algorithm terminates. Similarly, in the case of an alias mapping file that is certified by the user as having error-free information, this file can be fed into the system to both ensure that the email aliases specified in the file are bound to an actor with the correct first name, last name combination, and to no other actor. Note that this process is subquadratic in the total number of aliases.

In one embodiment, this sub-graph is updated again after the document lineage has been compared in the next step in the processing.

In one embodiment, the merging process is fully auditable. During a manual review, users of the system can observe and override an alias term merging decision or specify different merges. Similarly, the user can add constraints (such as ignoring input from certain files or sources) and cause the graph building to be re-run with the constraints observed. Note that because of the sparsity of the graph, the overall process is subquadratic in the number of vertices.

In another embodiment, there are additional methods used in conjunction with the above in order to disambiguate actors, including analyzing the signature footer of messages (such as vcards, any signature information stored in an email client, or any text apparently containing such information as actor name, telephone number, and email address), and using existing techniques to identify the prose style of the different authors. These techniques include, but are not limited to, such details as preferred syntactical structures, lexical items, and characteristics misspellings and typographical errors. These techniques are particularly useful in a situation where Actor A sends a message to Actor B, and Actor B replies as Actor C. It is important for the system to be able to determine that Actors B and C are the same individual.

This careful attention to alias merging allows the system to keep track not only of all messages sent or received by a particular actor, but also of instances in which an actor is removed from an e-mail thread in mid-discussion. If an actor can be determined not to have participated in the crucial portion of a discussion during which a particular decision was taken, that individual can potentially be shown not to be responsible for the decision in question. It therefore becomes much easier to "prove the negative", a notoriously difficult goal to achieve. To these ends, the present invention constructs a list of aliases that resolve to a particular actor, and consults this list whenever an actor needs to be identified.

Note that the system begins this analysis with email because it is verifiably correct; if email comes from a particular address, it is proof that the address existed. That an email was sent to address does not make it verifiably correct. While one embodiments of the invention match up email bounces to the original mail (using reply-to and other information stored in the headers) hence invalidating the alias terms, this will not solve the problem where the sending actor has erred in the email address, but the address nevertheless still resolves, but to an unintended actor. This is why different techniques, described below, are used in order to eliminate such very low frequency actors.

Files identified automatically by the system as being from a known HR system, which match one of the system templates for HR information, or which are manually identified by the user as being HR records are considered to be accurate by the system, but not necessarily complete. For example, there may be discrepancies in the names found in such systems, and what names people actually use on a daily basis. In essence, in such cases the actor in question has two concurrently valid names. Other types of actor database information is similarly treated; for example CRM and SFA systems are considered to provide reliable information about customers and sales contacts.

This initially constructed information can be both verified and augmented by assigning ownership to different machines or media in the corpus. FIG. 10a is a block diagram of one embodiment of ownership and authorship determination. The system does this by a combination of reading system user information (Block 1002) on the machine, seeking email client information (Block 1004) contained on the machine specifying one or more email address to use as sender information, and by examining the author meta-data (Block 1006) of the files resident on the machine (or media). The system attempts to extract author information based on the above data source (Block 1008).

If there are no documents created in a particular application, such as Microsoft Word, whose author meta-data corresponds to the actor-owner of the machine, or if only a joke or meaningless ID is found (Block 1010), the author meta-data information from this application on this particular machine will be disregarded by the system as being inaccurate (Block 1014). In addition, the system has a list of meaningless placeholder actors that will also be disregarded (Block 1014), for example "A user." Further, common joke names like "Bart Simpson" will be similarly disregarded (Block 1014) via the use of a look-up table, unless there is already a node in the actor graph with this name (e.g. one that is demonstrably responsible for the generation of communications). In either of these cases, authorship will be established (Block 1026) in a later step by a combination (Block 1022) of email trail, check-in history, presence on the machines "owned" by other actors, or failing any of these (because only one instance of the document was ever found,) the authorship will be assigned (Block 1028) to the owner of the machine.

If the ID found is not a joke or meaningless ID, the process determines whether there is conflicting information from various data sources (Block 1012). If there is not conflict information from data sources, e.d., all sources agree on the actors' identity, the process assigns authorship based on the evidence found (Block 1026). If there is conflicting data, the system determines whether email client information is available (Block 1018). If no such information is available, email trails, check-in history, and presence of other items owned by other actors is used (Block 1022). The process then continues to block 1024.

Email information is considered to be the most reliable for assigning ownership, and thus more importance is assigned to email client information (Block 1020), if any is found. Thus, email client information, if available, will take precedence when there is a discrepancy. In the unusual case that there is more than one such email store on the same machine or media which correspond to different well-known actors, select the obviously larger of the two. If the stores are approximately the same size, but the email stores contents do not overlap in time, the machine is considered to have been passed from one actor to another. This data range information will be kept, and used to disambiguate ambiguous document ownership at a later stage. If the date ranges of the email store do overlap, in date, machine ownership information can only be used in order to disambiguate between the actors associated with the 2 or more email stores.

If evidence of ownership is found (Block 1024), authorship is assigned based on the evidence found (Block 1026), otherwise, authorship is assigned to the owner of the computer (Block 1028).

In the case of logins to different systems, the system can process the user information from these systems. FIG. 10*b* is a flowchart of one embodiment of processing user information in the case of multiple system logins. If there is a linkage to an actor name or email address (Block 1050), the system will be add this information to the actor profile. If no such information is found, the user adjudicates (Block 1058). If such information is found, but the name is ambiguous (Block 1052), the system will leverage the identities of any unambiguous actors to resolve (block 1054) the ambiguous name to someone in the same department. In one embodiment, this is done by moving upwards one step hierarchically, and sideways to peer groups each iteration, or failing that, membership in the same circle of trust as the unambiguous actors. If the name remains ambiguous (Block 1056), because either two actors with the same name appear at the same level, or because none are found, a user will have to adjudicate (Block 1058). Additionally, the user of the system may manually link an account to an actor, in those cases where the system lacks the evidence to do it. Similarly, any erroneous linkages may be corrected manually.

Other types of files may be entered into the system by the user, but may require the user to specify which fields (or otherwise delimited data) correspond to which actor properties.

FIG. 11 is a flowchart of one embodiment identifying spam and other exogenous content. In general the following should all be true:

Each actor represented in an organizational chart should correspond to one entry in the HR system.

Each actor represented in the HR system should have at least one electronic identity. This expected to be true, except in very rare outlier cases.

Some, but probably not all, of the actors noted in personal address books, and systems managing information for such actors as vendors, suppliers, customers, partners, prospects, etc) will have at least one other manifestation in the corpus—for example, sending an email.

These actors, as well as any aggregate aliases comprised of them, are considered to be "indigenous" to the corpus (Block 1115).

Any actor that is represented in the HR database (Block 1105), organizational chart, personal address books (Block 1120), or system managing non-employee actor information (Block 1110), or has received email from an actor indigenous to the corpus (Block 1125) is considered to be indigenous (Block 1115).

As actor that does not meet any of the above criteria or has sent email to one or more actors, but none of these actors have replied is considered to be either spam, or some kind of exogenous creator (Block 1130) or distributor of data, for example on-line newsletters. All communications from these actors may optionally be removed (Block 1135) from the data to be processed into discussions. The process then proceeds to the next actor (Block 1140). For one embodiment, this process is iterative. For one embodiment, the process may be repeated with a second pass once the majority of indigenous actors have been identified.

An alternate embodiment of the invention can also employ current techniques for identifying spam, including but not limited to: Bayesian analysis on content, detecting random characters at the end of the message title, and lookup of known domains emitting spam. Such embodiments allow the user to specify how many tests must be positive before the item is automatically removed from the data set.

Actor Attributes (Actor Profile)

FIG. 12 illustrates one embodiment of actor class and containment hierarchy. Individual human actors 310 have the following properties in the invention:

UID
First Name
Other first name
Middle Initial
Nickname
Last Name
Last Name 2 (maiden name, other previously used name, or shortened form of name used in computer systems)
Organization
Department
Job Title
Alternate Job Title
Primary Work Email
Primary Personal Email
Other email accounts (as needed)
IM moniker
Account login information record (as needed)
Primary language (that is, spoken language)
Other languages (as needed)
Primary register
Importance
Personalities 1220 (as needed)
Calendar
Task lists
Work phone
Home phone
Mobile phone Lexical fingerprint (or footprint.) This is caused by comparing a word frequency table for the whole corpus (the inverted index) and that for each individual actor 1210, comprising the 100 most commonly used non-stop words from the entire corpus. Any words which are found only for a given actor or in a significantly higher distribution than the rest of the corpus, become part of that actor's lexical footprint. For example: if 'godzilla' occurs 100 times in the whole corpus, its frequency is going to be 0.00×%, but if actor A shows 32 instances of 'godzilla' in his communications, his frequency is going to more like 0.0×%, which will be a significant enough distinction in usage to cause it to be added to his footprint.

Circles of Trust (as needed)

Communication behavior records (as many as are needed) These are of the format:

Actor-personality (because an actor 310 may have more than one "personality" 1220)

Version

Interaction counts
  1) From-count
  2) To-count
  3) Cc-count
  4) Bcc-count
  5) Was-cc'ed-count
  6) Was-bcc'ed-count The "interaction count" fields can be divided up by any time interval and replicated accordingly, depending on how the user configures it.

Note that many other additional actor 310 properly fields may be added if available, such as demographic information—age, gender, marital status, race, etc. if this data is available it may optionally be used to perform correlations and tallies. In fact, any arbitrary attribute may be added and used in this way. This information is not used in any way to build discussions 305. However, it can optionally be used to provide "hints" to the anomaly detection engine described in a later section. Such hints, for example, that membership in a particular minority group may have caused the actor 310 to be left out of certain communications can be used to rank anomalies, query on the relevant anomalies, and determine whether these anomalies are statistically significant as a combined class.

Many of these fields may be null for any given actor 310. A valid actor 310 requires at least one electronic identity 1225. Other information may be calculated and/or filled in later, or remain permanently absent. However, in one embodiment, each time a new actor node is generated, a new default set of such fields is created in the data store. If, at a later stage in the process, it is determined that the same actor 310 exists more than once in the data store under different identities, the interaction count records are merged, as are other attributes that can have either 2 values, or a variable number of values. In the case of single-valued attributes, the user decides which values are to be retained.

Some actors 310 are aggregate actors 1205. For example, a mail alias that corresponds to a department of people. In many corporations, such mail aliases are used very extensively, and so cannot be overlooked. These aggregate actors 1205 have the following properties:

Name

UID

Email

Login account records (as needed)

Department (may be null if the aggregate actor 1205 has no correspondence to a particular organization or group.

Actors 310 (as many fields as needed)

Presumed Version

Personalities 1220. This is determined by how many distinct actor lexical footprints or signatures pop up in communications sent from the aggregate actor 1205 identity.

Calendar; some aggregate actors 1205 may have calendars associated with them.

Login Account info: This is important information to have in order to trap all accounts that a particular actor had available to him, and hence may have used to avoid using his own identity to access certain data.

Creation date: If not known, the date of the first appearance of the identity is used.

Deletion date: Will often be null; else the date on which this aggregate identity was explicitly deleted.

Note that aggregate actors 1205 are ultimately expanded to their member list, although the data that there was the intermediary of an alias is maintained. However, this expansion is not always a trival problem, since the members of an alias may change over time. FIG. 13a is a flowchart of one embodiment of identifying alias versioning. Version information on alias membership is often not maintained. In the face of this difficulty, the system will attempt to reconstruct the history of the alias by executing the following, in order of precedence:

Using any structure document 530 that maps departments or organizations to mail aliases, the system will look up the HR records (Block 1305) as to who was in each department or organization that corresponded to an alias during what interval of time. If there is no way to do this in an automated fashion (Block bus 205), the system will allow the user to manually perform the mapping, or to specify a mapping rule.

Analyze the set of individual actor 1210 replies (Block 1315) to email sent by an aggregate actor 1205. If someone replies to such a mail, it means that he was on the alias list.

Next, add any actors 310 for whom an email client file (or server records) indicates that the person received mail (Block 1320) from this aggregate actor 1205. That is, the mail is still in an "inbox" or other mail folder belonging to this actor 310. Similarly, identify any actors 310 who had the alias in their personal address book. Add any new actors 310 found in this fashion to the list.

Look up each actor 310 in any HR data sources (Block 1325) that exist in the corpus to determine the set of their lifecycle events 545 (i.e. hire, termination, transfer, promotion) as well as which departments they belonged to. If all of the actors 310 belonged to the same lowest level department, add (Block 1330) any other actors 310 that were also in this department.

Finally, in order to create the versioning information, use the lifecycle information extracted above to determine when the actor 1310 first entered or left the universe of the corpus, and where applicable, when they transferred in or out of a particular group. In another embodiment of the invention, the HR information is not considered, and only empirical evidence offered by saved emails is used. In one embodiment, the user may normalize department names during this process. (Block 1335)

Bump the presumed version number of alias by one for each distinct day on which a change occurred (Block 1340). This is to avoid counting a single mass change, for example, a group of 20 actors 310 being transferred to another division, being counted 20 times.

Each version of an alias is represented by a separate vertex in the graph. In one embodiment, the version number is appended to the core actor 310 id.

Note that alias versioning can sometimes be an important issue, because it can be used to establish that an actor 310 almost received a certain mail sent to an aggregate alias, even if no versioning information for the alias exists, and the copy of the mail sent to that actor 310 has long since been destroyed.

Returning to FIG. 12, aggregate actors 1205 do appear in one representation of the actor 310 sub-graph. In one embodiment, a mail sent to an alias will generate a link (or an additional link weight) from the individual actor 1210 sending it, to the aggregate alias, and then N links (or additional link weights,) to each of the members of the aggregate alias, where N is the number of such members. This is because the distinction between sending to an alias and to individual actors 1210 can be important under some circumstances, later in the process during the communications anomaly detection phase. For example, an actor 310 sending an email to nine individual actors 1210 when there is an aggregate alias that had been previously used by this actor 310 that contains these nine actors 310 as well as one other, could be used as evidence that the actor 310 was attempting to prevent the tenth actor 310 from seeing the message.

Some actors 310 may be computer processes, for example a daemon that automatically sends out status reports. While such non-human actors, or system actors, 1215 are generally not very interesting, for the sake of accounting, they cannot be ignored. Such non-human actors 1215 have the following properties:

Name (e.g. process name)

Host name

UID

FIG. 13b is a flowchart of one embodiment of actor parsing and deduplication process. While items (such as mailbox files or address books) remain in the alias-bearing containers in the corpus (Block 1350), the system picks an item, such as an email header or address book entry (Block 1351), and checks whether it is parsable into distinct alias terms (Block 1352). If so, then, while alias terms remain in the item (Block 1353), it picks an alias term, such as "John Doe jdoe@acme.com jane" (Block 1354), splits it after the email address (for example, after "John Doe jdoe@acme.com") (Block 1355), adds occurrence and n-gram frequencies for the term components (for example, "John, Doe" and "jdoe@acme.com" cooccur) (Block 1356), corrects the frequencies based on the quality of the container, for example, an address book entry is of higher quality than an email (Block 1357) and adds a corresponding alias vertex if none exists (Block 1358). It then accrues the weighted term components with the alias vertex (Block 1359), for example: (John=10, Doe=10, doe@acme.com=10, Total=30). If the term is not parsable into distinct alias terms (Block 1352), the system delays processing until the n-gram model is built (leaving an unparsed item, such as "john william jane") (Block 1360), segments the item (into, for example, "john william", "jane") (Block 1361), and continues to extend the segment while the ration n+1 gram frequency to n-gram freuqency remains above the threshold (Block 1362). Separate indexes are then built from keys (Block 1366). For example:

FName LName,

FName MName LName,

FName M LName, email names, email domains

For each type of key (Block 1367), and for each pair of approximately equal keys (including LName FName to FName LName) (Block 1368), and each pair (head, tail) of alias vertices containing the pair of keys (using index) (Block 1369), compute the first part of the arc weight with the head vertex (frequency of head key divided by total frequency of head vertex) (Block 1370). Similarly compute the second part of the arc weight with the tail vertex (Block 1371). Add to the weight of the arc (head, tail) the product of the two weight parts (Block 1372). Arc weights computation will complete in subquadratic time (Block 1373). Next, apply a hierarchical graph clustering (with constraints) (Block 1374). Pick the arc with the largest weight. If the alias pair is on the list of negative exceptions, ignore it and pick the next arc (Block 1375). If the arc weight is below threshold (Block 1376), clustering is finished. The remaining clusters are deduplicated personalities 1220 (Block 1377). External rules can be used to cluster certain personalities 1220 (Block 1378). The remaining clusters are actors 310 (Block 1379). If, on the other hand, the arc weight is not below the threshold (Block 1376), cluster the two endpoint aliases. The alias with the largest weight becomes the cluster representative (Block 1363). Add up the termwise weighted of the two clusters and let them be the weight of the new cluster (For example, {John Doe=20, john@acme=15} union {John E Doe=5, john@acme.com=5} gives {John Doe=20, John E Doe=5, john@acme.com=20}) (Block 1364), then recompute the modified arc weights (Block 1365).

FIG. 14 is a flowchart of one embodiment of actor personality identification. The system determines if an actor has more than one electronic identity (Block 1405). If not, the process continues to the next actor (Block 1410). Otherwise, the process continues, to determine whether the user has multiple personalities 1220. Note that the presence of multiple electronic identities 1225 by an actor 310 does not by itself constitute evidence of multiple "personalities" 1220. Rather it is very clear distinctions in the usage of some of these identities that causes the system to make this distinction.

In one embodiment, such potential differences are analyzed by clustering all the content (in another embodiment, tests are applied to segment data into groups) (Block 1415) created by a particular actor without respect to the various electronic identities used to create the content. If the clusters do not closely correspond to these electronic identities (Block 1420) the actor has only one personality (Block 1410). However, if there is at least one cluster that corresponds closely to at least one but not all of the electronic identities, each such cluster will be considered a new personality (Block 1425). Assuming that not all of the content is covered in this way, remaining clusters will be rounded up (Block 1430) into a single personality. For one embodiment, each personality will be labeled sequentially according to the amount of content produced by them (Block 1435). This is measured by total number of items created in some embodiments, while in other embodiments only production of "contentful" documents 505 is counted. "Contentful" documents 505 are those that contain a substantial amount of text apart from any that was present in the creating template.

In the event that there is a tie, the primary work-related personality takes precedence over all others. In another embodiment, change in spoken language used, or change in register, will by itself be considered evidence of a different personality, when correlated to different electronic identities. In yet another embodiment, null or near-null intersections in topics discussed (as determined by ontological filters), or in the actors or personalities communicated with can also be used independently or conjunctively as evidence of differential personalities. The process performs this analysis for each actor (Block 1440).

Personalities are useful both as an input parameter to the ontology filter that are described below, and as a means of providing negative evidence to the discussion building engine for including content from more than one of an actor's personalities in the same discussion. Otherwise put, if an actor has very carefully segmented her different personalities, the system will do the same. However, queries performed on the actor will return results from all of their identified personalities. This may optionally be broken down by personality. Copending application Ser. No. 10/358,786, entitled "A Method and Apparatus to Visually Present Discussions for Data Mining Purposes", filed concurrently herewith discusses the different presentation methods of such data.

"Circles of Trust"

FIG. 15 is a block diagram for one embodiment of circles or trust or clique class hierarchy and associations. Circles of trust 1508 are sets of actors 310 who consistently correspond in a closed loop with one another. Circles of trust 1505 may be associated with only very specific topics, or just be a set of close confidants who regularly communicate amongst themselves on a variety of topics. Circles of trust 1505 are initially calculated using the thread sub-graph (T-colored edges) so that they may used as an evidence source, and then are recomputed as a by-product of discussion building across the corpus. However, once calculated, they are considered a derived property of the actor. This is because the answer to the question, "who do they talk to" is often a fundamental one in an investigative or litigation context. Shifts in membership of circles of trust 1505 can also provide critical context in this regard.

Circles of trust 1505 will be identified by the system using heuristics described in the following paragraphs. Circles of trust 1505 can be of various types:

Crisis or event-motivated Circles of Trust 1520
Professional Circles of Trust 1510
Friendship-based Circles of Trust 1515

Crisis or event motivated circles of trust 1520 are circles of trust 1505 that only manifest themselves in response to certain kinds of stimuli, for example rumor-mongering about a merger. FIG. 16 is a flowchart of how crisis or event motivated circles of trusts 1520 are identified. They are derived in the following way:

Perform a frequency per unit time analysis (Block 1605) on all communications between a pair of actors with edges connecting them in the actor graph.
Identify any bursts (Block 1610) in the activity level of communication between these actor pairs, and the time intervals (Block 1615) in which these bursts occurred. If no bursts are found (Block 1610), then the process ends (Block 1635), and the system determines that there is no crisis/event based circle of trust.
Any totally connected sub-graphs (Blocks 1620, 1630) within those bursts (i.e. the set of actors connected by GB-colored or PB-colored edges, where each edge links communications within an actively burst covering the same interval of time) will be considered a circle of trust if it occurs in more than one interval of time. For any such subgraph add CL-colored edges between each pair of member vertices. Discrete intervals of time are determined by the communication behavior of the actors in question; each burst is centered in an interval of time, and modeled to a standard distribution. In one embodiment, if the curves of two bursts do not intersect within their respective second deviations from their centers, they are not considered to lie in the same interval of time. If there as N>2 number of occurrences of such burstly behavior, the system will attempt to correlate the start of the burst with events it is aware of (Block 1625) based on the actors 310, the topics 310 which occurred within a user-configurable time preceding the start of the burst. If the bursts meet the criteria, the crisis of event motivated circle of trust is identified (Block 1640).

Note that in general this is an NP-complete problem, however it is tractable with sparse graphs. Further, this pairwise heuristic increases the sparseness of the graphs.

Professional circles of trust 1510 operate on an ongoing basis, but often tend to be largely restricted to a limited set of topics, which are generally work related. In this case, similarly, the system searches for totally connected sub-graphs in the colored graph based on topic-limited communication among actors, e.g. TC-colored links. However, as "burstiness" is not a factor here, a clustering analysis is performed in order to cluster actors and communications on known topics. In the absence of a complete ontological covering of the corpus, standard lexical similarity measures may be substituted. Any totally connected sub-graph of TC-colored linked is recorded by adding CL-colored links between vertices in the subgraph; these clusters are identified as professional circles of trust 1510. Note that in some embodiments of the system, shortages in the lifespans of different actors relative to the time period in question will be accounted for by artificially boosting their communications count proportionally to the amount of time they were absent during the time interval being considered.

Friendship-based circles of trust 1515 are similar to professional circles of trust 1510, but are not topic-limited; by their nature, the actors communicate on a wide variety of topics—whatever happens to be on their minds at the time.

Note that in addition to circles of trust 1505, there is also the notion of chains of trust. These are cases in which trust is not transitive. For example, Actor A IM's Actor B with a secret of some kind. Actor B now forwards this information to Actor C, without the knowledge of Actor A. Specifically, there is pairwise communication amongst actors, and possibly N-ary communication among actors, but only for values of N less than the number of actor in the chain. The system identifies such chains of trust, and considers it primarily as an anomaly worth detecting. This is discussed in more detail below in the section on anomaly detection.

As part of this calculation, in one embodiment, unusual troughs in pairwise actor communication is also noted; burstly behavior and extreme lack of communication fall on opposite ends of the distribution curve (more than 3 sigma out.) As the system looks for bursts of communication among related actors, it also looks for related troughs. Troughs spanning major holidays are automatically removed; if an HR system or calendar is available to provide vacation and other planned absence information for the actors in question, trough spanning these time periods are similarly discounted. Finally, actor heartbeat frequency (a form of measuring or auditing electronic activity defined in a subsequent section,) during the time interval in question is examined. If there is no heartbeat during this period, the actor is considered to have been absent. If the heartbeat is reduced, the amount of communication with all like actors (in the sense of being members of the same equivalence class, for example members of the same organization,) is expected to be reduced proportionally for all such actors. If this expectation is violated, it is considered to be a trough of communication involving particular actors, rather than just a global trough in activity due to a deadline or other outside force. Such trough information is queryable through the system by providing it a set of actors, and optionally, a timeframe.

Actor Importance

In one embodiment, there is the notion of actor importance. Importance is determined by the following factors:

Position in the organizational hierarchy

Role or job title in the organization

Number of pivotal items associated with them (see discussion below)

Number of resolution items associated with them (see discussion below)

In one embodiment, the importance score of an actor is raised by 1 for each pivotal or resolution item he generated. Actors at the lowest level of the organization hierarchy are assigned an important of 0; at each subsequent level of the hierarchy, an additional 10 points are added. In one embodiment, if an actor appears in more than one level in the hierarchy, the highest level is used for the score. The user specifies how to score various job titles or roles within a particular organization. In one embodiment, the system will try to infer the importance of certain roles on the basis of their being approval/denial points in a workflow, as will be discussed in more detail below. Note that since any of these factors may change for a given actor—some frequently—importance information is periodically re-calculated in continuous or incremental versions of the invention. In some embodiments, actor importance is averaged across the lifespan of the actor. In others it is segmented; that is, the importance of the actor is calculated on a per message or per time interval basis in order to account for the fact that actor importance is dynamic. In general, actors become more important the longer they are around; they participate in more discussions, and are generally likelier to increase in organizational rank. The primary usage of actor importance is in ranking the results returned in response to a query.

Documents

All data input to the system is in some sense considered a "document." However, in general only the post-processed form of these raw documents is used by the present system. For example, archival formats that contain individual documents such as mail messages are exploded prior to consideration by the sociological context engine. Those items that do not end up being incorporated into discussions retain document status. They are also frequently referred to as "singletons."

The following is a list of commonly used document attributes. Additional attributes may be added for special applications, or for special document types. (For example, as previously noted, all header information is retained in the case of email). However, the following have general applicability.

Document Attributes

Title: extracted where available from document meta-data. Otherwise in some embodiments null; in others the first sentence or contents of first field in a fielded document. In still other embodiments, the user may provide a name for the document if it would otherwise have none.

UID: A unique ID code generated by the system. In one embodiment, the UID contains a hash of actor and timestamp of earliest occurrence (of the de-duped instances.)

Creation Date: The earliest date found associated with any instance of the document found during the initial de-duping phase.

Revision: Current revision number. This is taken from the version provided by an outside document management system if one exists. If additional versions of the document are found that do not correspond to what is in the document repository, the system will increment the minor version number in such a way as to not conflict with any version number formally assigned by another system. For example, if a document repository lists a 4.1 and a 4.5 version of a document, but the system identifies versions of the document that occurred in time between these two versions, they will be sequentially numbered using equal increments between 4.1 and 4.5. In the event that additional such versions are discovered later which conflict, a similar scheme is used to insert them into the numbering sequence. Finally, if a document has never been checked into a document repository, the system will number it sequentially. Each content charge results in the version number being increased by: each meta-data change (including user annotation) bumps it by one. Note that communication documents such as emails, IMs, SMS messages, or any type of "exactly once" document do not have the notion of revision. For such objects, both this field and the next have a value of null.

Revision History: An arbitrary number of records of the form <actor|timstamp|change description|version number|version controller>. The "change description" is either the check-in message, or the contents of the email associated with a soft revision. The version controller is either the ID of the source control or document repository assigning the system or an ID representing the invention, if it is assigning a "soft" version number after the fact.

Distribution History: An arbitrary number of records of the form: <dist_actor|recipient_actors|timstamp|version number|distribution event type>. Dist_actor is the ID of the actor responsible for the distribution event. Recipient_actors can be one or more individual or aggregate actors, or null (in the event where no clear recipients can be identified, such as posting something on the internet.) Distribution event types include, but are not limited to: published, posted, produced, sent, converted (to other format,) and submitted.

Strictly Versioned: 1 if no "soft" revisions exist; else 0. A "soft" revision is one that is found by the system but which does not correspond to a check-in event in some kind of version control or document management system.

Presumed Author: Either the valid author listed in the document meta-data if present, or if this actor is determined invalid by the ownership assignment process, the actor to whom primary document authorship is attributed by the system.

Other Authors: List of IDs of actors who have modified the document at some point.

OCR: 1 if this text was extracted from an OCR system, else 0.

Reconstructed: 1 if the document was partially or totally reconstructed by the system, else 0. (An example of this would be an email that had been reconstructed on the basis of the inclusion of its text and partial header information in a subsequent message.)

Topics: The set of topics identified in the document as a result of ontological analysis. Or statistical topic analysis, or any combination of these methods.

Named Entities: The set of named entities appearing in the document. This includes, but is not limited to: actor names, document titles, and geographic locations.

Natural Language: The spoken language(s) in which the document is written.

Pragmatic Tags: The set of pragmatic tags that apply.

Template: The ID of the template used to construct the document; null if there is none.

Is Template: 1 if the document is a reusable template, else 0.

Document Type: Possible values include, but are not limited to: email, database, regular document, spreadsheet, task list, and project schedule.

Created by Application: The application which was used to create the document, for example Microsoft Outlook or Word, Netscape Messenger, Excel, etc. This is generally determined by file extension, however some embodiments of the invention do scan the initial bytes of a file in order to validate the type suggested by the document extension.

Related Event: ID of the event that the document is linked to, if there is one. For example, a document might be the meeting transcript of a conference call.

Content Fingerprint: This contains the set of records traditionally used in indexes. This includes, but is not limited to, depending on embodiment: an inverted frequency index of stems, proximity tuples of such stems, and term density information.

Document Similarity

Once there is a reasonable cut of uniqued actor information, the system may return to processing documents. The next step in this processing is creating a lineage for each document; performing the digital archaeology process of determining which document are either different versions of the same document, or which had forebearer documents which contributed significant content of them. In each of these cases, the system will attempt to reconstruct the derivation tree as faithfully as possible. Two main cases of interest are considered:

Reusable document templates

Free-format documents

Reusable Template Documents

Many documents created in corporations are based on templates of some kind. These templates can vary from being fairly simple forms such as expense reports and vacation requests to very long and complex contract boilerplates. However, what they all have in common is that apart from date and entity information, the majority of their content is the same. Further, and more importantly, the relative location of content that changes is almost always the same. For example, while the number of characters in the changed content may vary, the markers on either side of it will be the same. Templated documents may in some instances also be identified from the document meta-data, which specifies the name of the template used to create the document 505.

Reusable template document information is used primarily by the system in order to determine when workflow processes are occurring. Such documents are presumed to have no special relationship to one another by dint of using the same template. For example, in a large company, in the course of a year, many people will file vacation requests, but the fact that they all used the same template to do so does not make the documents related to one another. However, a document based on a reusable template (a templated document) may have different versions based on changes being made to the non-templated portions. In this event, such templated documents may be considered related; this will be discussed further below. Apart from this exception, templated documents are not considered to be so-called "contentful" documents; documents in which significant new content has been authored.

Free-form documents

Other documents are created totally from scratch, or largely from scratch but with some borrowing of content from other documents. Some of these may contain substantial content from other documents, while others though written totally from scratch, may appear surfacely similar to other existing documents. As will be seen, the system distinguishes between these two cases, since in the former case there is an ancestral relationship between the documents involved, while in the latter case there may be no relationship whatsoever between the documents. For example, many press releases announcing new products sound very similar, boasting that their offering is "cheaper faster better" regardless of what the product may be or who its manufacture is.

All predominantly text "office" documents are considered by the system to be either free-form or template based. (Essentially, this is all regular documents except for fielded documents.) Communications such as emails and IMs are excluded from this categorization, as are all structure documents, such as databases, spreadsheets, or other record-containing files. The former are not considered to have versions; the latter do, but are not amenable to the following technique, and so are treated differently.

Documents that were identified during the initial indexing process as being of the non-fielded "regular document" category are now re-indexed at the level of individual sentences longer than, in one embodiment, 5 words (and, optionally, at even smaller granularities). (Block 1780), and paragraphs (Block 1785). During this process, repeated elements are de-duped, but a reference to the UID of each document where the segment occurred, and its relative position in that document is added to the index. Optionally, the user may configure the system to index at even lower levels of granularity, for example at the phrase level, or creating contiguous segments of N words each, the value of N being specified by the user. In addition, sampling may be used to limit the number of individual units being indexed if desired.

Given this index of segments, the system creates a clustering of the documents based on a count of segments common to two or more documents. FIG. 17*a* is a flowchart of one embodiment of determining document similarly. The procedure is as follows:

Sort the above-described records in descending order of numbers of non-null fields (Block 1705); this will cause the most frequently-occurring sentences to appear at the top of the index.

Starting with the first record in the sentence index and proceeding sequentially (Block 1710), the system creates a S-colored vertex (Block 1715) for each document.

Similarly, it creates SC-colored links connecting each pair of S-colored vertices that appear in the same record. If an edge already exists between 2 vertices, increment the weight of the edge by 1 (Block 1720). If there are no more records in the sentence index (Block 1725), the process continues to block 1730, otherwise, the process returns to block 1710, to the next record in the sentence index.

Repeat this process, but this time using the index of paragraph-sized segments (Block 1730). Augment the weight of each edge (Block 1740) between the documents by 10, for every case where a paragraph containing more than 3 sentences occurs. Note that content in headers, footers, or signatures are excluded from this rule, when they can be determined by the system. This scheme will have the effect that content-heavy templates and different versions of the same document will have the highest scored links; less text-heavy templates and documents that "borrow" substantially from other documents will also have noticeable link weights. Anything else should have only negligibly scoring links attached to it. If there are no more records in the paragraph index (Block 1745), the process continues to block 1750, otherwise, the process returns to Block 1730, to the next record in the paragraph index.

next, any edges are eliminated which have weights below a certain significance threshold (Block 1750). The intention of this is to remove linkages that are in effect random. In one embodiment of the invention, any link with a weight less than 10 is removed unless the length of the document is less than 100 sentences.

Now the system applies a hierarchical clustering procedure (Block 1755) to the documents that are still linked into the graph.

The result is a hierarchical clustering of documents. The lowest level of the clustering defines near-duplicate documents. Replace SC-colored links between vertices in these clusters with CR-colored links. All documents in such a cluster will be defined as "near-duplicates." The higher levels of the clustering define groups of documents that are related by the presence of common spans of text and retain their SC-colored links.

As the overall running time of this process can be a limitation in many cases, especially where the graph involved is not sparse, in another embodiment of the invention, the so-called greedy set cover heuristic is used instead. It allows distinct but close document sets to be collapsed into one during the counting phase. The Greedy Set cover is robust but is nevertheless an approximation of the minimal set cover. This also avoids incrementing weights O (s*d*d) times. Standard and custom local search techniques can be applied to improve the quality of this heuristic. Another embodiment, also performs n-gram analyses, and/or creates suffix trees, and use this an another dimension to provide to the clustering analysis.

The above analysis is based purely on lexical content. The system now matches actors up with these documents. FIG. 18 is a flowchart of one embodiment of actor involvement determination. The system examines each of the following data sources:

Emails in which any of these documents were emailed from one actor to another.

Which machines or media the documents appear on (prior to de-duping,) and the actors who "own" the machines or media.

Check-in and check-out logs from document management systems

Publication or posting dates to an intranet (or to the internet)

For each document the following information is retrieved and placed in a linear sequence according to time:

Email: From|To|cc|bcc|Date and time stamp|inline message content

Copies: {list of actor IDs corresponding to machines or media considered to be owned by them}

Logs: Check-in or Check-out|Actor ID|Date & Timestamp|Notification list (actor IDs)|check-in message text Publication/Posting date: Actor ID|Date & Timestamp This data is used as evidence of actor "touch" and is extracted for the current document (Block 1805). In addition, actors may have important connections to the document that are not associated with a particular timestamp. These include, but are not limited to, authorship (as reflected in the document meta-data, or as corrected by the system,) and mention in the document contents. Such associations are added to the count of actor involvement occurrences, though they will in most cases strongly correlate with the timestamped information.

As noted earlier, document meta-data will not always provide a correct author, or in some cases, any author at all. If more than one actor ID appears in these records (Block 1810), the system resolves this in these cases by assigning the author/owner on the basis of which machine the earliest known version of the document appears. Some embodiments may instead count the number of actor "touches" of the document as described above (i.e., emailing it around, checking it in to a document management system, etc.) and assesses ownership of the document to the actor with the most touches of the document. Other embodiments may combine these tests, and assign more than one author or owner as appropriate, or assign different owners over different time spans, if the actor activity of the persons in quest does not overlap in time.

Note that inline text in email accompanying document attachments is by default treated by the system in the same way as a check-in message. The system now pulls the document title information, and uses this as a third dimension to provide to the clustering analysis; the clustering analysis is now performed again.

From this data, a set of actor IDs corresponding to actors who had some clear involvement with the particular document may be obtained. Working upwards from the lowest level of the clustering, intersect the set of actors involved with each document within the cluster that has more than one actor associated with it (Block 1845). If the set is non-null, the cluster is presumed to correspond to different versions or variations of the same document (Block 1855). If the set is null, the cluster is presumed to correspond to a reusable template that is in fact being reused by a number of unrelated people (Block 1850), in these cases replace the original edge (SC or CR color) with a TM-colored edge. If however, there are hierarchical clusters of templated documents, this is interpreted by the system as evidence that multiple, distinct, significant sets of new content were added to the template (Block 1855). Note that for versioned documents, any document information provided by a document repository is considered to be hard evidence that overrides any other evidence type. For example, if a document management system records that document A and document B are respectively versions 3.1 and 3.8 of the same document, this will be asserted as a fact by the system, even if the clustering analysis contradicts it. The actor IDs are then uniqued, and identified as the actors involved with this document (Block 1860).

In some embodiments, in the above process the number of interactions an actor had with the particular document will be considered; in such embodiments, the above-described intersection process only considers actors that had multiple interactions with the document.

Next, the actor sub-graph is updated to reflect this initial collaboration information. A CO-colored edge is added (or edge weight incrementally adjusted) between each actor appearing in conjunction with each other document on the same document or on any document in the same cluster where the actor intersection set is non-null. This information will be further refined after discussion building. However, adding an initial cut at this information prior to discussion building makes available useful evidence for the process, namely which actors collaborate together in order to create content.

FIG. 19 illustrates the iterative nature of building an actor graph. As can be seen, the process is iterated multiple times, to obtain an accurate actor graph.

Textblock Identification

Textblocks consist of the maximum contiguous sequence of sentences or sentence fragments which can be attributed to a single author. In certain cases, especially emails, a different author may interpose responses in the midst of a textblock. However, the textblock retains its core identity for as long as it remains recognizable. This is used for a variety of important applications, such as reduction.

FIG. 20*a* is a flowchart of one embodiment of textblock identification.

- Tokenize each sentence (Block 2005) with a search engine tokenizer. This defines individual words. (Note that tokenizers may have special rules to consider such items as AT&T, I.B.M., joe@doe.com etc. as single words.)
- Consider the next word (Block 2010). Scan the inter-word characters for evidence of sentence boundary (Block 2015). If a punctuation character other than a comma occurs between two words the system places an end of sentence marker between the words (Block 2025).

If the running count of words is over N (Block 2020) also put an end of sentence (Block 2025). This is important for certain writing styles (informal email, poetry) and for content potentially cleaned from its punctuation by previous tools. In one embodiment of the invention, N is set at 50; another embodiment may use a different value, or allow the user to choose it.

- When a termination marker including, but not limited to, new line, paragraph, or change in quote marker in email (see below) is found (Block 2030), truncate the textblock (Block 2035). Any document meta-data, such as that provided by a change tracking mechanism, is similarly handled.
- Add all sentences to a special inverted index which also provides reference to their textblock of occurrence. For space efficiency, the sentences may be hashed before storage. Determine if there are further records (Block 2040), and if there are, return to block 2010.

Structure, or other fielded documents are handled separately, as one of the key dimensions of analysis for derivation, continuous lexical analysis, is not applicable. Instead, different mechanisms are defined for each main type of such document. For example, log files can be easily versioned based on the timestamp of the last event they contain. However, spreadsheets may have similar column and row names—as many do—but very different numbers in the body. The difference could be one of a single formula change, or it could be one of hundreds of individual changes. Thus, one embodiment of the invention has a special mechanism whereby the formulas from different similar but unversioned spreadsheets are applied to one another in an attempt to determine ancestry. Generally in the case of such documents any change tracking information is considered to be valid, as is that from any document repository.

Email is specially treated, due to the fact that a message will often contain the contents of previous messages, and so project false similarities. Thus, the system recognizes quoted text, using textblock attribution. FIG. 20*b* is a flowchart of one embodiment of textblock attribution.

The system assumes that emails contain text that was authored by one or more actors. Because of the frequency of the "more than one actor" case, the system attempts to attribute an author to each of these segments. It will thus perform the following operation on emails, starting with those that exist within an email thread. In one embodiment, all emails that are part of a thread are examined sequentially within the context of a thread, starting with the first element in the thread. The process is as follows:

- The textblocks at depth zero are attributed to the sender of the communication (Block 2060). Note that in this step, and indeed also in the following steps, once a textblock has been assigned to a particular actor ID, this same textblock will be attributed to this actor ID for the rest of the given email thread. This is critically important, since it is information that can be used to reconstruct individual emails in the thread that may no longer be independently present in the corpus.
- Textblocks at a greater depth are attributed based on decorations found within or immediately before the textblock. Textblocks at depth 1 are presumed to be authored by one of the recipients of the message. (If there is only one actor on the to: line, this actor is the presumed author of text at depth 1.)
  - One type of decoration is a "quote introduction" line (Block 2065). The system looks for patterns which include, but are not limited to: "^(\s)*On xxxxx ([:w:] [:w:]) said:"\n(\n)?" For example this may be a match in the textblock "On Apr. 1st 1991 John Smith said:" The system will also extract customized quote lines that an actor may have created in those email applications which support this feature. The name portion of the match is used as actor evidence for an actor model lookup. If it succeeds, it is used as evidence that the immediately subsequent textblocks should be attributed to that actor.
  - Another type of decoration is an inline signature block (Block 2070). Note that this can only be applied if the signature was left in the quoted text. In the event that it is, it is used as evidence both to attribute the textblock that includes it to the actor whose name appears in the signature, and further to attribute all textblocks at that level (for example, when equivalent indent or quote marker) to this same actor.

The system also extracts sender and recipients in the upward closure of the containing email thread (Block 2075). This information is used to fill in any missing author identities.

Each textblock is assigned a unique ID which may be used anywhere the same textblock appears (Block 2080). This ID includes a hash of the ID of the actor who authored it. (Note that in addition to automated inclusion in replies and forwards to a message, a textblock could get included in an email by the user copy/pasting it. Hence, the system does not require a forward or reply in order to identify a textblock in a communication. However it does require that it be the same actor responsible for it.)

Note that textblocks are correctly identified even after other actors have decorated them with additional characters because such text is identified by the above process as being a foreign or subsequent insertion. The more difficult case is the one in which a subsequent actor has snipped some text out of the original textblock, rather than just adding additional characters. In one embodiment, if a single sentence greater than the larger of 5 non-stop words or 50 characters survives completely, the textblock is still identified. Other embodiments may take different approaches, including, but not limited to: only allowing a fixed number of trailing characters in the textblock to have been deleted, or requiring that the same ontology classes must be triggered in the descendant textblock as in the original. Some of these embodiments may take the presence of a foreign insertion as evidence of the textblock being present; others may not. One of the textblock has been so identified, its ID is attached to each document in which any form of it appears. In general, if a textblock appears in two documents that have been attributed to different actors, the earlier appearance determines the attribution. (Block 2085).

The present invention supports all methods of representing quotes within a message. These include (but are not limited to):

1. The insertion of a character to the left of the text being quoted. An example follows. In the example, the quoted text appears above the new text, but the present invention also accepts quotations that appear below the new text, or messages that contain a mixture of quotations above and below the new text, as follows:
   \>\>This text is the quotation of a previous quotation, as
   \>\>can be seen from the repeated quote identifier.
   \>\>
   \>This text is quoted from the previous e-mail in the reply
   \>chain, as can be seen from the single quote identifier.
   \>This is the text of the current message
2. The use of a block quote mechanism in which the quoted text appears below the new text in a block that may or may not be indented. The present invention places no restrictions on whether or not the block is indented, and is flexible with regard to the headers that appear at the top of the quotation, or any heading that may appear above the quotation (" - - - Original Message - - - " in this example, which is taken from the default quotation settings of Microsoft Outlook 2000™) Here is the new message text, which is not automatically indented. The quoted text appears below.
   - - - Original Message - - -
   From: Fred Smith [mailto:fred@blah.com]
   Sent: Tuesday, Nov. 19, 2005 15:36
   To: ann@blah.com
   Subject: RE: Meeting Today's meeting has been postponed until 3 pm, but will still take place in the conference room.
   Fred As noted above, other types of common quotation are supported by the system including: "^>>", "<blockquote>", " - - - Original Message: - - - " These may be extended by the use of regular expressions. The system can be extended to recognize any other such delimiters. The user may also add additional quotation indicators.

Lexical or topical similarities are only applied to emails during the discussion building process, at which point all messages in the same thread will be available, assuming that they still exist in the corpus. This is to prevent emails that were part of the same thread, and hence contain the contents of the previous message, to be incorrectly overscored on these measures. IMs, due to their typically short length, will also be analyzed for similarity at a later stage.

Textblock Identification in Regular Documents

In regular documents, there are fewer cues as to content created by an author other that the primary one. However, by using the actor involvement information computed earlier, we may capture the changes made by each actor who made a change (presuming that their version of the regular document is still present in the corpus.) This is done by using any commonly available package or method to "diff" the document with other versions close to it in time or version number. Any new text appearing in the diff is attributed to the actor who performed any of the above listed actions, for example sending the modified regular document to other actors, or checking it into a repository.

In the event that the same textblock appears in two or more documents 505 that have been attributed to different actors 310, the earliest appearance of the textblock determines the actor 310 it will be assigned to (Block 2085). Note that this requires performing a query against the set of duplicate items in order to ensure that the true earliest instance is considered.

Note that whether a regular document has been OCR'ed is important because OCR'ed content is considered less reliable than native electronic content. In some instances, the same regular document may appear in a corpus in both native and OCR'ed format. Because of meta-data and document type differences, such documents will not be considered duplicates by the system during the initial indexing processes (and similarly would not have been had the data been pre-indexed prior to submission to the system.)

FIG. 20c is a flowchart of one embodiment of textblock identification within an OCRed document. Documents input through the OCR system (Block 2086) are flagged. However, any regular document flagged as "OCR" will cause the system to perform a modified sequential textblock analysis in which all textblocks must match but a 10% variance in individual characters is allowed, with the proviso that the differences must be randomly distributed throughout the textblocks. Some embodiments may allow a variance of up to 30% (Block 2088). Further the number of alpha-numeric characters in each textblock must match exactly, one embodiment. Alternative settings for declaring a match may be set by the user. For another embodiment, the user may declare a document matching, even if these criteria are not met.

In the OCRed document does not match an existing documents within the constraints (Block 2090), the document is added to the repository (Block 2092). If the OCR'ed copy of the regular document is a duplicate of the native electronic regular document, the process, depending on the user's preferences can: remove the OCRed document from the data set, or individual textblocks from OCR'ed regular document may be verified by native electronic versions, should they exist. In this event, the OCR'ed text is corrected (Block 2094) using the data from native electronic version. In order to prevent short similar textblocks from being cofounded, a number of words minimum is imposed for textblock length. This minimum can however be disregarded if two contiguous textblocks match. In one embodiment, this threshold is 50 words. In others, its value is determined by the user Event Types While "contentful" documents or communications are the richest source of data, events 1525 may also be of great utility in either contextualizing or interpreting the content-bearing data. For example, if there is a meeting among the same set of actors that have recently been engaged in an extension exchange of email on a particular topic, it is quite possible that this meeting also pertains to the same topic. Further, as previously noted, if a content-bearing document contains a reference to a meeting and a date and time, as well as possibly a list of attendees, this is considered further evidence that the meeting was indeed related to the prior dissuasion. Other types of events 1525 may be entirely external to the corpus itself, but may be interesting from a context perspective, as outside events 1525 do influence internal ones. FIG. 21*a* is a block diagram of one embodiment of a partial event hierarchy.

Events 1525 are inherently pieces of data that are content poor, with relation to content indigenous to the actors in the corpus. Most event 1525 types have some text associated with them, but not text that fully describes the event 1525. For example, a phone record might contain the number dialed from and to, a duration, and a date and time. This is certainly information in textual form, however it does not provide a description of the contents of purpose of the call.

Internal event 2102 types involve actors in the corpus performing some action, either with other actors in the corpus, upon content, or with the outside world. As indicated below, some of these event 1525 types are merely used to decorate discussions. However, other may be integral parts of discussions. For example, a meeting may be where the resolution to a discussion occurred, even if the system lacks the information to say what that resolution was. However, this information can still be used to question deponents in an investigation or litigation context.

While internal events 2102 by definition do not contain their own full descriptive content, instances of some event 1525 types may have relationships with specific content-bearing documents. For example, a meeting 2112 on an online calendar 2108 may have meeting minutes associated with it. Or a conference call 2114 noted on a calendar might have a complete transcription of it in a document. In those instances where the system can detect this relationship, in one embodiments, a combined document is created containing both the event 1525 information, and the document content.

The list of internal event 1525 types in one embodiment of the invention includes the list below. Internal events 2102 can generate two kinds of evidence in the discussion-building process.

Sustenance: There is evidence that the actors involved in the possible dissuasion are either communicating opaquely with each other (for example, via a phone call for which there is no transcript,) or are operating on objects being discussed contemporaneously, (for example, editing a report). Sustenance evidence interposes more items in the set of items being considered for inclusion in a discussion. As a result, the interval of time between any time-contiguous communications is shortened, increasing the probability that these items are related.

Hint: A "hint" is any kind of evidence that is of the general form that the presence of X requires Y to have occurred before it, after it, or at all. For example, the presence of a purchase order approval requires there to have first been a request made. Workflows 2110 are an important source of hints. While such information is used in discussion 305 building, such "hints" are a critical source of reconstruction information.

Note that the user may customize different event types and for navigational and querying purposes, even create hierarchies of them. For example, a "board meeting" is a particular type of meeting request; a "full board meeting" is a particular type of meeting, and so on.

Internal Event Types

Calendar events 2108 (i.e. tax day, end of quarter)

Electronic meeting requests. Such meetings may be where the resolution of a discussion occurs. It is evidence that there is continued communication among the actors in the discussion. The presence of such a meeting inserts a new item with the date and time stamp of the meeting time.

Employee lifecycle events 545 (promotion, transfer, termination, etc)

Document activity 540 (modification, repository checkin/checkout, creation, deletion, etc) Such activity is evidence that work is being done on particular documents. At such point as this work manifests itself in a newer version of the document being sent out to other actors via email, it is considered to be part of an informal workflow process and is considered an event in the discussion, one that inserts a new date and timestamp. When as a result of a check-in to a repository, the change is being made available to other actors the system treats it in the same fashion.

Telephone records and telephone messages/voicemail 2114. Under certain circumstances, these will be considered as weak evidence (e.g. sustenance) in building discussions. See below.

Wire transfers and financial transactions 2106

Workflow events 2110. Workflow systems are considered providers of strong evidence in building discussions. Ad hoc workflows 2120 are considered a source of weaker evidence in one embodiment. In another embodiment, only formal workflow events 2122 are considered.

Accounting entries/activity (i.e., bill sent, check cut)

Task lists (e.g. an item being added or check off as completed)

Records of packages shipped with carries who use electronic tracking systems

External Event Types

In one embodiment, external events 2104 are used for decoration only, to help the user recreate the context in which the content was created. That is, they do not generally contribute evidence to the building of discussions 305, but rather are added by the system after the fact.

The main types of external events 2104 are as follows:

External events (for example, a sharp stock price drop, earthquake)

The publication of external articles

External events 2104 can be attached to discussions either manually, through a third-party application that works programmatically via an API or object model, or automatically. If added automatically, an event will be added to all discussions whose lifespans intersect with the event in time, all discussions that were active at the time of the event, or only discussions containing certain topics as determined via the use of ontology classes or statistical topic analysis methods.

Many events will never end up in a discussion. However, prior to the start of the discussion building process, events that are potential candidates for inclusion in discussions are extracted and placed in a data store. In order to be a potential candidate for inclusion, an event must have either an actor associated with it that corresponds to a connected note in the actor graph or be associated with a document that has been passed through the previously described document lineage procedure. External events, and internal "calendar" events 2108 which are unrelated to specific actors are an exception to this rule. In one embodiment, rules for inclusion of these event types are specified by the user.

Event Attributes:
  Name: Some events may have titles associated with them; for example, a meeting request often will. Others, such as phone calls extrapolated from phone records, will not. In the former case, the existing title is used. In the latter, the system will create a title. For one embodiment, the title is created by concatenating a form of the event type name and the actor information. For example, in the case of a phone call, the system generated name for the event would be: <actor name> calling <actor name>.
  UID: A unique ID generated by the system for the event. In one embodiment, the unique ID includes a hash of actor IDs, date, and start time.
  Actor IDs: The IDs of any actors associated with the event. This is determined by explicit mention of an actor in the event title or description, inferred on the basis of ownership (for example, if an event is extracted from an actor's personal calendar, it is automatically attributed to them,) appearance of the actor's phone number in phone record (if such number can be uniquely attributed to them,) and so on. Note that aggregate actor IDs are valid, for example a calendar might be owned by a group rather than an individual actor.
  Start time: The start time, or presumed start time (based on the available evidence) and date of the event.
  Duration: The duration, or presumed (that is, the scheduled duration if no actual duration information is available) duration, of the event.
  Event type: The type of the event. Note that the user can create their own custom event types, and can also create hierarchies of event types.
  Related Document IDs: In the case that an event does have one or more documents associated with it that largely or completely defines its contents, such documents IDs. Such relations are detected by the system by pragmatic analysis, for example searching for content such as "transcript of meeting on <date> between <actors.> The system will also allow the user to identify such relationships, either on an instance or template level. Note that meta-documents, documents that were not part of the corpus, but are subsequently added to the system by the user, may be specified as being related to an event. An example in which this might occur is one in which a deponent provides an account of a telephone call.
  Description: Some event types may optionally have descriptions associated with them. These event types include, but obviously are not limited to: check-in messages, and meeting requests. If such a description exists, it is stored in this field. If not, its value is null.

These are the base set of attributes. However some event types may have additional attributes. For example, in the case of a wire transfer event, such additional attributes would include the amount of the wire transfer, and the relevant account numbers.

Next the system performs an initial iteration of the analysis of the interaction patterns among actors. In previous processes, the system has already established the amount of both communication and collaboration between the various actors. However, until this point, the temporal dimension to the interactions has been ignored. At this point in the process, this information is considered. Specifically, the system is designed to obtain mean response times between pairs of actors to communications. This process includes the following concepts:

Actor Heartbeat: Every time an actor performed an electronic action that is externally auditable, for example sending and email, logging into a database, etc, is treated as a "heartbeat." It means that the actor was at work, and available, and hence theoretically capable of replying to a message or performing some other action. To this end, the timestamps from all communication documents from each actor are extracted from the index and are placed into a new data store of the form: Actor_ID|reply_to_actor_ID timestamp|item ID. This allows three very important measures to be taken:
    The standard weekday (and non-holiday) distribution in time of each actor's communications to other actors indigenous to the corpus. For example, John Smith might be at work and on-line generally from 7:00 AM–4:00 PM, whereas for Jane Jones it might from 10:00 AM–6:30 PM.
    Absences of that actor, for example due to vacations or sick days; weekends and major holidays are automatically disregarded.
    The mean response time to communications from each actor that they interact with a sufficient amount in order to be able to build a statistically significant model.
  This derived data is also stored in a data store.
  Warped Time: In a corporate or work context the vast majority of communication among actors is likely to occur during or near "regular" business hours. In order to have a meaningful measure of mean response time to communications, the system must account for the fact that all actors have regular periods of inactivity, and that these periods may vary widely by actor. FIG. 22b illustrates warped time. The system solves this problem by discounting hours that the actor was not active (Block 2290). For example, if Jane Jones logs off her system at 6:00 PM (Block 2282), and Bob Smith sends her an email at 8:00 PM that same night (Block 2284), if she logs back on at 9:15 AM the next day (Block 2286), and replies to Bob's email at 9:45 AM (Block 2288), only ½ hour of "warped" time will be considered to have elapsed. In another embodiment of the invention, this information is only considered on an average basis rather than on a per day one, except for those days which are of particular interest to the user. Note that messages to which there was no reply are considered at this stage of the analysis.

The Importance of Communication Documents

Threading of email, or simulated threading of IMs across sessions are considered a source of evidence. Both show evidence of a sustained interaction among particular actors. Such threaded material has a high probability of being semantically related. However, this is only one dimension of evidence, and can be refuted by other kinds of evidence in the discussion building process. This is to account for the fact that a user may, for example, hit the "reply to" button merely as a matter of convenience as opposed to with the goal of literally replying to the message.

The Problem of Clock Drift

Clock drift on a machine sending email causes Sent: and Date: time stamps to be incorrect. Clock drift on an SMTP relay machine (an intermediate machine) will cause transport header timestamp information to be incorrect; the mail server that contains a user mailbox is the last intermediate machine in a message delivery route. An email is produced by an email client at an origin machine. The origin machine creates a Sent or Date header (usually when the Send button is pressed).

A wrong timestamp can invalidate numerous data, including the following: causal ordering of messages; reconstruction of reply chains of messages; average time before answer to an email. Therefore, the system endeavors to correct timestamps for clock drift before the portions of the model that depend on it are computed.

Note that computer clocks are often adjusted by their owner, especially the drifting ones. Therefore it is dangerous to extrapolate a drift rate from an isolated point in time. The technique described in FIG. 22a does not rely on drift rates computation. Instead it relies on the fact that certain timestamps should be ordered in a certain way in order to respect causality of events. For this reason, the system does not consider clocks to be slow or fast, but rather early or late clocks. Most clocks are correct, i.e. neither detectably early or late. The quality of a clock being early, late, or correct is per-message. This had the benefit that a clock adjustment between the messages does not cause a problem.

The system attacks the clock drive problem by exploiting available SMTP information. Each time an email is routed and received by an intermediate server machine, a Received: header containing a timestamp is pre-pended to the message headers. Consider the last Received header in a message. This is the earliest Received header in causal order (independently of what the actual time stamp values say).

The system skips messages that do not contain both the Sent time header and the (last) Received time header. Repeat the remaining steps for each other message.

Part one: detect late clocks that stamp a Sent header;

If available then consider the second to last Received header and call it Received-2. Note that if clocks were perfectly synchronized then the order consistent with causality is Sent<=Received<=Received2. (The inequalities are not-strict because time resolution is only one second and so equality is possible.)

If Received>=Sent then the caused order is respected and no clock drift can be inferred. Skip this message.

Otherwise the reason causal order is apparently violated is a clock drift between the sender's client machine (Sent time) and the intermediate machine (Received time). The system assumes that there is a universal time that is followed approximately by most machines. In particular it is assumed that only one of Sent, Received, Received2 is affected by time drift.

If Received2<Received then the intermediate machine Received is drifting (since one of Received and Sent is drifting and at most one of Sent, Received, Received2 is drifting). This drift is unimportant. Skip this message Else Sent>Received and in addition it is the origin machine (Sent) that is drifting. This is the case of interest to us since the Sent timestamp on the email must be corrected. We know the origin machine currently is late at least (Sent−Received) time units. Set Sent_corrected:=Received −1. This is a timestamp consistent with causal ordering.

Part two: detect early clocks that Stamp a Sent header.

Build partial email threads based on Message-Id/Reference links, as discussed elsewhere. Do not base any decision on Sent: time header for now.

Do a depth-first traversal of the threads. Consider child-parent message pairs (a child is a reply to its parent). If clocks were perfectly synchronized then the order consistent with causality is Parent.Sent<=Parent.Received_1<= . . . <=Parent.Received_n<Child.Sent<=Child.Received_ 1<= . . . Child.Received_n2. If Parent.Received_n or Child.Sent is not available then skip the pair.

If Parent.Received_n>=Child.Sent then causal order is violated. In this case proceed with the following steps.

The reason causal order is apparently violated is a clock drive between the last receiving machine for message Parent and the origin machine for message Child. We use the other inqualities to determine which one is wrong.

If n>1 and Parent.Received_n>Parent.Received_n-1 then the intermediate machine is drifting. We are not interested in this drift. Skip this message pair.

If n=1 and Parent.Received_n>Parent.Sent then this is a case already handled by Part one above. So do nothing.

Else Parent.Received machine is not drifting. We know that origin machine for the Child message is early at least (Parent.Received_n−Child.Sent) time units. Set Child.Sent_corrected:=Parent.Received_n+1. This is a timestamp consistent wit causal ordering.

Note that Parent.Received_n+Reaction_time=True_Child.Sent=Child.Sent+EarlyDrift. (where EarlyDrift>0 and Reaction_time is the delay between the arrival of Parent in the recipient Actors' mailbox and the sending of the Child reply by this Actor.) So in order for the violation Parent.Received_n>=Child.Sent to occur, we must have Reaction_time<Drift. Otherwise no clock drift is detected.

Parts one and two are independent and can easily be computed together during a single depth-first walk. Time (via the Sent/Date email headers) is used elsewhere in the invention as a component of an email fingerprint for de-duplication purpose. In that context it does not matter whether the stamped time is precise. What matters is that it is unique (most of the time) and that it is transmitted unaltered. In one embodiment, the clock drift correction is not applied to the timstamp used for email fingerprinting.

Formal Workflow

Commercial workflow systems such as Intraspect can furnish the system with valid workflow sequences. Specifically, it can provide the following information:

At the Nth step in the workflow process, the identities of the document or communication types that must have preceded it.

If the Nth step has occurred, similarly what the parameters are of the next step, if it occurred.

It may also possibly indicate which specific actors, or which job titles, are required to move the workflow to the next step.

Similarly, it may also indicate the date by which each subsequent step would have had to have occurred in order to be valid according to the rules specified in the system.

As previously noted, evidence provided by workflow system is considered to be "hard" evidence. While evidence of some of the data involved in the workflow may no longer be present in the corpus, a placeholder item will be inserted for any item whose sequence in a particular instance of the workflow process is less than the highest numbered item found associated with that instance.

Linguistic Evidence Sources

Different kinds of linguistic evidence can allow the system to expect a particular type of related information, or to expect that subsequent related items will have certain characteristics, thus making them easier to locate. These are as follows.

Ontology

The invention implements its own ontology 2128 representation geared specifically to representing relations between and constraints on terms or phrases. FIG. 21*b* is a block diagram of one embodiment of the element relationships in a sample ontology. Ontology terms 2148, 2150, 2152, 2154, 2156, 2158 and classes 2130, 2132, 2134 can be mapped both to queries in the query engine 3120 implemented in the invention as well as matching procedures that find terms and classes which describe an input text stream. The latter method is referred to throughout the patent as "matching an ontology class". The ontology representation includes:

Terms (blocks 2148, 2150, 2152, 2154, 2156, 2158)—which can be either individual tokens or phrases Classes (blocks 2130, 2132, 2134)—which can have other classes or terms as children. A class can have multiple parents.

Relation links (block 2160—between any combination of class and term. Relation links can be either directed or undirected. A directed link is equivalent to a "TRIGGERS" link in a conventional ontology, and an undirected link is equivalent to a "SYNONYM" link in conventional ontology implementations.

Every term and class may have clauses (blocks 2138, 2140, 2142) and refuting clauses (blocks 2144, 2146) attached (attachment 2136.). These clauses are queries composed in the query language supported by the system. The function of support and refute clauses is not symmetric however. Every term and class in the ontology 2128 inherits (see connector 2132) all support and refute clauses from its parent classes. For a term to match (in a stream) or be matched (in a query) the refuting clause must not be matched. However a match on the supporting clause is not required. Supporting clauses are intended as a mechanism for improving the match score for terms that appear in a certain context or are associated with other query-able data in the system.

In one embodiment, there are no prohibitions on cycles appearing in the graph of relations on classes and terms in a particular ontology 2128. In one embodiment, algorithms on the ontology 2128 are required to detect cycles of links. Given the restricted set of relationships allowed in the ontology cycles that can be dealt with consistently (i.e. inheritance of clauses and relation links is monotonic).

Any class can be converted into a query of the form: (+(terms children related) supports–refutes), where terms is a list of clauses constructed for each term that is a direct child of the class, children is a list of clauses generated for each child class, related is a list of clauses for each term or class accessible via a relation link originating at the class. Supports is a list of support clauses associated with the class and refutes a list of refute clauses. The '+' means that a match is required on at least on sub-clause in the initial list. The '–' means that the query fails if any of the clauses in the refute list are matched.

Similarly a term can be converted into a query of the form: (+(terms related) supports–refutes). This represents a canonical form for the query, the generation algorithm can optimize queries to remove redundant clauses.

The matching procedure is a bottom-up process that scans a text stream for occurrences of terms in the ontology 2128. If a term is found in the text stream, it only matches if no matches for any refuting clauses associated with that term are found. This is equivalent to the statement that the text stream would be returned in the result list for a query of the form (+term inherited_supports inherited_refutes) if it appeared in a document. In one embodiment, system components may utilize any of the following three methods to determine which classes will be output when a match is found:

Only output classes which have specifically been declared to be visible externally. When an ontology 2128 is defined, classes may optionally be labeled as "visible". In this method, the list of visible classes that include a term as a member are output each time it is matched.

For each term matched, return the most remote ancestor class that contains that term as a member. All terms in the closure of the class (i.e. terms directly in the class, terms directly in all reachable subclasses of the class) as well as related terms and closures of related classes are considered members of the class for this test. A class or term is related if relation link exists from it to a class or term in the closure of the original class. If a term's text matches but the match is rejected by a refuting clause, then find the most remote ancestor that if considered as the root of the class hierarchy (i.e. no clauses are inherited from the parents of that class) would allow the term to match. The most remote ancestor is the ancestor with the largest count of intermediate classes between itself and the term in question. If there are two or more classes with the maximum count, then a list of all such classes are output for the match. If the ontology 2128 contains a cycle then the last class that is traversed before the cycle is detectable is taken to be the most remote ancestor in the cycle.

Return the least remote class (in other words the most specific class) that contains as members all terms in a sequence of matches. The length of the sequence is determined by a parameter that is supplied when the search is initiated. The parameter specifies either that all matches in the text stream be considered as a sequence, or provides the length of the sequence to use. In the latter case, the sequence starting at each match in the document is evaluated. In other words, if the sequence length is three, then sequence of matches (1, 2, 3) is tried followed by (2, 3, 4) and all remaining 3 match sequences.

This results in a hierarchy of term classes, which can trap the presence of different topics in a document. Each ontology class may contain supporting evidence for establishing its topic's presence in a particular document. It may also contain refuting evidence. Therefore ontology classes can easily distinguish between different senses of a term, for example, Java the coffee, versus the country, versus the programming language. One embodiment of the invention allows each term, class, relation, and support or refute clause to be weighted positively or negatively in order to influence the score for corpus items returned from a query as well as term matches in a document. The use of the query language enables tests against accrued evidence to be performed and thereby creates a powerful system for automating analysis of a corpus. Since in some embodiments and configurations ontologies may be used at various stages in the process, in one embodiment, the system implements consistency checks of the supporting and refuting clauses against the evidence available whenever an ontology 2128 is loaded and used.

Language Detection

A number of commercial and academic sources provide schemes for recognizing a natural (human) language based on a sample of text. In the current invention, such schemes are used in conjunction with the sociological analysis engine for the following purposes:

- Personality spotting: inasmuch as a previously recognized actor is observed to use more than one human language beyond the use of isolated individual phrases, each language is assigned to a different personality 1220 for that actor, in the event that each such language usage corresponds to a different electronic identity 1225. (This last requirement is to prevent incorrect flaggings of, for example, multi-lingual employees who perform their job in more than one language. However, some embodiments of the invention may choose to make this trade-off).
- Cliques ("circles of trust 1505"): Cliques which substantially use a language MELISSA other than the primary one used in the corpus can be optionally flagged as suspicious by the sociological engine; ontology hit scoring thresholds would be lowered to any single occurrence of a positive evidence term. This is due to the fact that foreign language use may be indicative of an attempt to obfuscate, to pass sensitive or restricted information along without risk of detection by any keyword-based filters that might be in place.

In addition to these purposes, the system also makes use of language recognition schemes to mark documents or regions of text for transition, if desired.

Author Fingerprinting

The system applies statistical natural language processing techniques in order to help determine authorship of documents lacking valid author metadata, or of textblocks which cannot be unambiguously assigned to an actor. Techniques used by different embodiments of the invention include, but are not limited to, the CUSUM method. The system can input verified samples of the writing of each actor in the actor set in order to increase the accuracy of these methods. The relevant information needed to fingerprint an actor is stored in the "lexical fingerprint" attribute, discussed above.

Quantitative Sociolinguistics

The heavy use of sociological data in the system lends itself to the addition of sociolinguistic data, in particular, notation of the discourse role relative to communication between any given set of actors. The discourse role includes the notions of the pragmatic function, linguistic register (i.e. the relevant formality or informality of language used) and the intended audience of the communication. The primary implementation of sociolinguistic techniques in the current system applies to labeling the discourse role of a region of text with a pragmatic tag. This role must necessarily be considered contextually. For example, given a document containing a high percentage of sentence fragments and lacking formal openings and closings, most linguists would characterize such a document as 'informal.' However, in email communication, this may be an inaccurate categorization.

Pragmatic Tags

The present invention, in one embodiment, uses theory and methodology developed in the field of linguistic pragmatics and discourse analysis. Linguistic pragmatics seeks to explain the relation between language and context, including the structure of spoken or written discourse, the nature of references in communications, and the effect of context on the interpretation of language. While a substantial body of work exists on computational applications of linguistic pragmatics, the adaptation of such techniques to the sociological engine described here is a unique one. Specifically, pragmatic tags are used as a cue to the discussion-building algorithm and as a means of retrieving information within a coherent discussion that might be distributed across multiple text-containing items. FIG. 23a describes the spectrum of pragmatic tags that may be available. The application of pragmatic techniques in this regard represents a method unique to the system of this patent.

The system initially assigns pragmatic tags 2301 to textblocks while analyzing documents during discussion building. In one embodiment, assigned tags 2301 are stored at document vertices in the graph and available for later processing stages. An alternative embodiment of the invention may assign these tags 2301 in an earlier phase of processing and store the results. The pragmatic tag set described here is unique to the invention and defines the discourse properties both relevant to discussions and used for various analyses of constructed discussions. These pragmatic tags 2301 represent the discourse role distilled from examining the textblock as a whole, where a consistent role can be detected.

The tagging process uses an initial labeling pass, which labels text at a finer level of granularity with lower level tags 2301. Examination of the sequence of labels produced from this pass provides the strongest source of evidence for determining which pragmatic tag will eventually be assigned to the textblock. The invention uses currently practiced methods in computational linguistics, generally referred to as shallow parsing, to assign these lower level tags. The labeling process described below can take as input any tag set produced by a shallow parser so long as the tag set can represent a necessary set of distinctions described below. Automatic tagging presently available in shallow parsers is most reliable for labeling parts of speech (for example noun or verb), some syntactic constituents (for example noun phrase) and some syntactic relations (for example subject or object). One embodiment assumes the use of such tags. However, there are several tag sets in wide usage, such as the DAMSL (Discourse Annotation Markup System of Labeling) tag set, which also represent pragmatic and discourse roles for the labeled text. The Use of a labeling method that provided such information may allow the system to produce more accurate results.

The pragmatic tags 2301 assigned to textblocks in a document are the most likely role given the sequence of tags and other forms of evidence found. One embodiment of the invention implements a maximum likelihood estimation approach to doing so, although alternative embodiments may use heuristic, rule-based or other approaches. The input tag set should at a minimum be able to distinguish between various forms of question, declarative and imperative sentence structure. Ideally, assigned tags should give some indication of whether anaphora or resolved or not. If not some simple heuristics will be used to estimate whether unresolved anaphora may be present.

The assignment of pragmatic tags 2301 follows standard formal assumptions of linguistics, namely that actors provide information that is (1) relevant, (2) appropriate in quantity (that is, that all information introduced into the discussion can be assumed to fulfill illocutionary intent of the speaker) and (3) qualitatively appropriate (that is to say, that is either true, or if false, the falsehood is due to illocutionary intent of the speaker, rather than linguistic incompetence). These three assumptions guide the system in classifying all available information and linguistic phenomena relative to its social context.

The following linguistic attributes are considered by the system in assigning a tag to a given document (or region of text):

discourse markers, lexical markers: The presence of words from closed sets of particles or discourse markers may indicate relevant details about information flow, indicating discourse events such as hedges ("on the other hand"), conventional openings, closing and politeness markers ("thanks,") and linguistically relevant structural markers ("if," "whether"). The system uses an ontology as defined here for the purposes of the invention, to represent classes of lexical or discourse markers. The matching functionality is used to identify markers as each document 505 is processed.

personal pronoun usage: the target audience can often be inferred from the personal pronouns (or lack thereof) used in a document 505. "I" vs. "we" provides an important descriptor relative to speaker attitude and inclusion of other actors; "you" or "you guys" vs. indirect references to addressees indicates formality and/or breadth of target audience, and direct or indirect reference to third parties ("he", "they") are also telling indicators of group relations.

syntactic structure: sentences containing unresolved anaphora, for example, indicate that an antecedent is required. (A message such as "Don't bother telling them", with unresolved "them," is obviously an addendum or response to an earlier question or statement.)

reported speech markers: an indication that "X told me . . . " or "Y says . . . " is of interest as it may indicate the role of a third party with an indirect effect on a discussion.

Another embodiment of the invention may take into account other evidence types in addition to linguistic attributes. These include, but are not limited to evidence such as: document type, lexical similarity to textblocks in parent messages, textblock length, presence of quoted and other forms of shared content, and known revisions will be taken into account in assigning labels.

Core Pragmatic Tag Types

Initiator 2306: An initiator tag marks text that is intended to get a response from other actors (see block 2630). It typically introduces new content with little reference to older content. Typically, initiators can be found at the beginning of a discussion, though when found in the middle of a discussion they may mark a change in topic, an attempt to reinvigorate a lagging discussion of similar purposes. A number of linguistic and extra-linguistic factors in a document's structure serve as indicators. For example, lengthy documents containing a large number of complex noun and verb phrases typically indicate a drastic change in information flow. Therefor, such documents tend to be initiators.

Clarifier 2307: A clarifier (see block 2632), also commonly called a forward-looking statement, is somewhat more content rich but internally inconsistent; in other words, it contains a mixture of old and new information, indicating that both prior and subsequent information are required to resolve its content. In particular, clarifiers can indicate inclusion, exclusion or references to actors that can expand or restrict subsequent discussion flow.

Question 2308: While clarifiers are typically questions as well, the question tag indicates a class of questions that are simpler than clarifiers. Text segments with these tags tend to be shorter than clarifiers, they do not introduce new content, but rather refer to older content. They may also indicate an attempt to sustain a discussion.

Indeterminate 2309: This tag is for the fall through case where no clear indication for one tag of any other can be found.

Filler 2310: A filler tag indicates a class of responses that do not contain nay particular content. These responses are often formalities such as "Good job!", "Thanks for sending that", and so on. They tend to be short, do not introduce new material and are generally identified by the matching of discourse markers.

Response 2311: Shorter documents found to be lacking in distinct information can be tagged as responses (see block 2634). In general, "response" segments are relatively short and contain a number of statements with unresolved noun phrases co-references. This typically indicates that a prior document's content is needed to resolve the reference. In cases where noun phrase co-references are resolvable within a single short document (two or fewer paragraphs), it is still safe to assume that such a document will require additional outside context for complete intelligibility.

Summarizer 2312: As opposed to responses, summarizers tend to be richer in use of name entities and complex noun phrases (see block 2638). Summarizers do not introduce new content, and contain larger amounts of old content.

Null 2313: Certain classes of documents do not yield to pragmatic analysis, either due to the absence of clear linguistic structure (as in the case of a spreadsheet) or due to being so highly structured that subjecting them to analysis would introduce unacceptable levels of complexity into the system for which the pragmatic tags were originally intended, namely, ordering and retrieving related sets of documents. Such cases are eliminated from consideration by pragmatic tagging and receive the default 'null' tag.

Pragmatic tags 2301 play an important role in discussion construction, as they present data that indicates initiation, sustenance or conclusion of a discussion, points to missing information, and mark the emergence of topic drift. In the implementation described here, each tag is a tuple of 4 values. The first value, the tag type 2302, defines which of a set of broad classes (corresponding to linguistically relevant attributes) the tag belongs to. One example of the tag set that may be used for this embodiment appears in the section above. Alternative embodiments may adapt the tag set in one of several ways. A richer tag set could be used to break out finer levels of distinction along the same dimensions as those present in the core tag set For example there could be several levels of tags added between Initiator and Clarifier, representing finer gradations. Another direction that might be taken is to add further values to the pragmatic tag tuple to describe other characteristics of the tag.

The second value in a tag tuple represents the register 2303 of the textblock. This value can be one of: '+', '−', '*'.

Representing a format, informal or undetermined register for the textblock. Register 2303 can be detected by techniques including but not limited to examining the sentence composition of a textblock and pronoun usage as well as the use of specific lexical or discourse markers.

The third value in a tag tuple characterizes whether or not the communication is directed towards a particular audience or not, for instance talking about someone in the third person, e.g. the audience 2304. This value can be one of '+', '-' or '*', indicating that the communication is directed, undirected or undetermined respectively. The directed nature of a communication can be detected by techniques including but not limited to the us of lexical or discourse markers and pronoun usage. Additionally a check can be made to see if a named person exists in the recipient list for a communication to indicate whether or not the communication is directed.

The fourth value in a tag tuple indicates the specificity of the speaker 2305. It measures whether the author is speaking on their own behalf or that of an organization or group of people. This value can be one of '+', '-', or '*' for specific, plural or undetermined respectively. This value can be determined by techniques including but not limited to examining pronoun usage throughout the textblock.

Some examples of initiators are:

Example 1. An email containing only the following text: Hey, gang, 1 just got back from Comdex and saw some of the new specialized speech recognition headsets that Acme was demonstrating. I think they'd be perfect for our automated transcription project. Do you think there's money left in the discretionary budget for these? If there is, who do I need to talk to about getting a purchase order?

Example 2. A long document formalizing a company's sexual harassment policy could be tagged as "initiator,+,-,-".

Such a textblock would very likely be written with few or no first or second person pronouns, indicating formality and the intention of reaching a broad, nonspecific audience. Simple counts of the number of paragraphs and average number of sentences per paragraph suffice to identify the structure of most such documents 505 as formal. Finally, it can be assumed that any such policy statement will contain a relatively high count of named entities (company names, responsible parties, and the like) that would indicate its key role as an introductory or summary document 505 in an information flow.

The existence of tag sequences permits an additional query type for information retrieval. Specifically, locating documents that affirm or deny a previous statement or request, but are lacking in content themselves, are made available to users of the system by means of this set of tags. For example, a query of the type, "Did Lulu ever ask Fritz about the flux capacitor, and receive a response?" is possible through searches of content in conjunction with pragmatic tags 2301.

The core tag types can be thought of as points lying along a spectrum from Initiator 2306 at one end to Summarizer 2312 at the other. The tags 2301 at either extreme are considered more distinguished than those to the center. As pragmatic tags 2301 will be used as positive evidence for the likelihood that an item is part of a discussion, the procedure for determining tags is set up so that any errors that occur tend to be mislabeling the more distinguished tag as a less distinguished one, for example Clarifier 2307 for Initiator 2306.

One embodiment of the labeling procedure proceeds as follows:

Items to be analyzed are first classified by type. In one embodiment, only communication documents, communication events, regular events, non-structured documents are considered for non-Null tags. In other embodiments, all items except for structure documents and other fielded documents are considered. Additionally items that are found to be part of a formal or informal workflow are assigned Null tags, as their role is defined by their position in the workflow sequence (blocks 2318, 2319, 2328, 2320.)

Textblocks from the remaining items are selected for analysis (block 2321.) The textblocks selected must be attributable to the author of the document 505 (Blocks 2322, 2327). Shared content, revision history and other constraints are used to delineate each textblock in a document. Only those blocks not attributable to another actor, or marked as quoted text (as in an email communication for example) are considered attributable to the author of the document.

Textblocks that are too large are assigned a Null tag of the form "null,*,*,*" (blocks 2323, 2327.) The length threshold is set to agree with a labeling policy used for labelling of a training corpora as described below. In one embodiment, any textblocks over this limit wall automatically be assigned a null tag. For example, such a limit could be set at 2 kilobytes of characters of message content, following text extraction from formatted mail types such as HTML. Alternative embodiments could add other heuristics for making this determination. The issue of length tends to be self limiting in that it will be less likely that longer textblocks can be assigned to clear pragmatic tag 2301. Longer textblocks will tend to carry characteristics of each of the core tag types and therefore in the likelihood calculated for each tag type will tend to the same value in the scoring procedure mentioned below. Therefore longer textblocks—those remaining after the initial removal of those above the length threshold—will get an Indeterminate tag, above some naturally occurring limit and it is safe to err towards a higher limit.

For the remaining items which have not been assigned a Null tag, perform the first pass of labeling using a shallow parser as discussed above (block 2324.) Minimally only a unique tag corresponding to each core tag type is required, though a richer tag set with a finer breakdown of classes can be used. In addition add a tag for each lexical or discourse marker identified by matching against their respective ontology classes (see ontology definition section above). If the tag set produced by the shallow parser does not indicate unresolved anaphora heuristics may also be used to decorate tags to indicate this. The preferred embodiment simply counts backward from any pronominal noun phrase looking for compatible noun phrases that could serve as an antecedent (block 2325, and blocks 2346, 2347, 2348, 2349, 2350, 2351, 2452). A compatible noun phrase meet constraints such as agreement on person and number attributes (block 2352.) Additionally pronominal noun phrases are skipped over during the count back procedure. Optionally the count back can be limited to the beginning of an enclosing paragraph, or to a certain number of words. However, a more conservative strategy of counting back till either a compatible noun phrase is found or the beginning of the textblock is reached will make fewer false positive errors.

Construct a Markov chain (blocks 2326, and blocks 2357, 2358, 2359, 2360, 2361, 2362, 2363, 2364) for each of the possible tag types using the state transition matrices created during the training process described below. Labels from the textblock are mapped to states in the Markov model in the same way as in the training process (block 2361). This yields a set of scores, one for each potential tag type. If one tag is found to score significantly higher than the others then that is initially proposed as the tag type (block 2329) A typical technique for determining this is to square each of the scores and threshold the remaining values, say at half the value of the maximum score. In one embodiments, other exponents and thresholds (as determined by the previously described parameter estimation process) can be chosen. If more than one score remains and the core tag types for these scores fall in one half or the other of the spectrum defined above then hypothesize the initial tag as either Clarifier or Response respectively (locks 2329, 2330, 2335, 2337.) If there are several tags that are distributed on both halves of the spectrum, then assign an Indeterminate tag type (block 2336.) If there was no single winner, then apply heuristics similar to those below. The exact heuristics will depend on the properties of the shallow parser chosen. The threshold used, or parameters obtained for other techniques, can be obtained from standard practice parameter estimation techniques used during the training process.

In the case where a clear winner was not established and all high scoring tags fall into one half of the spectrum, the following heuristics are used to finalize this hypotehsis. The quantity of old information, new information, and information content are estimated, in one embodiment using methods described elsewhere in the patent. The hypotehsis is then modified as follows:

- if hypothesis is Clarifier, the textblock has no old information, adds new information and has a high information content then move to Initiator (blocks 2331, 2332.) On the other hand if the textblock has no new information, low information content, and either has some old information or unresolved anaphora then move to Question (blocks 2333, 2334.)
- if the hypothesis is Response, the textblock has no new information and high information content then move to Summarizer (blocks 2338, 2339.) On the other hand if it has low information content then move to Filler (see block 2340, 2334.)

Once the tag type has been determined, the remaining tuple values are calculated. In one embodiment Register is primarily determined by the presence of lexical or discourse markers (blocks 2341, 2369, 2370, 2371, 2372, 2373, 2374, 2375.) If a prevalence of formal or informal markers is found the value will be assigned to '+' or '−' respectively (blocks 2371, 2372, 2374, 2375.) Additionally indication of more complex sentence structure and length of the textblock indicate a formal register (block 2373, 2375.0 The exact heuristic depends on the tag set produced during shallow parsing, but will consist of checks for coordinate noun phrases relative clauses and other complex syntactic constituents. For the preferred embodiment prevalence is defined to be >=66% or <=33%. One embodiment considers email and other communications to be informal by default and documents 505 to be formal by default (block 2369.)

In one embodiment the directed value is determined by examining the prevalence of $2^{nd}$ vs $3^{rd}$ person pronouns to assign '+', '−' values (blocks 2374, 2375, 2376, 2377, 2378, 2379, 2380, 2381.) A prevalence of $2^{nd}$ person pronouns indicates directedness whereas third person indicates non-directedness (blocks 2374, 2375, 2378, 2379.) Additional heuristics may be applied, such as the presence of discourse markers representing directedness (blocks 2374, 2374, 2380, 2381.)

In one embodiment the speaker is determined by examining the prevalence of $1^{st}$ person singular vs $1^{st}$ person plural pronouns; in one embodiment, prevalence is determined as described above (blocks 232382, 2383, 2384, 2386, 2387, 2374, 2375, 2388.)

The accuracy for determining register, directed, and speaker values can be enhanced by looking at syntactic relations if available. The use of Markov chains is widely understood standard practice, however a brief explanation is recounted here.

The Markovian property applies for a series of events X if the conditional probability $P(X_{n+1}=q_i|X_n=q_j, X_{n-1}=q_k, \ldots)=P(X_{n+1}=q_i|X_n=q_j)$, in other words the likelihood for the next state in the system is dependant only the prior state. A large class of problems can be effectively solved by assuring this condition to be true. For the purposes of the invention, this assumption yields acceptance results. Define a set of states Q with a transition probability matrix $\{q_{ij}$ for all $Q_i, Q_j$ element Q, $0<=p<=1\}$, in addition each row of the matrix $\{p_{i,1} \ldots |Q|\}$ must sum to 1. Calculation of the likelihood for each event in a chain is obtained by multiplying the likelihood obtained for the last event by the transition probability from the state representing the last event to the state representing the current event. Often the prior event's likelihood is multiplied by an additional scaling factor to minimize loss of precision.

One embodiment of the invention defines a procedure that maps the sequence of labels from the textblock into states of Q. For example the shallower parser will likely create nested labeling structures if it marks both syntactic constituents and parts of speech. An example of this kind of labeling might be " . . . [NP pro3s:he] . . . ". In this case the mapping procedure can simply concatenate the tags to produce a label of the form "NP,pro3s" with a corresponding state in Q. Additionally, this procedure should filter out labels that are not deemed to be significant to categorization, as may be determined by a competent linguist during the training phase if desired.

Other embodiments may use a higher order Markov chain. In an n-order Markov chain, the transition probabilities measure the likelihood of a state given the prior n states of the system. In any case the state space may be large, and standard techniques for representing sparse matrices may be used to implement the transition matrix. If necessary the matrix may be sparsified by using the technique of removing low probability transitions and assuming a standard lower bound during calculation when no transition is found between a pair of states.

Training requires a set of textblocks that have been labeled using the same shallow parsing system used in the above procedure, with discourse markers and other decorations added as above. Each block will be assigned a tag type by human evaluators. The described embodiment of the invention requires a separately trained model for each tag type. Training is a simple process of scanning through the tags in a textblock and applying the mapping procedure to obtain a sequence of states, then counting the occurrences of each pair of states (or n+1 tuple of states for an n-order model). To account for possible sparseness in the training set, the count for each possible pair of states may be initialized to 1, or a mouse sophisticated standard technique may be chosen. After all counts have been collected normalize the rows of the resulting matrix so that they each sum to 1. Training may be done once on the basis of a large generic training corpus and then reused for the corpus to be analyzed by the invention, or for better results a training corpus with characteristics corresponding to a particular corpus to be analyzed, or from a sample drawn from the corpus to be analyzed. Training typically involves a verification phase, and parameter estimation can be done by attempting several iterations of training and verification in which parameter values are altered and using the parameter set that produces the best results.

Alternative embodiments may use other statistical classification schemes, such as Hidden Markov Models, that retain the essential characteristics of the system defined here, namely that tags are assigned to textblocks with appropriate characteristics as defined above and that classification errors result in labeling a textblock with a less distinguished label than desired.

Discussions

After the feeder elements for the discussion generation process have been extracted, derived, and/or calculated, the system is ready to begin building discussions. As previously noted, the goal of this process is not to include every item in the corpus in a discussion, but rather to reunite related series of events.

Specifically, a discussion can be defined as a (probabilistically) causally related set of heterogeneous items within a corpus. Discussions can be of arbitrary length and time span. Similarly, they can contain any arbitrary number of different optics, and have an arbitrary number of different actors associated with them. The only limitation in discussion construction is that there is adequate evidence to connect the N+1th element to the Nth. The methods for determining adequate evidence are detailed below.

In building discussions the system accrues evidence across a number of different dimensions in order to draw its conclusions about which documents and events should be woven into a discussion. Any individual piece of evidence may be refuted by other pieces of evidence. For example, the mere fact that an email message B was a "reply to" email message A does not by itself necessarily imply that A and B are related; the user may have hit the "reply" button merely as a convenience. If both messages have substantial lexical content, but which appear to be totally unrelated to one another (apart from an unmodified quoted textblock) that would be refuting evidence against there being a causal relationship between A and B. Additional refuting evidence would be a manually performed change in the subject field, or message B having very similar lexical content to message Z, which preceded A in time and involved the same actors.

The above example notwithstanding, in one embodiment of the invention, the four strongest types of evidence are:

Actor pressure

Reply to or forward (of communication documents)

Format or informal workflow process

The inclusion of either the same attachment or another version of the attachment, or one or more textblocks.

In one embodiment, the presence of at least one shared actor is an absolute requirement to link items together. However, an aggregate actor (such as a mail alias) is acceptable so long as once it is expanded, the correct individual actors are found. Date and warped time is also a strong supporting source of evidence.

Weaker forms of evidence include, but are not limited to:

Joining communications A and B, where B seems to require an antecedent. An example of this would be the case in which B had been pragmatically tagged as being an acknowledgement, and A had contained an attachment.

Lexical content similarity

A document modification or access event following communication about the document A communication event following a part of a discussion on the same topic.

In order to further describe discussions at this juncture, the list below states the properties of discussions in one embodiment of the invention.

Discussion properties:

Name: This is calculated from the most frequently occurring document title in the discussion. If there is a tie, one is selected randomly. In the event that a discussion contains no titled items, a title is selected by using the most frequently occurring sentence or phrase in the discussion. In addition, the user may rename individual discussions, or specify alternate naming heuristics using other discussion attributes. FIG. 24a illustrates one embodiment of the relationship of discussions to other objects.

UID: This is generated by the system in order to uniquely identify each discussion. Any reliable UID generation scheme may be used.

Items: ID's of the set of items contained in the discussion.

Lifespan: This is calculated from the time and date stamp on the first chronological item in the discussion, and that of the last chronological item in the discussion 305.

Primary actor 2408: The actor, or in some cases actors, who drive the discussion. The primary actor 2406 will most often be the initiator of the discussion, and is specifically the person who generates both the most content, and the greatest individual actor frequency of items in the discussion. In one embodiment of the invention, the amount of content generated is measured by sheer volume uniquely attributable to them as author, while in others it is only the content in so-called contentful documents that is considered. In one embodiment of the invention, if these last two tests indicate different actors, both actors will be considered primary actors 2406. The number of items generated by that actor will indicate which of the two actors is listed first when the discussion is referenced.

Contributor 2404: Actors who, while not the primary, generate significant content, specifically at least one contentful document. In one embodiment of the invention, contentful document is one containing more than a sentence, and which does not correspond to a known template.

Participant 2304: An actor who has at least performed one action in the context of the discussion, but who is not responsible for the generation of any contentful document.

Observer 2405: An actor who has received information pertaining to the discussion, but for whom there is no evidence of any kind of response or other action.

Reviewer 2407: A user of the system who has seen, and possibly acted upon the discussion—for example, has annotated it.

Topics: A topic is considered to be present in a discussion if a specific ontology class crated to identify evidence of that topic is triggered. Alternately, in some embodiments, this may be done through statistical topic analysis, or a combination of these methods.

Has Deletions: In those cases where a discussion seems to be missing an item that once existed, this value is incremented by 1. Examples of this include, but are not limited to, a missing reply-to ID in an email, a missing early item in a workflow instance in which later items appear, references to named documents that can no longer be located, etc.

Revision: A discussion may have more than one version. This most commonly occurs when new data is made available to the system that results in a modification to the discussion, either an addition of new items, or a reclassification into another discussion of an existing item. In one embodiment, users may modify discussions. In this event, each modification is maintained as a separate numbered version. In one embodiment, any content change in the discussion results in the version number being increased by 1, whereas a change to an annotation results in the addition of 0.1. Note that in such embodiments, 10 annotation changes to the same major version would not cause a change in the major version number. Rather, the $11^{th}$ such change would increment the version by 0.01.

Annotations: A reviewer 2407 may annotate the discussion with arbitrary content, including links to other discussions.

Redact Info: If the discussion contains items that were redacted, this field contains a pointer to the redacted text, both content and (original) relative location in the document Pragmatic Tags 2301: List of the pragmatic tags 2301 appearing in the discussion.

Natural Languages: List of the spoken languages contained in the discussion. Note that isolated individual foreign language phrases or items appearing in quotes will not get counted. In one embodiment of the invention, more than 1 sentence in a language other than the primary one will be counted, but only if the content does not appear inside quotation marks.

Item Types: List of the item types appearing in the discussion. For example: Excel documents, emails, phone calls, etc.

Item Count: Total number of items contained in the discussion.

External Events 2104: List of external event IDs attached to the discussion.

External Documents 525: List of external document ID's attached to the discussion.

Related Discussions: List of discussion IDs that are either precursors to, or offspring of, the current discussion 305. In one embodiment, various similarity metrics may also be included.

Partitions 2401: List of partition markers in the discussion 305.

Pivotal Items 2402: List of pivotal items in the discussion 305.

Max Depth: The greater of the length of the longest partition 2401, and the length of the longest series of items on the same topic(s). Length in this instance is measured by the number of items. In other embodiments of the invention, it may be used both as a query parameter or in relevance ranking; a high max depth on a particular topic is an indicator that there is considerable detailed content relating to it.

Resolution Item 24112: In a discussion 305 which has achieved resolution, the item number containing it. Otherwise null.

Special applications may provide or require additional attributes for discussions 305. For example, whether a discussion 305 contained privileged material in a legal context.

Colored Graph Representation

Embodiments of the invention will be described using a typed colored graph information for the sake of consistency and convenience. FIG. 7a illustrates one embodiment of the colored graph setup, and FIG. 7b provides a colored graph sample. The graph records relations between data items in the corpus as well as additional data items introduced during analysis on the corpus in order to describe derived evidence types and the structure of discussions. In alternative embodiments some of the relations and metadata described below may be represented in a more efficient and/or optimized data structure, such as an inverted index of the type used in information retrieval applications. The following processes and algorithms apply to any alternative embodiment that accumulates evidence which is equivalent to the set of relations and metadata described here.

The graph representation used here adds a type and color to each vertex in the graph as well as a color to each edge of the graph. In the graph implementation described below, each edge and vertex can store a set of data, defined by a metadata scheme 718. Colors are simply a code used to identify the metadata schema associated with each vertex and edge in the graph. Additionally, the color associated with an edge identifiers the type of relationship it defines between two data items. Vertices also have a type associated with them, which reflects the type of data item they represent (for example, Communication Document 510 or Regular Document 515). For vertices the metadata schema is fully specified via the combination of a color and a type. The consequence of this is that each data item in the corpus may be represented by several vertices in the graph, each with a different metadata schema. The different schema are necessary for computing the various evidence types computed during the discussion building process, either to fully describe the computed attributes for each type of evidence or as intermediate data required to compute such evidence.

A typed colored graph CG consists of the pair (CV, CE), where CV is the set of colored vertices and CE the colored edges. C is a set of colors $\{c_x: x \text{ is an integer}\}$ (see blocks 702, 708.) T is a set of types $\{t_y: y \text{ is an integer}\}$ (see block 704.) D is a set of unique ids $\{d_n: n \text{ an integer}\}$ which identify items in the corpus (see block 706.) CV is a set of colored vertices $\{v_i = c_x t_y;$ i an integer, $c_x$ element C and $t_y$ element T$\}$ (se blocks 702, 704, 706.) CE is a set of colored edges $\{e_j = c_x v_k v_l;$ element C; $v_k$ (head vertex) and $v_l$ (tall vertex) are elements of CV$\}$ (see blocks 708, 710, 712.) Edges can be either directed or undirected, which is determined by the edge color (see below). In the implementation described all edges are navigable in either direction, the preferred direction of an edge is recorded as part of the edge key.

The evidence accrual process consists of adding vertices and edges to a colored graph based on analysis of internal items in the corpus. Discussions are represented as an additional set of vertices and edges added during a decision process which takes as input this accrued evidence and determines which items are to be linked together into a particular discussion. Further edges are later added for relations between discussions and external items from the corpus as well as derived relations between discussions. The notations used are introduced below.

Vertex Types:

The colored graph used in one embodiment of the invention has the following vertex types (see block 704):

- AR: Alias Record—name address pairs extracted from documents 505. These pairs will be merged in order to construct actors 310.
- A: Actor—an actor as defined earlier 310.
- P: Personality—an actor personality 1220 is identified via a distinct behavior pattern exhibited by an actor 310. (There may not always be enough evidence to recognize two apparent actors 310 as two personalities 1220 belonging to the same actor 310, or such evidence may only surface at a late point in an incrementally updated system.)
- NE: Named Entity—extracted named entities that do not resolve to any of the other defined data item types. Examples of named entities include, but are not limited to: document titles 505, and actor 310 names.
- CE: Communication Event 570—The significance for discussion 305 building is that these events 570 will appear as part of an interactive discourse between two or more actors 310.
- RE: Regular (Internal) Event 2102—These events 2102 may provide evidence for linking together other data items.
- EE: External Event 2104—Only participate in relations built following discussion 305 building.
- C: Communication—The significance for discussion 305 building is that these events will appear as part of an interactive, turn based discourse between two actors 310. These items will most often provide the "backbone" for a discussion 305.
- RD: Regular Document 515—These items most often appear as items related to items directly involved in a discussion 305.
- ED: External Document 525—These items only participate in relations built following discussion 305 building.

In the implementation of the system these types may have some distinct subtypes. For example Communication items consist of email messages, IMs, and so on. In practice this means that the methods for obtaining an item id may be different for each subtype, or there may be different rules for extracting metadata fields for the various metadata schemas associated with the type.

Vertex Colors:

The colored graph used in the preferred embodiment of the invention has the following vertex colors. Note that for implementation purposes of efficiency of sorting and retrieval of vertices, any of these colors may be replaced by a set of equivalent colors.

- AP1, AP2: Actor Analysis—vertices with these colors store alias record data.
- T: Threading—vertices with this color store data used for constructing relations that can be directly computed from the data item itself without inference (see blocks 736, 724, 738, 746.) For instance email message ids specify direct reply and forwarding relationships. Or individual IMs captured in a session log. Meta-data for this color includes cc: versus bcc: and to: information.
- S: Similarity—vertices with this color store data used during computation of various sorts of similarity between non-fielded regular documents 515, which often require specialized secondary indexes to be built (see blocks 744, 740, 748, 752, 758, 762.)
- R: Reference—this color is used for generic vertices (see blocks 756, 742, 750, 754, 760, 764, 2640, 2642, 2644.) These vertices do not need to store any specialized metadata.
- D: Discussion—vertices coded with this color store metadata describing derived attributes of discussions 305 (see blocks 722, 726, 2638.) There is typically one such vertex at the root of a discussion 305.
- X: Auxiliary Discussion—some vertices within a discussion 305 may be marked with this color to indicate specific features such as a splitting point or a pivotal messages 2402.

Edge Colors:

Note: edges can be heterogenous, that is they may link together nodes of different colors and types. A specification of the vertex types that can be linked via each edge type follows the description. Brackets, { }, are used to specify a set of possible types, single headed and double headed arrows, →, <->, are used to indicate the preferred direction of an edge. The colored graph used in one embodiment of the invention has the following edge colors.

- FT: "from-to"—indicates that a communication was sent from the head identity to the tail identity.
  These Specification: AP1.AP2→AP1.AR
- TT: "to-to"—A relation established between recipients of the same mail. Provides negative evidence towards merging the two recipient alias records.
  Type Specification: AP1.AR<->AP1.AR
- CA: Cluster Alias Records—Edges used during merging of alias records to find actor personalities 1220.
  Type Specification: AP2.AR<->AP2.AR
- T: Threading—Indicate direct, rather than inferred, links between items(see block 730.) These edges are added prior to the process of discussion 305 building which discovers additional causal relationships between items.
  Type Specification: T.C→T.C, or
  T.CE→T.CE
- AT: Attachment—Simply records attachment relationships between messages and their attachments, which are stored as separate data items in the corpus.
  Type Specification: T.C.→{T.RD, T.C.}
- HR: Hard Revision—REcords direct known relationships between versions of a document 505, which hav ebeen extracted from an external source such as a source control system.
  Type Specification: R.RD→R.RD
- CR: Clustered Revision—Links between revisions of a document 505 identified through the document lineage assessment process.
  Type Specification: S.RD<->S.RD
- TM: Template—Links between a set of distinct documents 505 that are derived from one base version.
  Type Specification: S.RD<->S.RD
- TC: Topic Cluster—Links between items that both contain text referring to the same topic 315 (see block 734.) Derived via standard practice topic 315 clustering approaches.
  Type Specification: {R.CE, R.RE, R.C, R.RD}→{R.CE, R.RE, R.C, R.RD}
- SC: Shared Content—Links together data items sharing common textblocks (see block 732.) This can occur when material is cut and pasted from one item to the other, or when a reply message quotes material from its parent.
  Type Specification: {S.CE, S.RE, S.C, S.RD}<->{S.CE, S.RE, S.C, S.RD}

SD: Shared Document 505—Links together items related to a common document 505 in some way, either via direct attachment, references to the document 505 in the content of both items, and so on.

Type Specification: {S.CE, S.RE, S.C, S.RD}<->{S.CE, S.RE, S.C, S.RD}

SR: Shared Reference—Links together data items with any other shared references to named entities that have been extracted during preprocessing.

Type Specification: {S.CE, S.RE, S.C, S.RD}<->{S.CE, S.RE, S.C, S.RD}

CS: Content Similarity—Links together data items with similar lexical content. This measure is based on the amount of similar material between documents 505. For example it can be used to derive a rough measure of the amount of new information introduced in one item relative to an earlier item.

Type Specification: {S.CE, S.RE, S.C, S.RD}<->{S.CE, S.RE, S.C, S.RD}

TR: Trigger—Presence of a link indicated that an event has been found to trigger a subsequent communication in some way Type Specification: {R.CE, R.RE}→{R.C}

R: Reference—Links an item to named entities that can be resolved to other items in the corpus.

Type Specification: {R.CE, R.RE, R.C, R.RD}→{R.NE, R.CE, R.RE, R.RD}

CL: Clique—Presence of a link indicates that two personalities 1220 are part of the same social clique, also called a circle of trust 1505.

Type Specification: R.A<->R.A

W: Workflow 2409—Presence of a link indicates that two items represent successive steps in a formally defined workflow 2409.

Type Specification: {R.CE, R.RE, R.C, R.RD}→{R.CE, R.RE, R.C, R.RD}

AW: Ad hoc Workflow 2409–Presence of a link indicates that two items represent successive steps in a sequence discovered in patterns of communications in the corpus Type Specification: {R.CE, R.RE, R.C, R.RD}→{R.CE, R.RE, R.C, R.RD}

GB: Global Burst—Links two items from the same author with a time delay shorter than the average frequency, relative to a time window, computed for that author, in practical implementations once the frequencies over various windows have been computed for an actor 310 whether or not a pair of items are part of a burst of activity is easily computed on the fly, however the link type is described here for sake of consistency.

Type Specification: R.C→R.C

PB: Pairwise Burst—As for the GB, but computed between pairs of actors 310.

Type Specification: R.C→R.C

CO: Collaborators—Presence of a link indicates that two actors commonly collaborate on documents.

Type Specification: R.A.<->R.A

D: Discussion—Links items that are members of a discussion 305 (see block 728.) Contains a vertex id for the root vertex of a discussion 305.

Type Specification: {D.CE, D.RE, D.C, D.RD}→{R.CE, R.RE, R.C, R.RD}, or
{R.CE, R.RE, R.C, R.RD}→{R.CE, R.RE, R.C, R.RD}

AUX: Auxiliary Discussion—Links items that should be included in views of a discussion 305 but are not available as attachment points for later items in the discussion 305.

Type Specification: {R.CE, R.RE, R.C, R.RD}→{R.CE, R.RE, R.C, R.RD}

CTX: Context—Links external to internal items. These links are constructed in the post discussion 305 building analysis phase.

Type Specification: {R.EE, R.ED}→{D.CE, D.RE, D.C, D.RD, R.CE, R.RE, R.C, R.RD}

Colored Graph Implementation

In one embodiment, the colored graph is implemented as two persistent lookup tables, one for vertices (see block 714) and one for edges (see block 716.) Vertices are related to items via a unique index computed for each item. A vertex is uniquely specified by its color and id. Thus an item can be related to multiple vertices in the graph, each with a different color. The interpretation of data stored in the vertices table entry is determined by the vertex's color. The item id is also used to refer to the item in auxiliary data stores such as inverted indexes. For the sake of efficiency and to improve the locality of keys in the vertex and edge tables, data item ids encode their type and a time associated with the item. These keys are sorted lexicographically first by type, then time and then on any other attributes encoded in the id. Edges are uniquely specified by their color, and the vertex keys of their head and tail vertices. As with vertices the interpretation of data stored in the edge table is determined by the edge color.

The tables support iterations over keys in sorted order. Iterations can be specified over results of a range query 320. For sake of efficiency most evidence computation is implemented as a linear scan over edges in key sorted order where possible. A large exception is for an embodiment of the final discussion 305 building phase which must traverse various trees in the graph.

Vertex keys consist of concatenation of color and unique id. Thus vertexes of a given color and type can be retrieved via a single query 320 versus the persistent data store.

Edge keys consist of the concatenation of edge color, head and tail vertex ids and a flag indicating that the edge is directed or undirected. When an edge is added to the graph a reverse edge is also added to ensure navigability in both directions.

Actor Presence

The set of actors present in a discussion at each interaction defines the actor presence model 2654. FIG. 26a illustrates one example of an actor presence model evaluation. A discussion is defined by the participation of a particular set of actors over time. This set of actors may evolve as actors are added to or dropped from the ongoing discussion. Actor presence 2654 is modeled for the purpose of calculating the likelihood that a particular item is part of the discussion. Additionally, for purposes of reference and of querying, the presence model is stored as metadata on discussion vertices.

The actor presence model defines several levels of participation: primary actors 2406, contributors 2404, participants 2403, and observers 2405. A discussion may have an arbitrary number of actors associated with it, not all of whom are equally important. In fact, some actors may be totally passive throughout the discussion. In such cases, there may not even be any evidence that they ever opened any of the documents associated with the discussion.

In addition, some applications of the invention have the notion of a "viewer" or "reviewer" 2407. This is any user who has viewed individual discussions 305 or documents. This user may, or may not correspond to an actor represented in the corpus. Rather there is a mechanism of maintaining an adult trail on the retreival of information in the system. To this end, each time a discussion or individual document is viewed or otherwise accessed, its "viewed" count (or other access count) is incremented by 1. A separating viewing log is kept, with a basic record structure of: (User ID, Discussion Viewed, Timestamp.)

This adult trail allows the system to track not only which reviewers 2407 accessed which discussions 305, but also the relative importance, or popularity among reviewers 2407, of discussions 3056. Records are kept of items including (but not limited to) the number of queries 320 that resulted in a particular discussion 305 being retrieved; the number of drill-down examinations of each discussion 305 (for example, accessing its timeline); the number of times the discussion 305 was sent as an attachment.

In embodiments allowing modification of the information, a new version of the discussion 305 or document 505 is created; annotation information is added to the log record where present, as are deletions (where permitted.)

Modeling Actor Presence in a Discussion

FIG. 26a is a diagram of one embodiment of an actor presence model evolution The primary actors 2406, contributors 2404, participants 2403 and observers 2405 fields stored as discussion metadata collectively define the actor presence model 2654 (see blocks 2646, 2648, 2650, 2652). The presence model 2654 measures the level to which each member is intrinsic to a discussion. In one embodiment of the invention, during the construction of discussions candidate data items are evaluated for consistency with the current actor presence model 2654 when deciding whether or not the item should be linked into the discussion. For example the probability that a primary actor 2406 may drop from a discussion is much lower than for an observer 2405. Since actor presence can evolve throughout the lifetime of a discussion, for example actors may be added or dropped at various points, the presence model 2654 is not particularly amenable to clustering approaches. An alternate embodiment of the presence model can be defined using membership levels in place of the ranking induced by the four categories mentioned above. One embodiment of the invention uses ranking to simplify integration of heuristic and rule based methods for determining actor presence.

The following section describes a general procedure for constructing the presence model given a particular tree of sequentially related data items. In one embodiment, this procedure is generalized during discussion construction as the problem becomes one of finding a set causal relations that create a consistent presence model.

With reference to FIG. 26a, the status of an actor may change with each successive message. The pragmatic tags 2630, 2632, 2634, 2636 listed on the left demonstrate a very typical tag sequences: "Anthony Mavis" initiates the discussion, starts with a question, "Brad Norstrom" asks for a clarification while inviting "Elvira Quent" into the discussion, "Elvira Quent" gives a response which presumably answers the question, and "Carol Ogilvey" confirms this by thanking "Elvira Quent".

A simplifying assumption is made that participants 2403 in a discussion generally view items in the time order that they arrive. Therefore the evolution of the presence model can be determined by sequentially ordering all items in a discussion 305 by time. This means that the presence model for a discussion 305 at any given point in time is the presence model as calculated for the latest member of the discussion 305. In some embodiments of the discussion 305 may have several branches that remain contained inside it (as opposed to an offshoot), only if the presence model remains consistent. If two branches develop in a discussion that each have a different subset of actors, the parent discussion 305 has split into two new discussions. As elsewhere noted, two discussions 305 may merge if an item is strongly related to other items in the same discussion 305, but if the actor presence model changes the system will start a new discussion 305, at the point the two merge. When this occurs the discussion 305 vertex will be marked so that the possible merging of the parent discussions 305 will be recorded and can be queried by the system.

The following types of evidence can be used to evaluate changes in presence level for the author of each new item as it is evaluated:
  pragmatic tags (R colored vertex metadata)
  membership in communication time burst clusters (GB and PB colored links)
  membership in actor cliques or "circles of trust 1505" (CL colored links)
  membership in a collaboration cluster (CO colored links)
  job title/role and reporting relationships (A colored vertex metadata)
  frequency of participation (D colored vertex metadata)

Alternative embodiments may add other evidence types as well as additional heuristics to those mentioned below.

For the purpose of this description the starting point is assumed to be a list of Communication documents (C) 510 and Communication Event (CE) 570 data items. The construction method consists of iterating through the set of data items in time order. The actors 310 associated with each item are retrieved and assigned a level of presence, the actors 310 are added with a frequency count of 0 if not already in the presence model or they are moved to the appropriate rank set if necessary and the frequency count incremented.

Rank assignment is done on the basis of evidence accumulated during a traversal of items in the set. Most of this evidence can be maintained as a simple set of tallies. For shorter discussions 305 it is sufficient to sum tallies as, for example, evidence for primary involvement early in a discussion 305 should be sufficient for establishing the actor 310 as a primary actor 2406 overall. However, when confronted with longer discussions 305 or a need for incremented building of discussions 305 a tally computed over a sliding time window is more appropriate. For the sake of efficiency, one embodiment, these tallies can be approximated by:
  $(t_1/w)x_i + ((w-t_i)/w)x_{i-1}$, if $t_i <= w$
  $(w/t_i) x_i$, otherwise
  where $t_i$ is the time interval from the current item to the last item,
  w is the length of the window $x_i$ is the quantity to be tallied Note: the time interval will be adjusted to account for explained actor 310 absences and regular activity patterns, as described for other time based calculations used in the invention.

The tallies recorded may include, but are not limited to:
  count of communications sent, events that trigger other communications (these events include revisions on a shared document 505, events 1525 marked as triggers for a communication, etc . . . )
  distribution of pragmatic tags, i.e. tallies of initiator, clarifier, question, filler, response, and summarizer tags
  count of communications that are part of a pairwise burst between author and a recipient without being part of a global burst for the author.

The Discussion Building Process

Two embodiments of the invention are described for discussion building. Each embodiment derives several types of evidence that are used to join sets of items into a discussion 305. Each of these embodiments describes an initial construction phase, which yield clusters of items with strong evidence for membership in the discussion 305. Following this phase another pass is performed which refines these clusters and adds discussion 305 links.

Phase 1: Construct initial discussion clusters

FIG. 24*b* is a flowchart of one embodiment of constructing the initial discussion clusters. In one embodiment of the invention, discussion clusters will be constructed and recorded by placing hypothesized discussion edges in the graph. Initially a clustering process is performed on the actor sub-graph (Block 2412). Since the discussion building process may provide new evidence that can be used to further correct the actor graph, the actor graph will be rebuilt after discussions have been built. This clustering pass provides an approximate set of actors who interact the most frequently and substantively with one another.

In addition to the previous passes of analysis performed, such as computation or near duplicates and textblock identification, passes of clustering over indigenous corpus items are performed. These involve well-understood clustering techniques and are therefore not elaborated upon here. Topics are identified using topic clustering. The clusters are recorded in the colored graph with TC-colored links (block 2413). Clusters of items with similar lexical properties are identified, for example via number of shared frequency lexical items or shared frequency collocations. These clusters are recorded with CS-colored links (block 2414). Sequences of documents which are part of formal workflows are identified and the sequences stored with W-colored edges (block 2415). As described elsewhere in the patent ad hoc workflows are computed and recorded with AW-colored edges (block 2416). Note that in one embodiment of the invention, the computation of AW-colored edges requires an initial pass of discussion building in order to accrue a sufficient amount of evidence. In continuous or incremental versions of the system, this can be done after the initial processing of the corpus, and then re-computed at the same interval as structure documents are re-evaluated, or at some constant multiplied by this interval, since ad hoc workflow processes do not change frequently. In forensic versions of the system, an optional second pass on the corpus may be performed in order to include AW-colored edges as an evidence source.

In one embodiment, extraction of named entities (block 2417) is based on a mixture of techniques, including searching for known named entities that have already been identified. Known standard patterns, including but not limited to URLs, email addresses, host names, and IP addresses are identified using regular expressions. A shallow parser (as previously described for pragmatic tagging) may be employed to identify potential named entities such as proper noun phrases. If a shallow parser is invoked, perform pragmatic tagging (though some embodiments may opt to delay until the final phase of discussion building as only the items found to be in a potential discussion cluster need be examined). All known and suspected named entities denoting specific documents or resources, such as URLs, are placed in an inverted index. Remaining known and suspected named entities are placed in a separate inverted index. (A suspected named entity would be one or more contiguous tokens that had been pragmatically tagged as an entity, but an otherwise unknown one—for example, an unknown actor 310 name.) Clustering is performed over the first index in order to build SD-colored edges, for documents 505 that share references to external documents 525. If any documents 505 can be found within the corpus, R-colored edges may be added to the items containing the document 505 reference. Clustering is performed over the second index in order to build SR-colored links for groups of items sharing common references. (The preceding paragraph corresponds block 2417.)

Literal communication threads such as reply-to, forward, newsgroup postings, and the like, as well as workflows 2409, shared attachments, and shared content (e.g. textblocks and quotations shared between documents 505) will be used to provide a "backbone" that potential discussion 305 clusters will build on. As most discussions 305 will be initiated and sustained through communications, start by identifying thread "clusters" (see blocks 2418, 2419, 2420, 2423.) Note that some of this information, such as membership in strict email threads can be constructed through means other than clustering analysis. This is not necessarily the same sense of cluster as for the other clusterings described here. Since thread clusters are well ordered, create a tentative D-colored vertex at the root of the thread cluster (see block 2421.) Walk the tree of T-colored edges and create a corresponding tentative D-colored discussion 305 edge (see block 2422.) Tentative discussion 305 edges are decorated with a flag that gets set when the edge is either finalized in phase 2 or removed. Similarly find all W-colored clusters and if the root does not already have an outgoing D-colored edge then create a tentative D-colored vertex and add edges as for threads (blocks 2424, 2419, 2425, 2421, 2426, 2423). In one embodiment, AW-colored clusters are treated similarly (blocks 2427, 2419, 2428, 2421, 2429, 2423).

In one embodiment of the invention the actors associated with each initial discussion cluster may be augmented by the following this procedure. For each discussion cluster (blocks 2430, 2419, 2428) identify all associated actors and if all those actors fall into one of the actor cluster's (computed in the first step), augment the set of actors recorded for the discussion cluster with members from the actor cluster (blocks 2431, 2432). For those discussion cluster that have associated actors that fall into more than one actor cluster, removed all actors who were only cc'd or bcc'd in the discussion cluster, leaving only authors and direct (e.g. To: in the case of an email) recipients (block 2433), and repeat the test (block 2434). If the remaining group falls into one cluster then associate the discussion with that cluster (block 2432). Associate the remaining discussions with the union of the respective clusters in which their associated actors occur (see block 2435). This approach will potentially cause discussion clusters to grow larger than they otherwise would have when going through the expansion steps below and therefore the system less likely to miss elements that should have been included in a discussion. An alternate embodiment can simply start with the thread clusters and the identified actors associated with items in the cluster This step will identify communications that may be part of the same discussion on the basis of actors coordinating modifications on a document. For each discussion (blocks 2430, 2438, 2449.), collect the set of all document items reachable from an AT-colored link originating at an item in the cluster and all document items reachable through R-colored links added during named entity extraction (block 2439.) For each document item in the set (blocks 2439, 2440, 2448), identify all other document items reachable through CR-colored links (block 2441), i.e. near duplicates of the attachment that are not in a template cluster. Retrieve modification events pertaining to these documents (block 2442)—including creation and deletion or removal from a repository. Scan for the modification events (blocks 2442, 2443, 2447) which both occurred within the lifespan of the discussion cluster and were committed by one of the actors associated with the discussion (these events must be within cluster lifespan, have an actor in the actor set, match actor heartbeat, and pass all heuristics—see block 2444.) Recall that this set may have been augmented from the contents of actor clusters. Additionally comparison of the time of the event to actor heartbeat and other similar constraints may be applied (block 2444.) Add tentative discussion edges from the previous and next revision to the modification event that lies between them (blocks 2445.) Now update the list of actors associated with this "expanded thread" (to also include those identified in any of the modifications events that were pulled in, or who were affiliated with the document by dint of authorship, either by being the author of the item associated with the event, or the author of the previous or next item identified by event (block 2446.)

The next steps examine events for inclusion. FIG. 24d is a flowchart of one embodiment of incorporating events into discussions. These events typically provide sustenance for a discussion. An example of event sustenance might be a document modification or access event following a communication about the document, which then allows the system to find relationships with items related to the next version of that document. This step is somewhat heuristic in nature in that there are a large number of sustenance "scenarios" that must be handled on a case by case basis for differential event types. The overriding principles are that the communication event must relate to an item already in the discussion cluster and relate to following items that would therefore get included in the discussion. Addition of these events in constrained by the same factors as the previous step and will update the actor set associated with each discussion cluster as above. Event processing includes but is not limited to the techniques described below.

Calendared meetings represent another important event type (block 2125, 21450), since often important communication among actors may occur at meetings, leaving no other electronic evidence trace. Calendared meetings are associated with the appropriate cluster of actors based on the actors noted in the meeting entry. If the meeting has a semantically meaningful title (i.e. something other than "meeting",) or description (see blocks 2472, 2475), the system will try to determine a topic for the meeting. In this case, the discussion clusters whose actor sets contain the meeting's actor set and match on topic and general timeline will be considered candidates for the inclusion of the meeting. However, if any of the possible candidates contain content which refers to a meeting on that date and time, the calendared meeting will be included in those discussion clusters and not any others. If the meeting has a transcript or meeting minutes associated with it (as determined by date and time and meeting attendees, see block 2467) the meeting will be attached to whichever discussion clusters contain the transcript (see blocks 2466, 2468, 2469) In one embodiment, it will also be used to determine topic (block 2473). Failing both of these, a meeting will be attached to any discussion for which it is timeframe appropriate, and which contains at least some of the set of actors from the meeting (see block 2481). Note that there is an important exception to this; a secretary or admin may be substituted for the actor she or he supports. In one embodiment, such relationships may be added by the user.

In one embodiment, calendar events 2125, such as "end of quarter" will be inserted if there is content present referencing them (block 2476). In another embodiment, when and whether to add such events 2108 globally is user-configurable (block 2478).

Voicemail and phone events 2114 will be automatically inserted if they are between two actors 310 who are either primary actors 2406 or contributors 2404, and if they fall within the required time range (block 2471). This is because failing any additional information, there is no way to known which of the possible discussions 305 among these actors 310 it should be linked into. Therefore, the system takes the conservative path and includes them in all such discussions 305. This behavior is helpful for investigative purposes; when a witness is being interviewed, they can perhaps clarify the purpose of the phone call. In the event that they do, the user may add a meta-document 560 containing the witness' testimony and have that document 560 be considered a related document to that event. Note that this may potentially cause an event to be removed from one or more discussions 305 and potentially added to one or more others.

Employee or actor lifecycle events 535 are added automatically by the system in order to explain or annotate an actor's presence or absence (block 2474). For example if Actor A started off participating in a discussion and then drops out of it, a lifecycle event 545 noting that he had been transferred to another division would be automatically inserted.

All other types of events must meet the actor 310 and time test, but must also have been explicitly mentioned in the content. This is to prevent floods of events with limited or useless information from getting attached to numerous discussions 305. For example, an actor 310 may have a task list that commingles professional tasks and work items with personal ones, such as going grocery shopping. Clearly, it would not be appropriate behavior for all checking off of such tasks to be appended to any discussions 305 that that actor 310 had participated in.

Next, "solo" communications that do not appear in any T-colored edges, are examined (see blocks 2450, 2452, 2459.) These mails are linearized in time, accounting for clock drift, tagged by the IDs of their attachments, and associated with a particular actor 310 cluster as previously described (see block 2451.) The system now considers the evidence constructed during the earlier clustering stages, namely the SR, SD, SC, CS and TC edge colors. If the solo is related to one or more members of a discussion cluster via one of these edges (see blocks 2453, 2454, 2458) and it matches on actor 310—if the actors 310 associated with the solo are a subset of actors 310 currently associated with the discussion cluster—and fails either within the time span of the discussion cluster or within an interval of I of it, where I is the length of time from the occurrence of the first element to the last (see block 2455), and the solo matches actor heartbeat, and passes all heuristics, create a discussion edge to the solo. If the current vertex is a possible new root vertex (has an edge to the current root vertex—see block 2460, this involves (block 2461) creating a D-colored vertex on the core id of the solo vertex, copying attributes from the current discussion vertex, adding a discussion edge, and removing the old discussion vertex. If the current vertex is not anew root vertex (does not have an edge to the current root vertex—see block 2460) this involves creating a discussion edge from the related discussion member item (block 2462.) If there is an overlap in actors 310 between the solo and the expanded thread, but not complete containment, the solo will be placed in a holding set for later possible "best fit" placement (see blocks 2456, 2457.) Additionally a solo may become the new root for a discussion cluster (see block 2460), in which case the prior root is removed and all attributes transferred to the new root vertex (see block 2462.)

Next, the discussion 305 clusters themselves are clustered. In an alternate embodiment, only the communication thread clusters are merged, resulting in less "spread" of the clusters. Clustering proceeds (block 2501) on the SR, SD, SC, CS, TC edge set in addition to the actor set associated with each discussion/thread cluster (in one embodiment, this involves adding links between discussion vertices, weighting them based on number of links and actor score, and sorting and removing links below a given threshold). This is done in order to determine which clusters should be merged in the same discussion 305 (see blocks 2502, 2503, 2504, 2508, 2509.) Discussion/thread clusters which end up in the same cluster are possible candidates for unification. Discussion 305 clusters are unified by adding discussion edges corresponding to SR, SD, SC, CD and TC edges between members of the respective clusters (see blocks 2514, 2515, 2518), from the vertex which occurs first to the other (see blocks 2516, 2517.) These links are only created if the time span is consistent for that pair (according to actor heartbeat, for example). This is determined as follows:

If discussion A and discussion B do not overlap in time, but one ends within a distance of I of the other, where I is the max time span(A, B), they are unified (see blocks 2505, 2506.) (Note that some embodiments may use other means of determining the value for I, for example I could be the mean time between messages in the thread multiplied by a constant.)

If discussion A and discussion B occur further apart than I from one another, they will no be unified unless there is no other thread in the same cluster (see block 2507). This is because communications on a topic 315 that is incredibly rare may very well be related no matter how far apart in time they occur.

If Thread A and Thread B do overlap, or are concurrent in time, they will be united only if the actor 310 involvement is substantially the same between the two (see block 2513.) In one embodiment, this is determined as follows: the actors 310 are ranked by how many emails they sent, and how many they received. The former is scored at twice the weight of the latter. If any actor 310 receives a zero in either thread, the two threads cannot be joined. This is because the absence of a particular actor 310 may be the very reason for the existence of the second thread, and therefore the system would be ignoring potentially important sociological context if it were to combine the two threads. In some embodiments, the ordinal ranking of the actors 310 between the two threads cannot differ by more than one position in order for the threads to be joined. In other embodiments, this is simply a requirement that the actor 310 presence models of the two threads be identical.

As the next to last step, the question of what the proper time frame for the discussion is recalculated based on the date and timestamps of the items that are currently first and last chronologically (see block 2510.) As a result of this possible lifespan change, additional items may be added to the discussion 305. This includes any solos being held in a possible fit category will be re-evaluated (see block 2511.)

At this point, these "proto-discussions" are really candidate discussions 305 awaiting a sanity check or refutation test pass. Discussion 305 links will be finalized in pass 2 (see block 2512.) (See the subsequent section entitled "Finalization of Discussions.")

In another embodiment of the invention, discussions 305 are built via a series of constrained item clusterings, where the valid item types are: communication documents 510, regular documents 515, and all kinds of internal events (see block 515, 510, 2102 in FIG. 25b.) During each phase the clusters obtained are decorated by the elements that describe a discussion 305. The decorated top-level clusters are the discussions 305. In the next clustering phase each cluster is considered as a single point and is linked further with other clusters. Conceptually this is a form of hierarchical clustering, but each level of the hierarchy is built with differently turned algorithms and the larger clusters that a level produces have a particular interpretation and are decorated with different information. (In some cases the clusters created at a lower may be reconsidered.) Specifically, this is implemented as follows:

The base set of vertices is the set of all items. (Recall that exact duplicates have already been eliminated by the initial indexing process, but all meta-data information for the duplicates, such as location of occurrence, and timestamp is retained.)

The first "clustering" phase considers only communication documents 510. In this initial pass, each reply chain or "thread" of emails is clustered together (see block 2521.) This phase recreates the "reply-to" and "forward" relationships between emails with T-colored links. T-colored vertices are created to track metadata used during the clustering procedure.

The next clustering phase clusters together near-duplicate regular documents 515 (see block 2522), as well previously described. In the process, the sets of metadata for each exact-duplicate instances are merged into a set of metadata for each Near-Duplicate instance. Note that this clustering is not applied to communication documents 515 at this point in the process because such documents are versionless.

The next clustering phase covers document 505 metadata matches such as by title or subject, and workflow 2409 (see block 2523.)

The next clustering phase considers all attachments, and other documents 505 linked to communication documents 510, including those incorporated by reference or hypertext link (see block 2524.) For the following description, all such documents will be referred to as "attachments." For each attachment, the system constructs a ranked list of documents 505 that are proximate to the attachment in the derivation history tree produced as a result of the previous process. For communications 510 that "score high" (are compatible) on all counts (derivation history closeness and shared attributes): create a cluster link between the attachment and the communication 510. The link extends from the attachment to its communication 510. If the second communication 510 is also an attachment, then the link also extends to this item. In this case the effect is to merge into a single discussion 305 two communication threads that exchange closely related versions of an attachment. Mark the resulting cluster (tentative discussion 305) with the Attachments used to compose it.

Apply the same technique as the previous replacing Attachment with the communication 510 body for only those items which share more than 2 textblocks with a regular documents 515 (see block 2525.) This step is performed in order to catch the cases where a draft document has been typed directly in the communication 510 rather than in a text processor. This also catches the cases where an email agent or similar mechanism has converted an attachment to inline content.

Then perform the event integration as described in the previous embodiment, and as noted in FIG. 24*d* (see block 2526.)

In one embodiment, the following step is performed involving negative evidence and link-breaking: for each tentative discussion 305 apply a fast bisection over its items (see block 2527.) (This is a step usually taken in a bisecting top-down clustering) The bisection dimensions take into account text features but also time and actors 310. Consider the two resulting halves of the discussion 305. If the computed halves are not compatible with the discussion 305 topology (for example are randomly dispersed in an email thread) then stop: the bisection negative test is inconclusive. Compute a dissimilarity measure between the two halves. (For example: mutual information). If the dissimilarity is small then stop: the bisection negative test is inconclusive. Else the test may be a sign of topic drift with a sustained discussion 305 among actors 310. Or it may be a sign of mistake choice of a link during clustering. To solve both problems, cut the discussions 305 into 2 pieces along a minimum cut of the cluster edges (as determined during the topology compatibility test). Re-pass the resulting smaller discussions 305 through the negative evidence test so that may be broken down further if appropriate (see block 2528.)

Phase 2: Finalization of Discussions

Following the accrual of evidence via the edges added to the colored graph in the first phase D-colored vertices and edges are added to the graph to represent the final form of the discussion 305. The primary techniques that are used in this phase are the construction of the actor presence model 2654 and construction of a Markov chain of pragmatic tags 2301.

This phase has several purposes. Since much of the evidence accrual to this point has been based on clustering and pairwise relationships between items, an extra pass is required to filter out items that do not match with the history and evolution of accumulated discussion 305 properties. This procedure also resolves any remaining ambiguities as to where individual items should be placed in the discussion 305. The evolution of the actor presence model over time is used to determine where discussions 305 end, split or merge.

The procedure first evaluates a set of candidate items, as well as which items could be considered their direct parent in the discussion 305, recording the results for each. It then walks back through this record and creates discussion 305 edges. It uses two secondary data structures, a chart (see block 2588.) and a lookup table (see block 2589.) indexed by item id. Chart data structures are standard practice in a large class of parsing algorithms. Briefly a chart is a sequential list of vertices to which edges (see block 2590) are added which are decorated with data recording the result of a computation involving all vertices between the head and tail of the edge. For the purpose of this procedure, it can be implemented as an array with one entry per vertex. Each entry contains another array which contains all edges that terminate at that vertex. An edge consists of a record containing the head and tail vertex indices and any other data necessary to record prior results. The chart is supplemented with a lookup table that associates an item id with the index of the chart vertex that was current when that item was evaluated. Chart edges keep track of a candidate vertex (see block 2595), the proposed parent of that vertex (see block 2596), a proposed structural operation which determines whether the vertex will be added to the discussion or not (see block 2593), a cut flag (see block 2597) which is used for bookkeeping, a parent edge (see block 2598) by which a sequence of operations leading back to the beginning of the chart can be traced and the score (see block 2594) for that path. In addition at each edge the current overall actor presence model is kept and a separate actor presence model is kept for considering only the parents of the end item on the edges. The pair will be compared in order to look for discussion 305 splitting points. The models can often be shared across multiple arcs as seen below, and other schemes such as only recording changes can be used to reduce memory consumption if necessary.

The procedure uses a fixed size window to delay decisions until the downstream implications of those decisions can be taken into account. The size of the fixed window can be determined using parameter estimation techniques. Therefore the chart could actually be implemented as a FIFO queue or a circular array.

The procedure is as follows:

Start with a schedule of item vertices to be examined (see block 2532.) For a non incremental process the schedule can be initialized by scanning the colored graph looking for D-colored vertices. In an incrementally updated graph the process is more complicated. Vertices that were left unresolved from the last pass are added to the schedule if new vertices are found to be related to them. In addition all D-colored vertices marked as tentative (i.e. they were added during the last incremental update) are added to the schedule.

Remove the next item vertex from the schedule (see block 2522), this becomes the root item vertex.

Initialize the chart, chart lookup table and set the chart vertex id to zero (see block 2534.) If the vertex is a discussion 305 vertex (see block 2535) then add an initial arc, proposing an 'add' structure operation (see below for the role of the proposed structure operations), initialize the score and presence models for the schedule vertex, and set the chart vertex index to 1 (see block 2537.) Otherwise, initialize the lookup table with member vertices of the discussion (see block 2536). Each member should be placed in the table as its own value, i.e. if a vertex A is the key, A is the value retrieved for the key.

Construct a list in date/time order of vertices that are reachable via tentative discussion edges (see block 2538.) This list should be constructed incrementally during the traversal rather than ahead of time.

For each item added to the chart increment the chart vertex (see blocks 2556, 2557.)

For each tentative member vertex first check to see if it has a parent in the lookup table, if it does not then skip it (see blocks 2539, 2540, 2551.)

Determine the change in author's status (one of primary, contributor, participant, observer) in the overall presence model (see block 2541). Keep track of this change as it will also be applied to the models kept on each arc.

For each proposed parent (see blocks 2542, 2543, 2550,) propose a set of edges which correspond to the following proposed structure operators:
add item to discussion, 305
split the from discussion, 305
cut item from discussion, 305
if vertex already a finalized member of another discussion merge it with the current discussion (see blocks 1544, 1545, 1546.)

For each proposed edge (see blocks 2547, 2549) determine a likelihood score (see block 2548.) This score is determined by comparing the stage of the discussion as recorded on a prior arc in the chart with the current state of the discussion. This score is calculated from these three main types of evidence.

1) The likelihood that the detected change in the actor presence model is consistent with the structural operator proposed for the current edge, as shown in blocks 2561 and 2567. In block 2561, the system maps from an overall presence model (on discussion edge incident to parent vertex), to which it adds the following: a branch presence model (reusing the overall presence model above); a previously calculated change to the presence model; and a proposed operation on the current chart edge to a pair of states in the first Markov model. The system then obtains a score by multiplying the score from the incident discussion edge on the parent vertex by a scaling factor and transition portability. In block 2567, the system maps from an overall presence model and branch presence model stored on the incident chart edge, to which it adds the following: a previously calculated change to the presence model; and a proposed operation on a pair of states in the actor presence Markov model. The system then obtains a score by multiplying the score from the incident chart edge by a scaling factor and a transition probability. The effect of the above (blocks 2561 and 2567) is to determine whether the set of actors 310 is involved with the current vertex consistent with branching off to a new discussion 305, or is continuing the current one, or merging with another discussion 305. To calculate this the prior actor presence models, both the overall and the branch presence models are required (see blocks 2591, 2592.) The score is obtained by mapping the previous and current actor presence models in combination with the structural operation to states in a Markov model. This procedure is very similar to that described for pragmatic tagging. Multiply the prior arc's score by a scaling factor then by the transition probability trained into the model for that pair of states.

2) The likelihood that the proposed structural operation is consistent with prior operations proposed in the process of building up the discussion (see blocks 2562, 2568.) In block 2562, the system creates a mapping from the proposed structure operation, the last structure operation and the state obtained from incident discussion edge on the parent vertex to another score (as in block 2561). In block 2568, the system creates a mapping from the proposed structure operation on the current edge, then last structure operation, and the state obtained from the incident chart edge (as in block 2567). Some embodiments may choose to incorporate other attributes of the discussion into the training of the second Markov model.

3) The likelihood that the pragmatic lag set of the current vertex item follows from the tag set of the proposed parent (see blocks 2563, 2569.) The score can be determined by finding the maximum scoring pair of pragmatic tags, the first chosen from the tag set of the parent vertex and the second from the tag set of the child vertex (recall that an item may have more than one textblock, and each textblock has one pragmatic tag), then mapping the pair to states in a third Markov model and retrieving the transition probability.

The chart actually stores several sequences of modifications to a discussion 305 and the various states of the discussion 305 that would be obtained by making those modifications. The overall purposes of the algorithm is to find the most likely of those sequences. This is obtained by iterating through the list of chart edges incident on the preceding chart vertex (see block 2559, 2560, 2565, 2566, 2572), and selecting the highest scoring of those edges as the parent chart edge for the current proposed edge (see blocks 2564, 2570, 2571.)

When the highest scoring parent edge is found, the new actor presence models are calculated and stored in the current edge (see blocks 2564, 2571, 2578.) This is followed by some final bookkeeping (see blocks 2577, 2576, 2575, 2574.) (Note: Implementations need not store an entire presence model, for example one embodiment would store only the changes in the actor 310 mode at each step. If the presence model to state mapping function described below is used then the actual presence model never needs to be stored, only the prior state and the changes recorded at each step are sufficient to calculate the next state.) However, there is a twist in that the models are updated differently depending on the structural operation proposed for the current edge, as follows:

1) If the proposed operation is add, merge or split then apply the actor status change calculated earlier, and update the presence models from the winning parent vertex edge with actors associated to the current item (see block 2564, 2571.)

2) If the proposed operation is cut then creates a new overall and branch presence model which is initialized with actors associated to the current item (see block 2564, 2571.)

After completing all arcs for the current vertex the discussion is updated (see blocks 2552.) Select the highest scoring chart edge on the current chart vertex (see blocks 2579, 2580) and walk backwards through parent arcs (note: NOT the vertices where item parents stored) for the window size (see block 2581.) If the chart edge so obtained has the cut flag set (see blocks 2574, 2582.) delete the chart vertex, move the following vertices down by 1, update indices in the chart lookup table and reduce the current vertex id by 1 (see block 2585.) (In other words skip over descendants of cut or split items until the window fills with items to be added to the discussion.) Then apply the proposed structural operation on the chart edge to the current discussion:

1) For add and merge operations, if parent a member of the discussion 305, create a discussion 305 edges (see blocks 2583, 2586.) (If the parent is not a member, then this item descends from an item that was cut). In block 2586, finalize the discussion edge between the parent and child vertex stored in the edge, then store the presence models, score, and any other data on discussion edge. Store the discussion 305 id, overall presence model the score and other necessary data on the discussion 305 edge. For cut and split operations add the item vertex to the schedule mentioned in the first step (see blocks 2583,)

2) 2587.) In block 2587, the operation has been identified as either a cut or a split. Remove the discussion edge between the parent and child vertex stored in the edge, create a tentative D-colored vertex in the id of the child vertex id, then add it to the schedule to be investigated as the root of a new discussion.

Termination (see block 2558.) is handled differently for incremental and non-incremental processes (block 2553). For a non-incremented process (block 2555), select the highest scoring edge on the last vertex, walk back window size-2 steps and apply structural operations (e.g. cut, etc) walking forward along same path. Again, in a non-incremental process (block 2553), all vertices left in the window on the winning path get resolved. For an incremental process (block 2554), add the last 'window size'-1 vertices to the unresolved list, which will be used to initialize the next incremental pass as described in the first step (see blocks 2553, 2554, 2556.)

The embodiment listed here uses supervised methods to calculate likelihood scores for the general procedure above. There are 3 areas that require likelihood estimation. First, that the changes in a presence model are consistent with a proposed structure operation, given the prior presence model(s). Second, that a pragmatic tag is consistent with prior tag(s), given a proposed structure operation. Third, that a proposed structure operation is consistent with other general attributes of the discussion.

The preferred embodiment uses Markov models, similarly to the technique used for assigning pragmatic tags. The state space for each model is based on a combination of structural operations and other attributes of the system. Changes in an actor presence model will be scored by number of actors added, dropped or moved multiplied by a weight factor based on whether the actor 310 is moved into or out of the primary actor 2406, contributor 2404, participant 2403 or observer 2405 categories. Pragmatic tags are well defined and the state space will simply be the cross product of structural operations and each possible pragmatic tag. The third category can define a state space based on quantizing different evidence types, the exact choice dependant on the first phase operation, for the embodiment here whether the elapsed time from the last communication in the discussion falls into an extreme trough an extreme burst or in-between (previously described). Particularly for discussion 305 building, n-order models are preferred where n is no larger than the window size defined for the above procedure. Given the somewhat open ended nature of the first definition, either a sparse matrix should be used as discussed for pragmatic tagging training or the score should be bounded by a reasonable value (about 50% of a large discussion actor set).

The models are trained by running the system through the first phase of discussion 305 building, then extracting an appropriate sequence of labels from discussion 305 clusters and manually labelling transitions with appropriate structural operations, taking care to include cut and split nodes. Internal parameters and thresholds can be set by parameter estimation (i.e. evaluating accuracy over multiple runs with different parameter settings). The training procedure is more complicated than the procedure defined earlier in that it creates and updates an internal presence model in the same manner as the phase 2 procedure above in order to use the staple spaces defined above.

Th update procedure for actor status of the author of an item is based on the tallies and evidence types listed under the definition of the actor 310 presence model. Tallies are kept for:

pragmatic tags (R colored vertex metadata)

posts that fall in communication time burst clusters (GB and PB colored links)

frequency of participation (D colored vertex metadata)

Thresholds for these tallies can be determined from the same type of training data mentioned above by standard techniques. Pragmatic tags provide some of the strongest evidence for level of presence in a discussion. Actors 310 with higher counts of initiator/clarifier/summarizer tags tend to be contributor 2404 or primary actors 2406.

The following evidence types can also trigger a modification of presence level:

job title/role and reporting relationships (A colored vertex metadata)

in actor cliques or "circles of trust 1505" (CL colored links)

membership in a collaboration cluster (CO colored links)

Discussions 305 containing a manager and their direct reports automatically assign a higher participation level to the superior, for the embodiment here these actors are moved one level higher than they would normally be considered. For Discussions 305 centered around a clique or collaboration cluster, all members are assumed to be at least participants 2403 because they likely use other communication channels in addition to what can be tracked in the corpus. However there is also a higher requirement for becoming a primary actor 2406 in a discussion. So the effect on these types of discussions is a tendency towards contributor 2404 and participant 2403 levels.

In one embodiment of the invention, a machine learning mechanism including, but not limited to a neural network of genetic algorithm is used to optimize weights in the system.

Refine Actor Graph

Once the discussion 305 building process is complete, the system takes a final pass at correcting the actor 310 graph. In one embodiment of the invention, it does this by evaluating the actor 310 presence shifts within all discussions 305, and seeking patterns in which the presence of different actors seems to sequentially alternate. For example, the case in which Actor D is involved in the first several items of a discussion 305, then disappears for the next several items, but Actor E appears in the place for a while. Similarly, such alternation may correspond to particular topic(s) rather than an interval of time. Each occurrence of such an alternating pattern is recorded. In the event that any pair of actor 310 identities occurs with a statistically significant freuqency, it is reasonably likely that Actor D and Actor E are in fact the same person, but prior to the evidence offered by the discussions 305, there was no way for the system to be to draw this conclusion. In one embodiment, such suspected unmerged actor identities are presented to the user for acceptance or rejection. In others, the merging is done automatically. In either case, the two prior distinct identities will be treated as two personalities 1220 of the same actor 310. If the merge is automatic, the personality 1220 that corresponds to the anonymous identity will be considered the secondary one. In some embodiments, this personality 1220 will be flagged as having been inferential. Note that this will in turn cause circle of trust 1505 information, as well as any other actor 310 graph dependent data to be recalculated as well.

"Related" Discussions

In one embodiment, discussion A and Discussion B will be considered related to one another if any of the following are true:

B is an offshoot of a communication event 570 in A. For example, a subset of actors initiating their own discussion in the midst of another decision.

B is an offspring of A; a message "borrowed" from A becomes part of one of the elements of an otherwise separate discussion B (with a different actor 310 presence)

If A and B merge into one discussion 305 C, A, B, and C are all considered to be related One embodiment of the invention also defines other kinds of relations which have a semantic dimension. Such relations include, but are not limited to, the following:

All discussions 305 that match on topic 315 which occurred proximate to a particular time, or within a given time interval All discussions 305 on a particular topic 315 within a particular circle of trust 1505

All discussions 305 that match an ad hoc workflow 2409 among the same cluster of actors 310

In addition, in one embodiment, the system will consider discussions that have highly similar characteristics to be related. Such similarity can be determined by hierarchical clustering or similar techniques.

Ad Hoc Workflow

Not every corpus will have a format workflow management system associated with it. Even if one is present, it is highly unlikely that it in fact captures all workflow processes, both formal and informal. However, much of the day to day work at corporations is performed through often repeated informal or ad hoc workflow processes. The presence of ad hoc workflows 2409 is suggested by repeated patterns of any of the following:

The appearance of two or more templated documents 575 in the same relative order (Block 2602).

Repeated sequences (A→B→C→A) of communications or actions among individual actors 1210 A, B, C, members of the same actor groups (for example, actors 310 in the same department,) or of actors with the same job titles. In one embodiment, this test may have topic 315 and pragmatic tag limitations.

These patterns are then tested for statistical significance (Block 2612, 2614, 2616, 2618). Detecting ad hoc workflow 2409 (see blocks 2602–2618) is important because it allows the system to detect missing items. One obvious example of an ad hoc workflow 2409 is the pair of events of a purchase request being made and then granted. If there is a document 505 that asserts the request was granted, there must at some point have been the document 505 that initially made the request. In addition, once such ad hoc patterns have been determined, they can be queried on. Further, in one embodiment, including incremented or continuous updating versions of the system, prior existence of specific ad hoc workflows 2409 is used as a hint during discussion building.

Summary

All discussions 305 have an automatically generated summary 2410. In one embodiment of the invention, this discussion 305 is of the following form:

"A discussion led by <Primary Actors> 2406, with active participation from <Contributors> 2404 and others, over the period of time spanning <Discussion Lifespan.> The primary topics were <discussion topics>. If no topics have been identified, "about <named entities>" will be used instead. In the course of the discussion 305, the following documents were modified <document names> by <actors.>" (Blocks 2705, 2710, 2715, 2720, 2725).

This last sentence only appears when more than document 505 was modified. If only one document 505 was modified, the sentence is rewritten as "In the course of the discussion 305, the <document type> <document name> was modified by <actors.>"

If the discussion 305 contains a workflow process, a sentence will be added to the summary 2410 indicating this: "The <workflow process type> <workflow process instance> was <initiated|completed|terminated.> (Note that in order for the system to recognize that a workflow 2409 had been terminated, it would require a template for the workflow process in question.) (Block 2730)

In another embodiment of the invention, participants 2403 and observers 2405 are also named explicitly instead of just being specified as "others." In still other embodiments of the invention, using standard lexical summarization techniques, the most representative sentences authored by each of the primary actors 2406 and contributors 2404 are also included in the summary 2410, in the chronological order in which they appeared in the discussion 305. If pragmatic tagging had identified agreement, or disagreement between actors 310 in relation to a particular assertion (Block 2735), this information may optionally be included as well: "<Actor> asserted <assertion>; <actors> <agreed|disagreed.>" An assertion in this case is the final sentence prior to the lexical markers indicating agreement or disagreement. In yet another embodiment, even if there are no such markers present to indicate agreement or disagreement, the presence of lexically dissimilar responses to a particular assertion will be considered a divergence of opinion, and each such distinct response will be listed along with the actor 310 who provide it: "<Actor> asserted <assertion>;<actor_1> responded <response>, <actor_2> respond <response>." Where responses are lexically similar, or explicitly state agreement, they may be collapsed: "and <actors> agreed. Actor 310 responses are listed in the chronological order in which they occurred in the discussion 305, since one actor 310 response may influence another.

In one embodiment, the user may modify the template provided by the system. If a discussion 305 is revised as the result of the addition of new data to the corpus, the summary will be automatically regenerated.

Resolution

Whereas the intent of a summary 2410 is to summarize the discussion 305 from beginning to end, the resolution 2411 focuses on the outcome of the discussion 305. The term "resolution" 2411 has two related uses in the system: 1) the outcome-oriented summary of the discussion 305 automatically generated by the system, and 2) the actual content in the discussion 305 that contains the resolution. Note that 2) is not necessarily the final item of a discussion 305, though it will generally be towards the need of a discussion 305. Further, a resolution 2411 may sometimes only be inferable, rather than provable, based on the electronic evidence alone. For example, the resolution 2411 to a discussion 305 may occur in a communication event 570, such as a conference call.

In order for the system to produce 1), it must first locate 2)—if it exists. In one embodiment, this is done according to the following procedure:

In the event that the discussion 305 contains a workflow process (Block 2803), the outcome of this workflow process is considered to be the resolution (Block 2804) of the discussion 305, and an appropriate resolution template is generated (Block 2828).

If this is not the case, the system applies the following heuristic, walking backwards from the tail of the discussion 305:

Locate the first communication document 510 that is not pragmatically tagged as an acknowledgement or other "low content" communication (Block 2806).

Locate the first communication document 510 from the organizationally highest ranking actor 310 in the discussion 305. If there is no single highest ranked actor 310, disregard (Block 2808).

Locate the first communication event 570 among the primary actors 2406 and contributors 2404 (Block 2810) in the discussion 305.

Similarly, the first communication event 570 among these actors 310 and their managers (assuming that this data is available) (block 2812).

Whichever of these is found closest to the tail (or at it,) will be considered the resolution 2411. If the only such item is at the head, disregard it.

If none of these items are found to exist (Block 2814), again walking backwards from the tail of the discussion 305, locate a communication document 510 corresponding an attachment (Block 2816) or document link that was distributed among the primary actors 2406 and contributors 2404. Disregard the item if it is at the head of the discussion 305 (Block 2818).

Similarly, failing this, the system will attempt to locate a document 505 that contains lexical markers such as "resolution" or "answer" (Block 2820).

Finally, if none of these items can be found in the discussion 305, apart from its head, the discussion 305 is determined to have no resolution 2411. This is a valid state; ways that it can occur include the following:

The discussion 305 was resolved informally, (i.e. around the proverbial water cooler.)

The discussion 305 never achieved resolution; the participants 2403 abandoned it.

The discussion 305 did achieve resolution, but outside the time frame which is being considered (Block 2826).

Similarly, but no record of the resolution still exists (Block 2830).

In the event that there is no resolution (Block 2850), in one embodiment, the automatically generated resolution 2411 will simply state "None" (Block 2862) in the resolution field. If the resolution 2411 is presumed to have occurred inside an opaque communication event 570 (such as a phone call for which there is no transcript available,) the resolution field will indicate (Block 2866) in one embodiment: "The resolution may have occurred during a <communication event type> meeting between <actors> on <date time.>." If the information regarding this event 570 was extracted from an online calendar which specified a location for the meeting, one embodiment uses the following information: "at <location.>"

If the resolution 2411 has actual content associated with it, the actor 310 represents for the greatest amount of content in the item containing the resolution 2411 will be quoted for up to a user-configurable number of sentences. This is also referred to as the "primary author" (block 2854). (Or, in the event of a transcript associated with a meeting event 2112 (Block 2852, 2856), the "primary speaker" (Block 2860), as identified by their name preceding a textblock 325.) Note that this may not always be the actual author of the item. In one embodiment, this is expressed in the form: "On <date time> <actor> stated: <sentences.>" (Block 2864) Note that sentences could also be sentence fragments or phrases, depending on the actual content.

In one embodiment, the user may modify the template provided by the system. If the discussion 305 is revised due to the addition of new data to the corpus, the resolution 2411 will have to be regenerated.

In continuous versions of the system, a discussion 305 may not have a resolution 2411 for the simple reason that it has not yet concluded. A discussion is considered to be terminated when there are no further items appearing after an interval of t after the last item. In one embodiment of the invention, the value of t is calculated according to:

For actors 310 {a,b . . . z} participating in the discussion 305, if f(a,b) yields the longest interval of warped time between consecutive communication between actors a and b, t=2* the largest value of f(a,b) for all pairwise combinations of actors participating in the discussion 305. In other embodiments, a different value than 2 may be used.

In another embodiment, t may be set to a fixed time interval by the user; alternately the user may add formulas, or select from a set provided by the system. For example, 5*(mean time between contiguous events.)

In the event that the discussion 305 is not yet (considered) complete, its resolution 2411 will be: "Pending."

Discussion Partitions

Since discussions 305 may have an arbitrary number of items, ease of navigation and readability can become a significant issue. To counteract these potential difficulties, the system will attempt to partition longer discussions 305 into smaller logical segments. In one embodiment of the invention, any discussion 305 containing 30 items or more falls into this category; in other embodiments it is user-configurable.

The idea is to create partitions 2401 that have semantic meaning. Events 1525 that will trigger the generation (Block 2905) of a new partition 2401 include, but are not limited to:

Entry of one or more new contributors 2404 into the discussion 305.

Topic drift (as determined using any of the currently available analysis packages for this purpose. The new partition maker is inserted after the drift from one topic 315 to the next is complete)

A burst of communication activity

A change in register

A trough of all discussion 305-related activity that is equal or greater in length to the interval of time covered by the items that would be in the newly created partition 2401 previous to it.

End of a workflow process

End of a project (as extracted from a project management system if available, or calendar.)

Such a trigger will be acted upon unless it would violate the minimum partition 2401 size, which may be set by the user. Partition 2401 triggers occurring in under this limit will be ignored (Block 2910). A partition 2401 ends where a new partition 2401 begins. The type of the previous marker does not influence the type selection of the subsequent one. In other embodiment of the invention, a partition 2401 marker is automatically inserted (Block 2920) after each N items, where the value of N is user-configurable.

Partitions 2401 are used by the querying engine in order to approximately identify those portions of the dissuasion 305 that are most relevant to the query 320. This comes into play when the topic 315 or lexical content specified by the user in a query 320 only really occurs as a passing topic in the midst of a much broader discussion 305. In such cases, the query engine 3120 will identify those partitions 2401 which contain the terms or topics 315 in question. This information is made available for use by user interface components, so that (for example) the partitions 2401 in question can be highlighted.

Pivotal Items

Often, a particular item in a discussion 305 will cause a sudden shift in one or more dimensions of a discussion 305. Such items, whether external 2104 or internal events 2102, email messages, or any other item type are important to note because by definition they were either responsible for, or at the least correlated to, a substantial impact on actor 310 behavior in the discussion 305. They are for this reason often memorable to the participants 2403 in the discussion 305 long after the fact, an attribute which may be very helpful in certain use cases, such as depositions. If an actor 310 is consistently generating pivotal items, this can be considered a measure of their level of influence. In one embodiment of the system, this is also considered as a measure of actor 310 "importance." Thus the system especially identifies them. In one embodiment, pivotal items 2402 may have occurred within a short time interval prior to any of the following:

Shift in actor 310 presence.

Topic 315 drift (as determined using any of the currently available analysis packages for this purpose. The new partition 2401 marker is inserted after the drift from one topic 315 to the next is complete)

A burst of communication activity

A change in register

Initiation of collaboration

A splitting of the discussion 305

Pivotal items 2402 are identified on a purely empirical basis. FIG. 30 is a flowchart of one embodiment of identifying pivotal events. Each of the above changes in a discussion 305 suggests, but does not require, the possibility of a pivotal item 2402. In instances where such a change has occurred, any item occurring in the partition 2401 containing the start of the change, as well as the first item in the next partition 2401 (if the change spans 2 partitions 2401) are candidates to be selected as pivotal message(s) 2402. To determine which item, if any (Block 3005), is to be considered pivotal, all items in both the Nth and the N+1nth partitions 2401 are analyzed (Block 3010) for common textblock 325 content. The first chronological item in the Nth partition 2401 containing the most commonly occurring (Block 3015, 3020) textblock 3245 in the N+1nth partition 2401 is considered to be pivotal (Block 3040). If no textblock 325 occurs more than once, the same test is applied on named entities (Block 3025, 3030) other than actors 310 (i.e. document titles, locations, organizations,) and links to web pages.

For example, in the case of an external article being forwarded to several of the actors 310 in a discussion 305 prior to a burst in communication, the initial appearance of the article is the pivotal item. In the case where there is a shape register change between consecutive communications, which of the two communications is really the pivotal event is determined by the combined number of replies to and forwards specifically of each. In the event that this number is equivalent, the "pivot" is considered to extend over both items. Similarly, in the situation of a burst of communication, the system seeks the item that is at the root of the greatest number of communications in the burst. This might be a forwarded email, a URL to something on the internet, or a textblock 325 extracted from a document 505. In any of these events, the system looks for the first occurrence of the content in question, up until the first item that is clearly part of the burst.

Note that while pivotal items often lie near partitions 2401, this will not always be the case. The system creates partitions 2401 for purposes of general usability and navigability. It will do this whether or not there are pivotal items. Conversely, since partitions 2401 can be configured to have a minimum length, in theory a partition 2401 could contain more than one pivotal item.

Missing Item Detection & Reconstruction

Real-world data often offers only an incomplete record of what transpired. For example, a large number of communications might be found with "RE: change request" in the title, but most email client programs only insert the "RE:" into a header when it is a response to a prior email message. The logical assumption that can be made is that this thread started with a message called "change request" but that the email message that initiated the thread cannot be located, for whatever reason. (Even if the "re:" were manually inserted by the user, it can be considered some indication that the item in question was not originally a singleton.) A quoted textblock 325 that doesn't match any other mails is also considered evidence of a deleted email message. A reply-to ID that no longer resolves to an item—or similarly a frequently referenced link to a document 505 that no longer resolves are other types of items whose original presence may easily be inferred from the system. Workflow 2409, either ad hoc or formal, also provides compelling evidence that certain items must have existed at one point.

The above example represents perhaps the simplest case of how the system copes with missing or corrupt data. In order to account for the strong likelihood that items submitted to analysis by the system will contain omissions and/or unparseable data, a mechanism is required for resolving missing references or predicting the existence of documents 505 not otherwise located by the system. This is crucial not only in the assembly of items into discussions 305, but also in the capability to detect specific patterns in the deletion of data.

For example, let us take the following scenario:

| Emails | Documents | Meeting requests |
| --- | --- | --- |
| A to B, C, D | | |
| B to A | | |
| C to A | | |
| D to A | | |
| | C writes Contract | |
| | | A, B, C, D discuss contract |
| D to B, C, A | | |
| | | A, B, C, D discuss contract revision |
| | | A, B, C, D discuss customer rejection of contract offer |

Here, the request to discuss contract revision seems to occur without the contract revisions being located. However, a number of factors seem to indicate that this must have occurred: there was a meeting to discuss a contract, and subsequently, a meeting to discuss revisions to it, which was preceded by an email exchange between parties who had been at both meetings. Using the previously described linguistic processing techniques, including specific kinds of ontologies, the system attempts to identify events 1525 at best it can. In the above example, the system would be aware of all named documents 505 in the corpus, and with the assistance of a document modification event 540 ontology to recognize such stems as "revise" and "rewrite" and phrase templates, the fact that a document 505 revision that appears to have once existed is no longer present could be trapped.

A related function of the invention is to actually reconstruct a document that no longer exists or is no longer accessible (has become corrupted, is strong encrypted, etc,) but which has left an evidentiary trail behind—in those cases in which this is possible to achieve. In one embodiment of the invention, two main categories of reconstruction are performed:

Email. If an email was either part of an email thread or contained copy/paste text from another email (as identified in the textblock 325 matching process,) the email can be largely, and in some cases totally, reconstructed simply by removing all content that appears at a depth of zero.

Regular documents 515. The best can be hoped for in this case is that an email or check-in message involving the change(s) that correspond to that document 515 version or document 515 still exists and is accessible. Specifically, by "correspond," we mean any of the following, though it is not limited to this list:

The document 515 was referenced by title, directly or indirectly, in an email The subsequent step in a workflow 2409 instance notes or bears witness to the contents of the previous step.

It was contained in an attachment to an email, or in a link, but is no longer accessible It had been in a document repository, but is no longer accessible In such cases, the "reconstructed" attribute of the document 505 is set to 1. The reconstructed document 505 content becomes one of the following:

The partial, or full email, up to and including any header information that still exists.

Rump information about a document that no longer exists in any version. This includes communications as described above, workflow 2409 information (including the template that would have been used in the missing document, when this information is available,) and any check-in messages, fax or other cover sheets that might have appeared in the same OCR'ed staple set.

The immediately previous version of the regular document 515, plus any rump information.

In the event that document 505 is located later, it will replace the reconstructed version, and the reconstructed attribute will revert to 0.

Querying Engine

In one embodiment of the invention, the query engine 3120 accepts query parameters from a number of different sources, including but not limited to:

Query language 3102 (see 'A Method and Apparatus to Visually Present Discussions for Data Mining Purposes')

Natural language interface 3104

QBE GUI 3110 (see 'A Method and Apparatus to Visually Present Discussions for Data Mining Purposes')

Query Building Wizard 3144 (see 'A Method and Apparatus to Visually Present Discussions for Data Mining Purposes')

Direct Multi-Evidence Query GUI 3106 (see 'A Method and Apparatus to Visually Present Discussions for Data Mining Purposes')

Canned Query Generator GUI 3112 (see 'A Method and Apparatus to Visually Present Discussions for Data Mining Purposes')

Visual Query 3108 Specification (see 'A Method and Apparatus to Visually Present Discussions for Data Mining Purposes')

Access API 3114

FIG. 32 is a block diagram of the primary template and return types. The query engine 3120 understands the following classes of query 320 and related objects: actor query 3205, content query 3210, event query 3215, quantification query 3220, statistical analysis 3225 and anomaly or pattern 3230. The query engine 3120 generates the following return types: actors 310 and actor count 3235; discussions 305 and singletons 435, and count 3240; event 1525 count and instances 3245; object count 3250; output of statistical test 3225; anomaly records and/or anomalous discussions 305, and count 3260.

Regardless of the type of the query submitter, the behavior of the query engine 3120 is the same (see blocks 3120–3142). If it is not explicitly passed a template (see 'A Method and Apparatus to Visually Present Discussions for Data Mining Purposes') to match the query 320 to, it will match the query 320 to the available templates 3118 based on the order and types of the query 320 terms. Note that the natural language interface 3104 includes additional terms that indicate the template 3118. For example, the presence of the words "how often" at the start of a query 320 indicate that it is an event-count query 320.

While most query templates 3118 result in the retrieval of discussions 305, this is not universally true. The query language 3102 allows for querying of anomalies, patterns, and trends. It also allows for statistical computations, such as asking the system to correlate two kinds of events. Further, transitive queries are also permitted. For example, instead of querying to see all of the discussions 305 on topic 315 X, the user may query directly to determine the list of actors 310 involved in those discussions 305, or who played particular roles in them (e.g. primary actor 2406, contributor 2404, etc.) Similarly, a user can query to see all actors 310 who generated content on topic 315 X, without explicitly involving discussions 305.

Query 320 result types include, but are not limited to, the following:

Discussions 305

Actors 310

Events

Documents 505

Anomaly instances

Number of Entity (discussions 305, actors 310, events, documents 505, etc)

Statistical test result (including but not limited to: statistical significance, correlation, conditional probability, variance, etc)

Not every query 320 specified will be a valid one. In the event that no clear template 3118 match can be found, the system will abort the query 320 attempt, and prompt the user with structural assistance, (such as a wizard in a GUI), to respecify the query 320. If a particular term specified, such as an actor 310 name, cannot be found in the corpus, the system will present a list of nearest matches, and request that the user select the desired one. In embodiments, this is done on the basis of n-gram analysis, while in another embodiment the system relies on phoneme-oriented technology such as that offered by Soundex. If this falls as well, the system will prompt the user for the organization or group of the desired actor 310, and will provide a list of names to browse through accordingly. Other terms are handled similarity. The system will proceed with the query 320 if it has at least one valid instance of each query 320 term required for the particular template 3118. If there are also invalid terms present, the system will generate a list of the unrecognized terms with a warning.

Queries that will result in either the retrieval or counting of discussions 305 perform a structured queries which are not discussion-bound may have to access multiple record types. Hence those queries directly involving discussions 305 will be the most computationally efficient.

All queries produce an audit trail. In one embodiment of the system, this audit function tallies the number of queries on each entity (for example, how many times the actor 310 Jay Smith was specified in a user query 320,) as well as the number of times each object was retrieved in response to a user query 320.

Relevancy Ranking Schemes

Because discussion 305 objects have so many different attributes, many based on entirely different kinds of evidence, a simple or fixed relevancy ranking scheme would be ineffective, and without lead to user confusion. Most queries entered into the system are likely to have at least 3 or 4 distinct dimensions, for example: actor 310, content description, action (i.e. created, modified, received, deleted, etc) and time frame. In addition, in certain uses cases, the most relevant characteristic of a discussion 305 might be arbitrary compound attributes, such as two complex events (i.e.. actor 310 performing action on content) occurring in a particular sequence.

In order to counter these difficulties, the query engine 3120 performs a clustering analysis on the candidate result set (Block 3310). Returned results are returned according to cluster, with the members of the highest ranking cluster being displayed first. The clusters are ranged according to how well the canonical member matches the values of most important evidence types specified in the query 320 (Blocks 3315, 3320). Which evidence types are most important are determined by the user. This may be done as a global default, or as an advanced option to an individual query 320. In one embodiment of the invention, this is done using a combination of ordinal ranking and a 5 point anchored importance scale ranging as follows:

5=critically important
4=important
3=moderately or somewhat important
2=relatively unimportant
1=unimportant In one embodiment of the invention, a default setting is provided in which actor 310 specification has an ordinal ranking of 1 and an importance of 5, and content specification has an ordinal ranking of 2 and an importance of 5. Note that both an ordinal ranking and an important scale are required; the former is necessary in order to break ranking ties, and the latter is required in order to know how much relative weight to assign to each evidence type. Specifically, the relevance ranks for individual items are determined using the importance scale value, multiplying it by the match coefficient (blocks 3325, 3330) and then where necessary, using the cardinal ranking to brake ties (Block 3340). For example, if a user specifies in a query that it is critically important that a particular document type in a discussion 305, actor 310 information will still take precedence in ranking, presuming that actor 310 is information ha the highest ordinal ranking. However, if the user that one actor 310 appearing the results is more important than another particular actor 310 appearing, both will have the same ordinal rank, but will have different importance levels assigned to them.

The match coefficient is used to express the degree to which the attributes of an individual discussion 305 matches what the user has specified in a query 320. For example, in a query 320 the user may have specified an actor 310 group which is composed of 8 members. A particular discussion 305 might only be associated with 5 of those actors 310, but might strongly match other terms in the query 320. Most embodiments of the invention take the viewpoint that in this example, the discussion 305 should not receive a score of 0 in the actor 310 dimension. In such embodiments, the discussion 305 will therefore receive a partial score for actors 310. In one such embodiment, the discussion 305 would receive a score of 5/8. In other embodiments, the partial score is based on the percentage of overlap between the actors 310 occurring in the discussion 305, and those specified in the query 320. So if the discussion 305 in question had 10 other actors 310 associated with it apart from those 5 named in the query 320, the partial score would be 5/8. Still other embodiments perform similar calculations, but factor in the different possible levels of actor 310 participation. Another embodiment requires that at least one of the primary actor(s) 2406 in the discussion 305 appear in the query 320 in order for a partial score to be assigned. Other embodiments extend this to contributors 2404 as well. However, the user may specify in the query 320 that the presence of a certain actor 310 is required in order to return a result. In such instances, this specification takes precedence over all any partial scoring mechanisms.

Other examples of where match coefficients should be used include, but are not limited to:

Ontology classes: In one embodiment, a parent ontology class may be substituted for a child, and similarly, one sibling class may be exchanged for another. In one such embodiment, either substitution results in a partial score of 0.75.

Document Templates: Similarly, a document 505 in a discussion 305 may not have been created with the exact template specified in the query 320, but rather a specialization, generalization, or sibling. In one such embodiment, either substitution results in a partial score of 0.75.

Events: Similar logic applies to events 1525. This is especially important, since some events 1525 extracted from sources such as online calendars may frequently be underspecified. Further, there may be arbitrarily deep hierarchies of user-created event 1525 types, decreasing the likelihood of exact type matches.

Within each cluster, by default, the results are shown in order of highest score relative to the query 320. Singletons 435 can also appear in results sets, but by default will do so only after the list of discussions 305; in some embodiments the singletons 435 (when present) are placed in a separate result set, and displayed separately. Singletons 435 are relevance ranked using standard lexical relevancy ranking techniques.

In one embodiment, the user may specify a query 320 that would result in a specific set of discussions 305 being returned, and in the same query 320 specify that he wishes to see any anomalies related to this set of discussions 305. This will result in any anomaly containing discussions 305 being brought to the top of the results list, regardless of other scoring. The relevant anomaly records will also be returned.

Some embodiments of the invention may also relevancy rank according to factors including, but not limited to:

The length of the discussion 305 in terms of item count
The maximum depth of the discussion 305
Whether it achieved resolution; incomplete discussions 305 are valued less highly The number of times a document 505 or communication within the discussion 305 has bene forwarded to other actors 310, forwarding often being an indicator of relevance.

In e-mail reply chains, the value of the X-importance flag.

The number of actors 310 to which a communication was sent, and the identity and importance or circle of trust 1505 or organizational membership of those actors 310.

Querying by Example

The invention allows various forms of Query of Examples. It allows the user to submit a discussion 305 as an exemplar, using the scoring mechanisms discussed above. It also allows one or more singletons 435 to be so submitted. In one embodiment, all exogenous documents 505 of the same type are processed in a batch so that similarities and overlap may be noted. (Block 3512) These documents 505 can be part of the corpus, or any arbitrary document outside of the corpus. One highly useful use case of this loading depositions into the system. Such especially useful document types may have special interpretative templates created for them (Blocks 3502, 3504), as well as special results output behavior. For example, in the case of a deposition, the structure consists of a sequence of question blocks followed by answer blocks. The identity of the deponent can be easily be identified from the document format, instead of having to rely on the first known actor reference located in the document (Block 3508.). This information can be leveraged to parse the question, and submit the block comprising the question and answer along with the deponent actor substituted for the pronoun in the question (block 3510) to the QBE processor (Block 3430). It can also be used to group results very effectively, for example grouping together and comparing the responses of multiple deponents to the same question. More generally, if there is no template available for the document in question, pragmatic tagging will be used to separate questions from answers (block 3506) the system passes the document 505 through its ontological filters in order to ascertain references to specific topics 315 of interest in the corpus (block 3506). The QBE processor performs a full linguistics analysis (block 3514) and extracts any named entities, such as actors 310 or document titles (Block 3506). Then it extracts dates, as well as geographical locations (Block 3435). Doing a segment by segment analysis, where the segments are first sentences and the individual textblocks 325, the actor 310, action, content descriptor, time frame, and potentially other data, such as event information are extracted, and translated into queries in any case in which minimally an actor 310, an action, and a content descriptor have been delimited.

Depositions and similar question and answer formatted documents 505 are of special interest for commercial reasons. In particular, in those instances where a large number of deponents are asked the same (or very similar once post-processed) questions, the invention can be used to compare and contrast the different answers provided (blocks 3520, 3518).

Perform an n-gram analysis of the different answers to the same question.

Within each set of answers to a given question, group similar answers based on shared n-gram and shared Named entities (block 3522). This is an unsupervised text clustering within one supervised cluster.

Using pragmatic tags 2301 to separate negative from positive responses, further categorize the responses (see blocks 3524). Count up and correlate the actors 310 providing similar responses with the circle of trust 1505 information computed from the corpus (block 3524).

Aggregate the cluster of Actors 310 over all answer sets. Again look for intersections with circles of trust 1505 computed from the corpus (block 3526)

If there is a pattern of unusually common agreement among actors 310 who are members of the same circle of trust 1505 as opposed to arbitrary other deponents, the system generates a message containing the names of the actors 310, the question, and the most canonical example of a response. (For the preceding bullet point see blocks 3528, 3530, 3532, 3534.)

Statistics and Anomalous Behavior

In order to help build discussions 305, the system calculates the patterns of actor 310 behavior. However, the flip side of calculating the patterns is determining the anomalies, or exceptions to these generally practiced patterns of behavior. Such anomalies are an important facet of the communication of the groups of actors 310 in the corpus. For example, sometimes the fact that a particular actor 310 was manually eliminated from a "reply all" is more interesting than the contents of the email in question. To this end, the system calculates these anomalies, and allows them to be queried by the user. Anomalies are properties of the actors 310 committing them, however a discussion 305 may be flagged as anomalous if it contains anomalous behavior. In one embodiment of the invention, anomalies are determined as follows.

The system calculates the proportion of messages any individual actor 1210 addresses to any other actor 310 or group of actors 310 over discrete time intervals. Any change in these numbers or proportions may indicate a significant event such as a change of role for the actor 310 in question, the start or end of a project, or the start or end of some activity that the system is attempting to detect. Note that in those instances where the detected anomaly matches on actor 310 and time with a well-known calendar event 2108, such as the end of a project, no anomaly will be reported. Similarly, the system detects other changes in behavior, or anomalous behavior, including, but not limited to:

An actor 310 starting to cc or bcc himself on certain e-mail messages.

An actor 310 starting to forward messages or documents 505 to another of his own accounts, or to another actor 310, either of which may be inside or outside the organization.

Situations where Actor A organizationally reports to Actor B, and Actor B reports to Actor C, but A and C communicates with each other frequently, excluding Actor B. Similarly, any instances in which a circle of trust 1505 exists that does not conform to the organizational chart (in which links exist in the circle of trust 1505 that do not exist in the graph representing the organization chart.) Or any other instance in which the flow of communication is not aligned with the org chart, either skipping over actors 310, or violating organizational boundaries. This includes, but is not limited to, patterns cases such as the one in which Actors A–E all report to Actor Z, but A only regularly communicates with B, C, and D. This information may optionally be correlated to other actor 310 information that may be available, such as age, race, gender, and religious or sexual orientation. Note that in addition to organization charts, other information such as project membership lists may be fed into the system in order to avoid false positives caused by actors 310 communicating extensively within a project spanning multiple organizations. Note that the system constructs different versions of an organization chart graph by extracting the actor lifecycle events 545 from an HR system, and then building as many versions of the resulting graph as necessary. (No more than one new version per calendar day can be generated. This restriction is to account for bulk events, such as the transfer of 20 persons from one organization to another.)

Situations where the actors 310 discussing a particular subject are not those who would normally be expected to discuss that subject. This is detected by finding isolated islands of topic 315 communication, as determined by the use of ontology classes or statistical topic analysis. For example, in the accounting department, there will typically be many finance-related discussions 305. The saturation level of these topics 315 in the discussions 305 in which the actors 310 in this department participate can therefore be expected to be high. However, for example, in the engineering department, discussing such topics 315 is unusual, again as measured by the saturation level of the topic 315 in the discussions 305 in which actors 310 in that department are engaged.

Chains of trust: patterns where whenever Actor X communicates with Actor Y, Actor Y always communicates with Actor Z immediately afterwards (or in the first bunch of e-mails thereafter, to allow for Actor Y returning from an absence—so called "warped" time). Likewise, situations where this pattern initially exists, but then suddenly ceases to exist. This is determined by walking the colored graph for common patterns of sequential actor 310 communications. Those not corresponding to a known workflow process are flagged; the subset of these in which an organizational boundary of some kind (even a hierarchical or lateral one) has been crossed are flagged as anomalous. Note that in this regard, the organizational boundary is determined by assessing the primary work domain of each actor 310. In other words, in this particular calculation, an actor 310 making use of another actor's 310 home email account will not be considered crossing an organizational boundary if the two actors 310 are in the same organization.

Instances in which an actor 310 who does not normally edit a specific kind of document 505 (determined by either topic 315, file extension, template, or a combination of the above,) or instance of a document 505 doing so. Further, instances in which such edit appears to have been requested by another actor 310, as identified by a combination of pragmatic tagging and named entity extraction (i.e. the document 505 is referenced by name in a communication,) or by clear reference to the document 505 as attachment to the present or related communication.

Changes in "warped time" for more than 50% of the actors 310 who are either members of the same circle of trust 1505, aggregate actor 1205, or organizational group. Otherwise, put, statistically significant increase in the amount of after-hours communication and other electronic activity.

Similarly, time intervals providing evidence of the burstly behavior used to establish event-based circles of trust 1520 are flagged as anomalies.

In addition, the system keeps a count of each such instance per actor ID, as well as the impacted items. These items can be mapped to their containing discussions, thus allowing discussions containing anomalous items to be identified. It can thus also identity any actor 310 who performs these unusual activities a significant amount on a long-term ongoing basis. Such an actor 310 would avoid detection based on only examination of only his own behavior. However, when contrasted with the rest of the population, the behavior will appear appropriately anomalous.

The system will endeavor to correlate all anomalies that occur more than once to any periodically or frequently occurring event 1525. The time threshold used may be set by the user; by default, if L is the temporal length of the event, an anomaly would have to occur within |L| of the event 1525 in order to be considered related.

As noted in a previous section, in general, abrupt or gradual changes in the interactions among specific actors 310 are not considered anomalous per se. However pairwise histogram information of actor 310 communication is calculated during the computation of circles of trust 1505, and such changes are queryable through the querying engine.

Forensic vs. Continuous Systems

The invention herein described can be used in either a forensic context, or on a "live," continuous, or "incremental" monitoring basis. The main difference is that in the case of the latter, the interpretation of some items may have to be deferred until there is sufficient data to determine how to proceed. From a procedural standpoint, this amounts to the same thing as adding new data sets in the forensic use case. However, in the continuous case, discussions 305 which currently do not yet have resolutions marked with a special "pending" flag until the discussion 305 is considered to have concluded based on a long period of inactivity (see previous discussion of this.) In one embodiment, singleton items 435 that were created by actors 310 indigenous to the corpus are similarly marked as pending for a certain period of time based on the mean time to the next expected related event, if there is be one. For example, if the item is an email from Actor A to Actor B, the system will use the communication profile history to these actors 310 to determine how long to wait before no longer expecting a response. For other types of items, the mean time to the next related event is calculated on the basis of past historical mean times between events of this type in a discussion 305 in which the same actor 310 was involved, and the subsequent event. In one embodiment, after an interval of 3*t has passed, where t is the mean time of the next related event occurring, the pending flag will be removed. Other embodiments may use a different constant.

Note that even discussions 305 that were not labeled as pending may yet change, as "new" data retroactive data becomes available. Examples of cases this might occur include the case of an actor 310 synching a mobile device with a networked computer after several days of use, an actor 310 who had been on vacation without internet access suddenly getting back online and sending numerous communication—or a human resources database being updated after numerous changes had already taken effect. Therefore, the pending flag should be thought of as a probabilistic guess on the part of the system based on historical behavior, rather than as an absolute guarantee of stability of non-pending items. If a non-pending discussion 305 is changed, its version number is increased by 1. Pending items do not have version numbers. Discussions 305 which are considered to be complete by the system may be data warehoused or moved into other types of systems for examinations.

An appropriate processing interval is determined by the system's administrator. If desired, different processing intervals may be set for data of different types, or in different locations. The most appropriate interval length is determined by a number of different factors, including how frequently new data arrives, and the particular application of the system. For example, in one embodiment, as the data is processed, an alert is sent to a pre-configured list of users if certain ontology classes trap data (or example, child pornography,) or for different kinds of anomalies, such as information leakage. A log of all such occurrences is also maintained by the system. In such cases, a frequent processing cycle is required.

FIG. 36a is a block diagram of the dynamic update detection process. The system uses polling or subscriptions to monitor file system changes (Block 3604), application store changes (Block 3608) and changes from other sources including the network 105 (Block 3606). Files 3602 are passed as input to the spider, adding file location and timestamp to the spider database, if not already there (Block 3610). Duplicates are detected (Block 3612), files are split into communications (Block 3614), a communications fingerprint is computed (Block 3616), and the fingerprint is associated with a spider database entry (Block 3618). If the fingerprint has not been seen before (Block 3620), indexing 3622 (possibly incremental) is required (Block 3622).

FIG. 36b is a block diagram of the indexing process 3622 Fulltext indexing 3623 of free text and metadata (Block 3624) allows a graph index to be generated (Block 3626) and discussions 305 to be built (Block 3628). Constrained clustering is conducted (Block 3634), rules are applied (Block 3636), local search is carried out (Block 3638) and actor 310 aliases are deduplicated (Block 3640).

Privacy Issues

Access Control Lists (ACLs) may be set up on the basis of actor 310 (individual or aggregate,) topic 315, the presence of specific document types (as determined by pragmatic tags, the presence of specific words or phrases, or file extension or name,) or the intersection or union of any of these attributes. In one embodiment, the ACLs used as those of the underlying operating system, so that the present invention inherits the security model of the computing environment in which it is running, and allows the reviewer 2407 access only to those items to which the reviewer 2407 would normally have access using access methods other than the present invention. The system may be configured to not show any discussion 305 in which even one protected item appears. If this option is not enabled, the discussion 305 items will be automatically renumbered by the system prior to display to the user so as to mask the existence of the protected item. Note that the numbers are mapped back to the correct underlying numbers if the user makes a modification, such as an annotation. An option also exists to exclude from view any personal communications. This is judged by correspondence with, or documents 505 from an actor 310 outside the primary domains of the corpus who is manifested in the corpus only in relation to a single actor 310. Similarly, items that would be considered as "privileged" in a court of law may be automatically excluded from view for everyone except the superuser, who has access to all data.

CONCLUSION

An apparatus for processing a corpus of electronic data associated with a finite (though potentially very large) set of actors into sets of causally related documents or records which will be referred to here as 'discussions' 305. This contextualization of the data makes for much easier, faster, and less ambiguous reading of a related series of communications, events, or documents. Moreover, it greatly reduces the number of false positives returned to the user who submits queries, thereby virtually eliminating the problem (commonly encountered with keyword search) of huge results lists containing just a few items of interest. It additionally facilitates the identification of patterns of behavior among the actors associated with the corpus. This can be used both to carry out informal process assessment, and to detect anomalies in these patterns that may be important in an investigative or litigation context.

By managing documents within their sociological context, the present invention allows the user to understand the when, who, how, and why of the document, and the document's relationship to other documents. Specifically:

Who: The system's notion of "who" includes, but is not limited to the following: Is the document an attachment, or inline text in an email message; Who is the author of the document; If the document is an attachment, is its author different than the author of the email; Was it forwarded from another source; Who was it sent to; Was it sent to individuals, or to lists; Who was it cc'ed to; Bcc'ed to; Was there a "reply to:" different from the authoring account; Does the exchange fan out over time to include more people, or does it contract; Who has deleted the message; Saved the attachment; Did the sender delete it especially from his "sent" box; Did he specifically cc: or bcc: to it himself, (indicating that he felt it had a certain importance when he sent it.) Who has retrieved or examined the discussion;

When: The system's notion of "when" includes, but is not limited to the following: When was the document first sent; What time of day; Is the time of day consistent with other messages classified as being in the discussion; What day of the week; Was it sent more than once; By the same person, or also by other people—and if so, whom; If an attachment, when did it first appear in an email; Has it been updated or revised; If so, how many times.

Where: The "where" is a means of capturing personal context. Personal context is extremely helpful in assisting someone to remember the range of dates or approximate time span in which the discussion may have initiated, intensified, or concluded. For example, someone might remember "The conversation really heated up when I was in France." (Further, if the trip information is entered into a calendar, the system can retrieve the date range automatically.)

"Where" includes the answers to questions such as: From what account was the document sent, a corporate or a personal one; From what time zone; (Was the sender traveling at the time); From what kind of device. In the context of the "where" part of the equation, the type of device is relevant in that is a hint about the user's physical location at the time he sent the message. For example, if he is at his desk, he is unlikely to use a mobile device.

How: The system's notion of "how" includes, but is not limited to the following: Was the information sent via email; With what priority; Via an instant message; Via a text page; From what kind of device; Via an attachment in an email; If an attachment, was text from the attached document copied inline in the email itself; Does the attachment appear to be summarized in the email.

The type of device, or method of sending the message may alter certain aspects of the communication. For example, an email message sent from a small mobile device is likely to be shorter than one sent from a desktop machine, and may also be likelier to reference a previous or forthcoming message. A response from a mobile device, especially a longer one, may suggest time critically of the discussion.

Why: The system's notion of "why" includes, but is not limited to the following: in response to a previous message, as the result of a known meeting—one time, frequent or periodic, which might be recorded in an Outlook or similar online calendar; as part of a periodic series of messages, such as a weekly status report; to send out an updated version of an attachment; as part of a repeatable or known business process.

When taken collectively, the above-described data allows the document to be placed in its real world context and subsequently classified appropriately on this basis. The result is what is referred to here as a discussion 305.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A computer processing system for retrieving interrelated documents, comprising:
   a document repository for storing a plurality of documents, wherein a document is any data that has an inferable or explicit actor and date;
   a metadata repository for storing a plurality of metadata elements to represent relations between the documents;
   a sociological analysis engine to identify causal relationships between the documents using the metadata elements from the metadata repository.

2. The processing system of claim 1, wherein the sociological analysis engine automatically resolves references to an actor who has more than one electronic identity.

3. The processing system recited in claim 1, wherein the sociological analysis engine automatically resolves reference to an actor who has more than one electronic personality.

4. The processing system recited in claim 1, wherein the sociological analysis engine detects missing data by reference to other documents within the document repository.

5. The processing system recited in claim 1, wherein the sociological analysis engine removes or otherwise makes unavailable documents or parts thereof deemed by the engine to be of a particular content type.

6. The processing system recited in claim 1, wherein the sociological analysis engine categorizes a plurality of documents by iteratively attempting to match the documents to multiple ontology classes, both individually and in combination.

7. The processing system recited in claim 1, wherein the sociological analysis engine determines the most likely correct term in a document that has been input using a process that is subject to error.

8. A computer implemented method for identifying whether a plurality of documents are causally interrelated, the method comprising:
   extracting metadata and content from the documents and storing it in a repository, wherein a document is any data that has an inferable or explicit actor and date;
   computing metadata for representing a sociological analysis to identify causal interrelations between the documents and storing the metadata in the repository;
   and in response to a search query, identifying a plurality of relevant, causally interrelated documents stored in the repository.

9. The method as recited in claim 8, wherein the sociological analysis engine automatically resolves reference to an actor who have more than one electronic identity.

10. The method of claim 8, further comprising:
    enabling a user to query based on record type, wherein record type includes one or more of the following: anomalies, circles of trust, ad hoc workflows, and cliques.

11. A computer implemented method for identifying causal relationships between a plurality of documents comprising:
    extracting metadata and content from the documents and storing it in a repository, wherein a document is any data that has an inferable or explicit actor and date;
    computing metadata for representing a sociological analysis to identify causal interrelations between the documents and storing the metadata in the repository; and
    creating links between the causally related documents.

12. The method of claim 11, further comprising:
    identifying patterns in behavior; and
    tagging changes in the patterns of behavior over time.

13. The method of claim 12, further comprising:
    identifying ad hoc workflows illustrating a directed graph of communication between actors based on the detected patterns of behavior.

14. The method of claim 12, further comprising:
    identifying closed loops defining circles of trust based on the detected patterns of behavior over time.

15. The method of claim 11, further comprising:
    identifying an actor, wherein the actor may have a plurality of different aliases, and wherein the aliases of the actor may change over time.

16. The method of claim 15, further comprising:
    building a behavioral model of the actor, the behavioral model generating an actor heartbeat defining the actor's expected behavior.

17. The method of claim 15, further comprising:
    identifying the actor's importance globally and at a per-conversation level.

18. The method of claim 15, further comprising:
    identifying a conversation and identifying each of the actors associated with the conversation.

19. The method of claim 18, further comprising:
    categorizing each of the actors in the conversation based on a level of participation.

20. The method of claim 11, further comprising generating a communication graph to determine communication links between the actors.

21. The method of claim 11, further comprising:
    in a discussion including quoted text, identifying each text block and attributing the text block to an actor.

22. The method of claim 21, further comprising identifying an arc of discussion and determining pivotal items in the discussion.

23. The method of claim 22, further comprising summarizing the discussion.

24. The method of claim 22, further comprising identifying a resolution of the discussion, if the resolution was reached.

25. The method of claim 24, further comprising identifying a discussion as pending, if the data is real-time data, and no resolution has been reached in the discussion.

26. The method of claim 11, further comprising performing pragmatic tagging on a document to establish intent.

27. The method of claim 11, further comprising:
for each document, determining if the document is an original document or a revised document, and for each revised document, determining a version and history.

28. The method of claim 11, further comprising:
enabling a user to enter a query based on a plurality of questions targeted at one or more actors, and responding to the query with documents which provide yes/no answers to those questions.

29. The method of claim 11, further comprising distinguishing between template based and boilerplate based documents.

30. The method of claim 11, further comprising enabling a user to submit a query by example, based on a submitted discussion or document.

\* \* \* \* \*

UNITED STATES PATENT AND TRADEMARK OFFICE
CERTIFICATE OF CORRECTION

| | | |
|---|---|---|
| PATENT NO. | : 7,143,091 B2 | Page 1 of 1 |
| APPLICATION NO. | : 10/358759 | |
| DATED | : November 28, 2006 | |
| INVENTOR(S) | : Elizabeth Charnock et al. | |

It is certified that error appears in the above-identified patent and that said Letters Patent is hereby corrected as shown below:

On Title Page, Item (73)
Assignee: delete "Cataphorn, Inc., Redwood City, CA (US)" and insert --Cataphora, Inc., Redwood City, CA (US)--.

Signed and Sealed this

Thirteenth Day of February, 2007

JON W. DUDAS
*Director of the United States Patent and Trademark Office*